US012088888B2

(12) United States Patent
Kim et al.

(10) Patent No.: US 12,088,888 B2
(45) Date of Patent: Sep. 10, 2024

(54) USER INTERFACES FOR MEDIA SHARING AND COMMUNICATION SESSIONS

(71) Applicant: Apple Inc., Cupertino, CA (US)

(72) Inventors: Sooyeon Kim, Mountain View, CA (US); Brian K. Shiraishi, Belmont, CA (US); Jee Won Choi, San Francisco, CA (US); Lucio Moreno Rufo, Campbell, CA (US); Neil P. Cormican, Menlo Park, CA (US); Pavan Rajam, Cupertino, CA (US); Tiffany S. Reese, Livermore, CA (US); Victoria K. Harrington, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/663,320

(22) Filed: May 13, 2022

(65) Prior Publication Data

US 2022/0368993 A1 Nov. 17, 2022

Related U.S. Application Data

(60) Provisional application No. 63/197,442, filed on Jun. 6, 2021, provisional application No. 63/189,121, filed on May 15, 2021.

(51) Int. Cl.
*H04N 21/4788* (2011.01)
*H04N 21/43* (2011.01)

(52) U.S. Cl.
CPC .................. *H04N 21/4788* (2013.01); *H04N 21/43076* (2020.08)

(58) Field of Classification Search
CPC .................... H04N 21/4788; H04N 21/43076
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |

(Continued)

FOREIGN PATENT DOCUMENTS

| | | | |
|---|---|---|---|
| WO | 2013/169849 | A2 | 11/2013 |
| WO | 2014/105276 | A1 | 7/2014 |

OTHER PUBLICATIONS

International Search Report received for PCT Application No. PCT/US2022/072330, mailed on Oct. 21, 2022, 6 pages.

*Primary Examiner* — Kyu Chae
(74) *Attorney, Agent, or Firm* — Kubota & Basol LLP

(57) ABSTRACT

In some embodiments, communication and/or media user interfaces associated with a synchronized media and communication session can be displayed at one or more devices. In some embodiments, a first electronic device can join and/or add media content to a synchronized media and communication session when an associated second electronic device is part of the synchronized media and communication session.

69 Claims, 87 Drawing Sheets

(56) References Cited

U.S. PATENT DOCUMENTS

| | | | | |
|---|---|---|---|---|
| 8,239,784 | B2 | 8/2012 | Hotelling et al. | |
| 8,279,180 | B2 | 10/2012 | Hotelling et al. | |
| 8,381,135 | B2 | 2/2013 | Hotelling et al. | |
| 8,479,122 | B2 | 7/2013 | Hotelling et al. | |
| 9,348,458 | B2 | 5/2016 | Hotelling et al. | |
| 9,933,937 | B2 | 4/2018 | Lemay et al. | |
| 2002/0015024 | A1 | 2/2002 | Westerman et al. | |
| 2005/0190059 | A1 | 9/2005 | Wehrenberg | |
| 2006/0017692 | A1 | 1/2006 | Wehrenberg et al. | |
| 2006/0033724 | A1 | 2/2006 | Chaudhri et al. | |
| 2006/0197753 | A1 | 9/2006 | Hotelling | |
| 2010/0188575 | A1* | 7/2010 | Salomons | H04N 5/50<br>348/553 |
| 2013/0173742 | A1* | 7/2013 | Thomas | H04L 65/762<br>709/217 |
| 2014/0325541 | A1* | 10/2014 | Hannes | H04N 21/6175<br>725/14 |
| 2016/0212181 | A1 | 7/2016 | Zhang et al. | |
| 2017/0041658 | A1* | 2/2017 | Mattingly | H04N 21/4312 |
| 2018/0159855 | A1* | 6/2018 | Ha | G06F 21/35 |

* cited by examiner

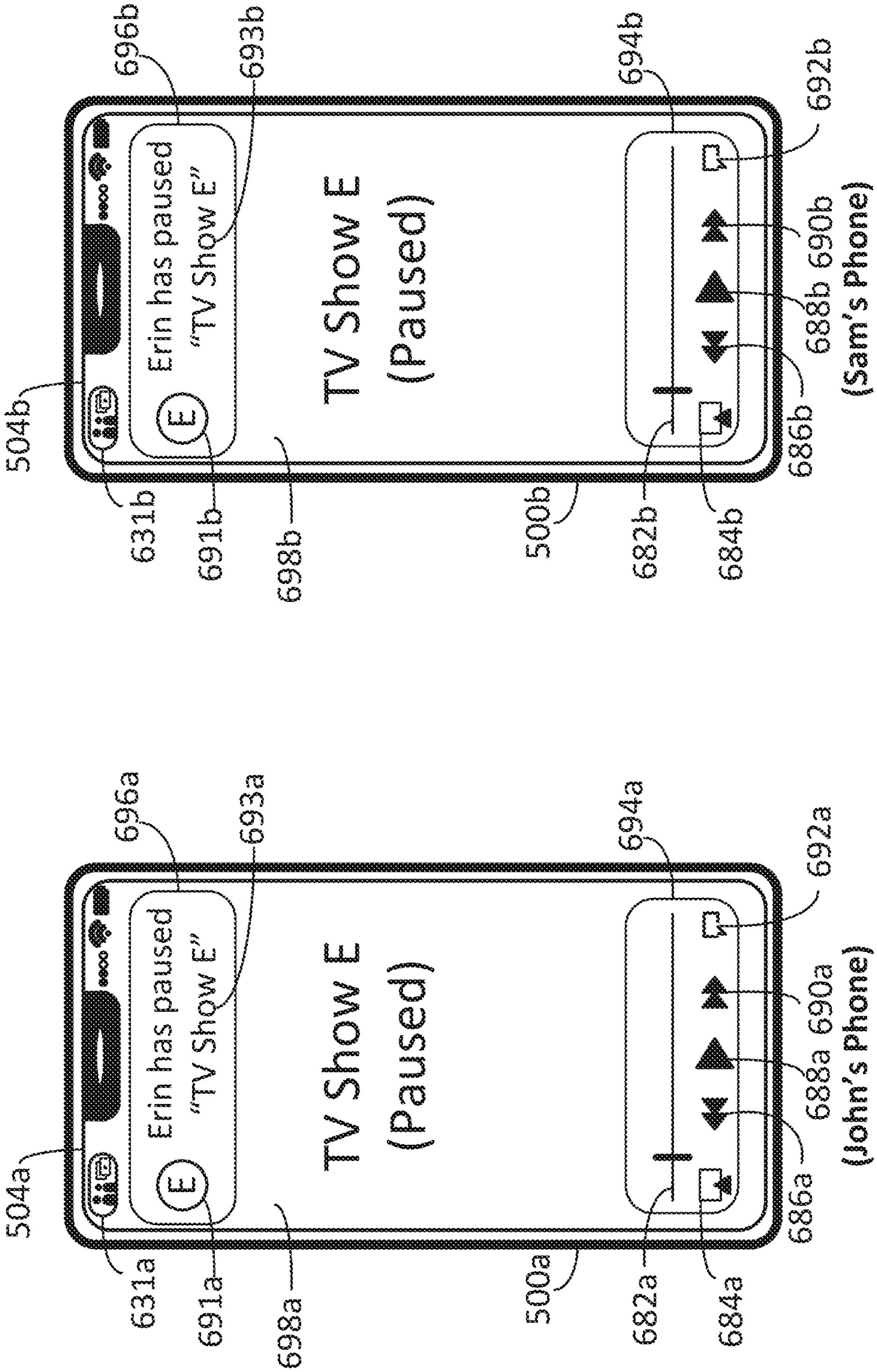
FIG. 6AAA

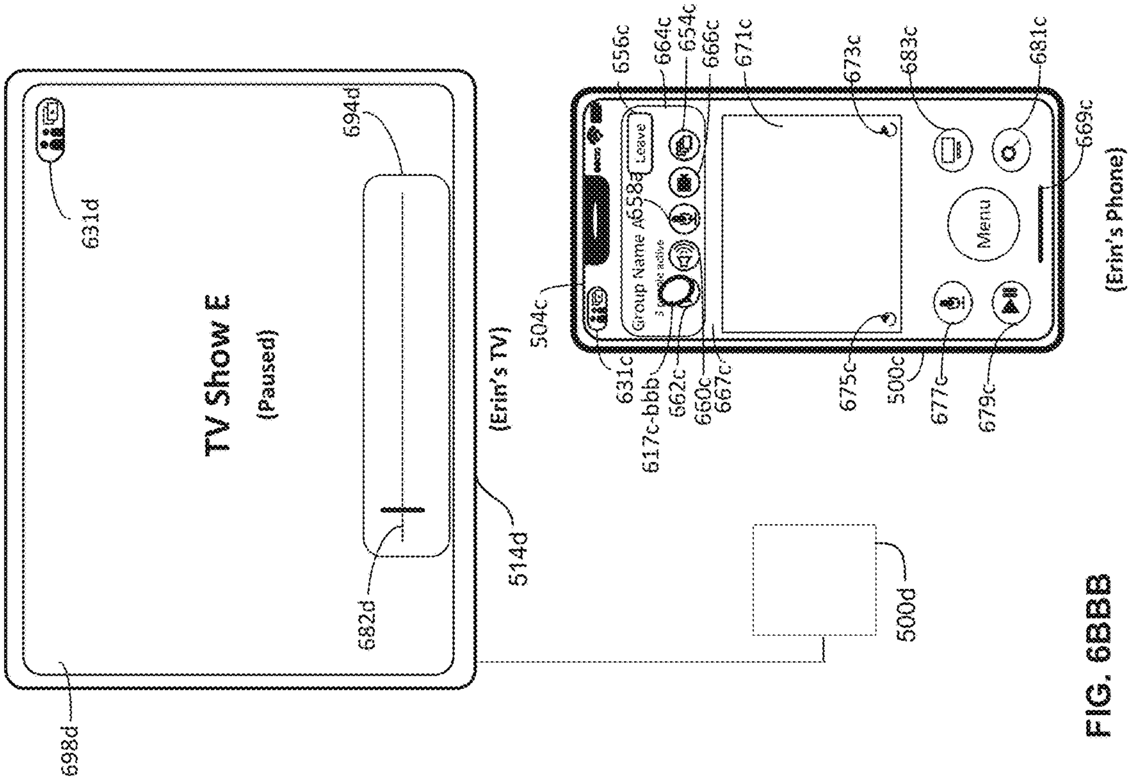
FIG. 6BBB
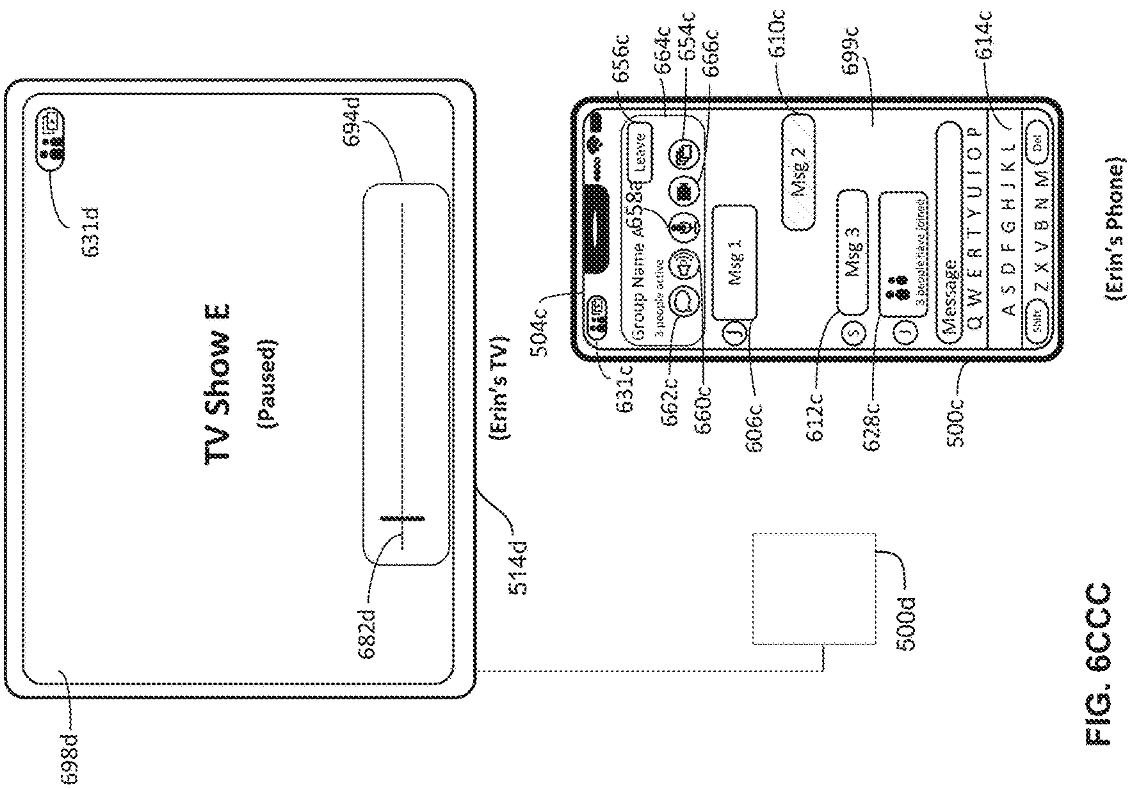
FIG. 6CCC

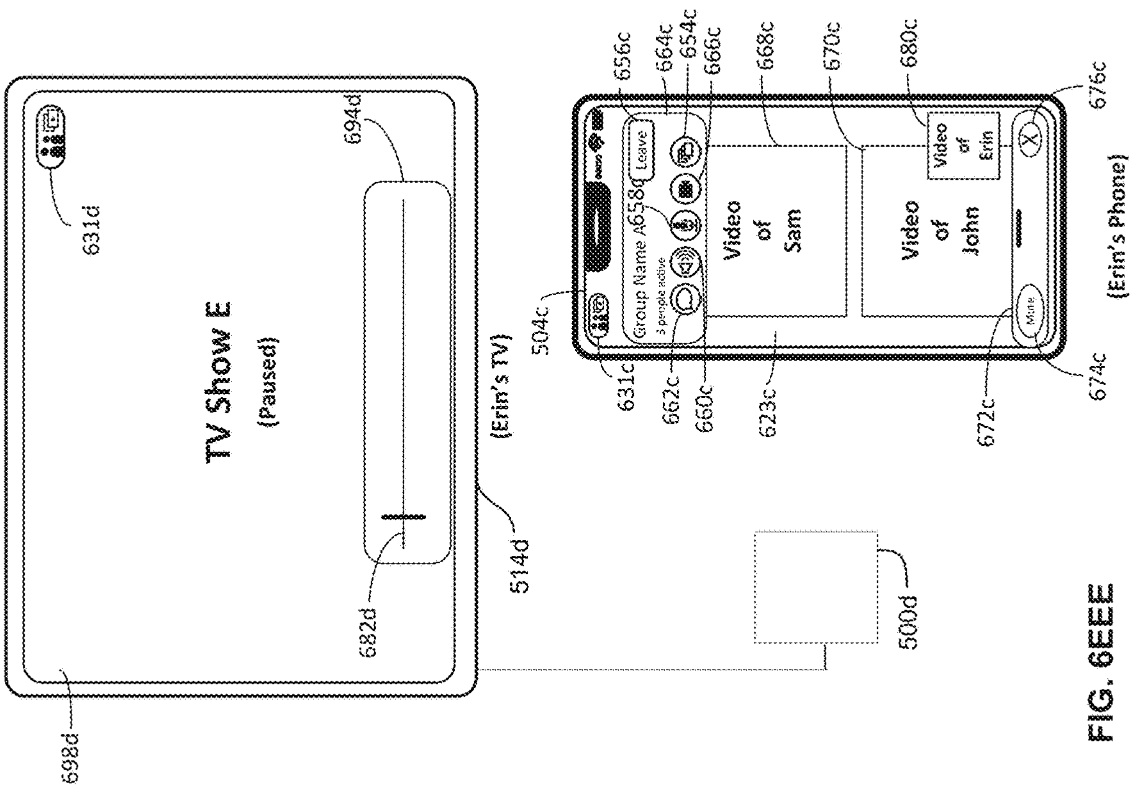
FIG. 6EEE
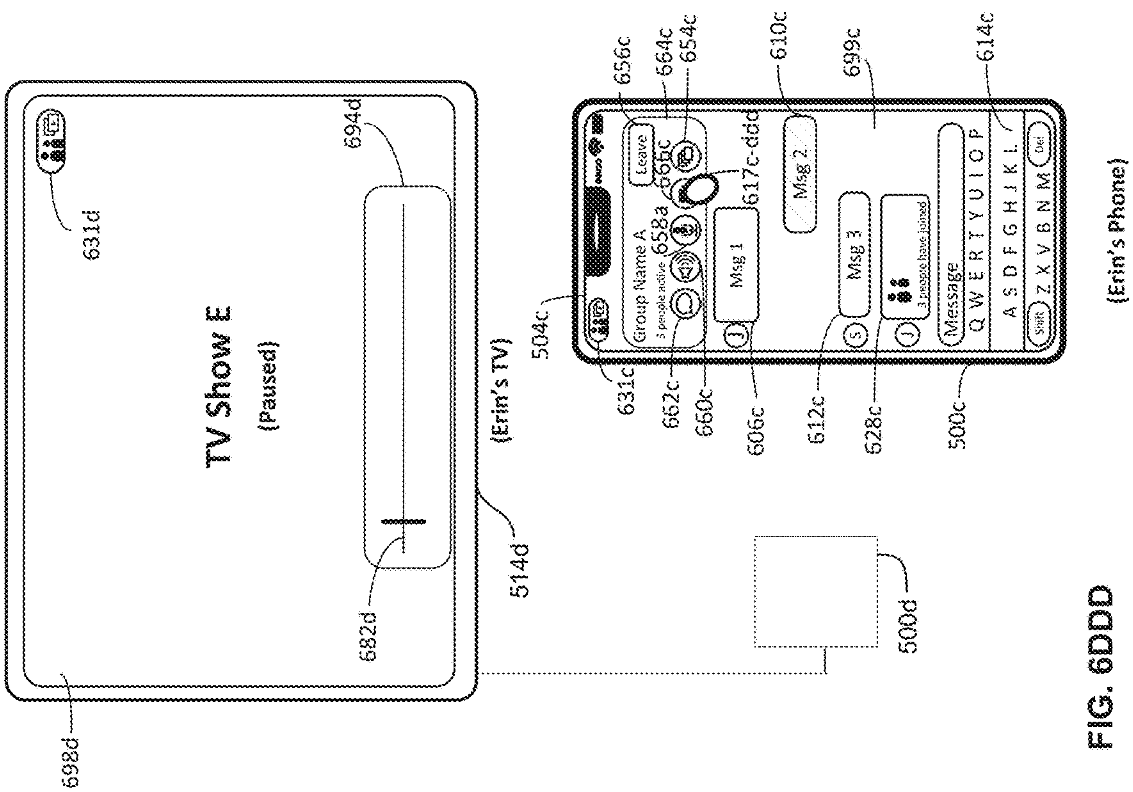
FIG. 6DDD

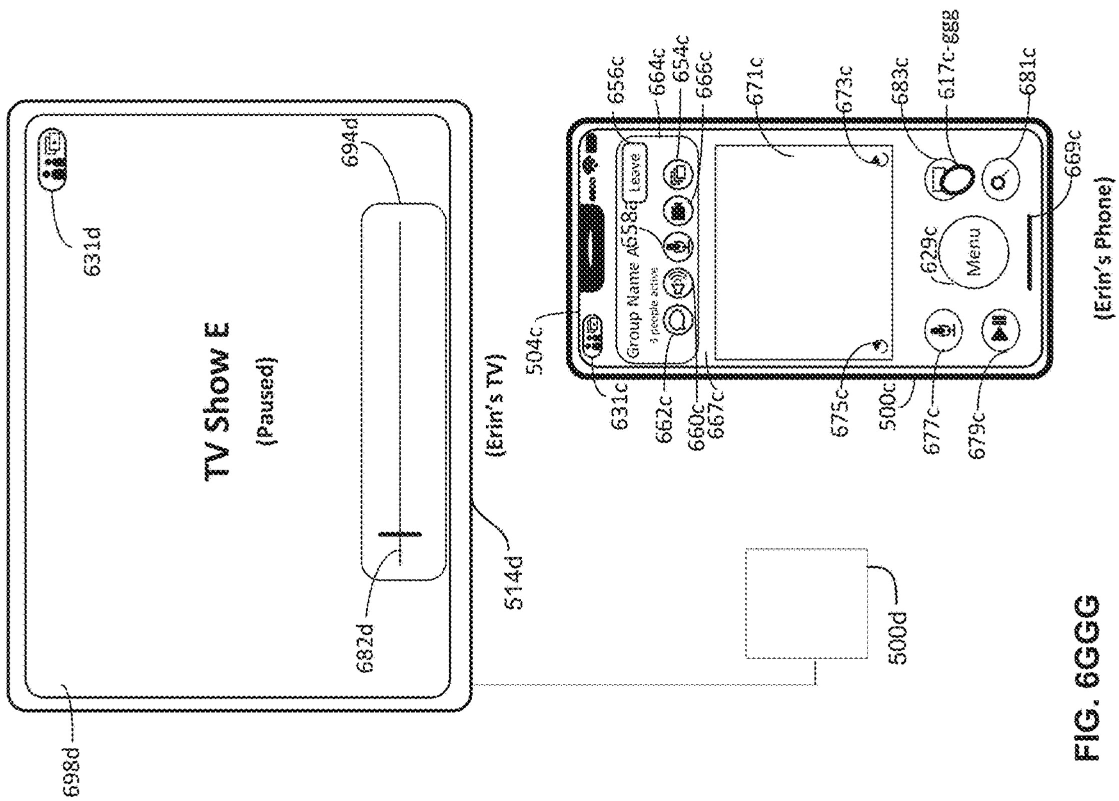
FIG. 6GGG
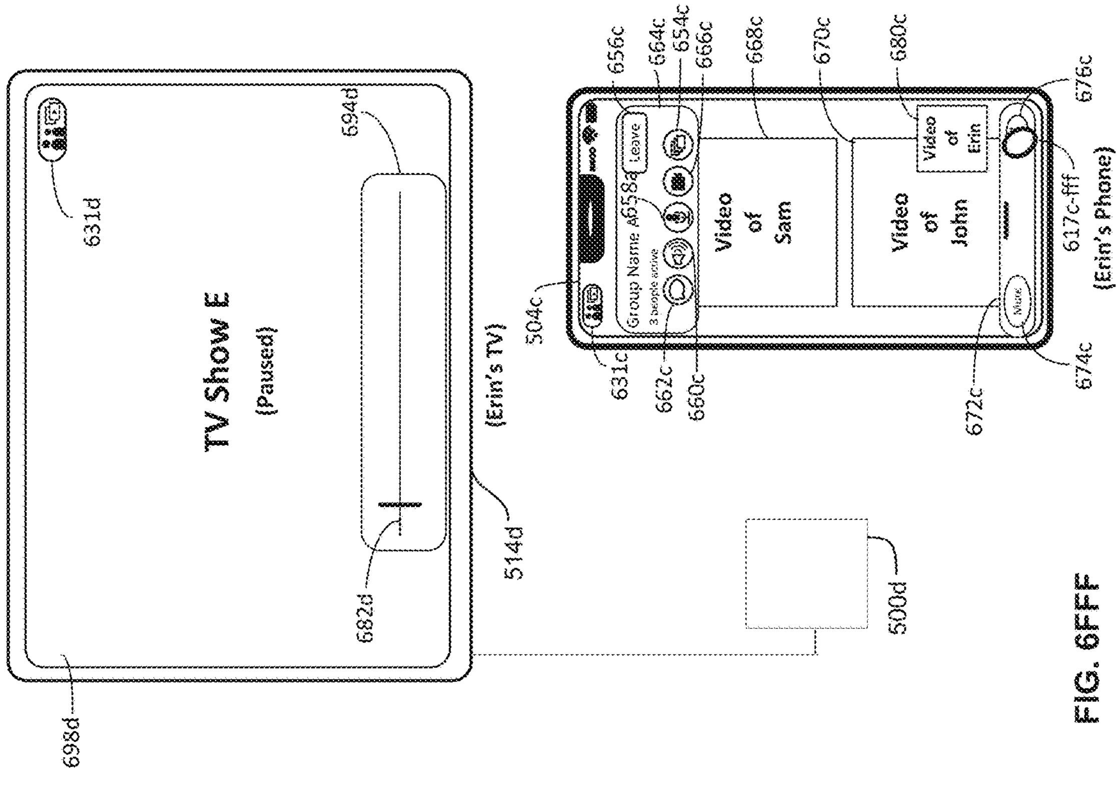
FIG. 6FFF

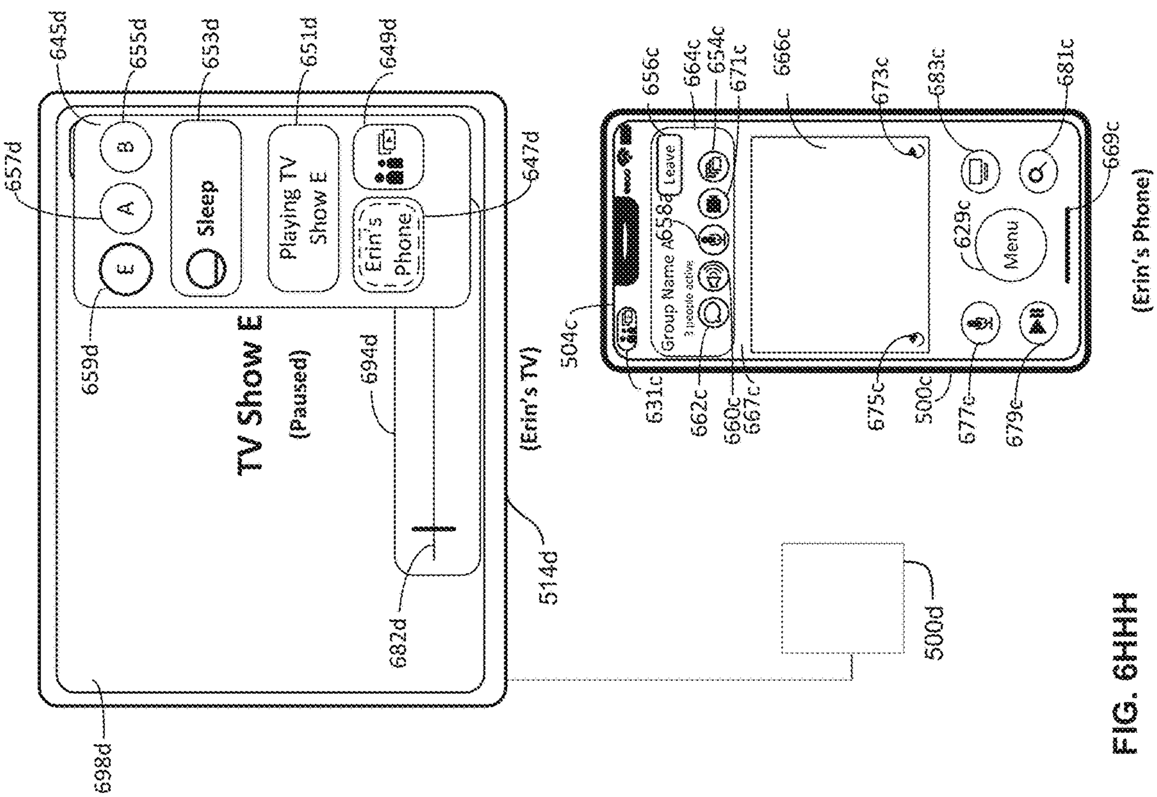
FIG. 6HHH
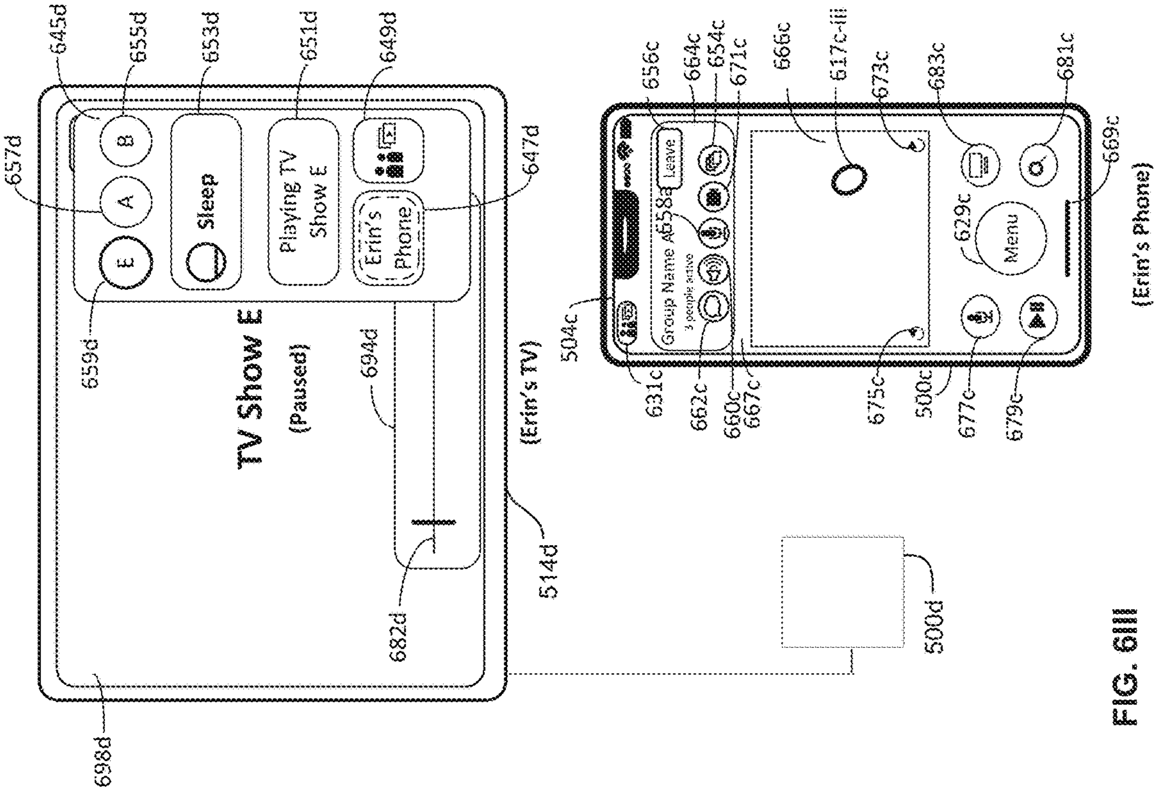
FIG. 6III

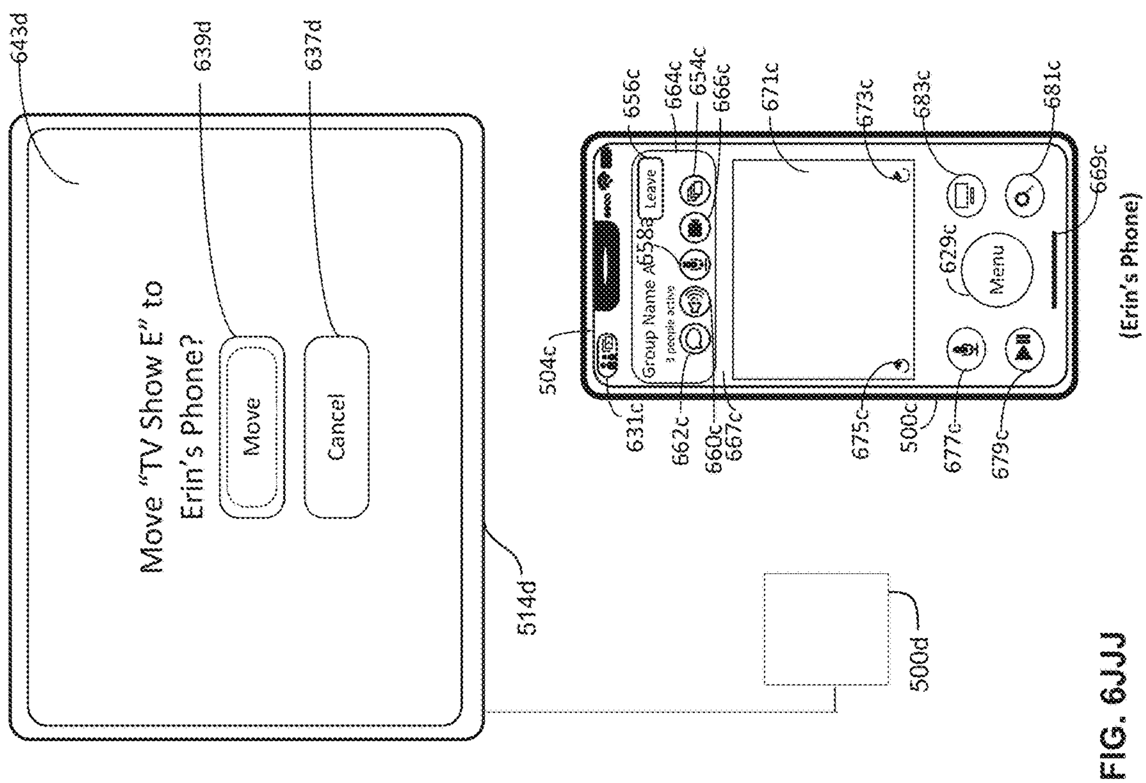
FIG. 6JJJ
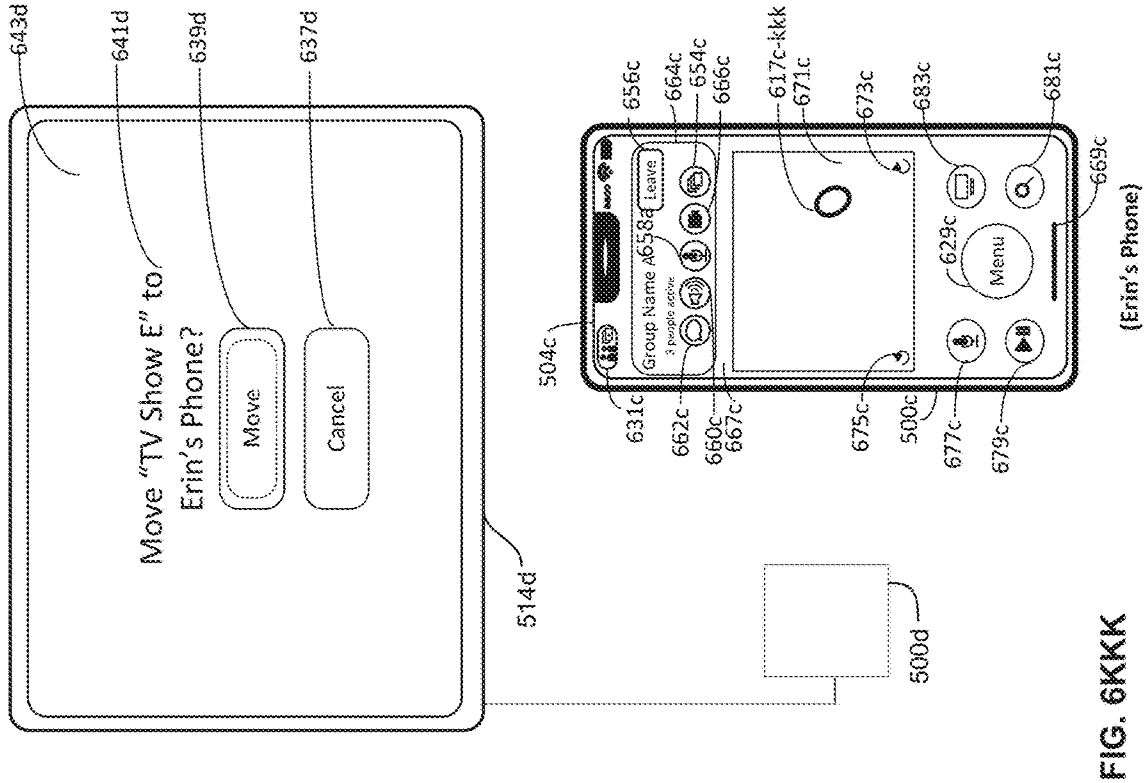
FIG. 6KKK

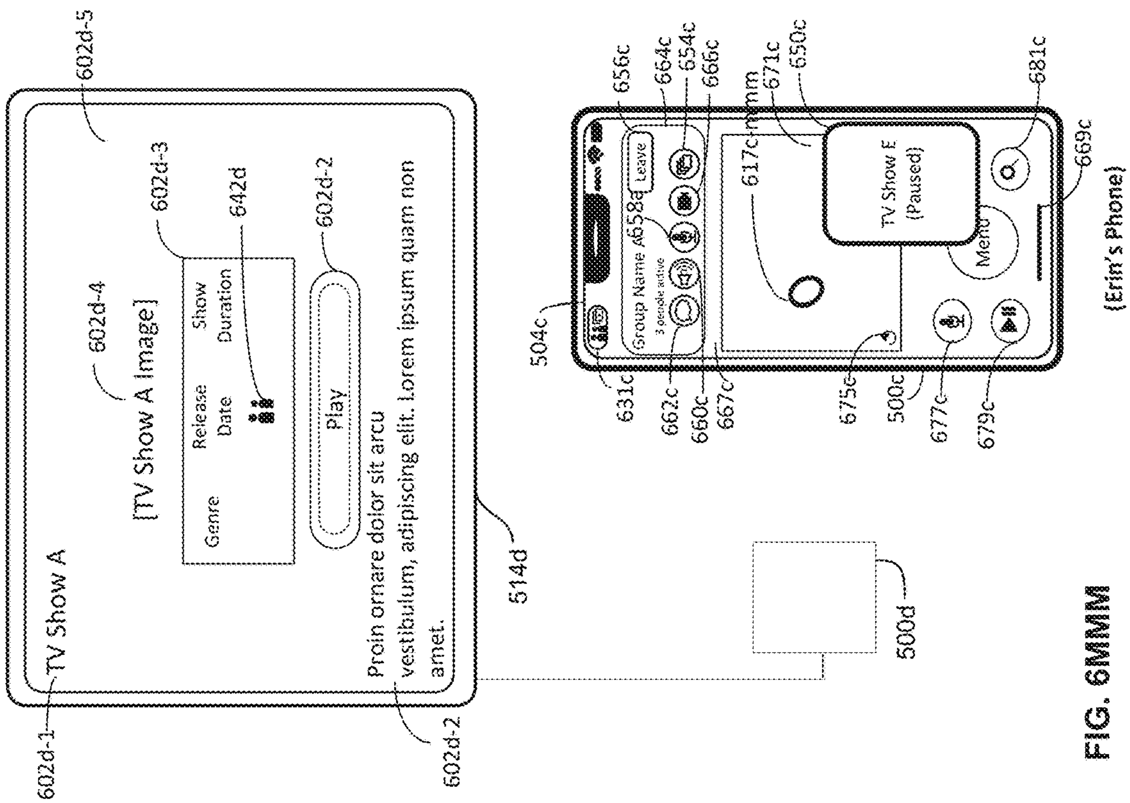
FIG. 6MMM
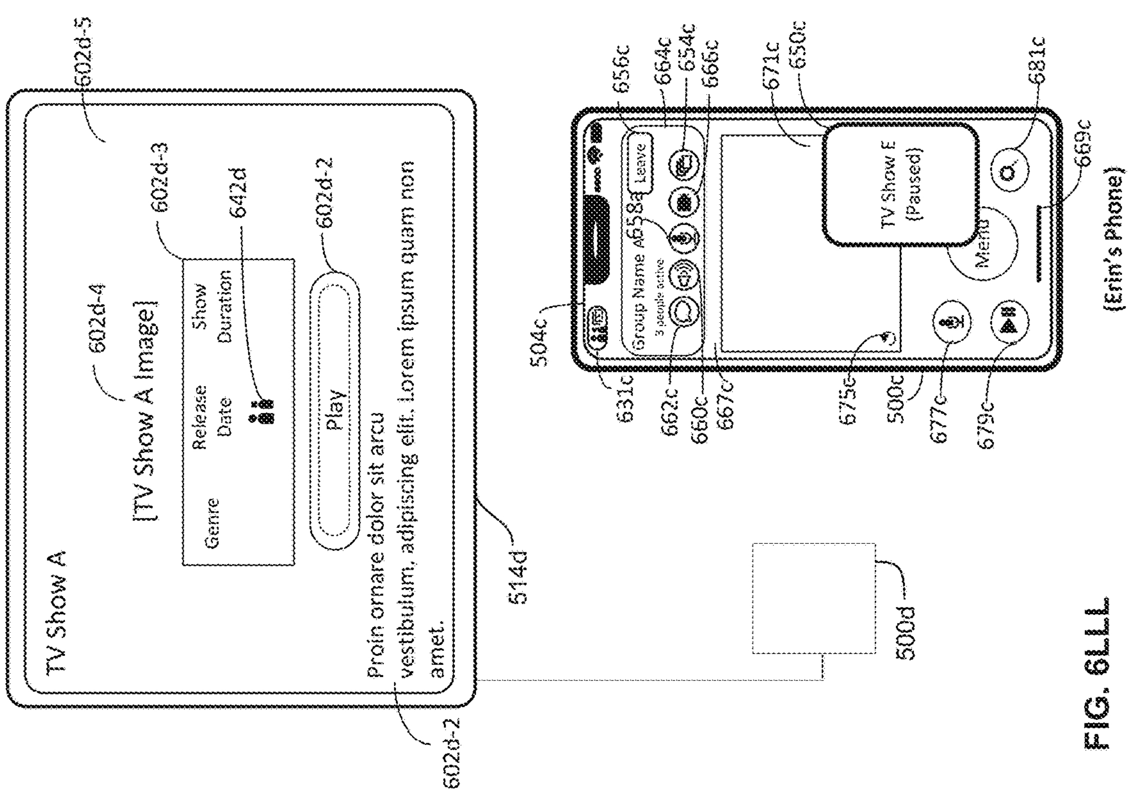
FIG. 6LLL

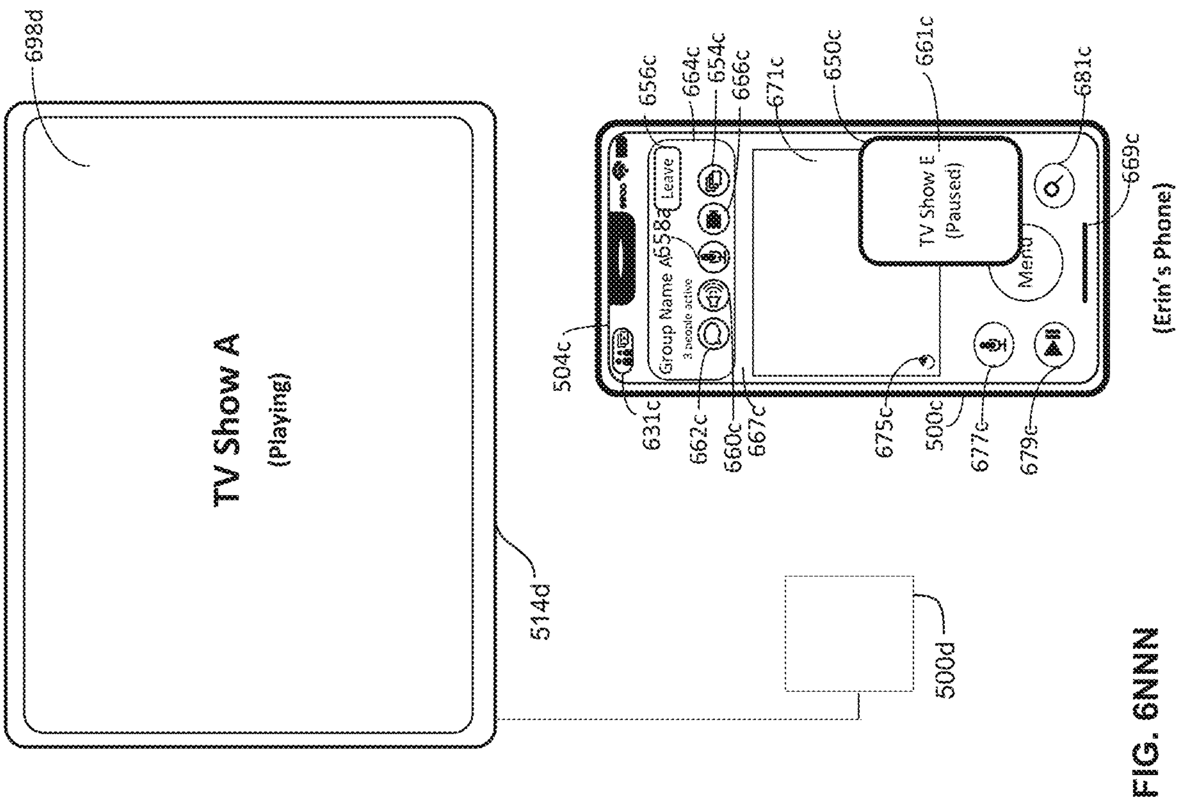
FIG. 6NNN

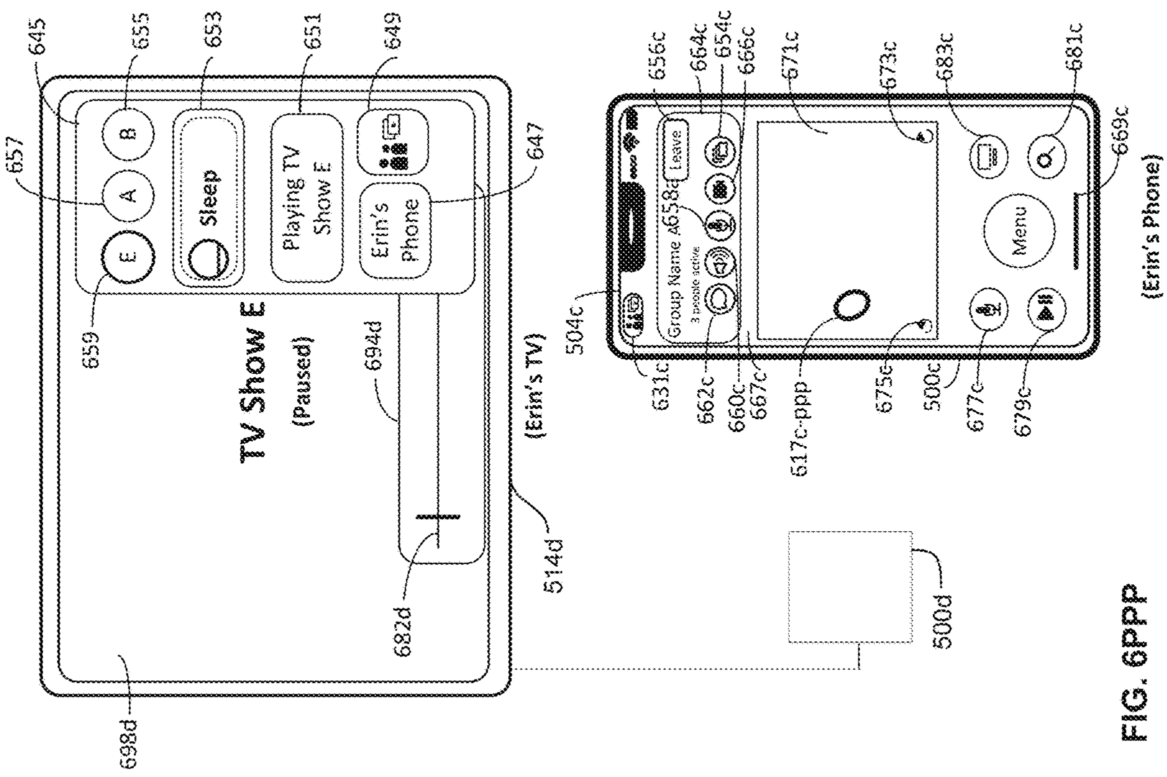
FIG. 6PPP
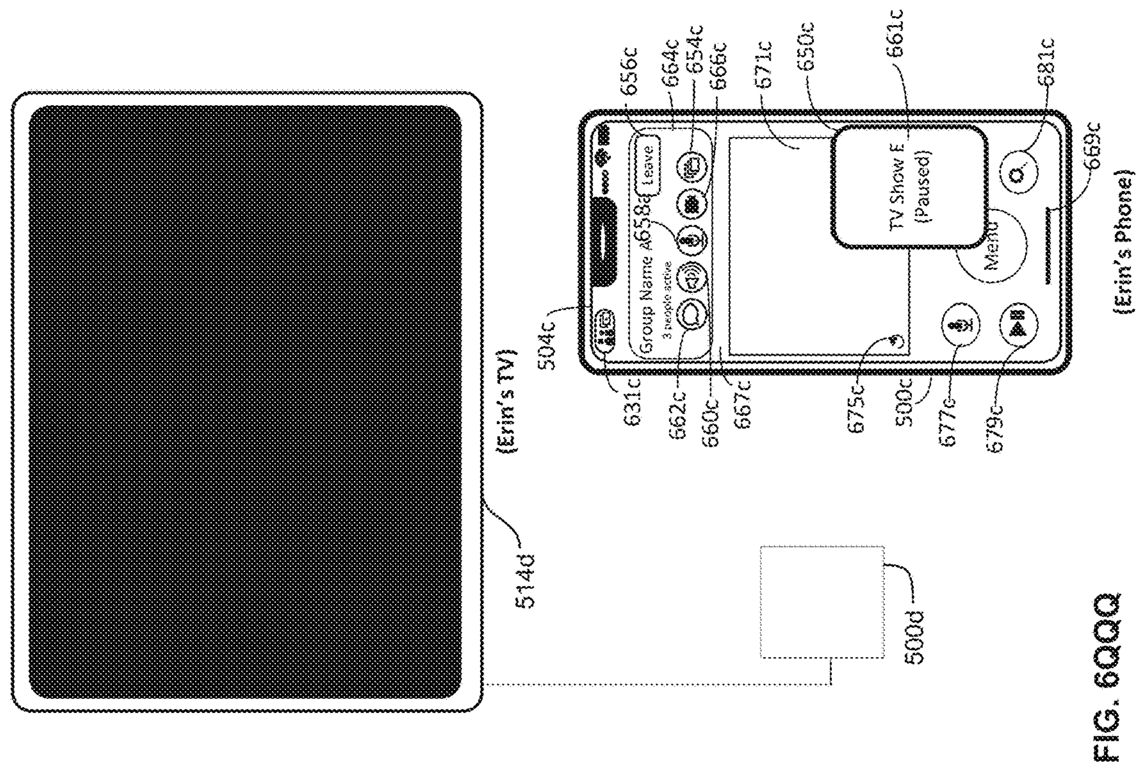
FIG. 6QQQ

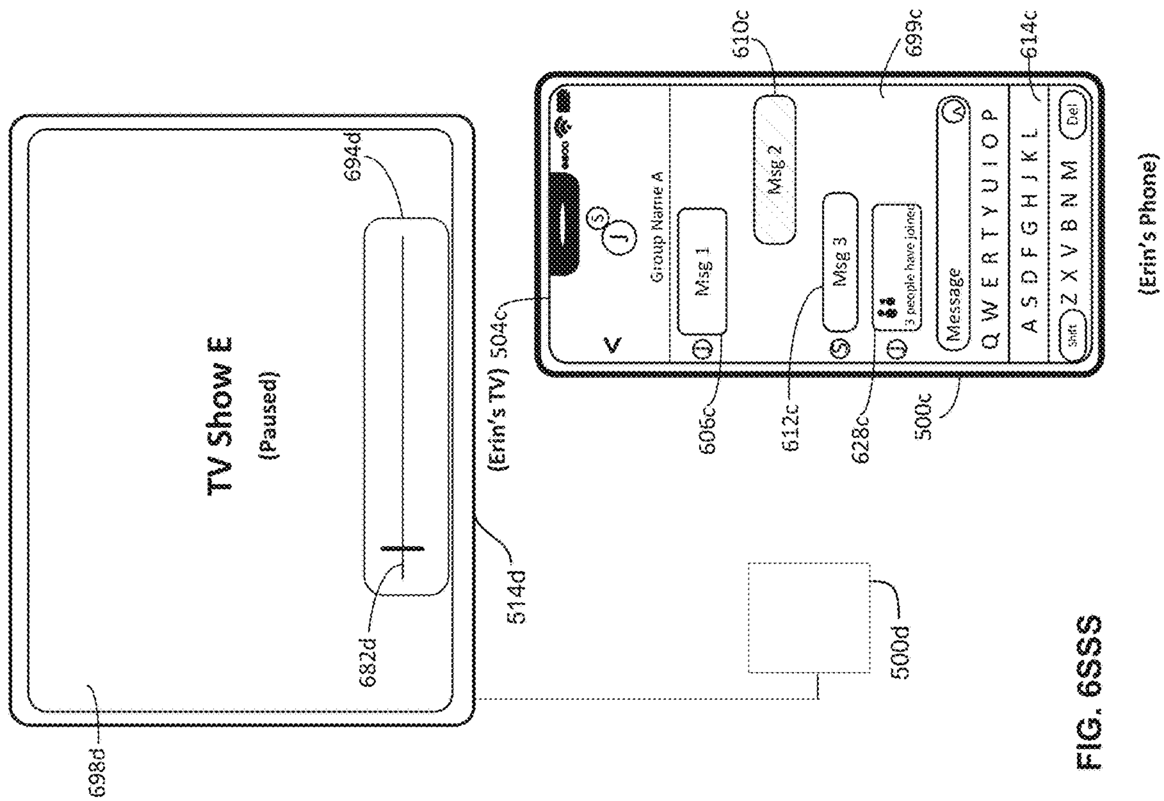
FIG. 6SSS
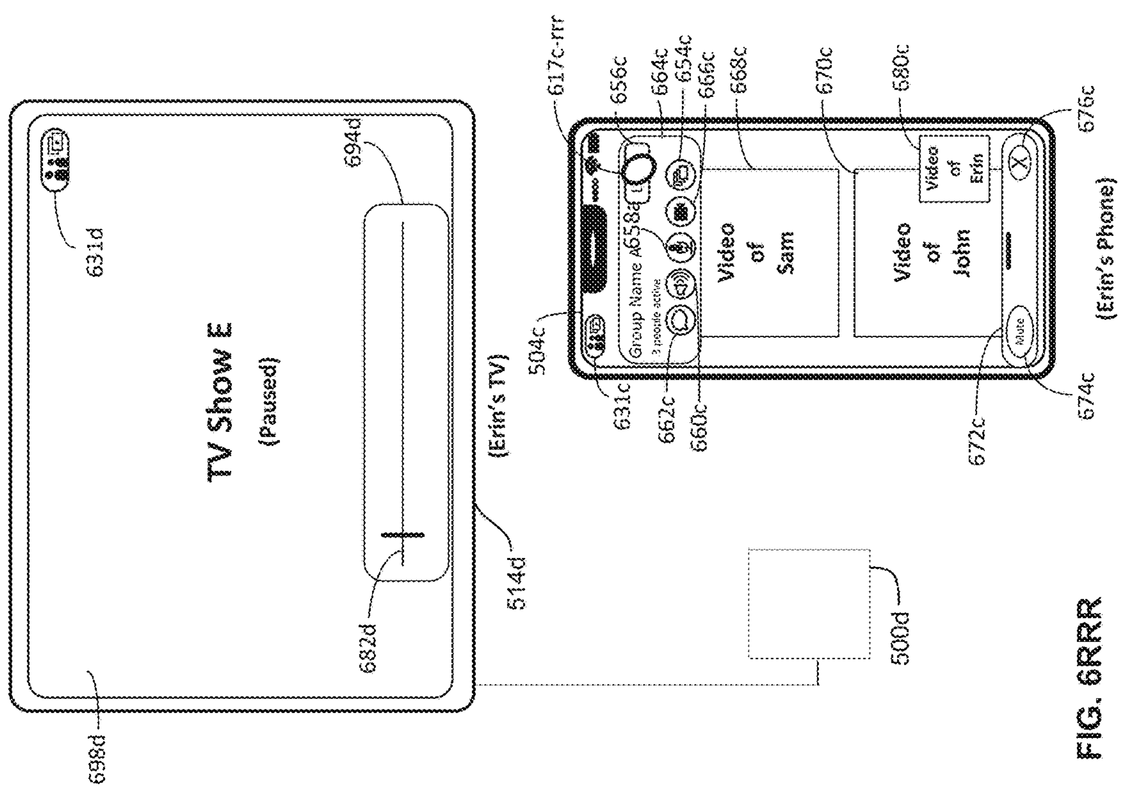
FIG. 6RRR

900

USER INTERFACES FOR MEDIA SHARING AND COMMUNICATION SESSIONS

CROSS-REFERENCE TO RELATED APPLICATIONS

This application claims the benefit of U.S. Provisional Application No. 63/189,121, filed May 15, 2021, and U.S. Provisional Application No. 63/197,442, filed Jun. 6, 2021, the contents of which are incorporated herein by reference in their entireties for all purposes.

FIELD OF THE DISCLOSURE

This disclosure relates generally to user interfaces displayed by one or more electronic devices that are part of or associated with a media sharing and communication session.

BACKGROUND OF THE DISCLOSURE

User interaction with electronic devices has increased significantly in recent years. These devices can be devices such as computers, tablet computers, televisions, multimedia devices, or mobile devices. Sometimes a user may wish to join a synchronized media and communication session and play media content in a synchronized manner with other users in the synchronized media and communication session. The user may therefore desire efficient ways of joining a synchronized media and communication session and synchronously playing media content with the other users in the synchronized media and communication session.

SUMMARY OF THE DISCLOSURE

Some embodiments described in this disclosure are directed to ways of displaying user interfaces associated with a synchronized media and communication session at a same electronic device or at different electronic devices. Some embodiments described in this disclosure are directed to ways of joining a synchronized media and communication session that is associated with another electronic device. Enhancing a user's interactions with an electronic device in performing the above actions improves the user's experience with the one or more electronic devices, which is particularly important where input devices are battery-operated. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
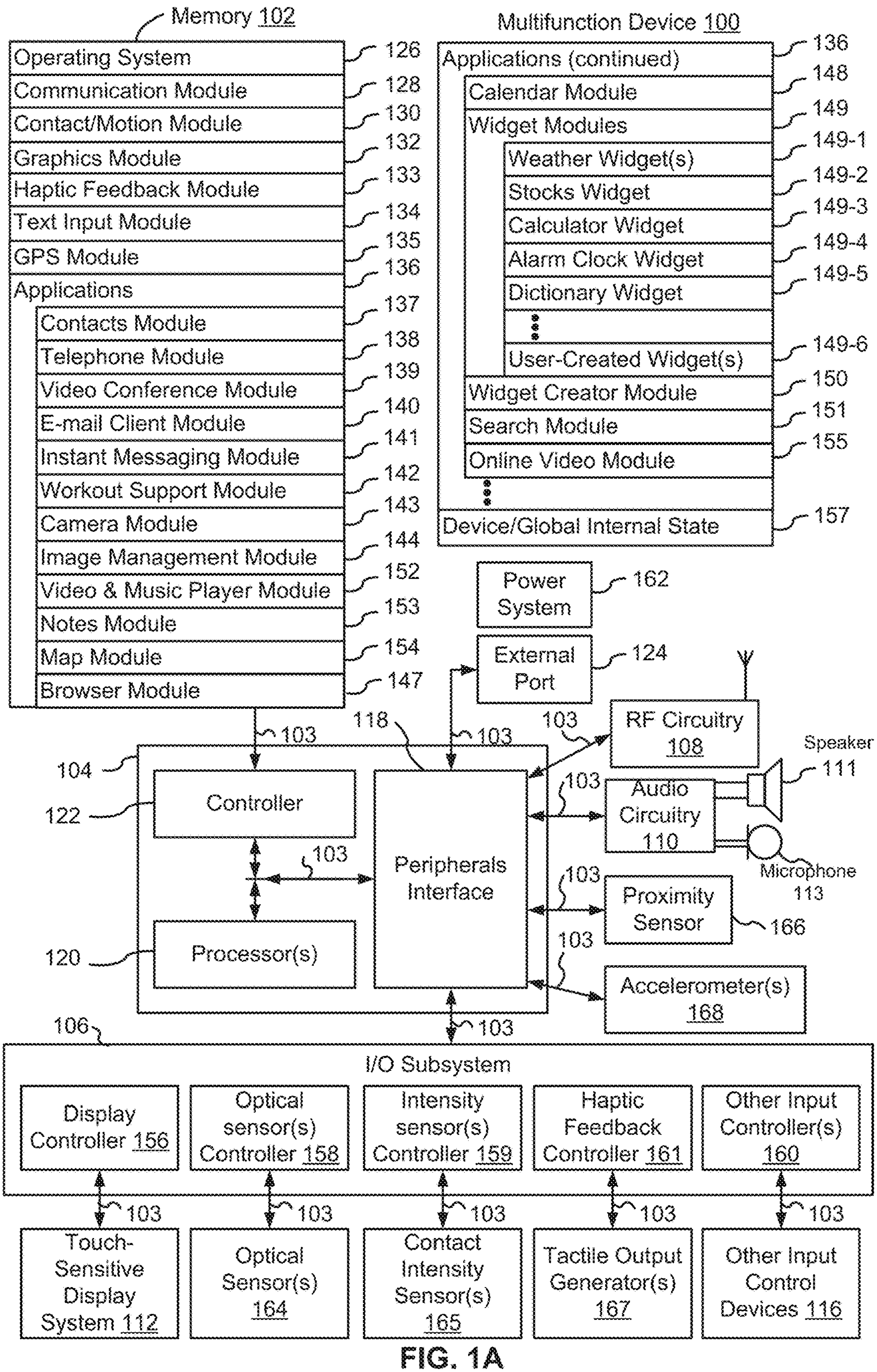
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

There is a need for electronic devices that provide efficient ways of displaying communication user interfaces and media user interfaces associated with a synchronized media and communication session. In some implementations, if a respective user is associated with a first electronic device and a second electronic device in a synchronized media and communication session, the first electronic device plays the media item currently playing in the synchronized media and communication session, and the second electronic device displays a communication user interface associated with the synchronized media and communication session. In some implementations, if the respective user is only associated with the first electronic device in the synchronized media and communication session, the first electronic device displays both the media playing in the synchronized media and communication session and the communication user interface associated with the synchronized media and communication session. Such techniques can reduce the cognitive burden on a user who uses such devices. Further, such techniques can reduce processor and battery power otherwise wasted on redundant user inputs.

There is also a need for electronic devices that provide efficient ways of joining a synchronized media and communication session. In some embodiments, an electronic device joins a synchronized media and communication session that is associated with a second electronic device. Such techniques can reduce the cognitive burden on a user who uses such devices. Further, such techniques can reduce processor and battery power and streamline a process for joining a synchronized media and communication session.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display)

technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
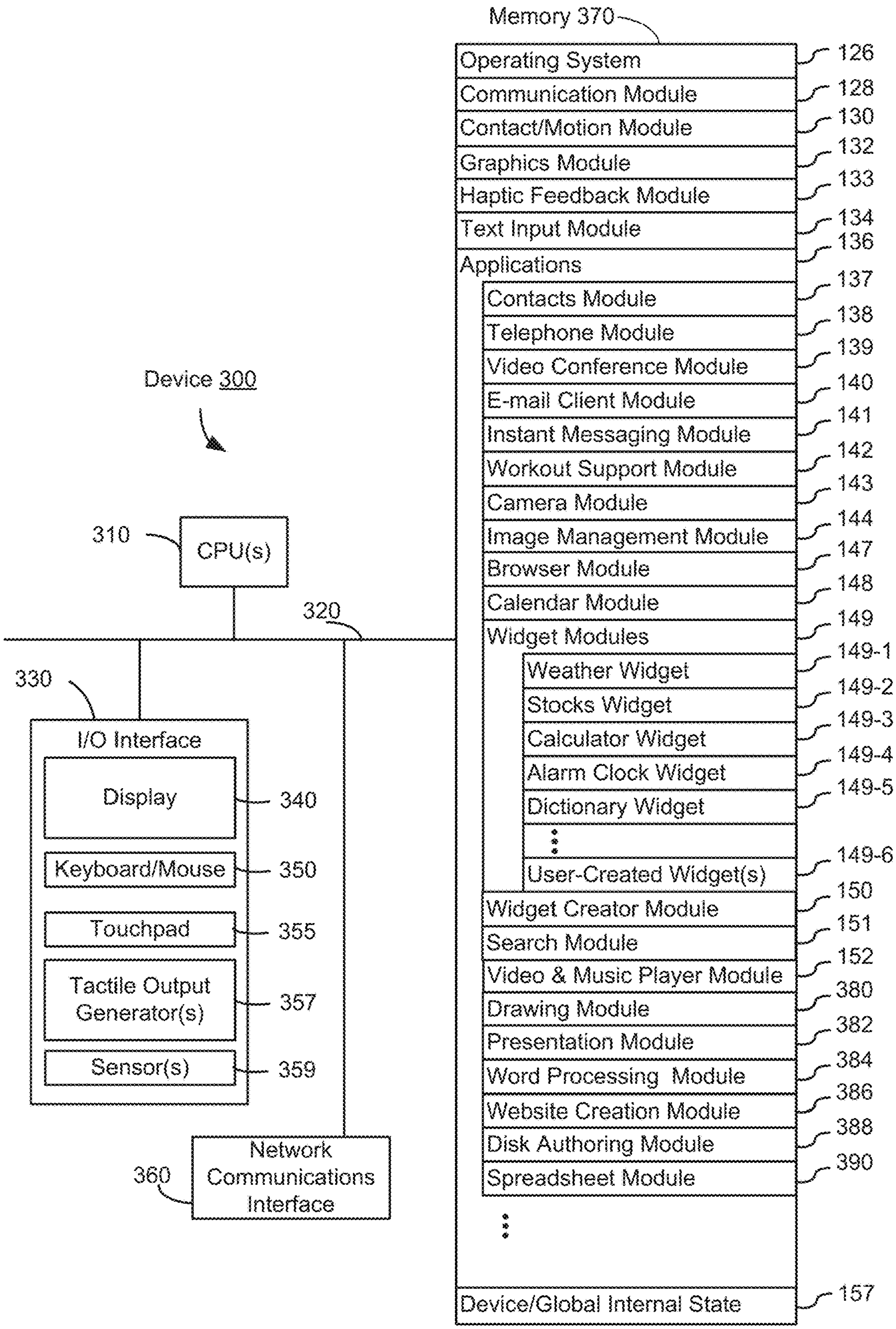
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
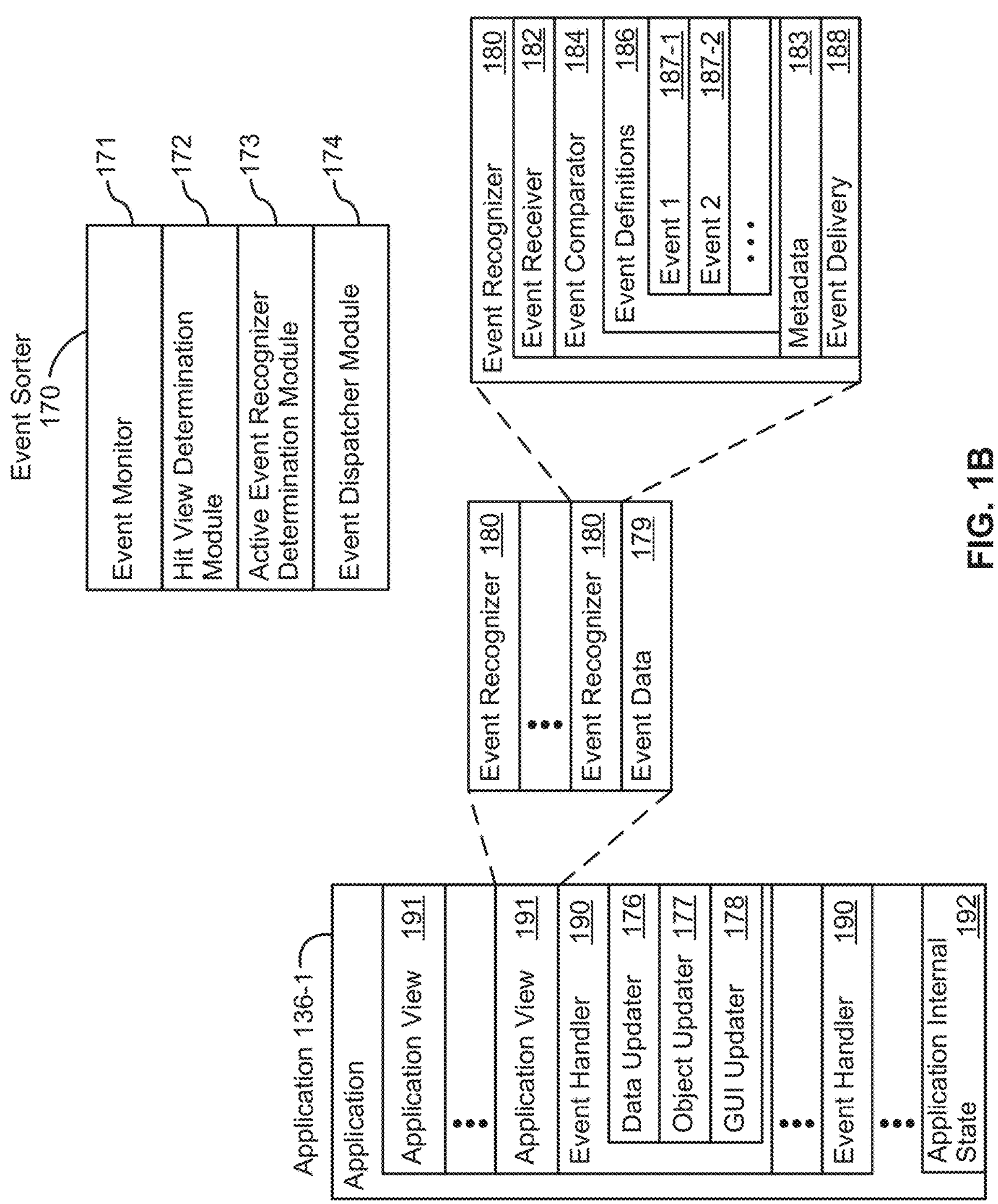
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
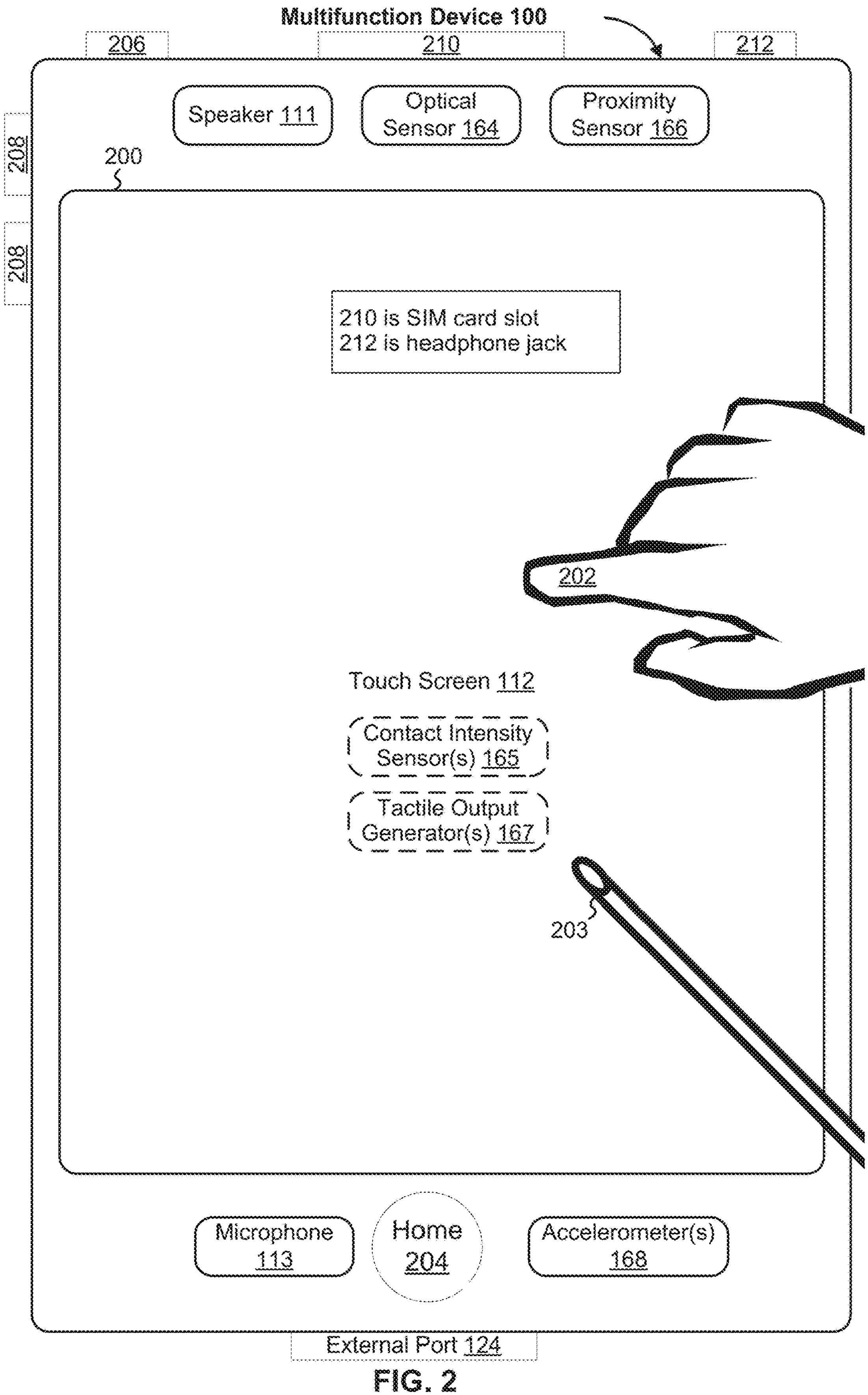
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
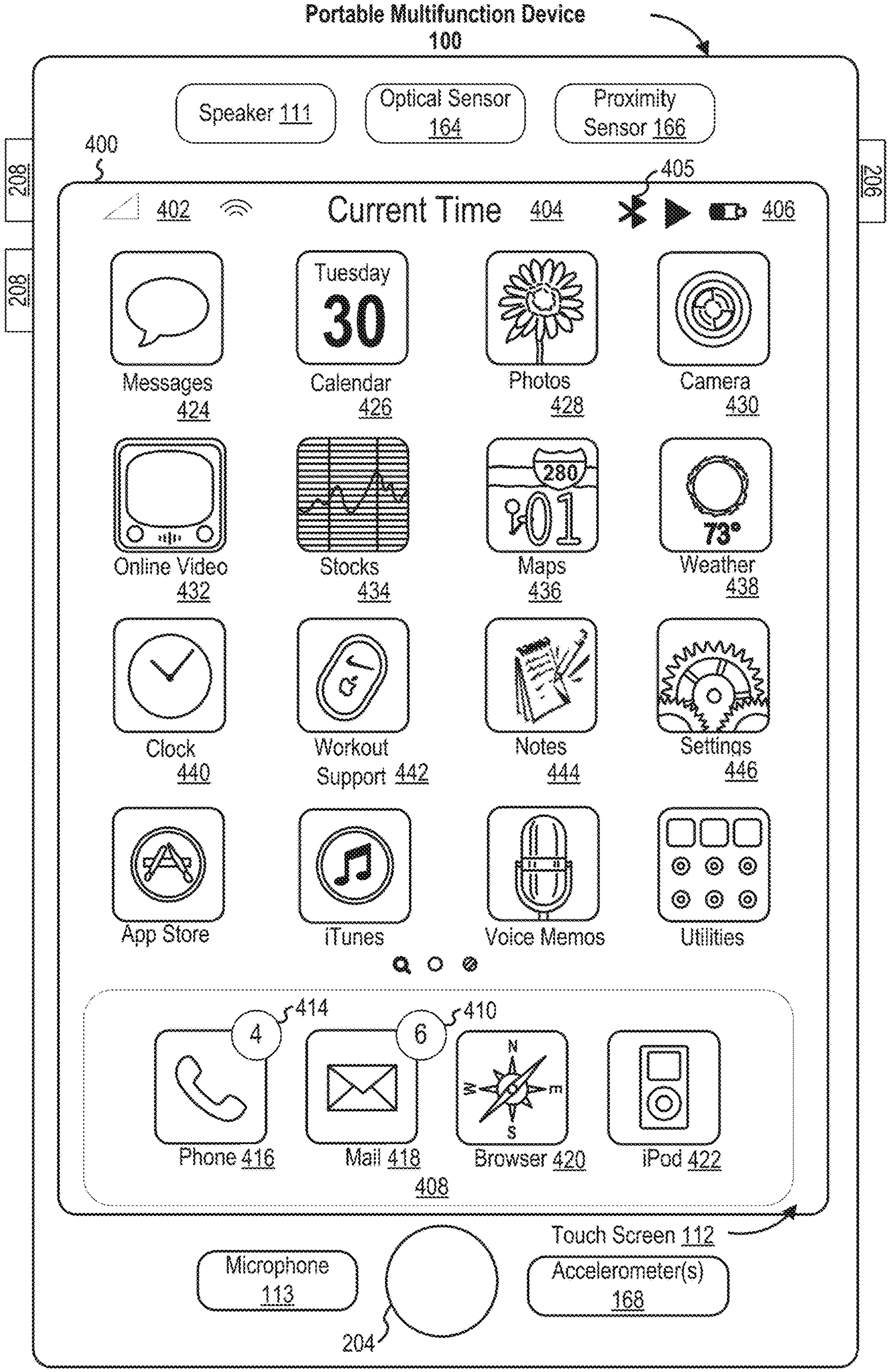
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
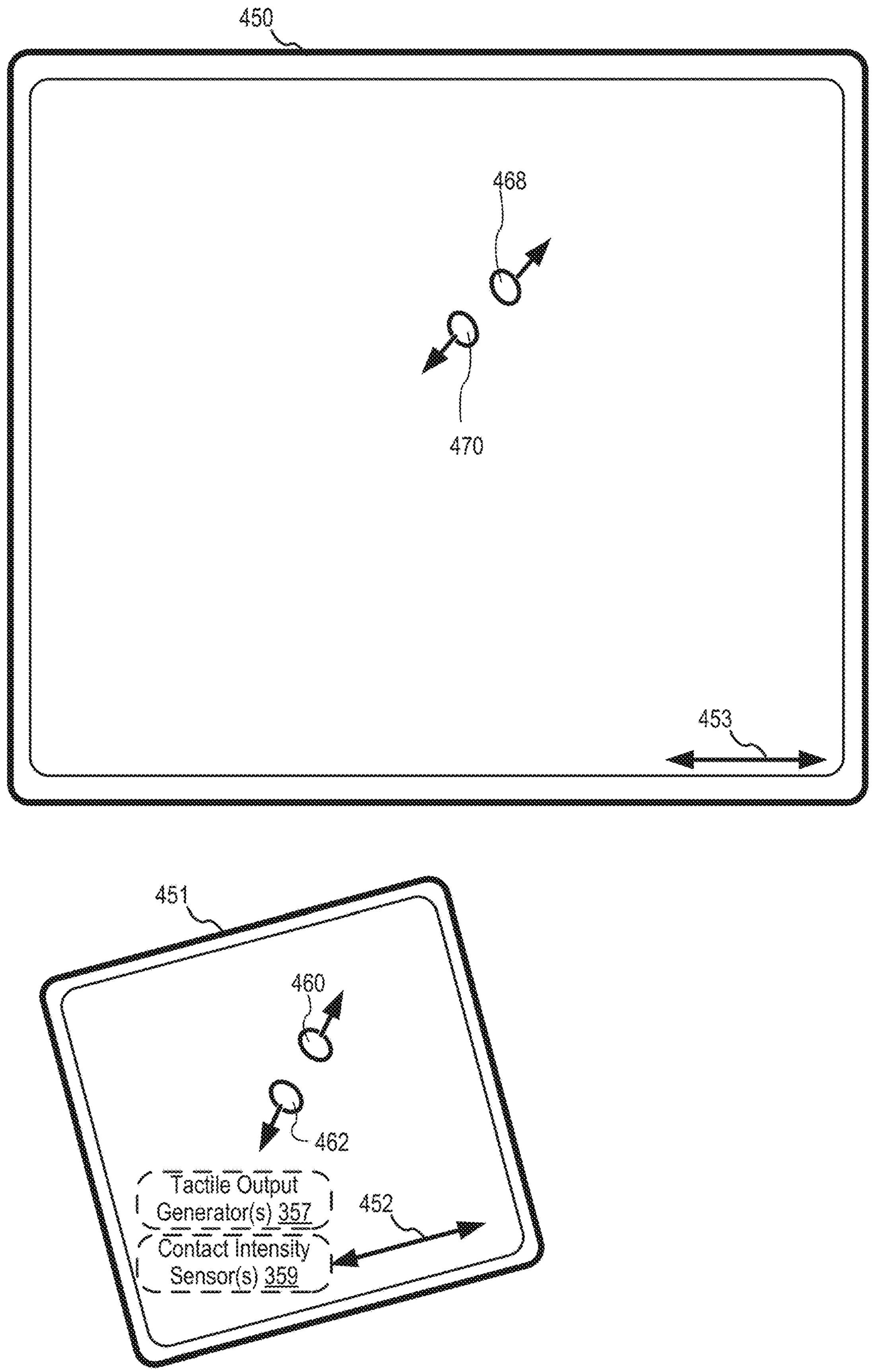
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
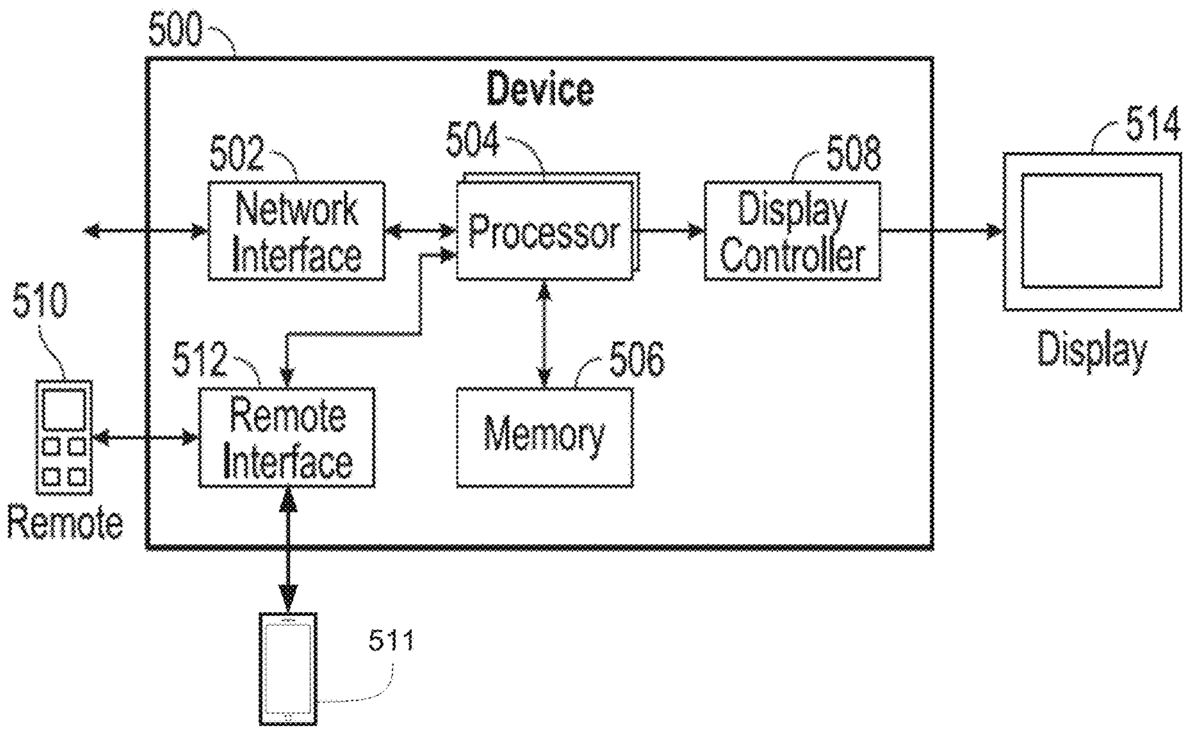
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700 and 900).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4B; and, display 514 optionally corresponds to one or more of touch-sensitive display system 112 in FIGS. 1A and 2, and display 340 in FIG. 3.

Figure 5B:
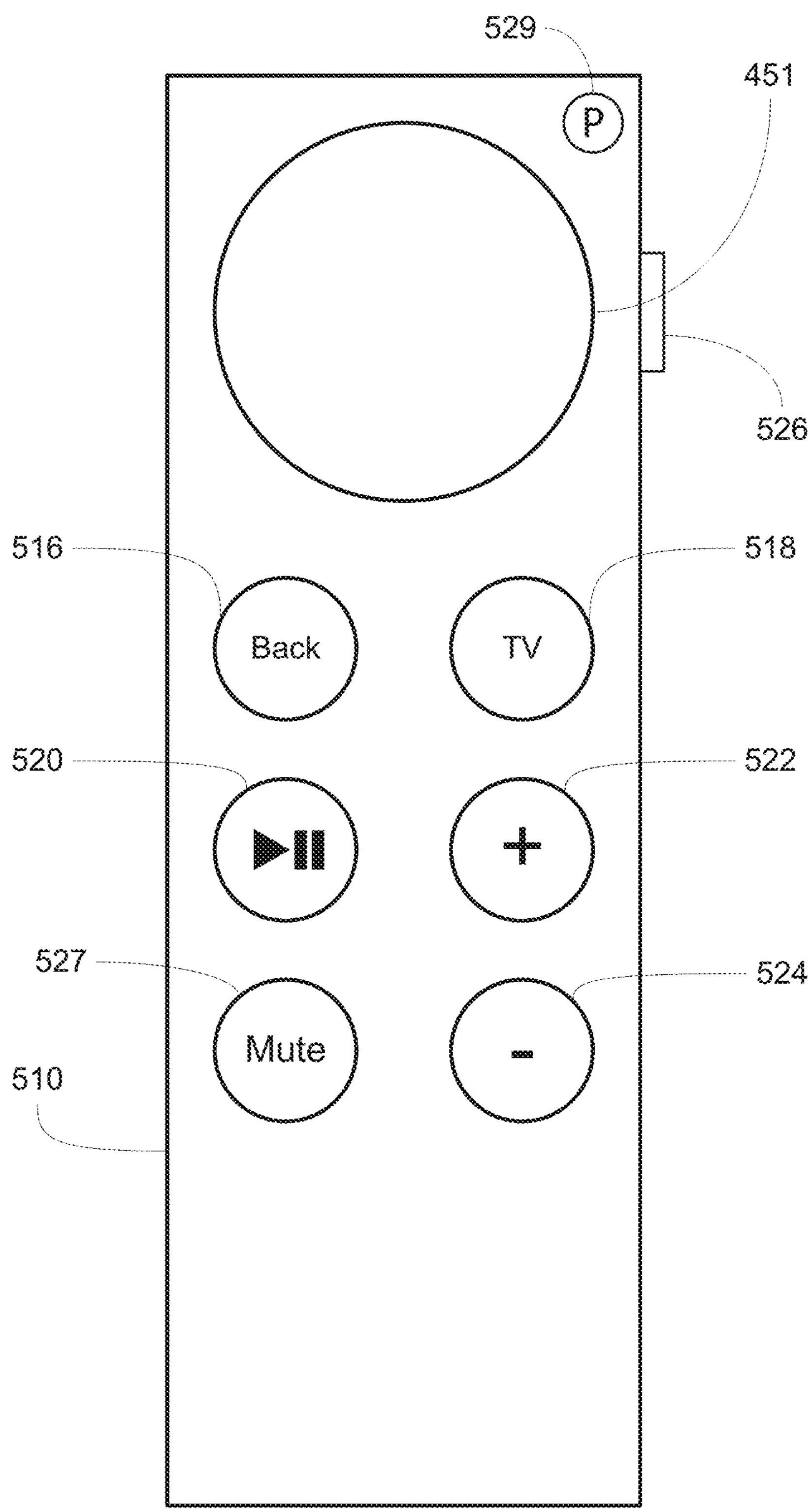

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524, 526, 527 and 529. Buttons 516, 518, 520, 522, 524, 526, 527 and 529 are optionally mechanical buttons or mechanical button alternatives that are able to sense contact with, or depression of, such buttons to initiate corresponding action(s) on, for example, device 500. In some embodiments, selection of "back" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "TV" button 518 by a user navigates device 500 to a main, home, media browsing user interface or root user interface from any user interface that is displayed on device 500 (e.g., to a home screen of device 500 that optionally includes one or more applications accessible on device 500 or to a media browsing user interface of device 500 that includes representations of media available for viewing via device 500). In some embodiments, selection of the "TV" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 (e.g., which is optionally a button on the side surface of remote 510, rather than on the surface of remote 510 that includes buttons 516, 518, 520, 522, 524 and 527) by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote. In some embodiments, selection of "Mute" button 527 toggles the audio reproduced by device 500 on and off. In some embodiments, selection of "Power" button 529 causes device 500 (and/or external devices coupled to device 500, such as display 514) to toggle between entering or exiting a low or off power state.

Figure 5C:
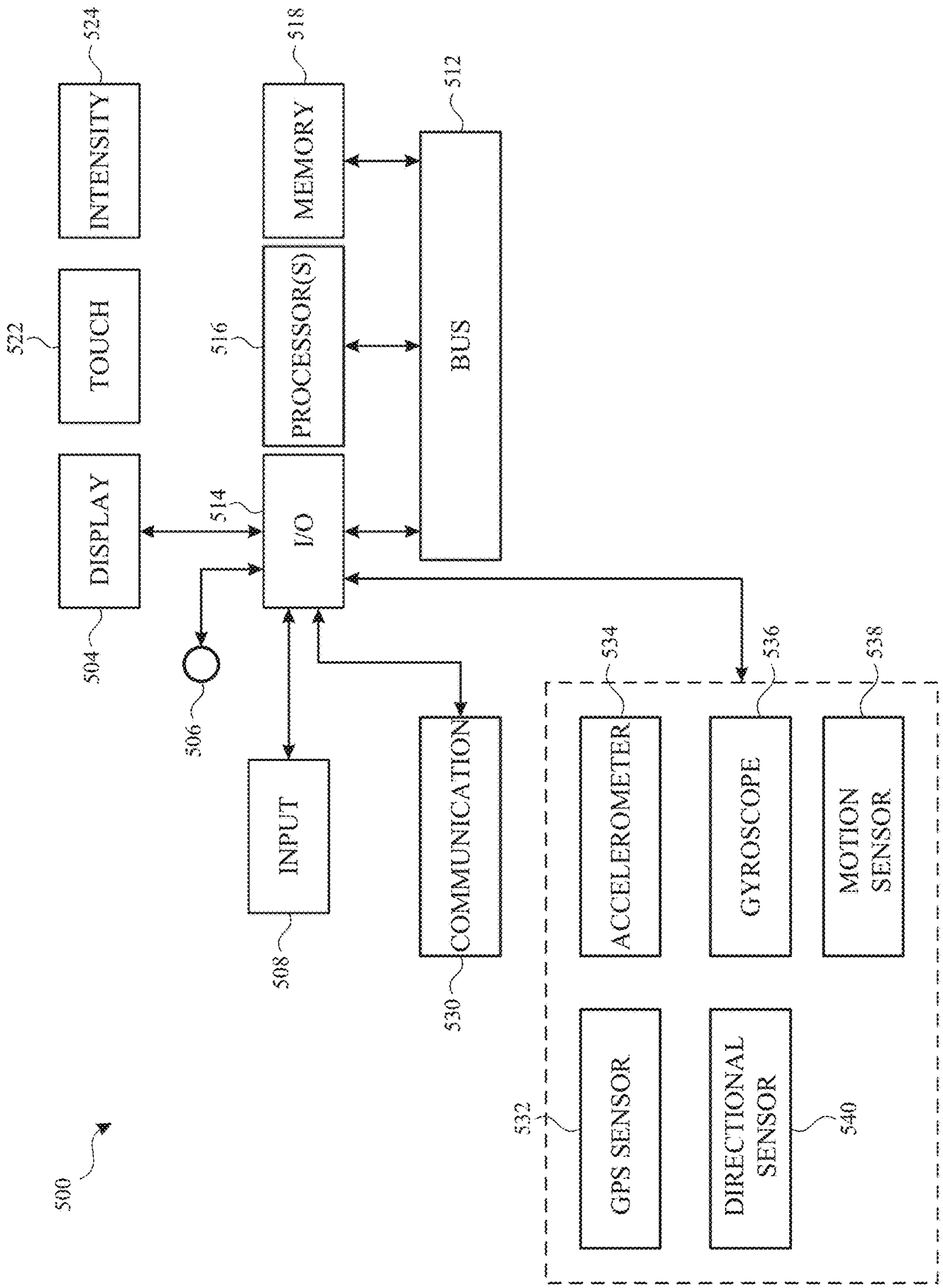

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-11. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application" Application No. 62/822,952, filed Mar. 24, 2019), "User Interfaces For a Media Browsing Application" (Application No. 62/822,948, filed Mar. 24, 2019), and "User Interface Specific to Respective Content Items" (Application No. 62/822,966, filed Mar. 24, 2019), each of which is hereby incorporated by reference.

Attention is now directed towards embodiments of user interfaces ("UP") and associated processes that are implemented on an electronic device, such as portable multifunction device 100, device 300, or device 500.

User Interfaces and Associated Processes

User Interfaces for Synchronously Playing Media Content

Users interact with electronic devices in many different manners, including using electronic devices to communicate with one or more users and synchronously play media content. The embodiments described below provide ways in which an electronic device that is part of a synchronized media and communication session displays user interfaces for communicating with users in a synchronized media and communication session and/or displays user interfacing for playing media content in the synchronized media and communication session. Providing efficient manners of displaying communication and media user interfaces associated with a synchronized media and communication session provides an efficient way for a user in a synchronized media and communication session to synchronously watch media content while also communicating with other users in the synchronized media and communication session, thus reducing the amount of time a user needs to switch between different interfaces of a synchronized media and communication, and reducing the power usage of the electronic device, which increases battery life for battery-powered devices. It is understood that people use devices. When a person uses a device, that person is optionally referred to as a user of the device.

Figure 6B:
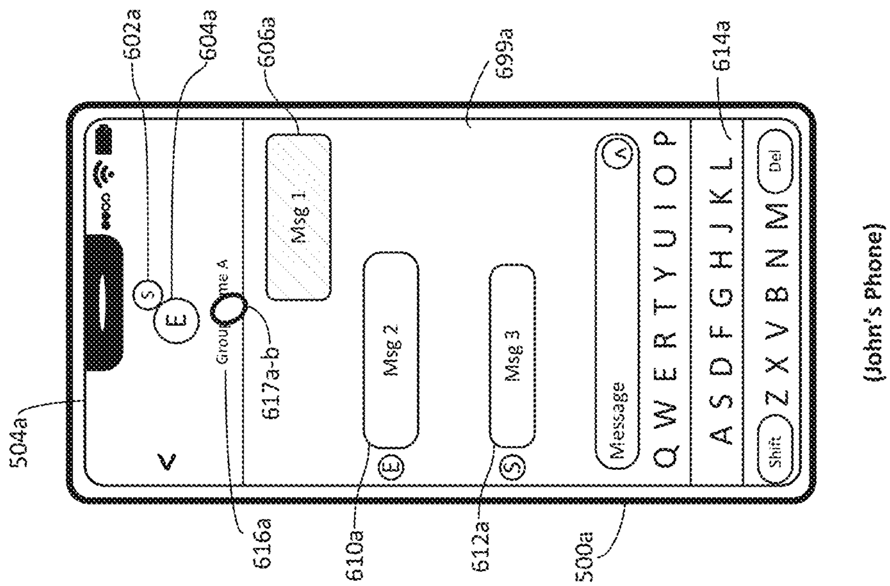
FIGS. 6A-6SSS illustrate exemplary ways in which communication and/or media associated with a synchronized media and communication session can be displayed at one or more devices in accordance with some embodiments of the disclosure.
Figure 6A:
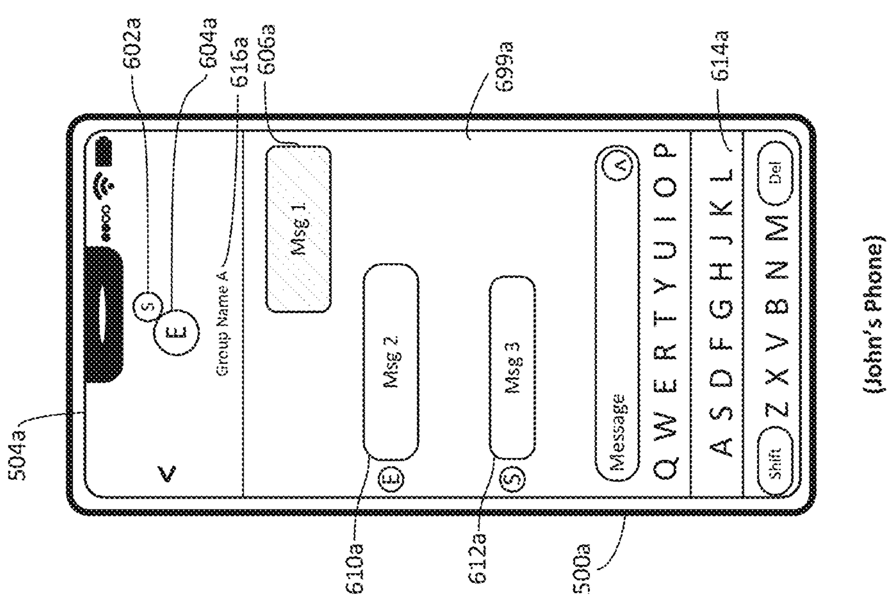
Figure 6D:
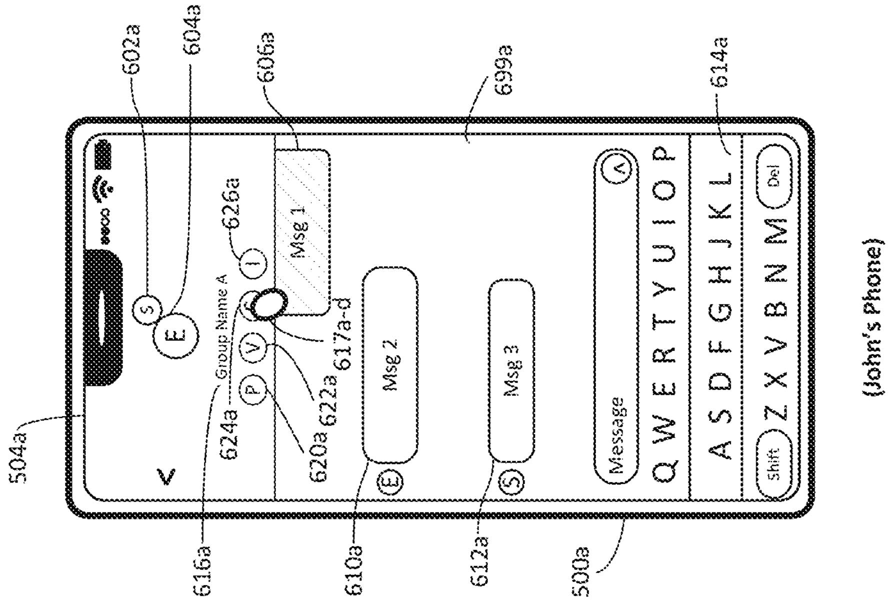
Figure 6C:
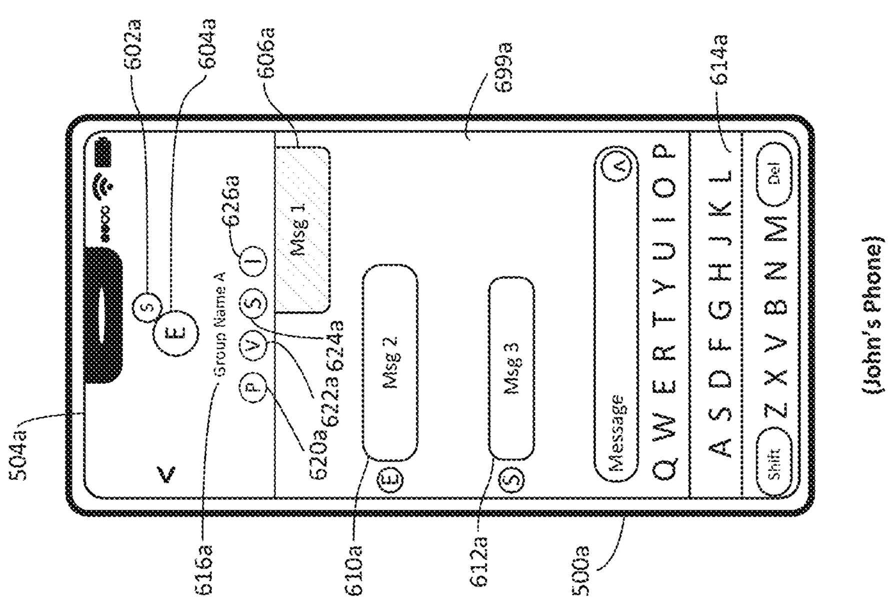
Figure 6E:
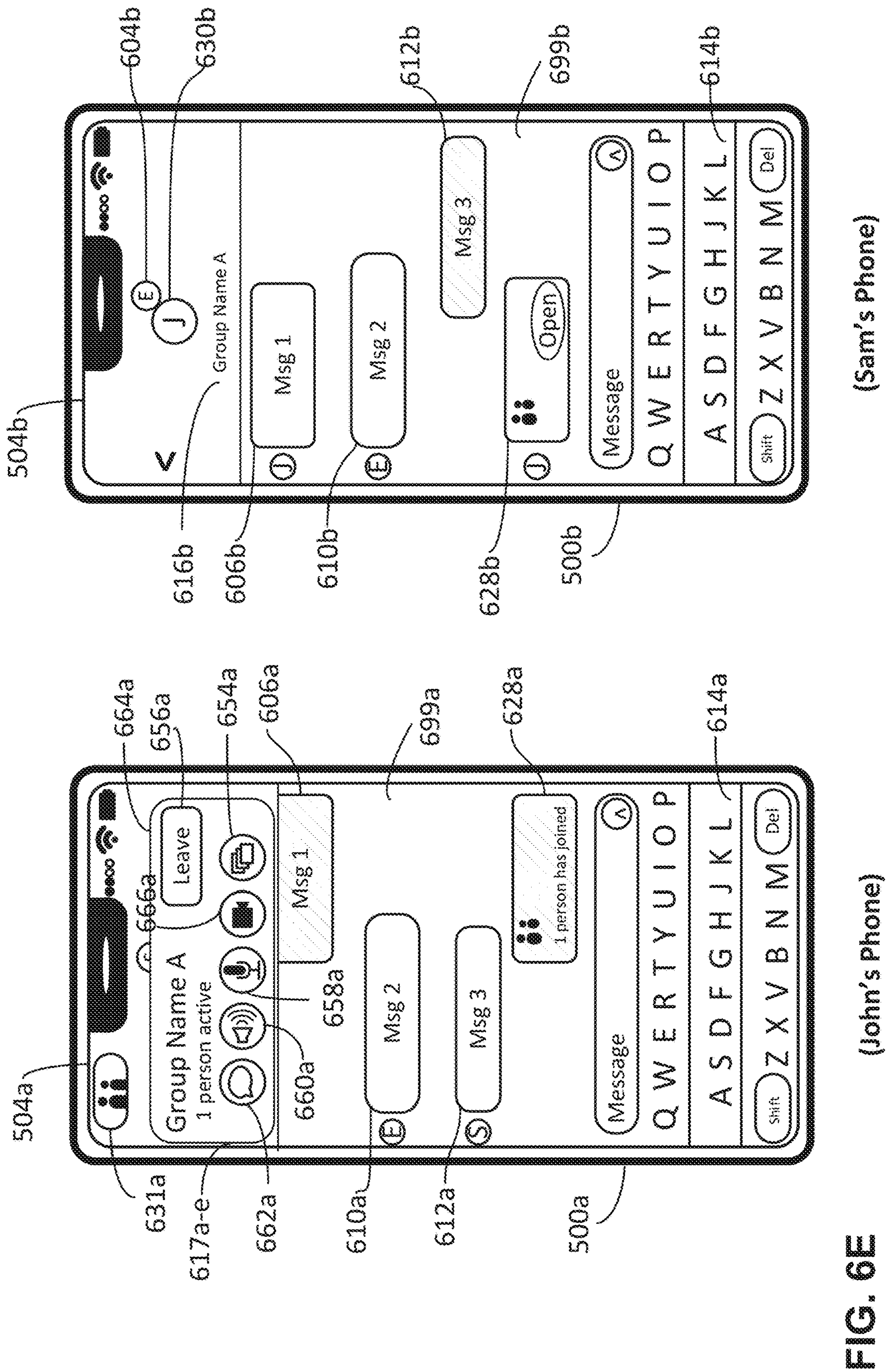
Figure 6F:
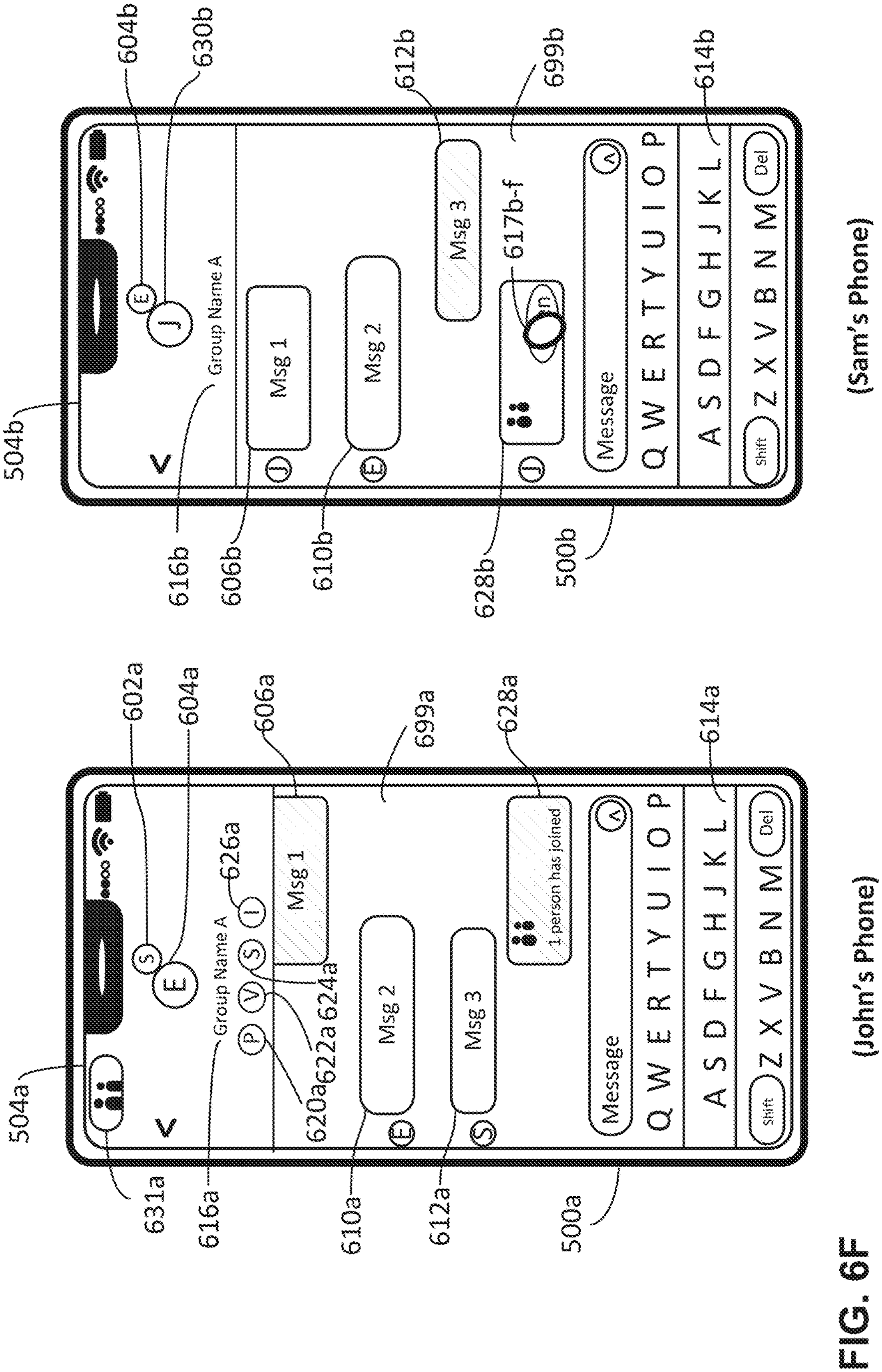
Figure 6G:
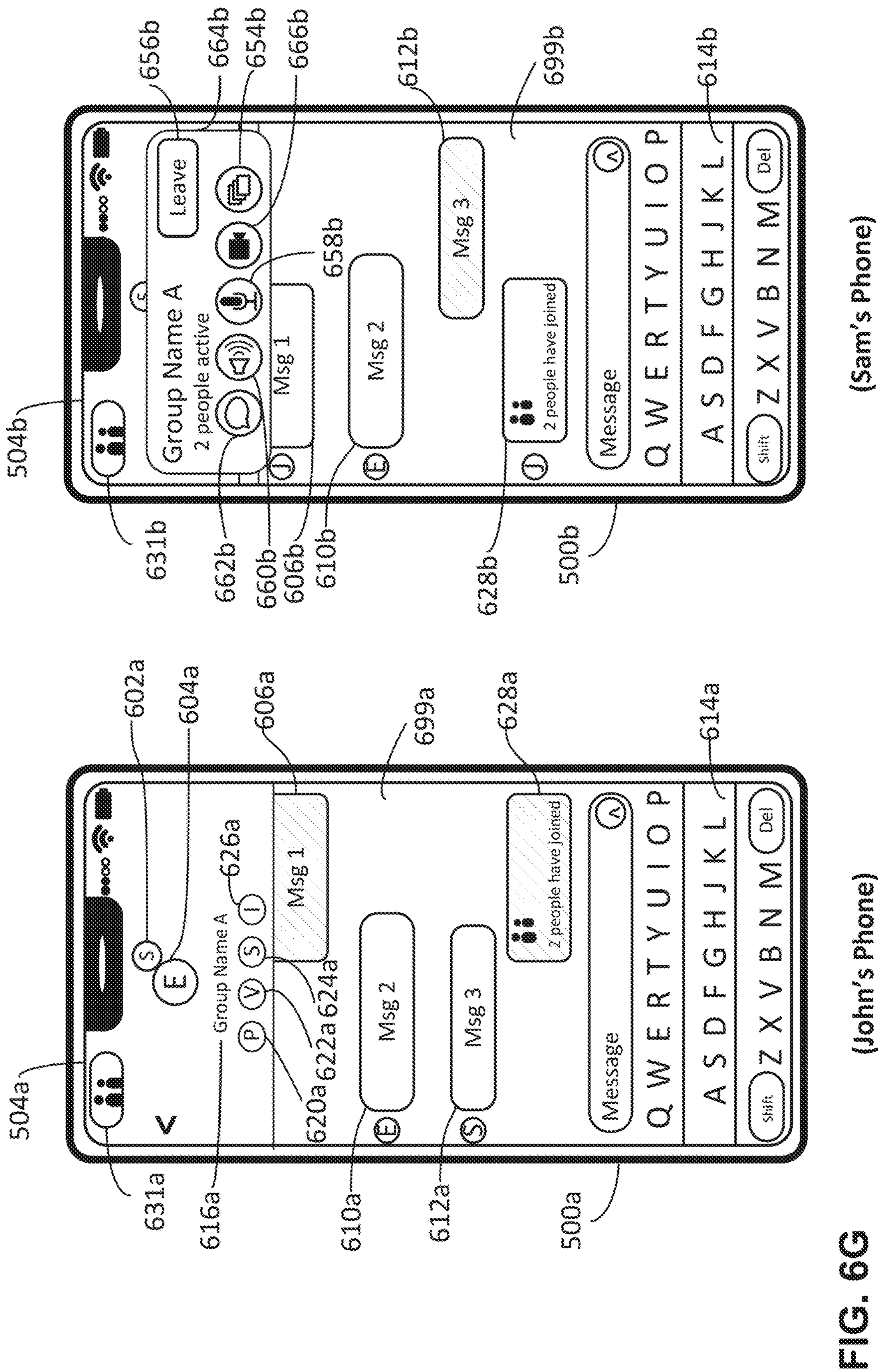
Figure 6H:
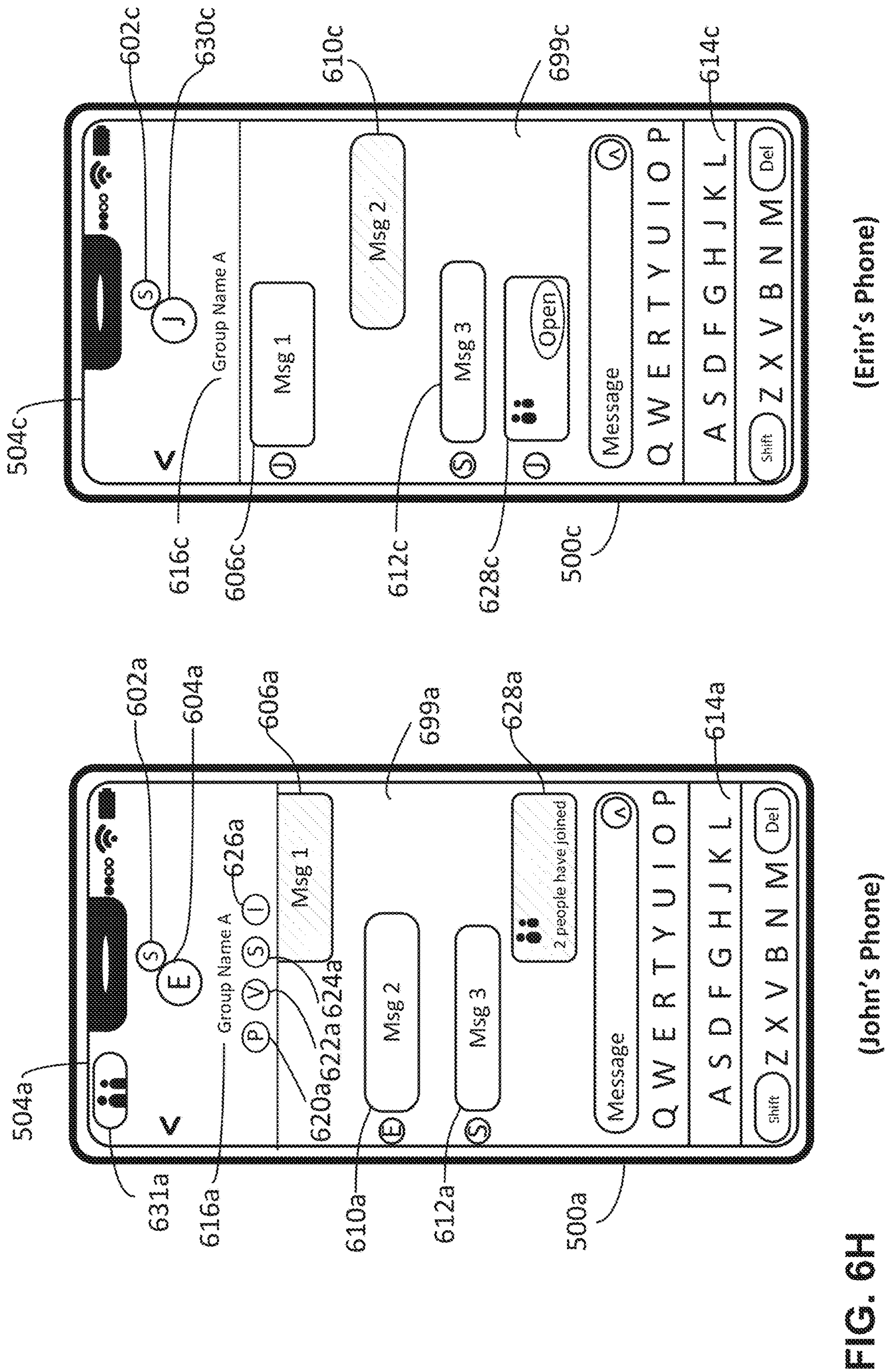
Figure 6I:
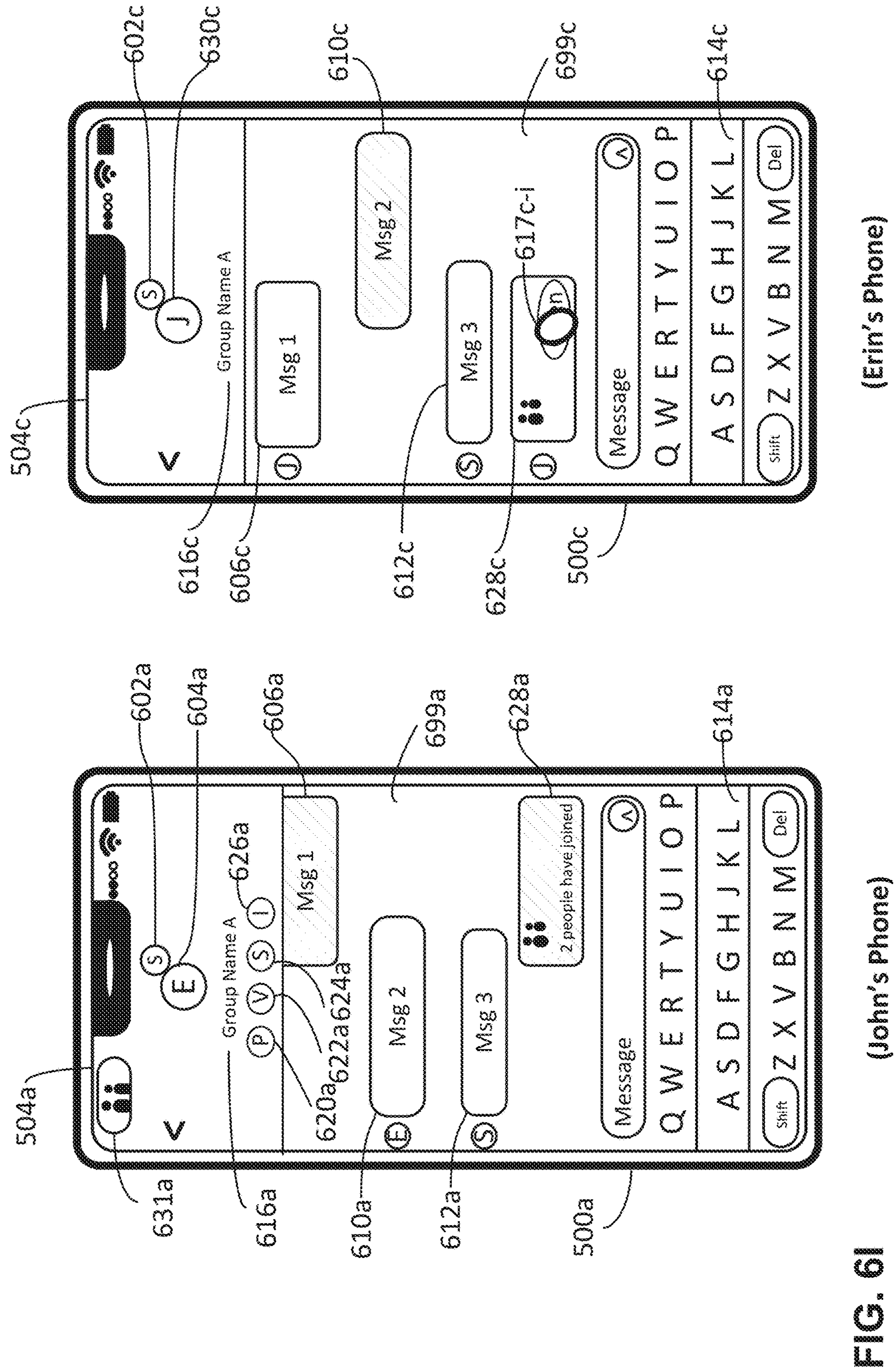
Figure 6J:
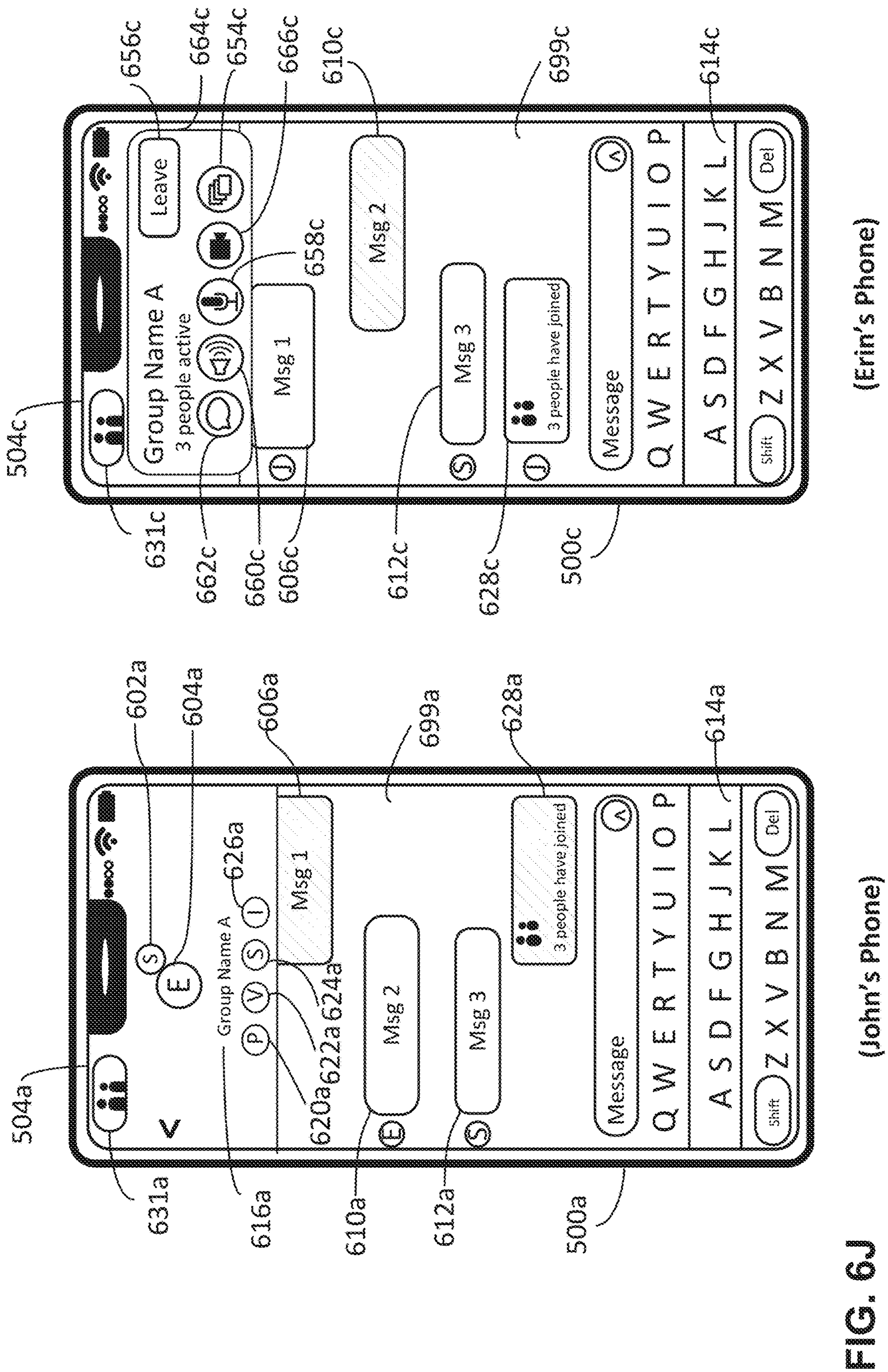
Figure 6K:
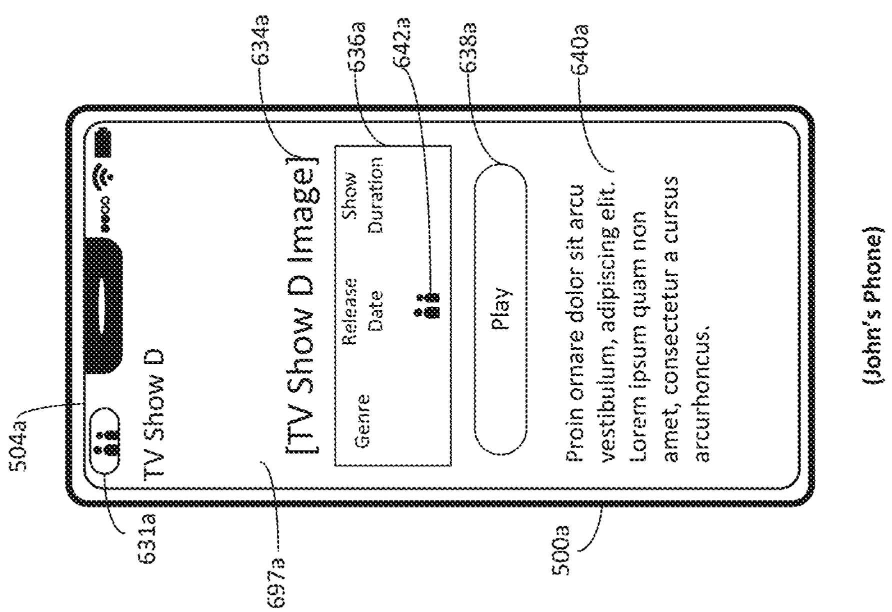
Figure 6L:
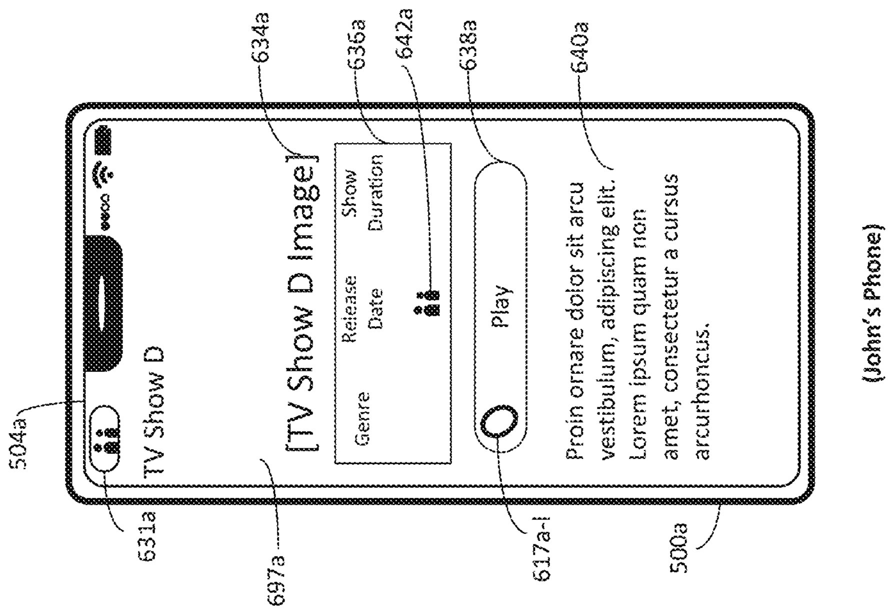
Figure 6N:
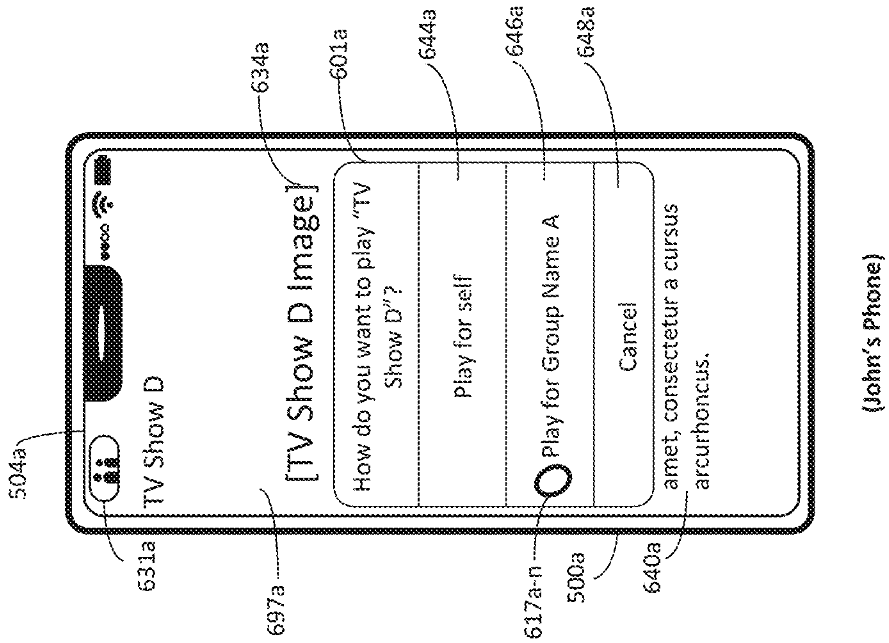
Figure 6M:
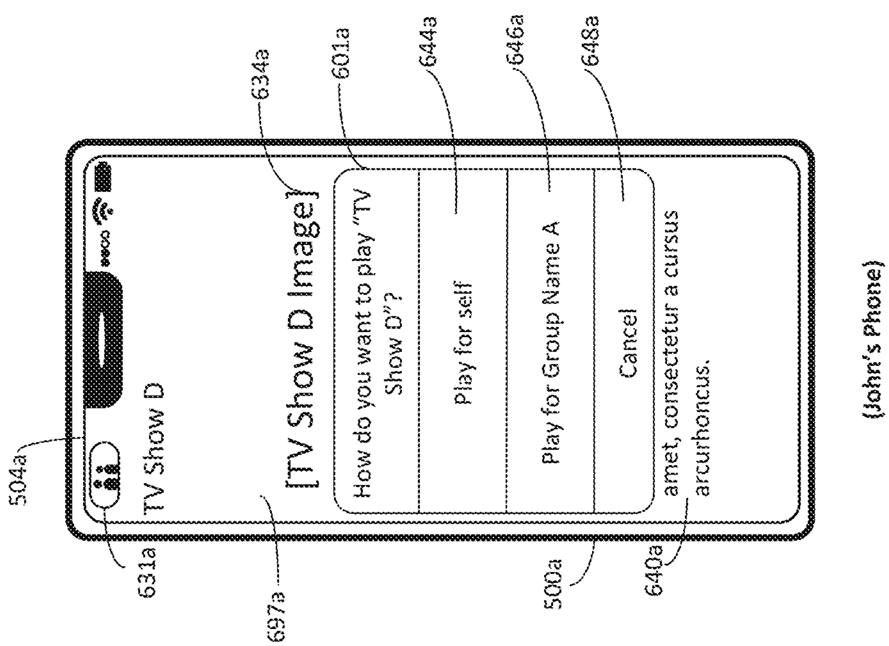
Figure 6P:
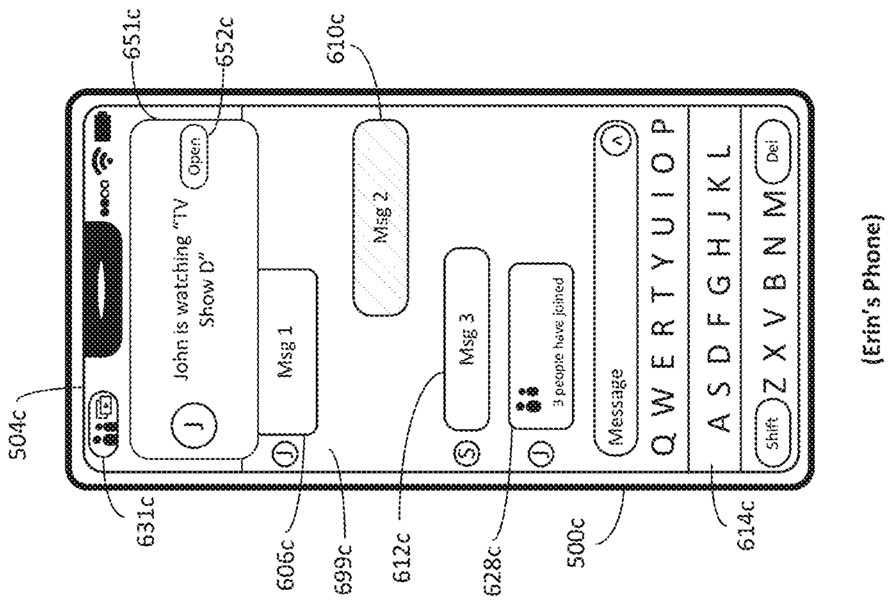
Figure 6O:
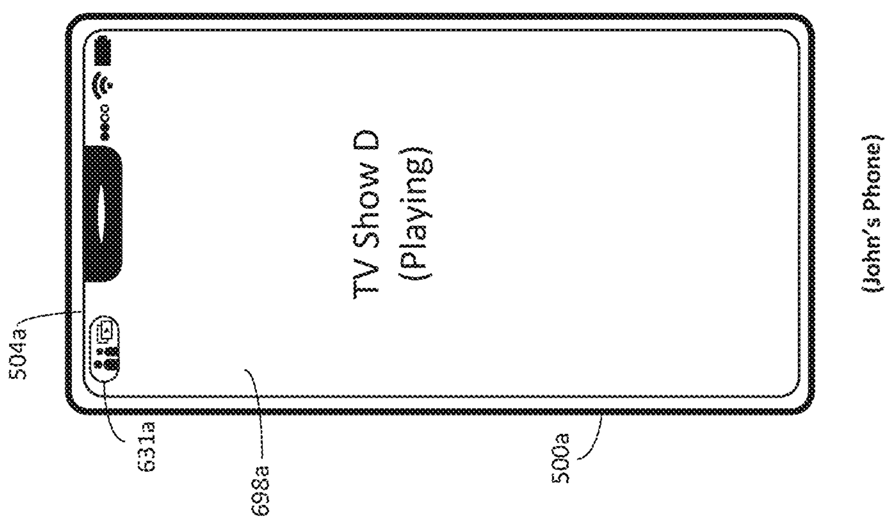
Figure 6R:
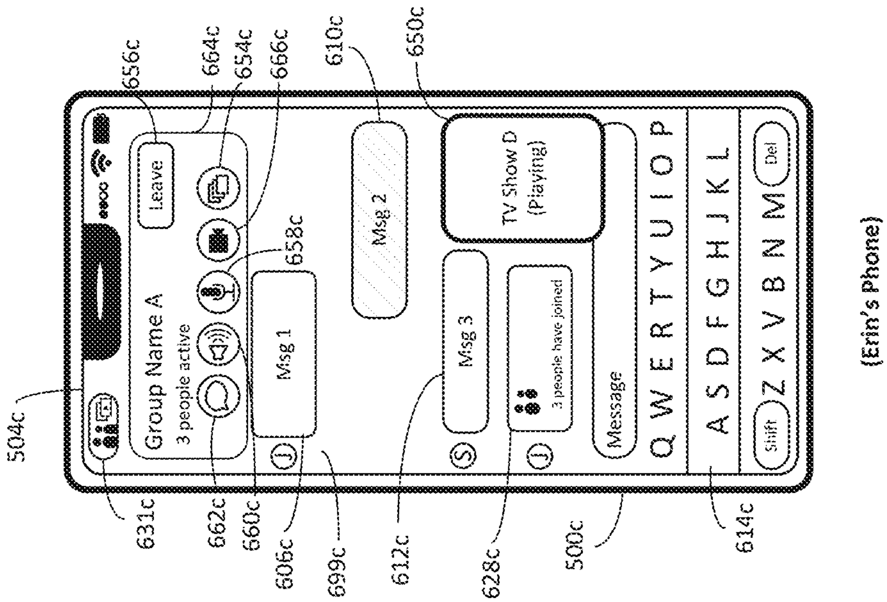
Figure 6Q:
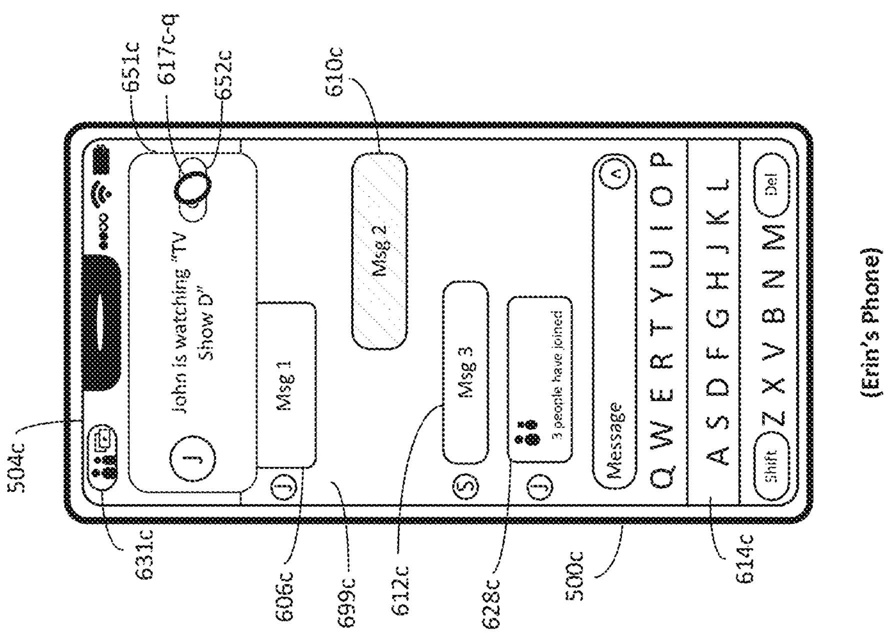
Figure 6S:
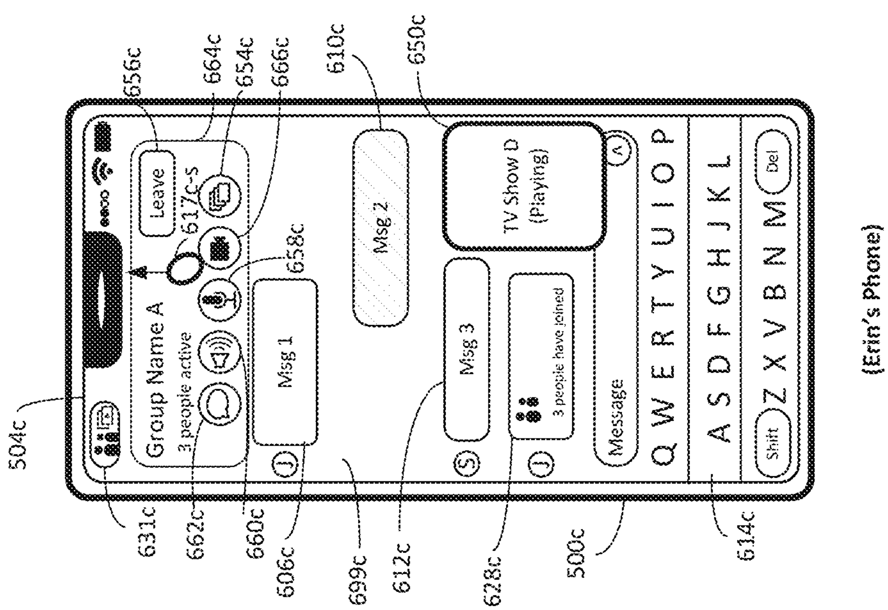

FIGS. 6A-6SSS illustrate exemplary ways in which communication and/or media associated with a synchronized media and communication session can be displayed at one or more devices in accordance with some embodiments of the disclosure. The embodiments in these figures are used to illustrate the processes described below, including the processes described with reference to FIG. 7. Although FIGS. 6A-6SSS illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6SSS.

FIGS. 6A-6J illustrate an exemplary way in which one or more electronic devices can join a synchronized media and communication session. In some embodiments, electronic devices that are part of a synchronized media and communication session synchronously play media content with other electronic devices that are also part of the synchronized media and communication session, as will be described in more detail later. Additionally, in some embodiments, while the electronic devices are synchronously playing media content, users of the electronic devices are also optionally part of a communication session associated with the synchronized media and communication session (e.g., a group messaging conversation, a group phone call, a group video call, etc. with the users in the synchronized media and communication session), as will also be described in more detail later.

In some embodiments, an electronic device that is not currently part of a synchronized media and communication session can start a synchronized media and communication session and send a request to one or more other electronic devices to join the synchronized media and communication session. For example, in FIG. 6A, device 500*a* (John's Phone) is displaying a messaging user interface 699*a* while device 500*a* is not currently part of a synchronized media and communication session. The messaging user interface 699*a* displayed by device 500*a* includes a messaging conversation between John (the user of device 500*a*), Sam (indicated by the representation 602*a* of Sam), and Erin (indicated by the representation 604*a* of Erin). The messaging conversation includes a first message 606*a* that was sent by a device associated with John (e.g., device 500*a*), a second message 610*a* that was sent by a device associated with Erin, and a third message 612*a* that was sent by a device associated with Sam. Additionally, the messaging user interface 699*a* includes a keyboard 614*a* for composing messages and a name of the messaging conversation 616*a* (Group Name A) indicating the users that are part of the messaging conversation.

In some embodiments, the name of the messaging conversation 616*a* is selectable to display one or more selectable options associated with the messaging conversation. For example, in FIG. 6B, while displaying the messaging user interface 699*a*, the electronic device 500*a* detects a request to display one or more selectable options associated with the messaging conversation (indicated by touch contact 617*a-b* tapping the name of the messaging conversation 616*a*). In response, in FIG. 6C, the electronic device 500*a* displays, in the messaging user interface 699*a*, selectable options 620*a*-626*a*. Selectable option 620*a* is selectable to cause device 500*a* to start an audio call/chat with Sam and Erin (e.g., the users participating in the messaging conversation). Selectable option 622*a* is selectable to cause device 500*a* to start a video call/chat with Sam and Erin (e.g., the users participating in the messaging conversation). Selectable option 624*a* is selectable to cause device 500*a* to start a synchronized media and communication session with Sam and Erin (e.g., the users participating in the messaging conversation). Selectable option 626*a* is selectable to display settings for and information about the messaging conversation.

In FIG. 6D, the electronic device 500*a* receives a request to start a synchronized media and communication with the devices associated with the users in the messaging conversation (indicated by touch contact 617*a-d* selecting selectable option 624*a*). In FIG. 6E, the electronic device 500*a* starts the synchronized media and communication session and, subsequently, joins the synchronized media and communication session. As a result of device 500*a* joining the synchronized media and communication, device 500*a* displays indication 631*a* indicating that device 500*a* is currently part of a synchronized media and communication session. In some embodiments, indication 631*a* is displayed with different visual appearances based on whether the synchronized media and communication session is playing media content or is not playing media content. In the example shown in FIG. 6E, the indication 631*a* is currently displayed with a visual appearance indicating that the synchronized media and communication session is not currently playing any media content.

Additionally, as a result of device 500*a* joining the synchronized media and communication, device 500*a* displays an overlay 664*a* (e.g., overlaid on user interface 699*a*) that includes an indication of the group of users that are included in the synchronized media and communication session (e.g., users associated with Group Name A (e.g., the same users included in the messaging conversation described previously)) and an indication indicating the number of users currently in the synchronized media and communication session (1 person active). Overlay 664*a* also includes a selectable option 654*a* for controlling whether device 500*a* is in a private viewing mode (e.g., a mode which allows device 500*a* to play media content without that media content being added to the synchronized media and communication session), a selectable option 656*a*, which when selected, causes the electronic device 500*a* to leave the synchronized media and communication session, a selectable option 658*a* which mutes/unmutes the microphone of electronic device 500*a* from the synchronized media and communication session, a selectable option 660*a* which is selectable to modify the audio output of the synchronized media and communication session, a selectable option 662*a* which is selectable to cause the electronic device 500*a* to display a messaging conversation associated with the synchronized media and communication session (e.g., the messaging conversation associated with Group Name A), and a selectable option 666*a* which is selectable to cause the electronic device to display a video chat/call user interface associated with the synchronized media and communication session.

Additionally, in response to the first electronic device 500*a* starting the synchronized media and communication session, the first electronic device 500*a* sends a request to the devices associated with Erin and Sam (e.g., the devices associated with the users in the messaging conversation) to join the synchronized media and communication session. In FIG. 6E, device 500*b* (Sam's Phone) receives the request to join the synchronized media and communication session, and displays message 628*b*. Message 628*b* includes a selectable option ("Open") that, when selected, causes the second electronic device 500*b* to join the synchronized media and communication session.

In FIG. 6F, device 500*b* receives a request to join the synchronized media communication started by device 500*a* (indicated by touch contact 617*b-f* tapping the selectable option ("Open") included in message 628*b*). In FIG. 6G, in response to receiving the request to join the synchronized media and communication session, device 500*b* joins the synchronized media and communication session (indicated by indication 631*b* displayed by device 500*b*). Indication 631*b* is similar to the indication 631*a* previously described above. Additionally, because device 500*b* is now part of a synchronized media and communication session, device 500*b* updates the content/visual characteristics of message 628*b* to indicate information about the number of users that have joined the synchronized media and communication session (2 people have joined).

Additionally, as a result of device 500*b* joining the synchronized media and communication, device 500*b* displays an overlay 664*b* overlaid on user interface 699*b* that includes an indication of the group of users that are included in the synchronized media and communication session (e.g., users associated with Group Name A (e.g., the same users included in the messaging conversation described previously)) and an indication indicating the number of users currently in the synchronized media and communication session (2 people active). Overlay 664*b* also includes a selectable option 654*b* for controlling whether device 500*b* is in a private viewing mode (e.g., a mode which allows device 500*b* to play media content without that media content being added to the synchronized media and communication session), a selectable option 656*b*, which when selected, causes the electronic device 500*b* to leave the synchronized media and communication session, a selectable option 658*b* which mutes/unmutes the microphone electronic device 500*b* from the synchronized media and communication session, a selectable option 660*b* which is selectable to modify the audio output of the synchronized media and communication session, a selectable option 662*b* which is selectable to cause the electronic device 500*b* to display a messaging conversation associated with the synchronized media and communication session (e.g., the messaging conversation associated with Group Name A), and a selectable option 666*b* which is selectable to cause the electronic device 500*b* to display a video chat/call user interface associated with the synchronized media and communication session. Similar to overlay 664*a*, device 500*b* can cease display of overlay 664*b* when an upward swipe is detected at a location corresponding to overlay 664*b*.

FIGS. 6H-6J illustrate device 500*c* (e.g., the electronic device associated with Erin) joining the synchronized media and communication in a manner similar to what was described with reference to FIGS. 6E-6G. In FIG. 6H, device 500*c* (Erin's Phone) receives the request, from device 500*a*, to join the synchronized media and communication session, and displays message 628*c*. Message 628*c* includes a selectable option ("Open") that, when selected, causes device 500*c* to join the synchronized media and communication session. Messaging user interface 699*c* and message 628*c* optionally have characteristics similar to the above-described messaging user interfaces 699*a* and 699*b* and message 628*b*. In FIG. 6I, while device 500*c* is displaying messaging user interface 699*c*, device 500*c* receives a request to join the synchronized media and communication session (indicated by touch contact 617*c-i* tapping the selectable option ("Open") included in message 628*c*).

In FIG. 6J, in response to receiving the request to join the synchronized media and communication session, device 500*c* joins the synchronized media and communication session (indicated by indication 631*c* displayed by device 500*c*). Indication 631*c* is similar to the indication 631*a* previously described above. Additionally, because device 500*c* is now part of the synchronized media and communication session, device 500*c* updates the content/visual characteristics of message 628*c* to indicate information about the number of users that have joined the synchronized media and communication session (3 people have joined).

Additionally, as a result of device 500*c* joining the synchronized media and communication, device 500*c* displays an overlay 664*c* overlaid on user interface 699*c* that includes an indication of the group of users that are included in the synchronized media and communication session (e.g., users associated with Group Name A (e.g., the same users included in the messaging conversation described previously)) and an indication indicating the number of users currently in the synchronized media and communication session (3 people active). Overlay 664*c* also includes a selectable option 654*c* for controlling whether device 500*c* is in a private viewing mode (e.g., a mode which allows device 500*c* to play media content without that media content being added to the synchronized media and communication session), a selectable option 656*c*, which when selected, causes the electronic device 500*c* to leave the synchronized media and communication session, a selectable option 658*c* which mutes/unmutes the microphone of electronic device 500*c* from the synchronized media and communication session, a selectable option 660*c* which is selectable to modify the audio output of the synchronized media and communication session, a selectable option 662*c* which is selectable to cause the electronic device 500*c* to display a messaging conversation associated with the synchronized media and communication session (e.g., the messaging conversation associated with Group Name A), and a selectable option 666*c* which is selectable to cause the electronic device 500*c* to display a video chat/call user interface associated with the synchronized media and communication session. Similar to overlay 664*a* and 664*b*, device 500*c* can cease display of overlay 664*c* when an upward swipe is detected at a location corresponding to overlay 664*c*.

In some embodiments, after a synchronized media and communication session has been started, an electronic device that is part of the synchronized media and communication can receive a sequence of one or more inputs for navigating to a (e.g., dedicated) user interface for a respective media item. For example, in FIG. 6K, after device 500*a* joined the synchronized media and communication session (indicated by indication 631*a*), device 500*a* received a sequence of one or more inputs for navigating to the (e.g., dedicated) user interface 697*a* for TV show D, as shown in FIG. 6K.

In FIG. 6K, the user interface 697*a* for TV Show D includes a background image for TV Show D 634*a* (represented by [TV Show D Image]), information 636*a* about TV Show D, an indication 642*a* indicating that TV Show D is a type of content that can be added to the synchronized media and communication session, an affordance 638*a* that is selectable to cause the electronic device 500*a* to start playing TV Show D, and a description 640*a* of TV Show D. In some embodiments, user interface 697*a* includes indication 642*a* if device 500*a* is currently participating in a synchronized media and communication session, and does not include indication 642*a* if device 500*a* is not currently participating in a synchronized media and communication session. As shown in FIG. 6K, information 636*a* includes information about the genre of TV Show D, the release date of TV Show D, and the duration/length of TV Show D. In some embodiments, the electronic device 500*a* includes a setting that, when activated (e.g., toggled on), causes the electronic device 500*a* to automatically play content items in the synchronized media and communication session (e.g., play the content items at device 500*a* and at the other devices included in the communication session) in response to receiving an input corresponding to a request to play a content item while the electronic device 500*a* is in a synchronized media and communication session that includes content sharing.

For example, in FIG. 6L, the electronic device 500*a* detects a request to play TV Show D (indicated by touch contact 617*a*-1 selecting affordance 638*a*). In response to detecting the selection of the affordance 638*a*, device 500*a* initiates a process to play TV Show D. In some embodiments, if the setting to automatically play the content item in the synchronized media and communication session (e.g., without further inputs) is active, the electronic device 500*a* initiates playback of the content item in the synchronized media and communication session, as shown in FIGS. 6O-6P, in response to the input illustrated in FIG. 6L without presenting a menu 601*a* to select between playing the content item only at device 500*a* or in the synchronized media and communication session. In some embodiments, in response to the input illustrated in FIG. 6L (e.g., in accordance with a determination that the setting to automatically play the content item in the synchronized media and communication session is not active (e.g., toggled off)), device 500*a* displays menu 601*a*, such as shown in FIG. 6M. Menu 601*a* includes selectable options for designating how to play TV Show D, including a selectable option 644*a* ("Play for self"), which when selected, causes electronic device 500*a* to play TV Show D without causing TV Show D to be played in the synchronized media and communication session, a selectable option 646*a*, which when selected, causes electronic device 500*a* to play TV Show D and causes TV Show D to start playing in the synchronized media and communication session, and a selectable option 648*a*, which when selected, causes electronic device 500*a* to cease displaying menu 601*a* without playing TV Show D at device 500*a* or in the synchronized media and communication session.

In FIG. 6N, the first electronic device 500*a* receives a request to start playing TV Show A in the synchronized media and communication session (indicated by touch contact 617*a-n* selecting selectable option 646*a*). In response, in FIG. 6O, device 500*a* begins playing TV Show D in media user interface 698*a*, and TV Show D starts playing in the synchronized media and communication session (indicated by indication 631*a* being displayed with a different visual appearance than when the synchronized media and communication was not playing media content, as described and illustrated with reference to FIG. 6F).

In some embodiments, when an electronic device that is part of a synchronized media and communication session adds media content to the synchronized media and communication, that electronic device transmits, directly or indirectly (e.g., via one or more servers), an indication that new media content has started playing in synchronized media and communication session to the other electronic devices that are also part of the synchronized media and communication session. For example, in FIG. 6P, device 500*c* receives an indication that TV Show D has started playing in the synchronized media and communication session. In response to receiving the indication, device 500*c* displays indication 651*c*. Indication 651*c* is indicating who added TV Show D to the synchronized media and communication session (John is watching "TV Show D") and is indicating the user associated with the device that started playing the media content in the synchronized media and communication (representation of John, such as a picture or avatar of John). Indication 651*c* also includes a selectable option 652*c* that, when selected, causes device 500*c* to start playing TV Show D at a playback position defined by the synchronized media and communication session.

In FIG. 6Q, device 500*c* detects a request to start synchronously playing TV Show D with device 500*a* (and the other electronic devices in the synchronized media and communication session). Specifically, in FIG. 6Q, electronic device 500*c* receives an input selecting selectable option 652*c* (indicated by touch contact 617*c-q*). In some embodiments, when an electronic device receives a request to play the media content currently playing in the synchronized media and communication session, the media content will play at that electronic device if a respective user is only associated with one device in the synchronized media and communication session. In some embodiments, if the respective user is associated with two or more electronic device in synchronized media and communication session, media content is played at one of the associated devices.

In some embodiments, the media and communication user interfaces associated with a synchronized media and communication session are displayed at the same electronic device when a user is not associated with more than one electronic device in the synchronized media and communication session. For example, in FIG. 6R, device 500*c* (associated with Erin) is the only device that is associated with Erin in the synchronized media and communication session. As a result, in response to receiving the input in FIG. 6Q, TV Show D (the media content currently playing in the synchronized media and communication session) starts playing in the picture-in-picture user interface 650*c* overlaid on user interface 699*c* while device 500*c* is also displaying messaging user interface 699*c*. In some embodiments, while TV Show D continues playing (e.g., in the picture-in-picture user interface 650*c*), input for browsing content available on device 500*c* (e.g., independent from the content included in the synchronized media and communication session) can be detected, and device 500*c* can display user interfaces for browsing such content (e.g., such as the user interface shown in FIG. 6K). Thus, in some embodiments, content other than the content included in the synchronized media and communication session (e.g., including content that can and/or content that cannot be played in the synchronized media and communication session) can be browsed via device 500*c* even while device 500*c* is participating in, and displaying content playing in, the synchronized media and communication session. In some embodiments, in response to receiving input to play a browsed-to content item, device 500*c* optionally responds as described with reference to FIGS. 6L and/or 8DD-8EE.

Figure 6T:
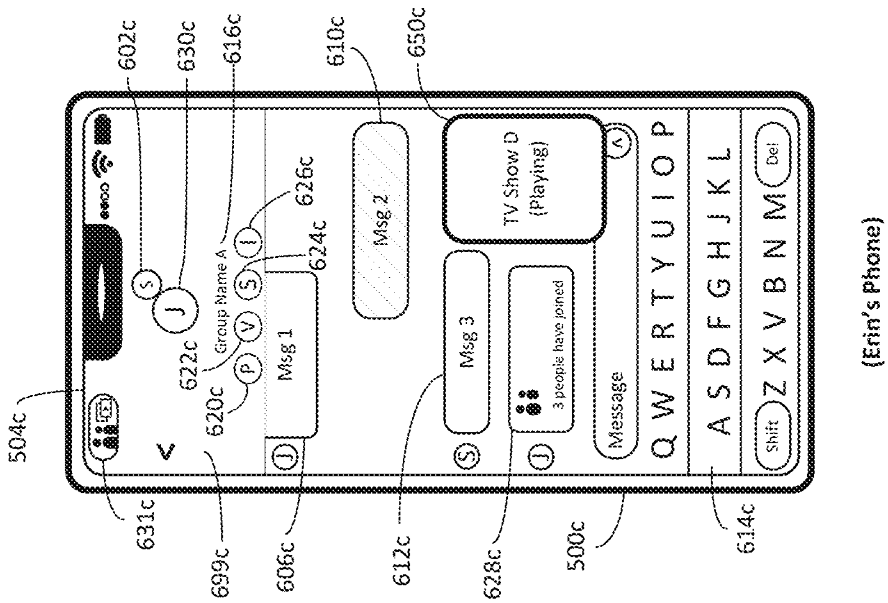
Figure 6U:
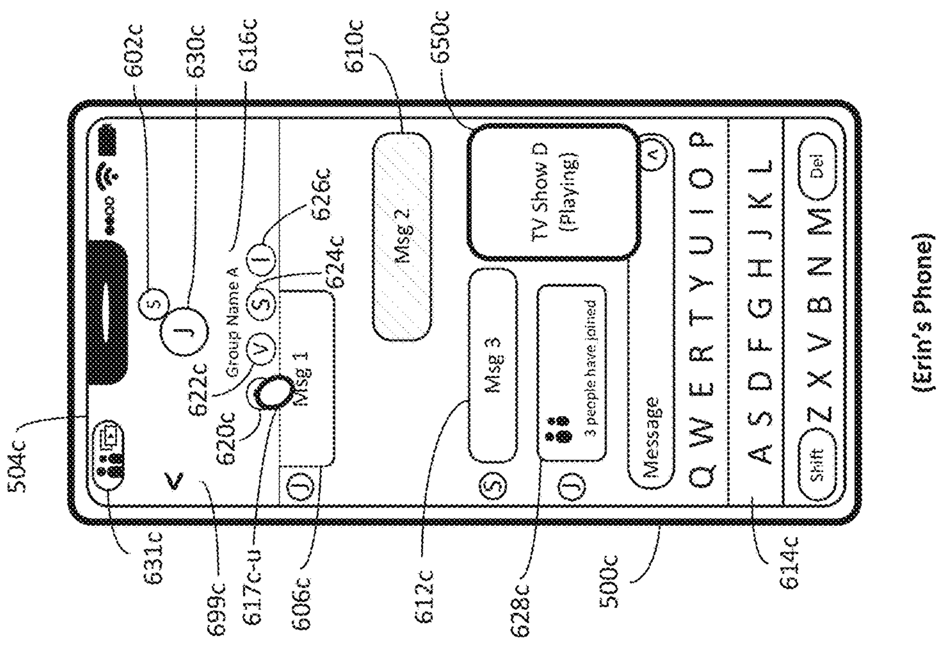

In some embodiments, TV Show D (the media item currently playing in the synchronized media and communication session) continues playing while device 500*c* is facilitating an audio call with other users in the synchronized media and communication session. For example, in FIG. 6S, device 500*c* detects an upward swipe while touch contact 617*c-s* corresponds to a location of the overlay 656*c*. In FIG. 6T, in response to detecting the upward swipe, the device 500*c* ceases displaying overlay 664*c* while continuing to display messaging user interface 699*c* and continuing to play TV Show D in the picture-in-picture user interface 650*c*. In FIG. 6U, device 500*c* receives a request to start and/or join an audio call with the other users in the synchronized media and communication session (indicated by touch contact 617*c-u* selecting selectable option 620*c*). In response, in FIG. 6V, device 500*c* displays an audio call user interface 603*c* between the users in the synchronized media and communication session while continuing to play TV Show D in the picture-in-picture user interface 650*c* (e.g., the media item currently playing in the synchronized media and communication session). The audio call user interface 603*c* illustrated in FIG. 6V includes representations of users included in the synchronized media and communication session, including a representation 668*c* of Sam, a representation 670*c* of John, and a representation 680*c* of a user of device 500*c* (Erin), an indication of the current duration of the phone call (00:30), and the phone number of each device currently in the audio call (e.g., the phone numbers of devices 500*a-c*). In some embodiments, as the audio call progresses in time, the duration of the phone call is also updated in real time.

Figure 6V:
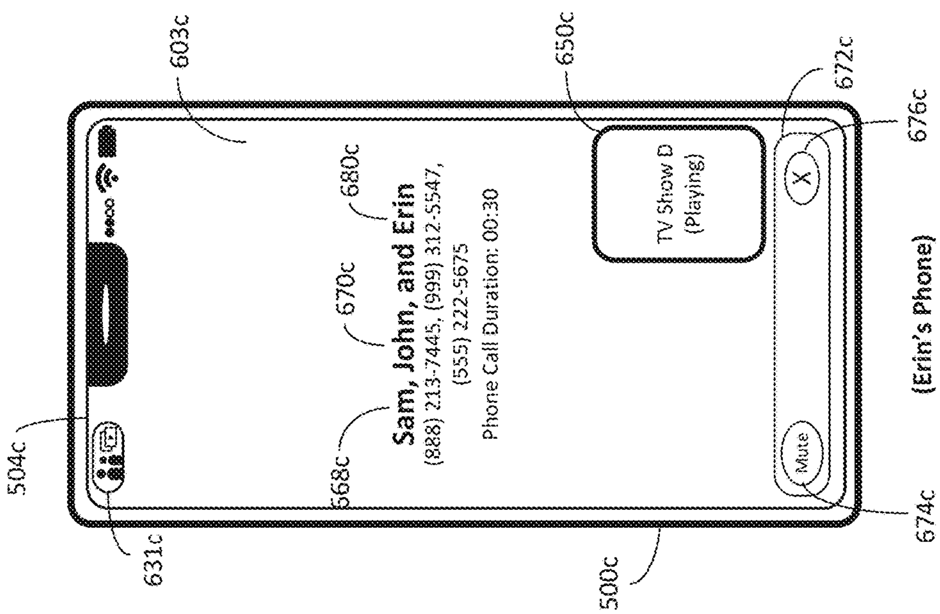
Figure 6W:
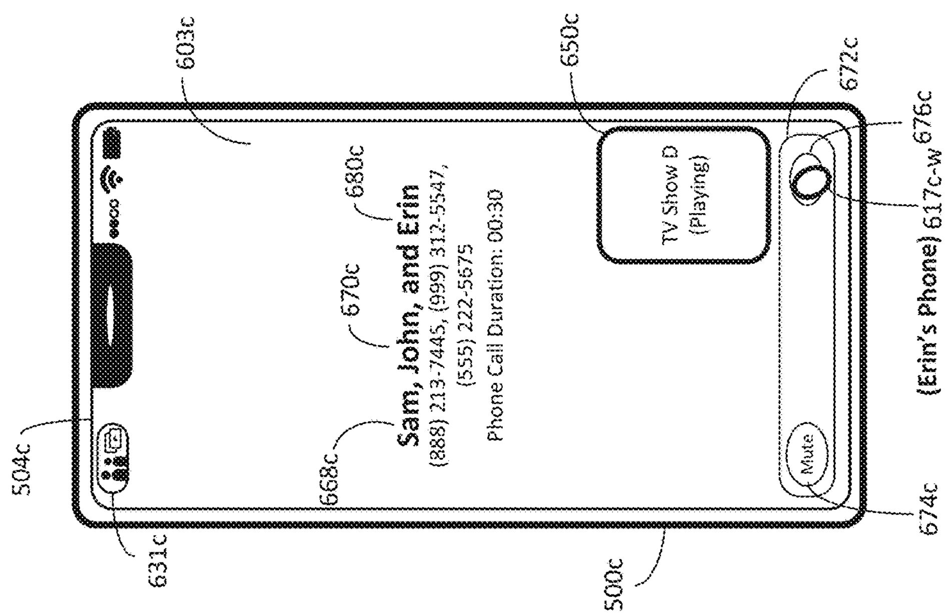

The audio call user interface illustrated in FIG. 6V also includes a user interface object 672*c* that includes a selectable option 674*c* that mutes/unmutes the microphone of the third electronic device 500 from the audio call, and includes a selectable option 676*c* that is selectable to cause the electronic device 500*c* to exit the audio call. In FIG. 6W, device 500*c* detects a request to leave the audio call (indicated by touch contact 617*c-w* selecting selectable option 676*c*). In response, in FIG. 6X, the device 500*c* leaves the audio call user interface 603*c*, and begins displaying the message user interface 699*c* concurrently with the TV Show D—the media item currently playing in the synchronized media and communication session—continuing to play in the picture-in-picture user interface 650*c*.

In some embodiments, TV Show D (the media item currently playing in the synchronized media and communication session) continues playing while device 500*c* is facilitating a video call with other users in the synchronized media and communication session. For example, in FIG. 6Y, device 500*c* receives a request to start/join a video call with the users in the synchronized media and communication session (indicated by touch contact 617*c-y* selecting selectable option 666*c*). In response, in FIG. 6Z, the electronic device 500*c* displays a video call user interface 623*c* while continuing to display the picture-in-picture user interface 650*c*. Video call user interface 623*c* includes video streams of the users in the synchronized media and communication session, including a video stream 668*c* of Sam, a video stream 670*c* of John, and a video stream 680*c* of the user of device 500*c* (Erin).

In some embodiments, the picture-in-picture user interface 650*c* is selectable to cause the electronic device to play the media item that is playing in the picture user interface in a full screen mode. In some embodiments, the picture-in-picture user interface 650*c* includes a selectable option for closing the picture-in-picture user interface 650*c*. For example, in FIG. 6AA, while displaying the video chat user interface 623*c* and the picture-in-picture user interface 650*c*, the electronic device receives a request to play TV Show D in full-screen mode (indicated by touch contact 617*c-aa* selecting picture-in-picture user interface 650*c*). In response, in FIG. 6BB, device 500*c* plays TV Show D, in full screen, in media user interface 698*c* (e.g., without displaying user interface 623*c* and/or user interface 650*c*).

In some embodiments, when an electronic device that is part of a synchronized media and communication session modifies playback of the media content currently playing in the synchronized media and communication session, that electronic device transmits, directly or indirectly (e.g., via one or more servers), an indication that the media content playing in the session has been modified to the other devices in the synchronized media and communication session. For example, in FIG. 6CC, the electronic device 500*c* receives a request to display playback controls (indicated by touch contact 617*c-cc* tapping touch screen 504*c* while media content is playing in media user interface 698*c*). In response, in FIG. 6DD, the electronic device 500*c* displays, in the media user interface 698*c*, an overlay 694*c*. Overlay 694*c* includes a scrubber bar 682*c* for scrubbing TV Show D, which is also indicating a current playback position in TV Show D (indicated by the solid vertical line). Overlay 694*c* also includes a selectable option 684*c*, which when selected, causes the electronic device 500*c* to initiate a process to stream/play TV Show D at a different electronic device, a selectable option 686*c*, which when selected, causes the electronic device 500*c* to rewind TV Show D (e.g., by a predetermined amount (e.g., 15, 30, 60, 90 seconds)), a selectable option 688*c*, which when selected, causes the electronic device 500*a* to play/pause TV Show D, a selectable option 690*c*, which when selected, causes the electronic device 500*c* to fast-forward TV Show D (e.g., by a predetermined amount (e.g., 15, 30, 60, 90 seconds)), and a selectable option 692*c*, which when selected, causes the electronic device 500*c* to turn on/off subtitles for TV Show D. In FIG. 6EE, while device 500*c* is playing TV Show D (e.g., the media content currently playing in the synchronized media and communication session), the electronic device 500*c* detects a request to pause TV Show D (indicated by touch contact 617*c-ee* selecting selectable option

688*c*). In response, in FIG. 6FF, the electronic device 500*c* pauses TV Show D in media user interface 698*c* and pauses TV Show D in the synchronized media and communication session.

Additionally, in FIG. 6FF, devices 500*a* and 500*b*, which are part of the same synchronized media and communication session as device 500*c*, receive an indication that TV Show D (e.g., the media content currently playing in the synchronized media and communication session) has been paused. In response to receiving the indication, device 500*a* pauses TV Show D at a playback position defined by the synchronized media and communication session. Additionally, in response to receiving the indication, device 500*a* also displays indication 696*a* (e.g., overlaid on user interface 698*a*). Indication 696*a* includes text 693*a* indicating that TV Show D was paused (Erin has paused "TV Show D") and the user associated with the device that paused TV Show D (representation 691*a* of Erin). Device 500*b* (Sam's Phone) pauses TV Show D and displays indication 696*b* in a similar manner described above with reference to device 500*a*.

In FIG. 6GG, the playback position of TV Show D (e.g., the media item currently playing in the synchronized media and communication session) is further modified. Specifically, in FIG. 6GG, while TV Show D is paused in the synchronized media and communication session, device 500*b* detects a request to fast-forward TV Show D to a new playback position (indicated by touch contact 617*b-gg* swiping to the right on scrubber bar 682*b*). In FIG. 6HH, after the electronic device 500*b* detects that TV Show D is no longer being scrubbed, the playback position of TV Show D, at device 500*b*, is updated in accordance with the amount of fast-forwarding performed by touch contact 617*b-gg* in FIG. 6GG. In some embodiments, when the playback position of TV Show D is being scrubbed, the playback position of TV Show D is updated in real time.

Additionally, in FIG. 6HH, devices 500*a* and 500*c* receive an indication that the playback of TV Show D has been fast-forwarded. In response to receiving the indication, device 500*a* fast-forwards TV Show D to the playback position defined by the synchronized media and communication session (e.g., the same playback position of TV Show D at device 500*b*). Additionally, in response to receiving the indication, device 500*a* also displays indication 696*a* (e.g., overlaid on user interface 698*a*). Indication 696*a* includes text 693*a* indicating that the playback of TV Show D was modified (Sam has fast forwarded "TV Show D") and the user associated with the device that fast forwarded TV Show D (representation 691*a* of Sam). Device 500*c* (Erin's Phone) fast forwards TV Show D and displays indication 696*c* in a similar manner illustrated and described above with reference to device 500*a*.

In FIG. 6II, after device 500*b* fast forwarded TV Show D in the synchronized media and communication session, device 500*b* detects a request to start playing TV Show D (indicated by touch contact 617*b-ii* selecting the play/pause affordance). In response, in FIG. 6JJ, device 500*b* starts playing TV Show D in media user interface 698*b*. Additionally, because TV Show D is currently playing in the synchronized media and communication session, the electronic device 500*b* transmits an indication, directly, or indirectly with one or more servers, that TV Show D has started playing in the synchronized media and communication session.

Additionally, in FIG. 6JJ, devices 500*a* and 500*c* receive the indication that TV Show D has started playing in the synchronized media and communication session. In response to receiving the indication, device 500*a* starts playing TV Show D at the playback position defined by the synchronized media and communication session (e.g., synchronously with the other devices in the synchronized media and communication session). In response to receiving the indication, device 500*a* also displays indication 696*a* (e.g., overlaid on user interface 698*a*). Indication 696*a* includes text 693*a* indicating why the playback of TV Show D started playing (Sam started playing "TV Show D") and indicates the user associated with the device that started playing TV Show D (representation 691*a* of Sam). Device 500*c* (Erin's Phone) starts playing TV Show D and displays indication 696*c* in a similar manner illustrated and described above with reference to device 500*a*.

In some embodiments, an electronic device that is part of a synchronized media and communication session can add a (e.g., associated) second electronic to the synchronized media and communication session and/or start playing the media content playing in the synchronized media and communication session at the second electronic device. For example, in FIG. 6KK, while device 500*c* is playing TV Show D synchronously with the other devices in the synchronized media and communication session, the electronic device 500*c* receives an input (indicated by touch contact 617*c-kk*) selecting selectable option 684*c*. In response to selecting selectable option 684*c*, in FIG. 6LL, electronic device 500*c* displays a menu 611*c* that includes a selectable option 613*c* for playing TV Show D at Erin's Phone (e.g., the device the media content is currently playing at (indicated by checkmark 619*c*)), a selectable option 615*c* for playing TV Show D at Erin's TV (e.g., a set-top box connected to a TV), and a selectable option 621*c* to cancel/close menu 611*c* without changing the device that plays TV Show D. In FIG. 6MM, the electronic device 500*c* receives a selection of selectable option 615*c* (indicated by touch contact 617*c-mm*). In response, in FIG. 6NN, the electronic device corresponding to Erin's TV is selected to play TV Show D (indicated by checkmark 619*c*) and initiates a process to start synchronously playing TV Show D at Erin's TV and with the other devices that are also part of the synchronized media and communication session.

In response to the input in FIG. 6MM, in FIG. 600, device 500*d* (Erin's TV/set-top box) is added to the synchronized media and communication session (indicated by indication 685*d* displayed on display device 514*d* in communication with device 500*d*) and starts synchronously playing device TV Show D in media user interface 698*d* (e.g., the media item currently playing in the synchronized media and communication session). Specifically, in FIG. 600, the indication 685*d* displayed by device 500*d* is indicating that device 500*d* has recently joined the synchronized media and communication session and that media associated with the synchronized media and communication session is being presented by device 500*d*. In some embodiments, the media user interface 698*d* optionally has one or more characteristics similar to the media user interfaces 698*a-c* illustrated and described above.

Additionally, as shown in FIG. 600, after detecting the input in FIG. 6MM, device 500*c* displays indication 689*c* (e.g., overlaid on user interface 697*c*) which is indicating that TV Show D is now playing at device 500*d* (Now Playing "TV Show D" on Erin's TV). Indication 689*c* also includes a selectable option 687*c* for displaying a remote user interface for controlling device 500*d*. It is understood that device 500*d* is able to receive input/commands from a dedicated remote control (e.g., remote 510 in FIG. 5B). However, in some embodiments, it may be desirable for a user to provide inputs/issue commands to the electronic device 500*d* from a remote-control user interface of a multi-function device, such as electronic device 500*c*. Additionally, after the detecting the input in FIG. 6MM, device 500*c* also ceases playing TV Show D and starts displaying a dedicated user interface 697*c* for TV Show D, which is similar to the dedicated user interface 697*a* for TV Show D described and illustrated previously.

In FIG. 6PP, while electronic device 500*d* is synchronously playing the TV Show D, electronic device 500*c* detects a request to display a remote control user interface for controlling device 500*d* (indicated by touch contact 617*c-pp* selecting selectable option 687*c*). Additionally, in FIG. 600 device 500*d* switches from displaying the indication 685*d* in FIG. 600 to displaying the indication 631*d*. Indication 631*d* is similar to indication 631*a* previously described above. In some embodiments, the device 500*d* switches to displaying indication 631*d* because the indication 685*d* in FIG. 600 was displayed by device 500*d* for more than a respective amount of time (e.g., 5, 15, 30, 60 seconds). In FIG. 6QQ, in response to detecting the selection, the electronic device 500*c* displays remote control user interface 667*c*. The remote-control user interface 667*c* includes various controls that simulate controls on a dedicated remote control (e.g., remote 510 in FIG. 5B) for controlling electronic device 500*d*. Specifically, the remote-control user interface 667*c* includes selectable options 629*c*, 683*c*, 679*c*, and 677*c* that correspond to the buttons described with reference to remote 510. Selection of one of the selectable options 629*c*, 683*c*, 679*c*, and 677*c* optionally causes device 500*c* to transmit corresponding commands to the electronic device to respond accordingly. Remote control user interface 667*c* also includes a trackpad area 671*c*, which optionally operates in a similar manner as the touch-sensitive surface 451 on remote 510 in FIG. 5B. In some embodiments, electronic device 500*c* can detect a tap on selectable option 673*c* to adjust the playback forward by 15 seconds, and can detect a tap on selectable option 675*c* to adjust the playback backwards by 15 seconds.

In FIG. 6RR, the electronic device 500*d* receives a request to pause TV Show D, which is currently playing in the synchronized media and communication session (indicated by touch contact 617*c-rr* selecting selectable option 679*c* while TV Show D is playing at device 500*d*). In FIG. 6SS, in response, electronic device 500*d* pauses TV Show D (represented by TV Show D (Paused) in media user interface 698*d*). Additionally, in response to receiving the command to pause the playback of TV Show D, the electronic device 500*d* displays an overlay 694*d* that includes a scrubber bar 682*d* that is indicating a current playback position in TV Show D.

Additionally, because TV Show D is currently playing in the synchronized media and communication session, the electronic device 500*d* transmits an indication (e.g., directly, or indirectly via one or more servers) that the playback of TV Show D has been paused to other electronic devices that are part of the synchronized media and communication session. In FIG. 6TT, the electronic devices 500*a* and 500*b* receive the indication that TV Show D has been paused by electronic device 500*d*. In response to receiving the indication, electronic device 500*a* pauses the playback of TV Show D in the media user interface 698*a*, and the electronic device 500*b* also pauses the playback of TV Show D. In the example of FIG. 6TT, because TV Show D is synchronously being played, the playback position of TV Show D shown at the devices 500*a-c* in FIGS. 6SS and 6TT correspond to the same playback position. Additionally, in response to receiving the indication, device 500*a* also displays indication 696*a* (e.g., overlaid on user interface 698*a*). Indication 696*a* includes text 693*a* indicating why TV Show D was paused (Erin has paused "TV Show D"), and also indicates the user associated with the device that paused TV Show D (representation 691*a* of Erin). Device 500*b* (Sam's Phone) pauses TV Show D and displays indication 696*b* in a similar manner described above with reference to device 500*a*.

In some embodiments, an electronic device that is part of the synchronized media and communication session can cause the synchronized media and communication session to play a new media item (e.g., different than the media item currently playing in the synchronized media and communication session). For example, in FIG. 6UU, while device 500*b* is currently displaying TV Show D (e.g., the media content currently playing in the synchronized media and communication session), device 500*b* detects an upward swipe while touch contact 617*b-uu* is at a location that corresponds to the overlay 696*b*. In FIG. 6VV, in response to detecting the upward swipe, the electronic device 500*b* ceases displaying the overlay 696*b*. Additionally, in FIG. 6VV, the electronic device 500*b* receives a request to cease displaying media user interface 698*b* (indicated by touch contact 617*b-vv* selecting selectable option 663*b*).

In response, in FIG. 6WW, the electronic device 500*b* ceases displaying media user interface 698*b* while device 500*a* (and optionally other devices in the synchronized media and communication session) continue displaying TV Show D in media user interface 698*a*. In some embodiments, after an electronic device stops playing media content that is currently playing in the synchronized media and communication session, that electronic device still remains part of the synchronized media and communication session, as illustrated by device 500*b* continuing to display indication 631*b*. Alternatively, in some embodiments, when an electronic device stops (or is no longer) playing the media content that is currently playing in the synchronized media and communication session, that electronic device also initiates a process to leave the synchronized media and communication session. In some embodiments, after ceasing to display content that is currently playing in the synchronized media and communication session, but while device 500*b* remains in the synchronized media and communication session, subsequent input to play the content that is currently playing in the synchronized media and communication session (e.g., but is not and/or no longer playing at device 500*b*) results in device 500*b* rejoining playback of that content at its current playback position in the synchronized media and communication session. For example, if device 500*b* were to receive input to navigate to user interface 697*a* for TV Show D shown in FIG. 6K after having ceased playback of TV Show D (e.g., which continues to play in the synchronized media and communication session), selectable option 638*a* would optionally indicate "Resume" (e.g., rather than "Play). Further, selection of selectable option 638*a* would optionally result in device 500*b* playing TV Show D from the current playback position of TV Show D in the synchronized media and communication session, which is optionally different from (e.g., earlier than, later than) the playback position of TV Show D when device 500*b* ceased playing TV Show D. In some embodiments, if TV Show D is no longer playing in the synchronized media and communication session when device 500*b* displays user interface 697*a*, selectable option 638*a* would optionally indicate "Play" (e.g., rather than "Resume"), and selection of selectable option 638*a* would optionally result in device 500*b* playing TV Show D from a playback position not based on the synchronized media and communication session. In some embodiments, device 500*b* can additionally or alternatively rejoin playback of a content item at its current playback position in a synchronized media and communication session via selection of an option displayed in overlay 664*b* (e.g., such as shown in FIG. 6G) for rejoining such content playback.

In FIG. 6WW, after the electronic device ceases display of media user interface 698*b*, the electronic device 500*b* received a sequence of one or more inputs for navigating to a (e.g., dedicated) user interface 605*b* for TV Show E. The user interface 605*b* for TV Show E includes a background image for TV Show E 607*b* (represented by TV Show E Image), information 609*d* about TV Show E, an indication 642*d* of the content type of TV Show E (e.g., a type of content that can be added to a synchronized media and communication session), an affordance 638-1*b* which is selectable to cause the electronic device 500*b* to start playing TV Show E, and a description 640*b*-1 of TV Show E. As shown in FIG. 6WW, information 609*b* includes information about the genre of TV Show E, the release date of TV Show E, and the duration/length of TV Show E. Specifically, as illustrated in FIG. 6WW, TV Show E is able to be added to the synchronized media and communication (indicated by indication 642*b*).

Figure 6X:
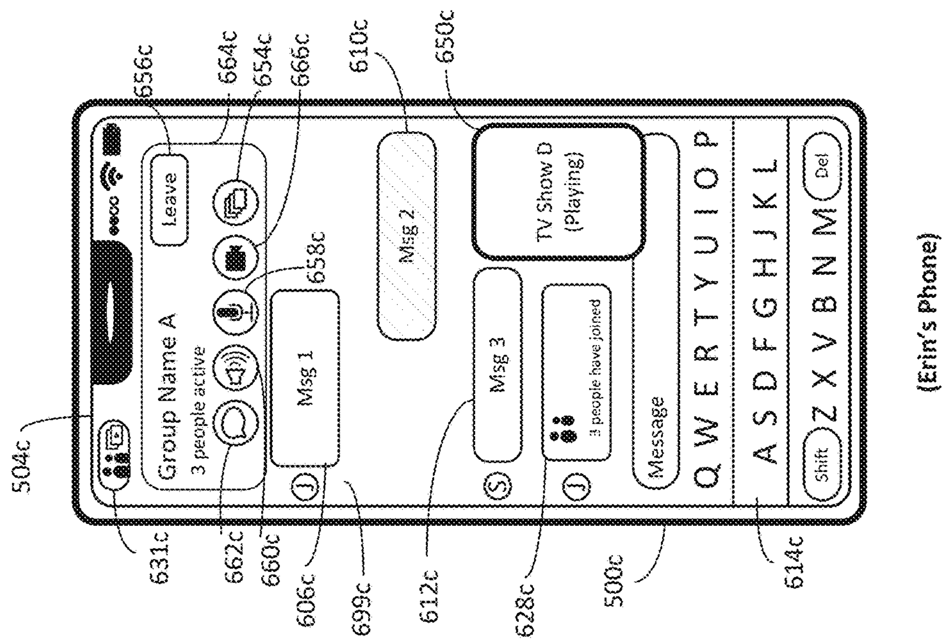

In FIG. 6WW-1, while displaying the user interface 605*b* for TV Show E, the electronic device 500 receives a request to play TV Show E (indicated by touch contact 617*b-ww-*1 selecting affordance 638-1*b*). In FIG. 6XX, in response to receiving the input for playing TV Show E, the electronic device 500*b* starts playing TV Show E in media user interface 698*b* and in the synchronized media and communication session. The menu 601*a* and selectable options 644*a*-648*a* are not displayed before TV Show E starts playing, as illustrated and described in FIG. 6N, because the electronic device 500*b* is already part of a synchronized media and communication session that is playing media content. In FIG. 6XX, electronic device 500*a* receives an indication that media playing in the synchronized media and communication has changed from TV Show D to TV Show E. In response to receiving the indication, device 500*a* ceases playing TV Show D (e.g., the media previously playing in the synchronized media and communication session) and starts playing TV Show E at the playback position defined by the synchronized media and communication session (e.g., the new media item added to the synchronized media and communication session). Additionally, in response to receiving the indication, device 500*a* also displays indication 696*a* (e.g., overlaid on user interface 698*a*). Indication 696*a* includes text 693*a* indicating why the synchronized media and communication started playing TV Show E (Sam has started playing "TV Show E") and indicates the user associated with the device that modified the playback in the synchronized media and communication session (representation 691*a* of Sam).

It is understood that, in some embodiments, other devices that are part of the synchronized media and communication could receive an indication similar to the indication received by device 500*a* in FIG. 6XX and operate in a similar manner. For example, in FIG. 6YY, because electronic device 500*d* is part of the synchronized media and communication session (indicated by indication 631*d* displayed by device 500*d*), electronic device 500*d* also receives an indication that electronic device 500*a* has started playing TV Show E in the synchronized media and communication session. In response to receiving this indication, electronic device 500*d* stops playing TV Show D and starts playing TV Show E synchronously with the other electronic devices in the synchronized media and communication session. Additionally, in response to receiving the indication, device 500*d* also displays indication 696*d*. Indication 696*d* includes text 693*d* indicating why TV Show D has started playing at device 500*d* ("Sam has started playing "TV Show E") and indicates the user associated with the device that caused TV Show E to start playing in the synchronized media and communication session (representation 691*d* of Sam).

Figure 6Z:
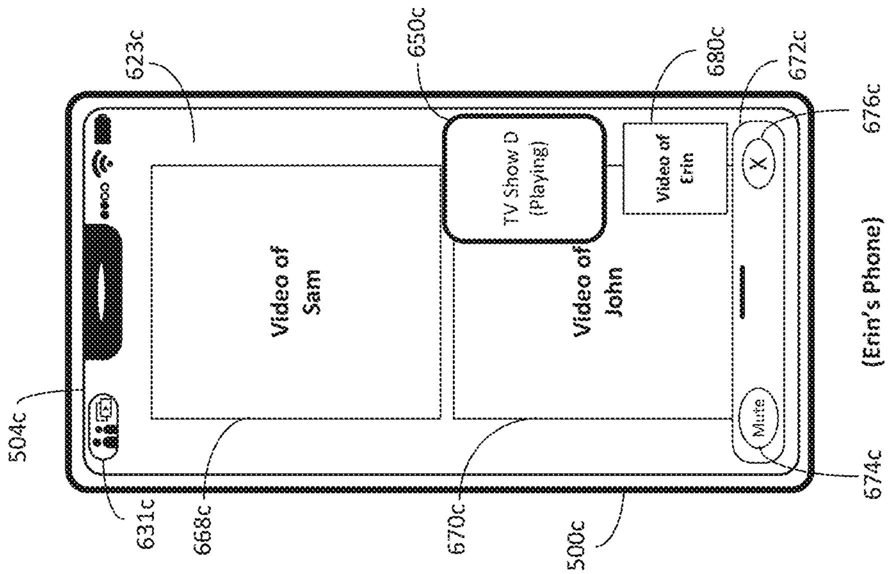
Figure 6Y:
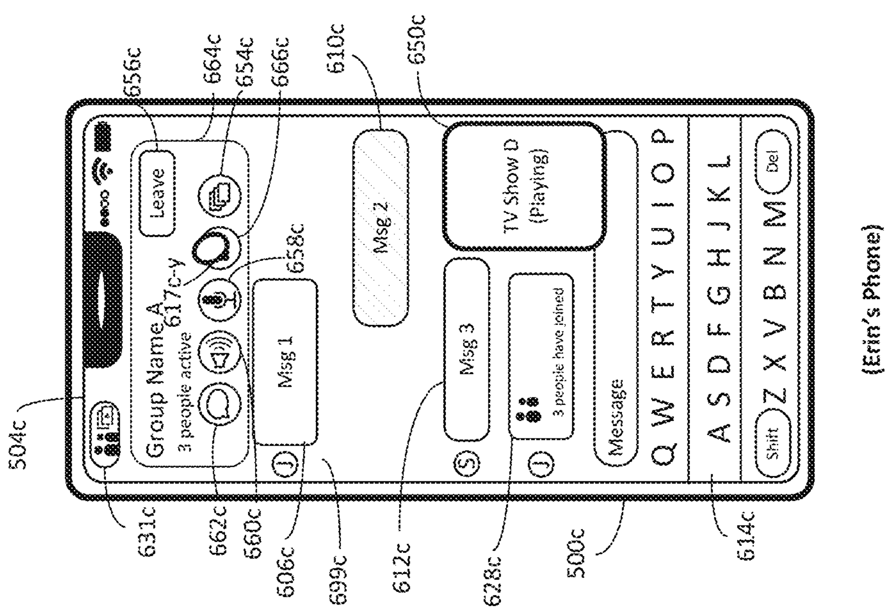
Figure 6B:
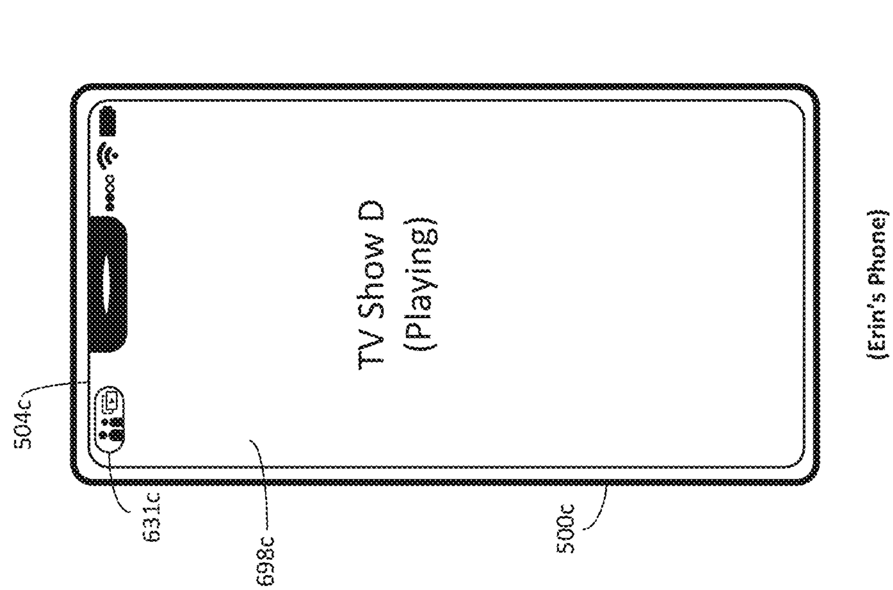
Figure 6A:
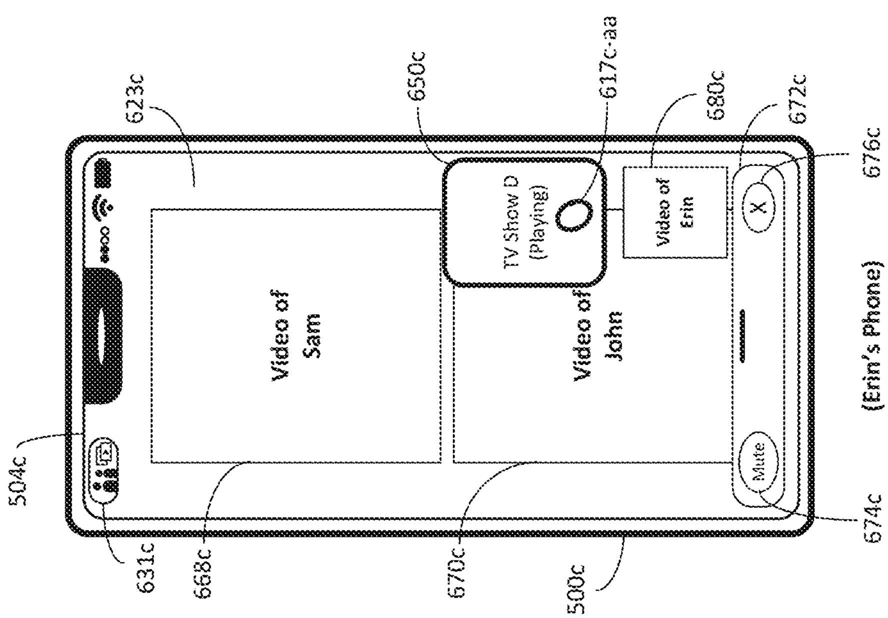
Figure 6D:
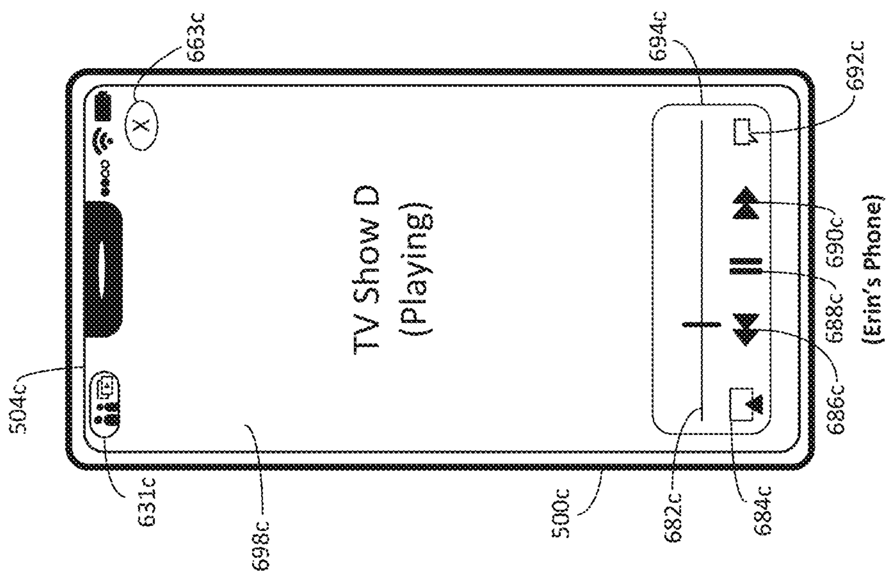
Figure 6C:
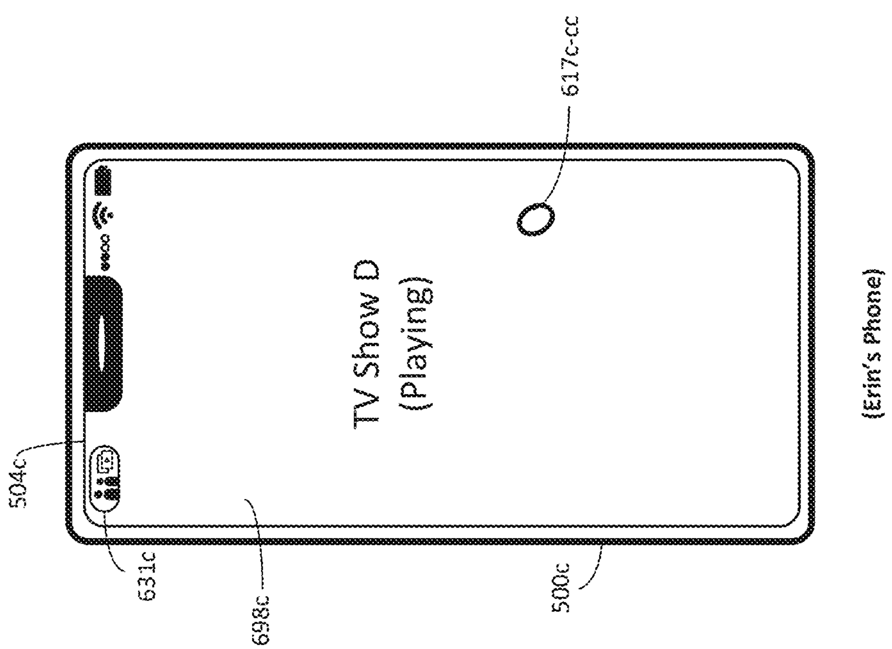
Figure 6E:
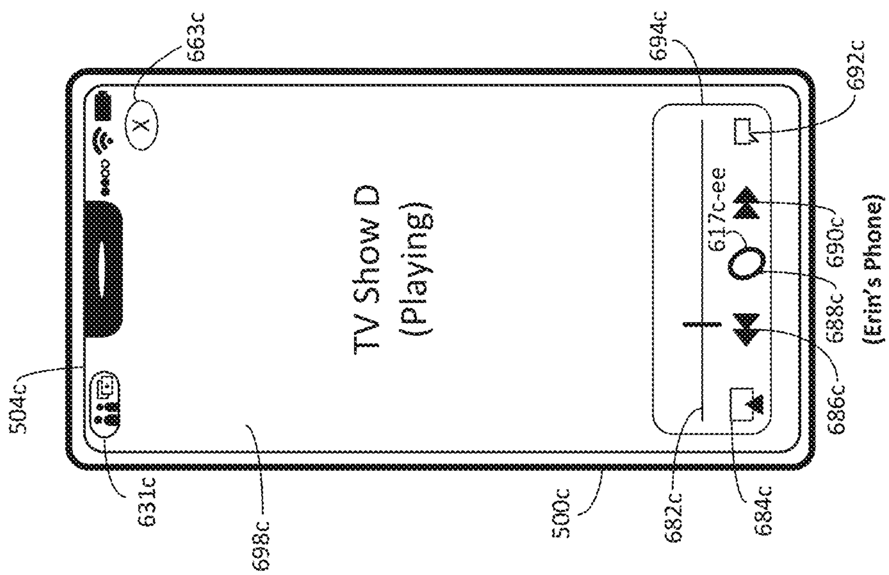
Figure 6F:
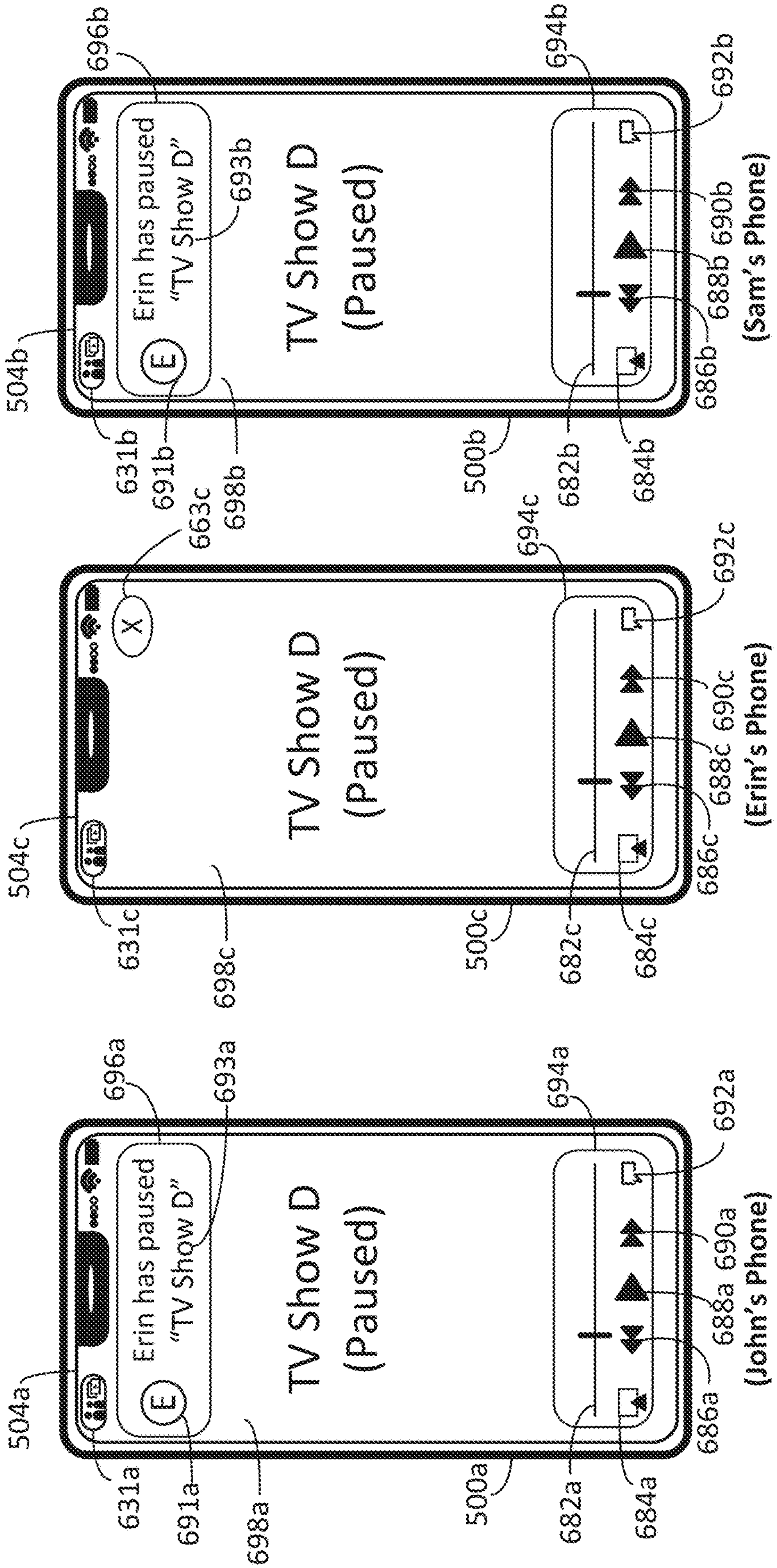
Figure 6G:
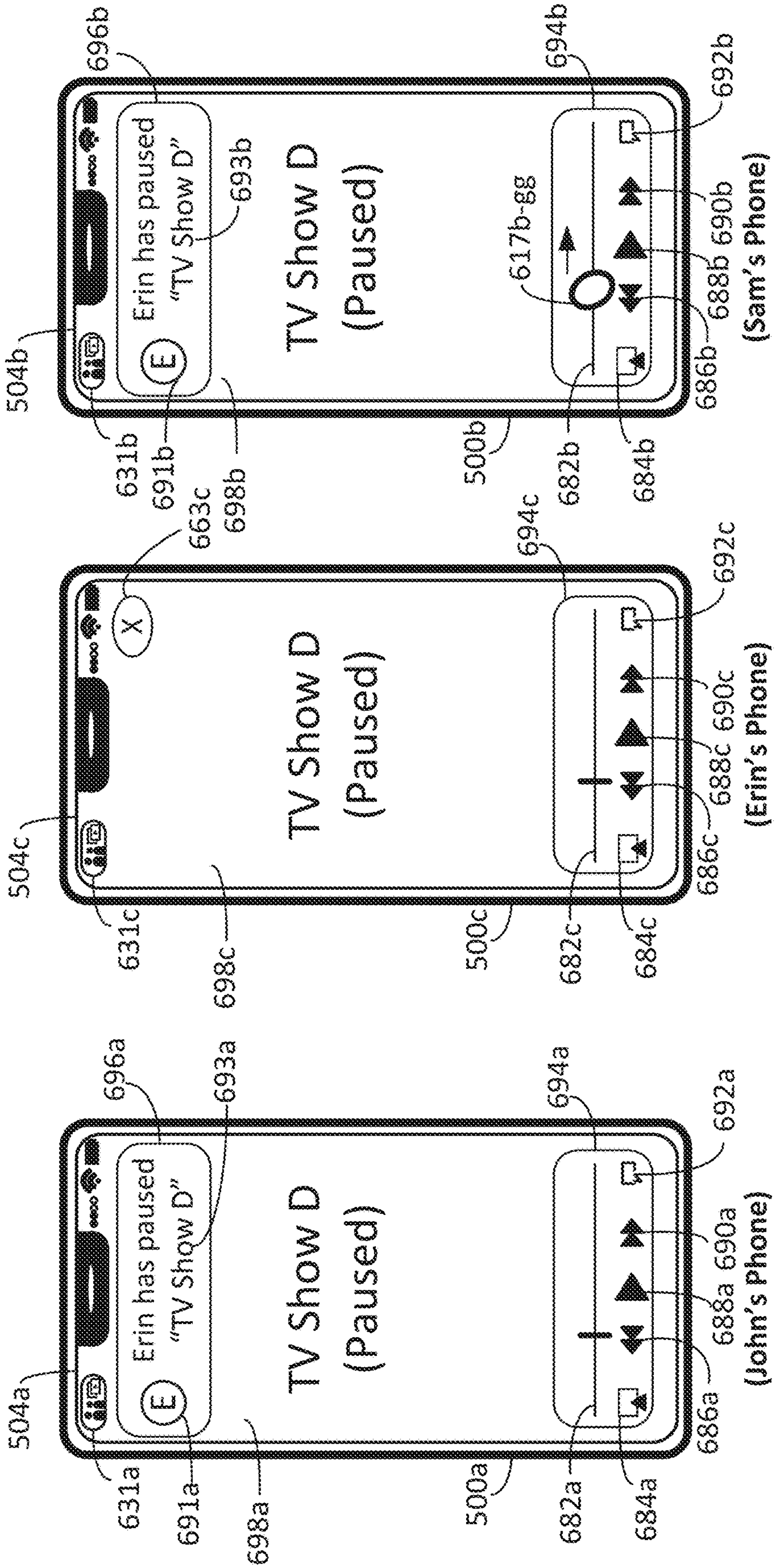
Figure 6H:
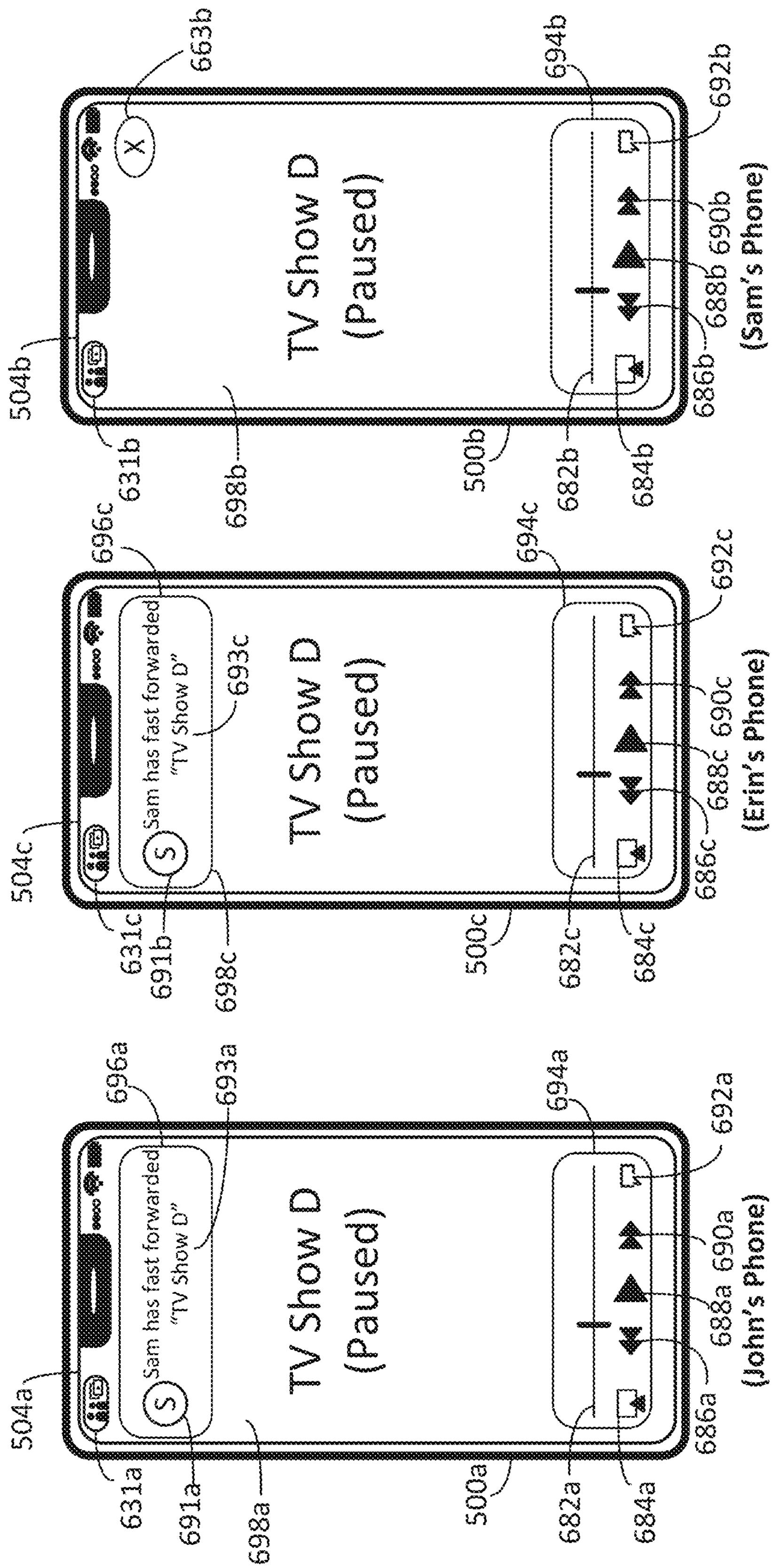
Figure 6I:
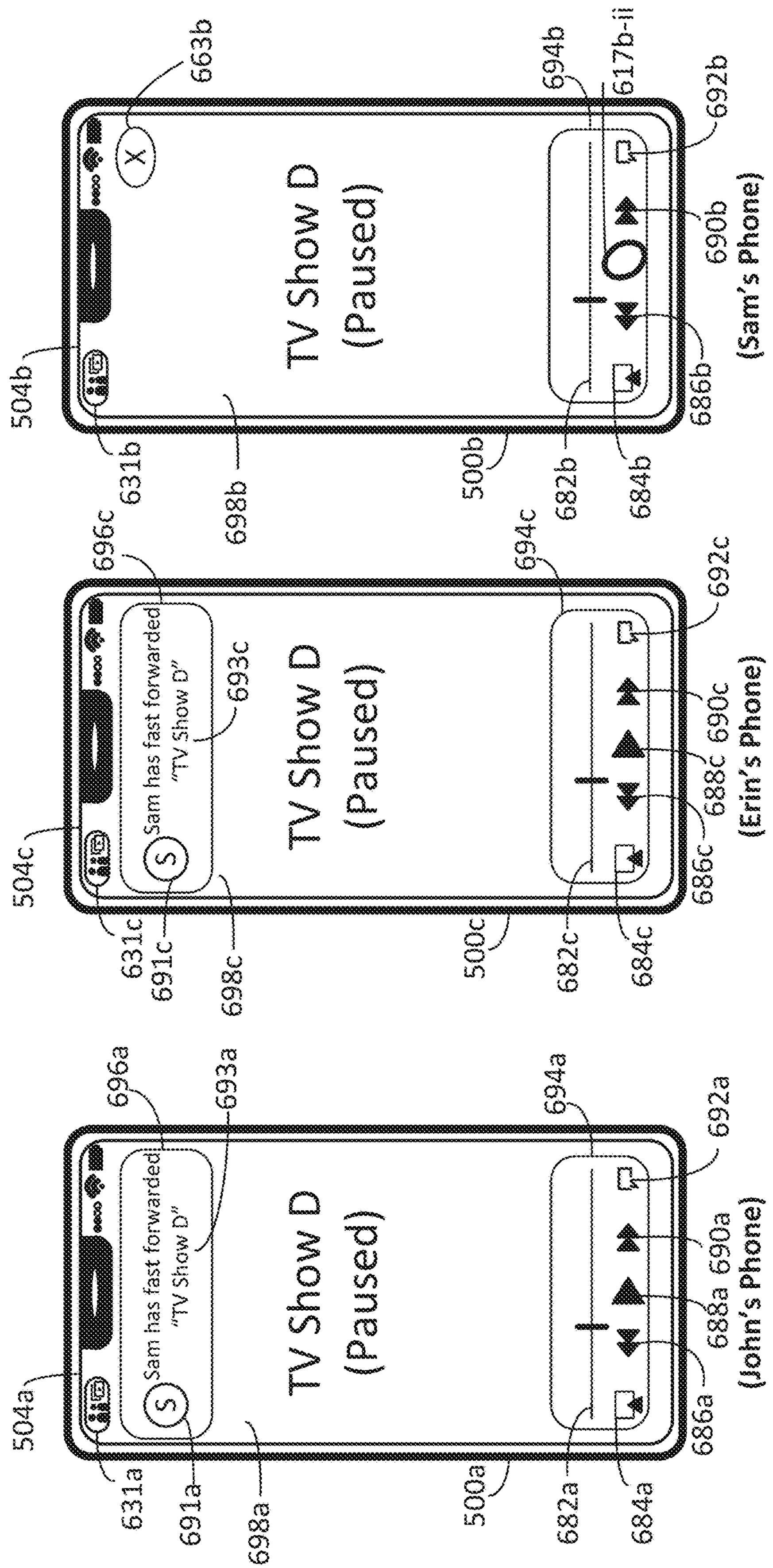
Figure 6J:
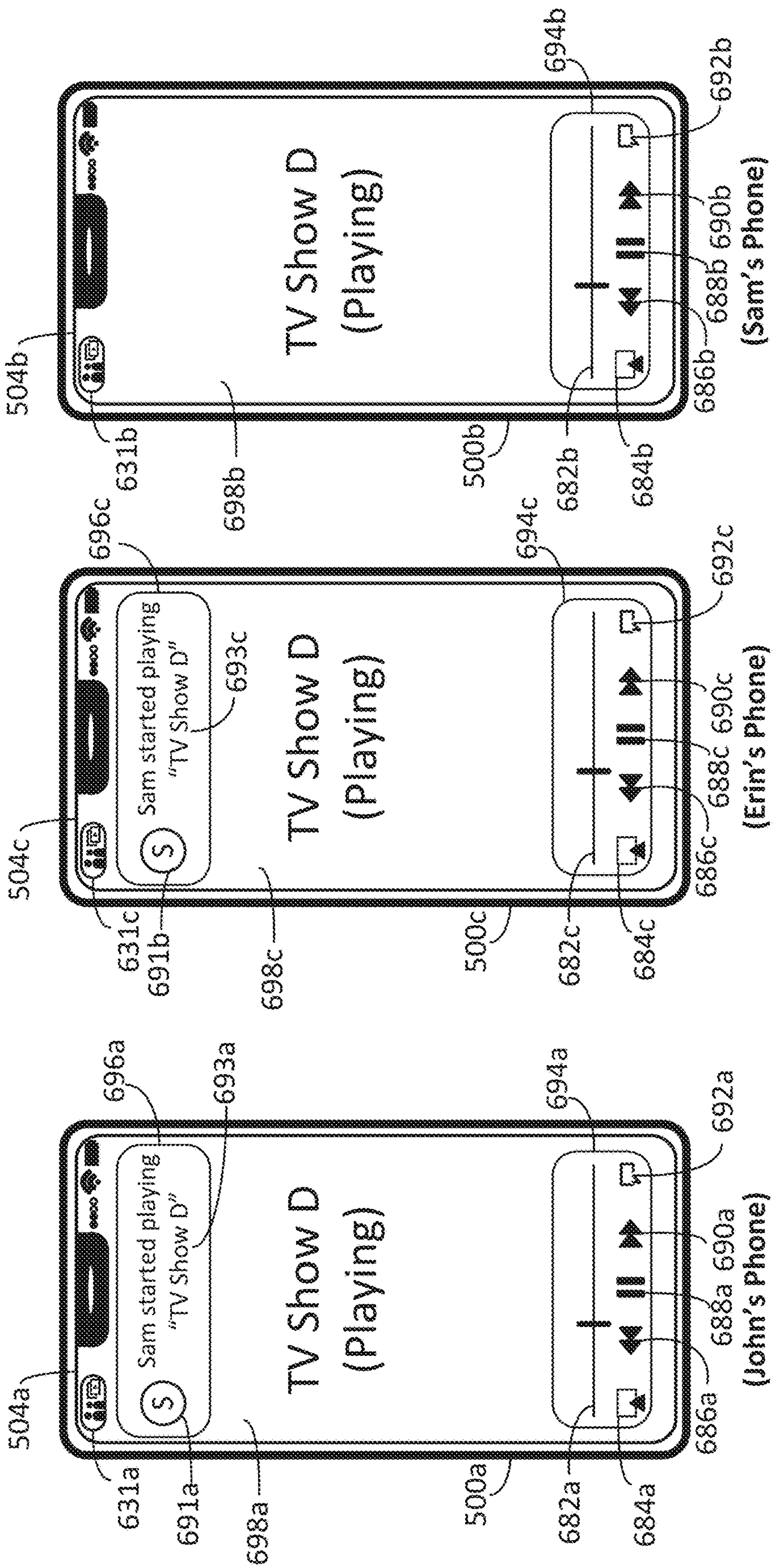
Figure 6L:
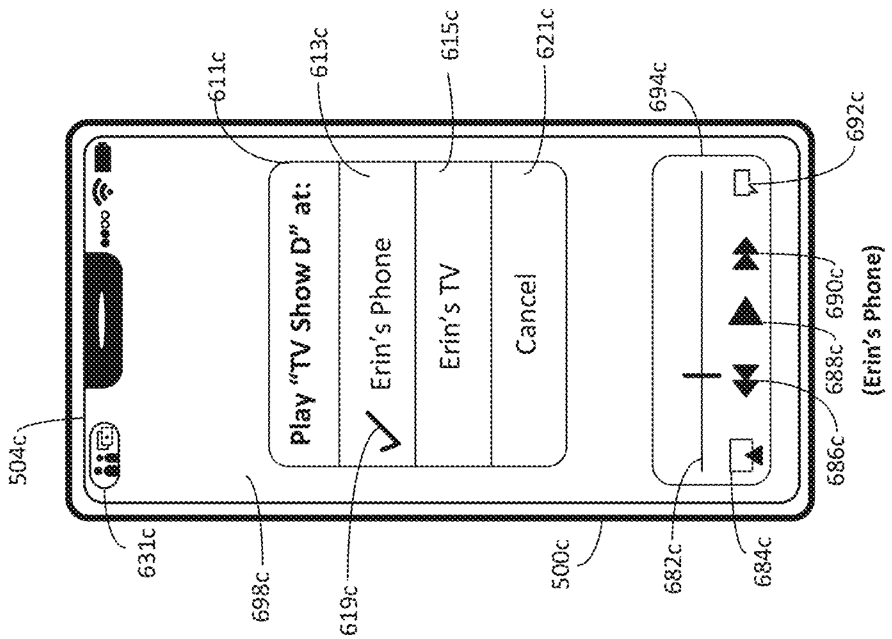
Figure 6K:
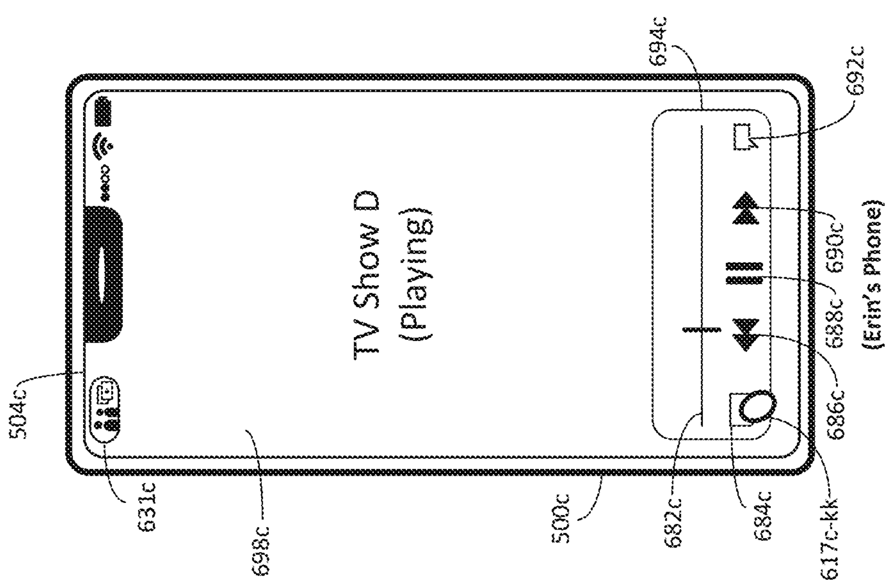
Figure 6N:
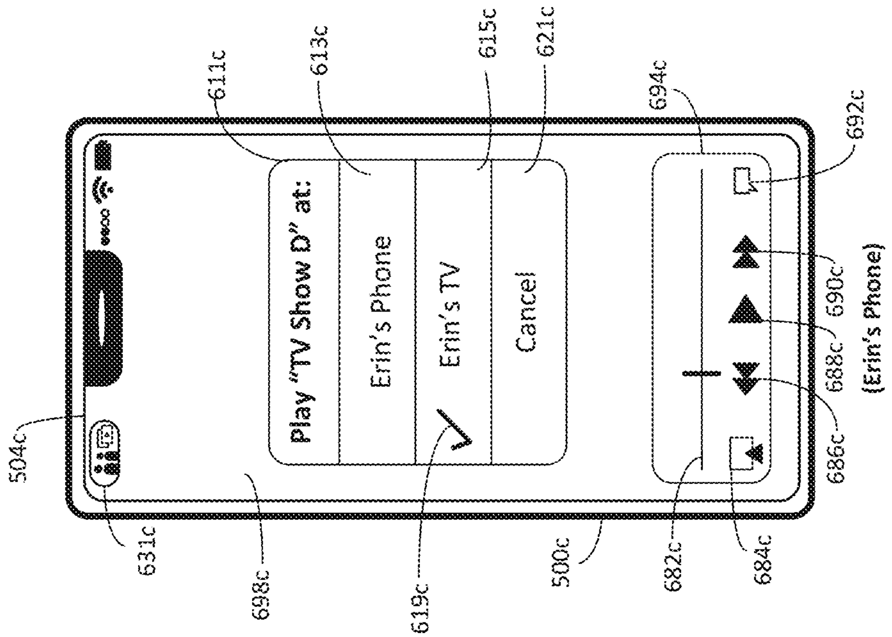
Figure 6M:
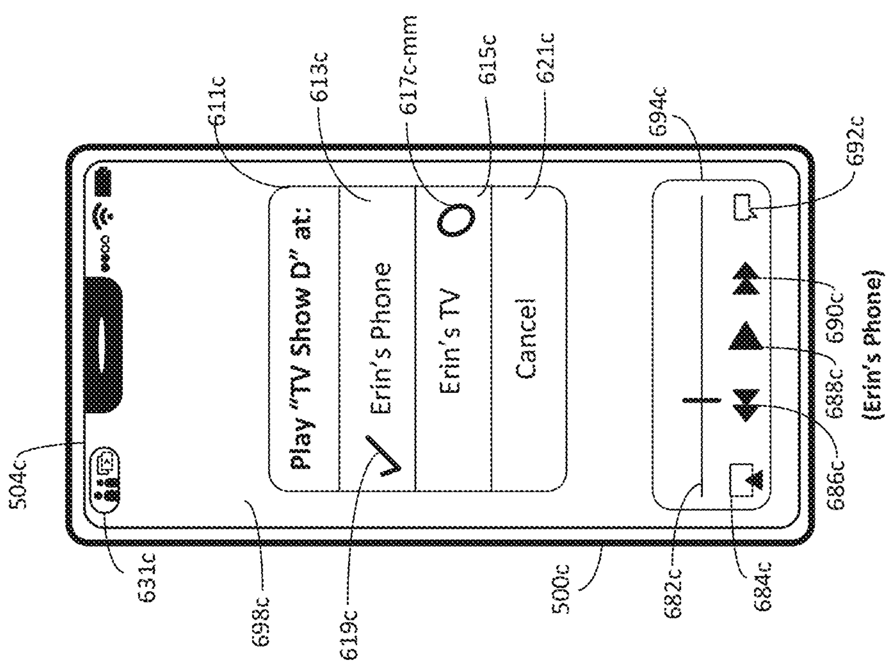
Figure 6O:
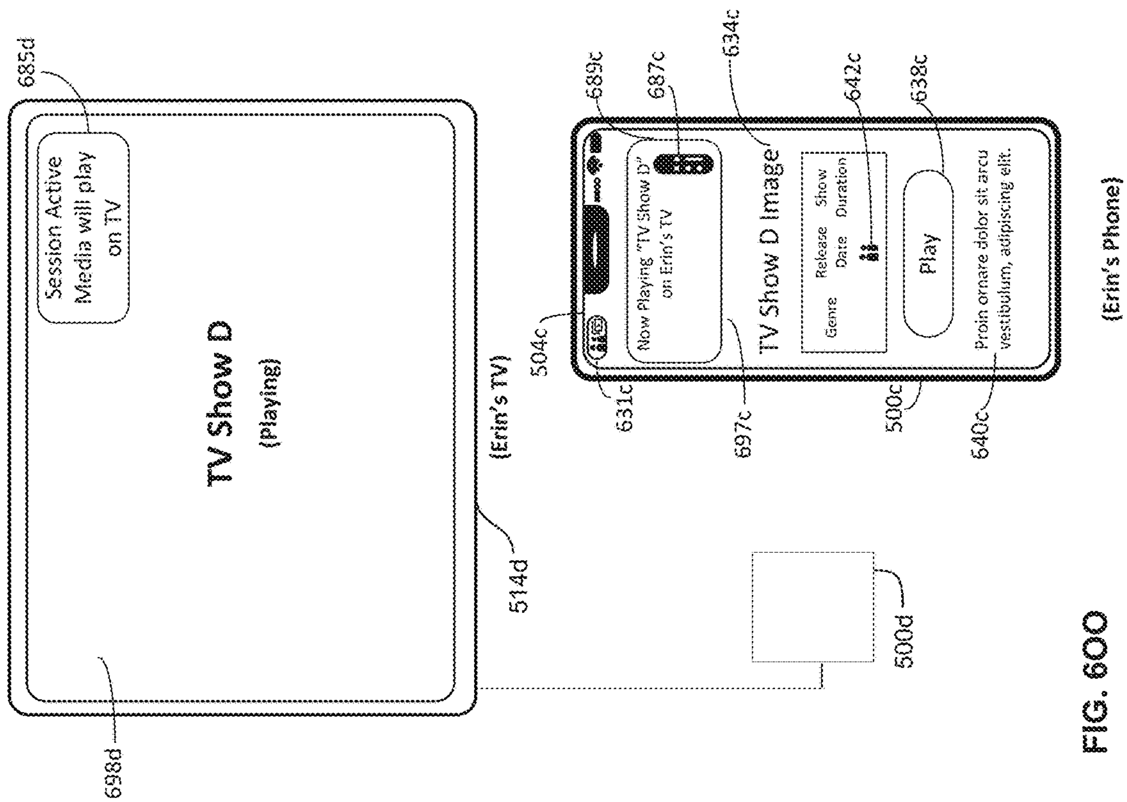
Figure 6P:
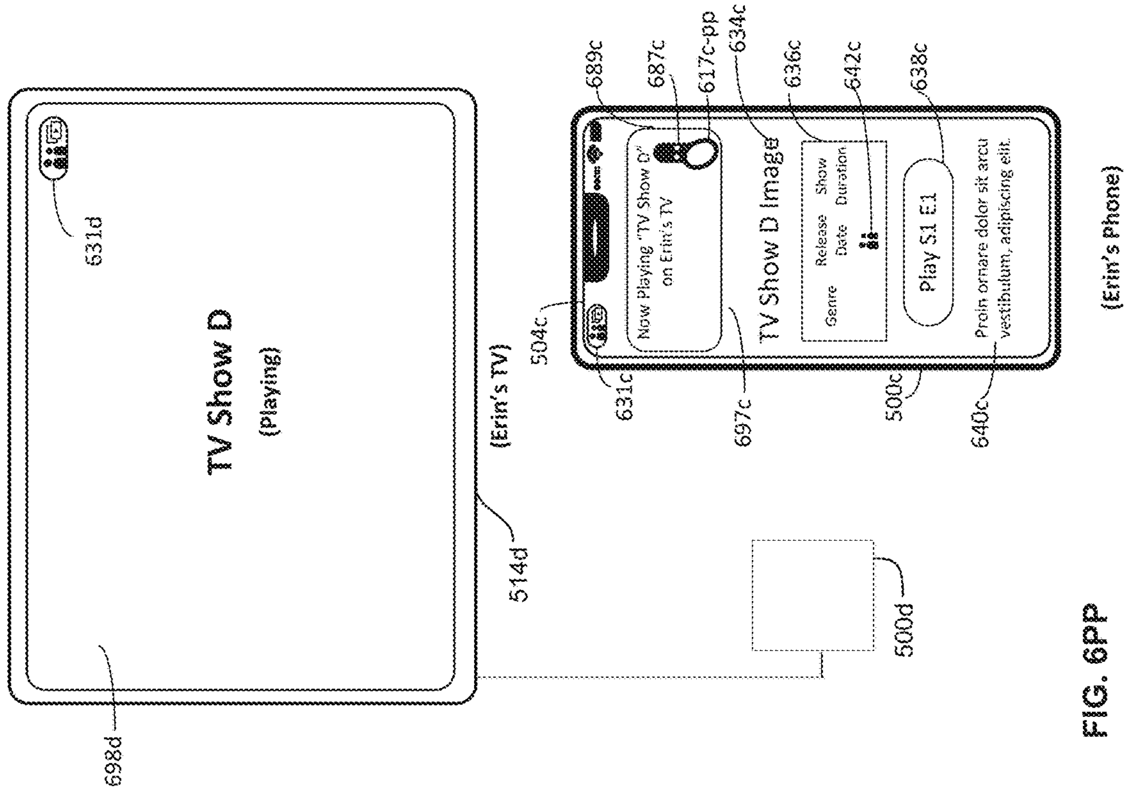
Figure 6R:
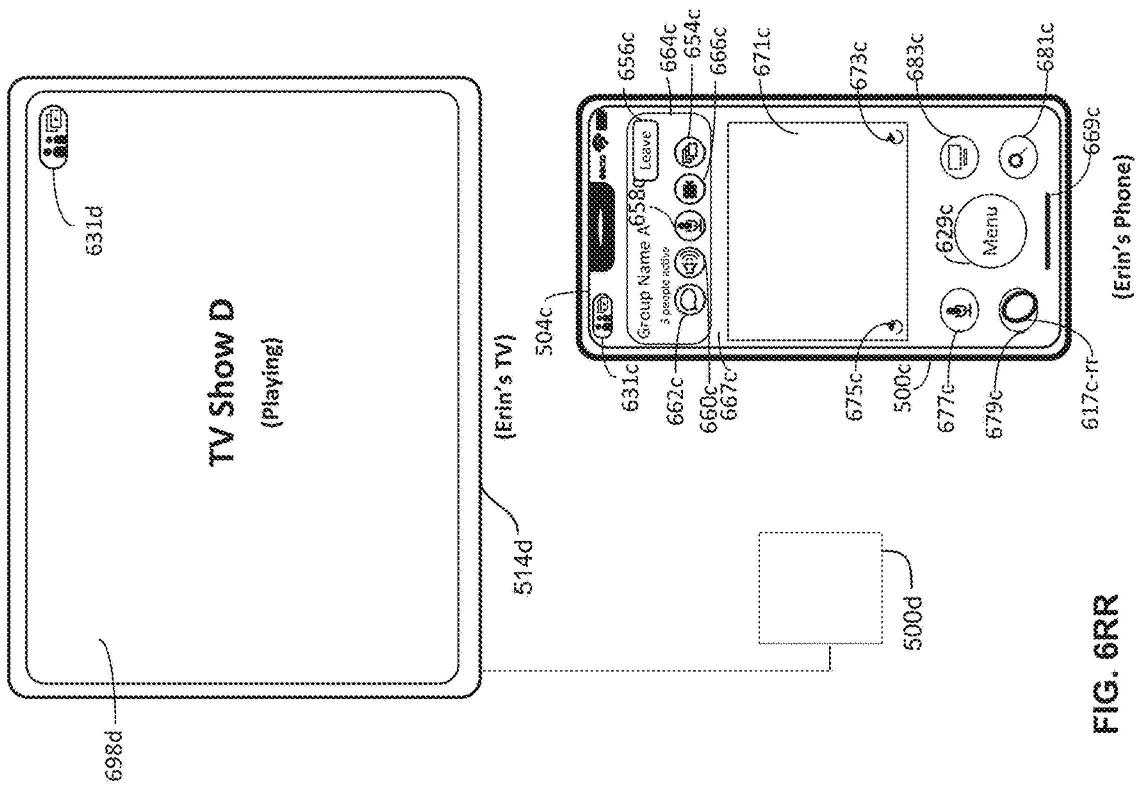
Figure 6Q:
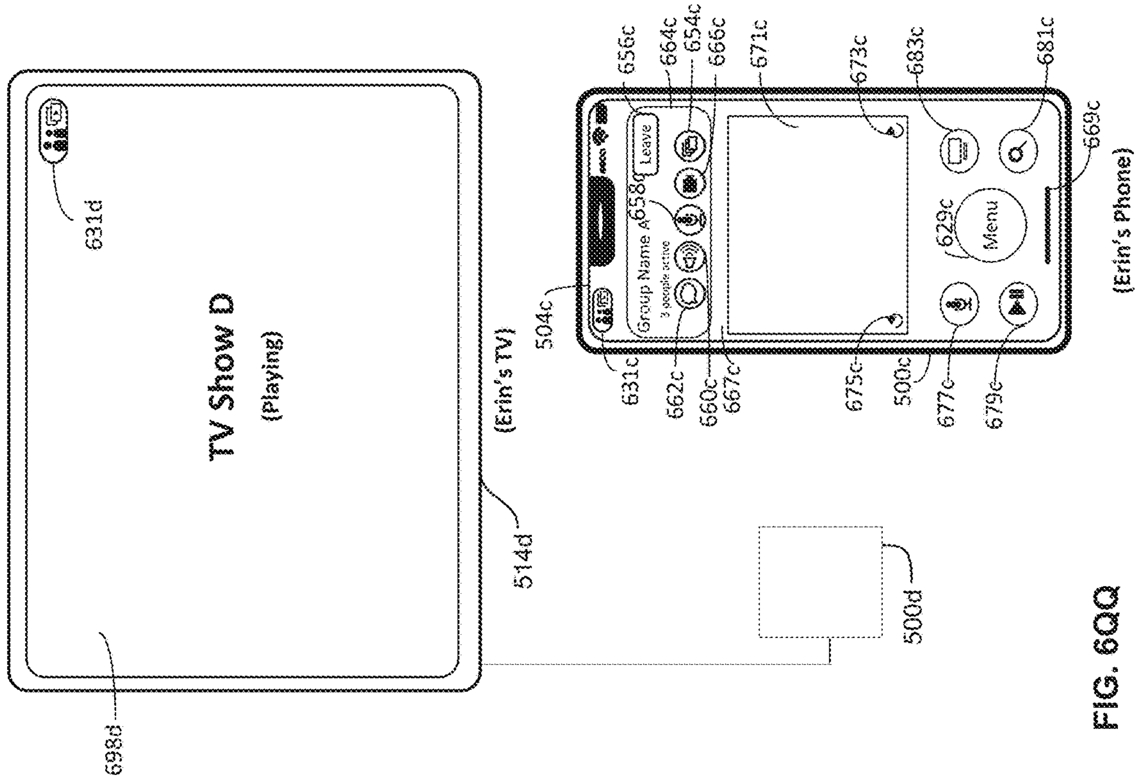
Figure 6S:
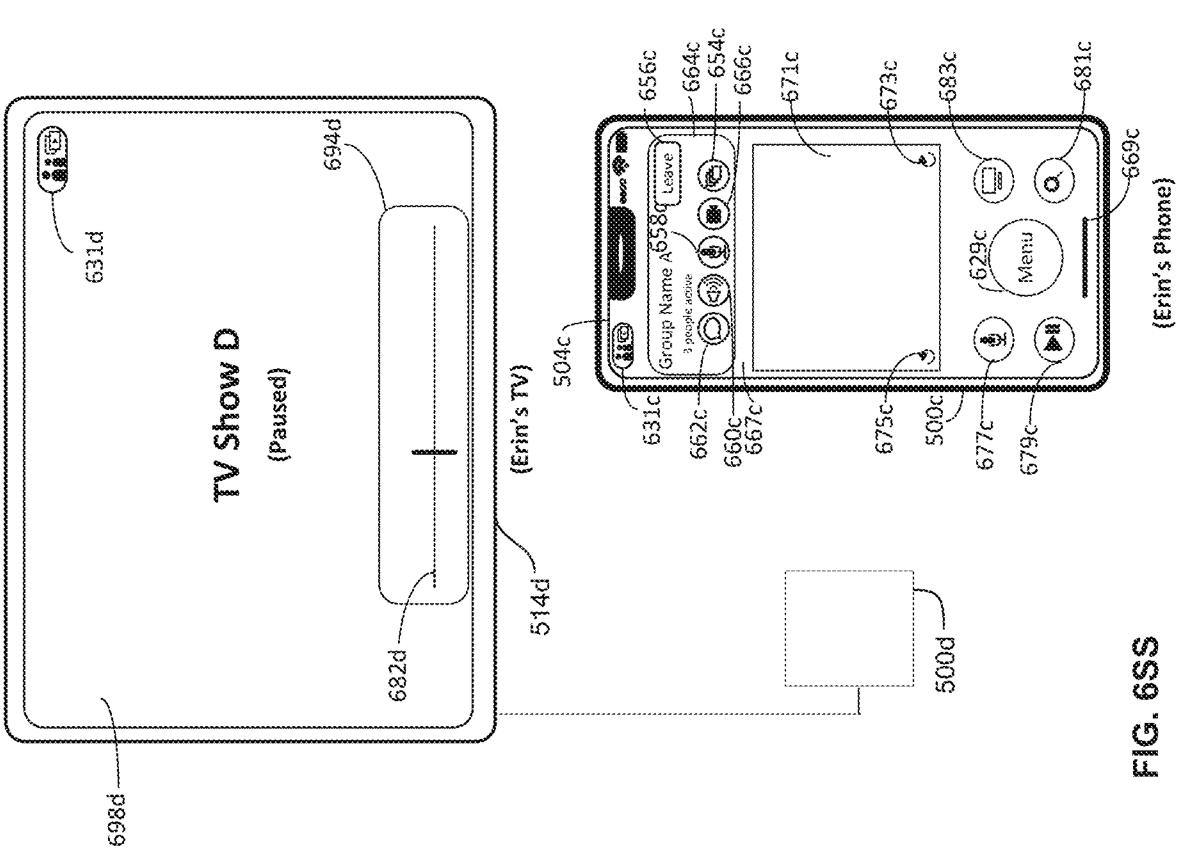
Figure 6T:
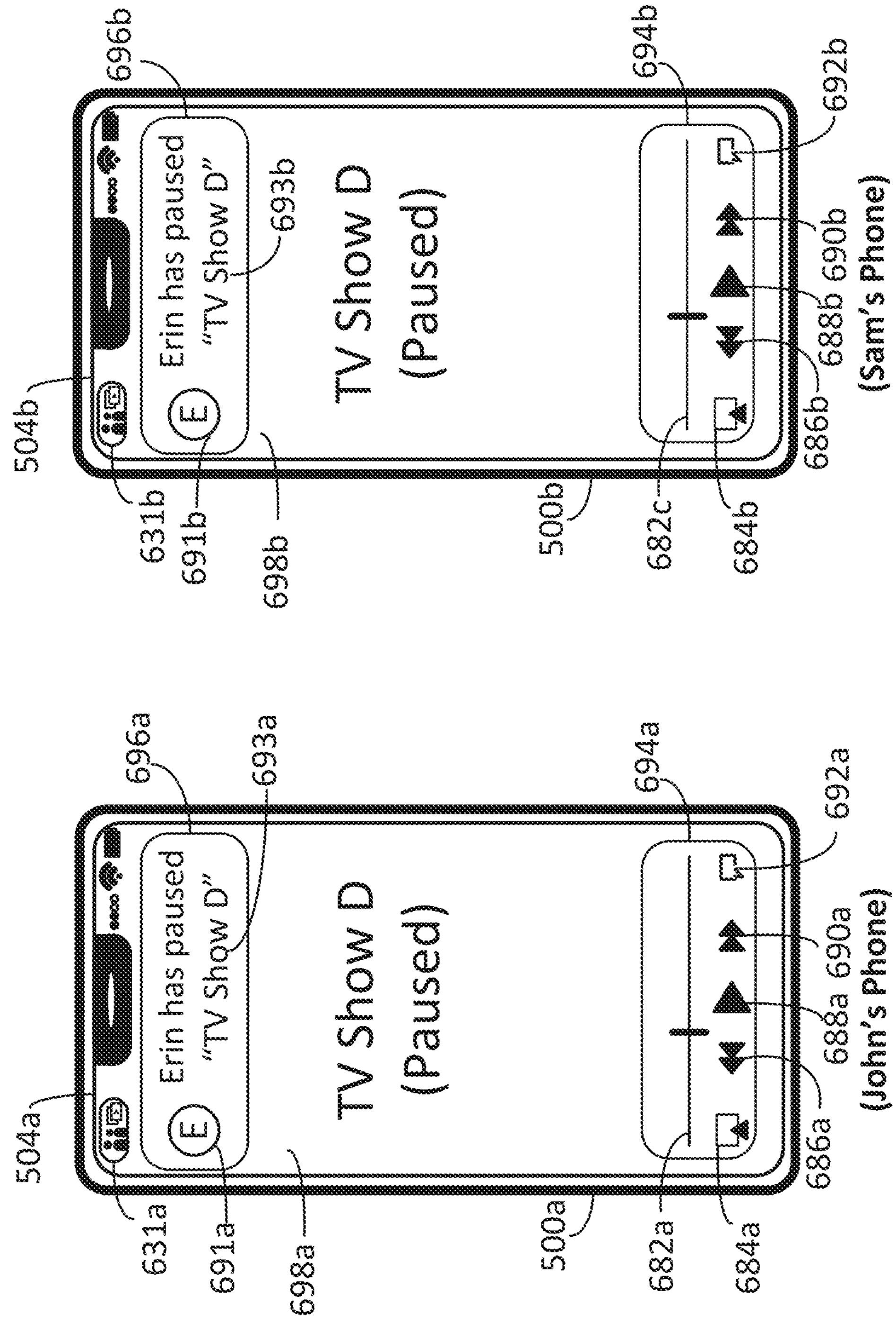
Figure 6U:
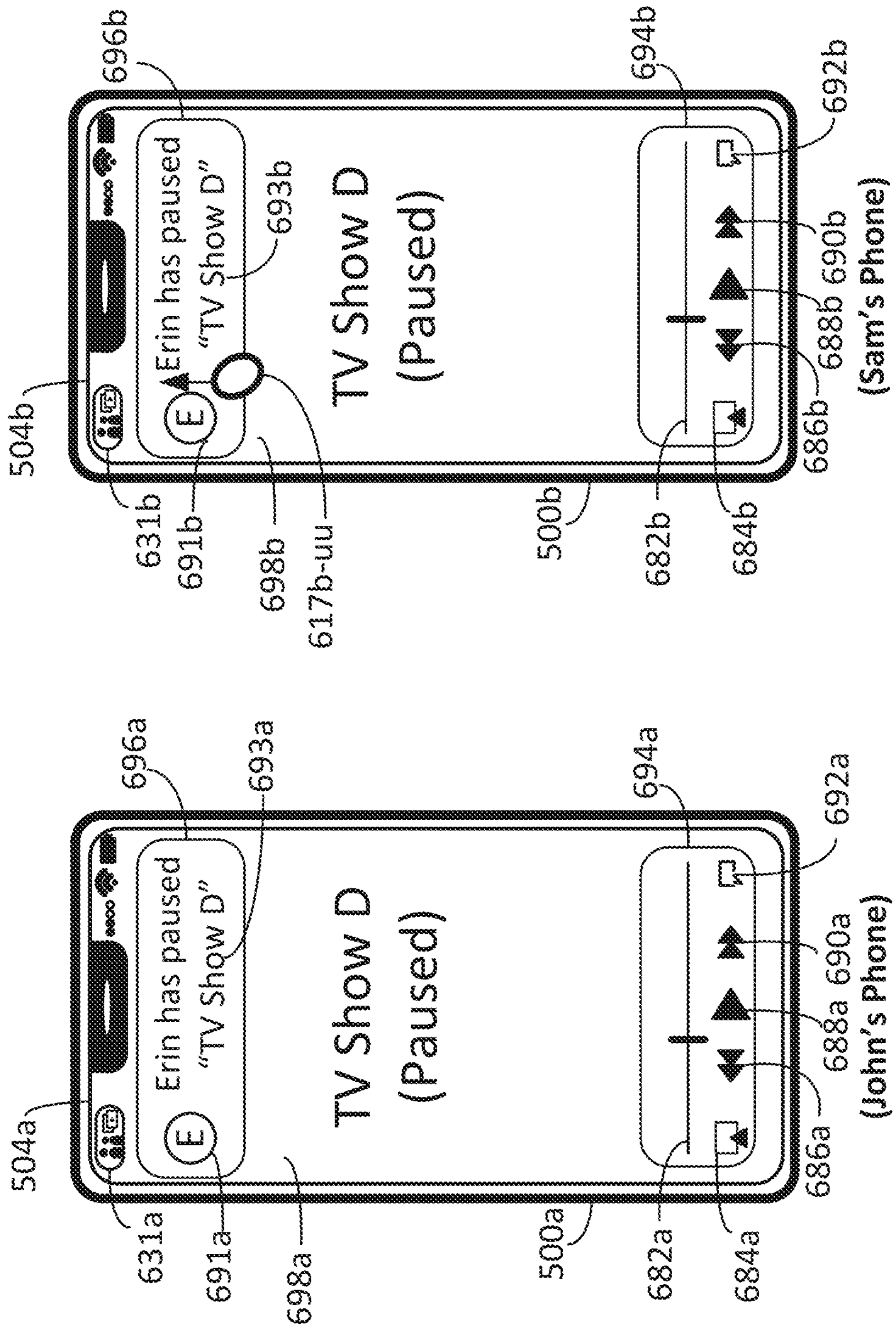
Figure 6V:
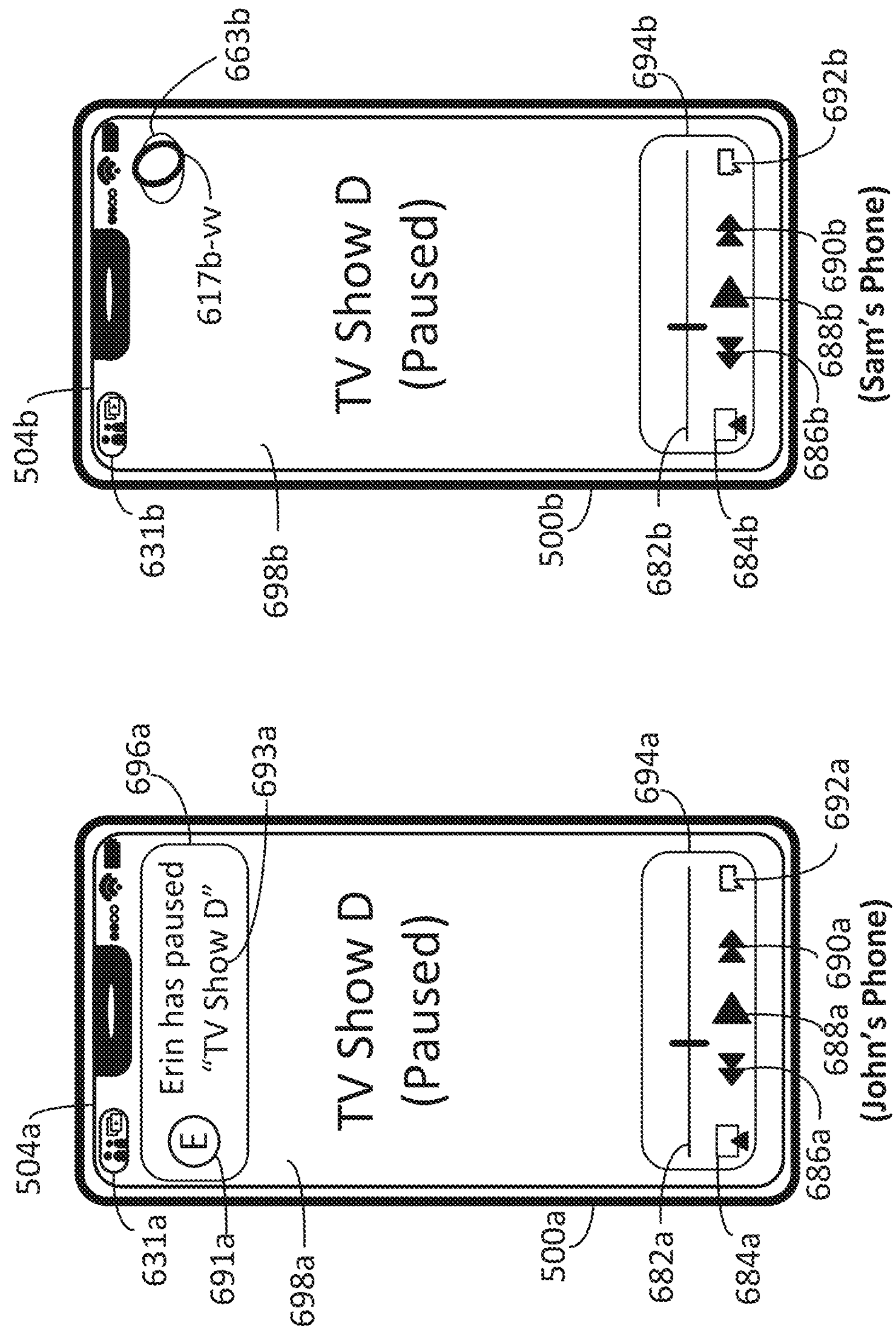
Figure 6W:
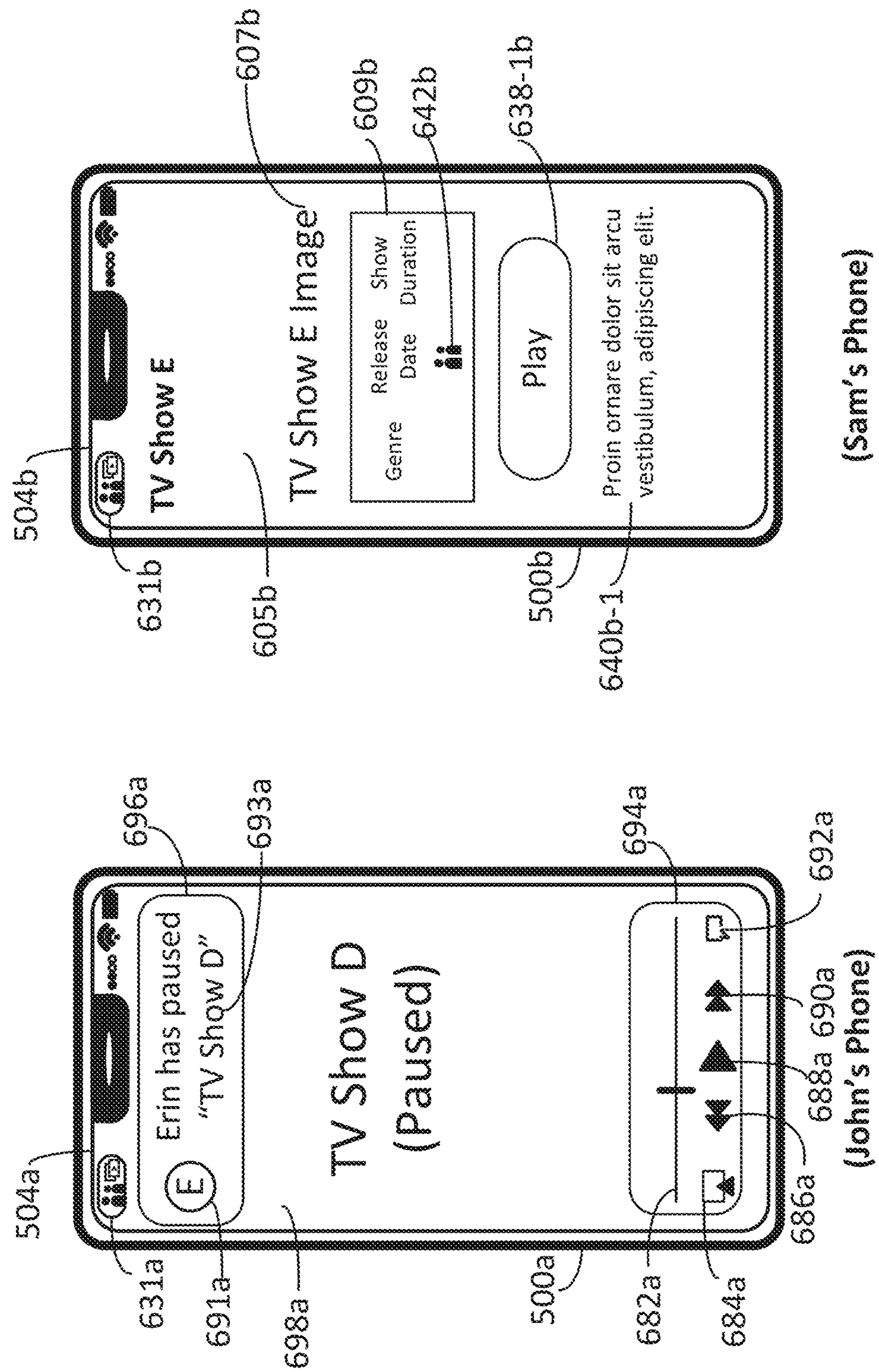
Figure 6W:
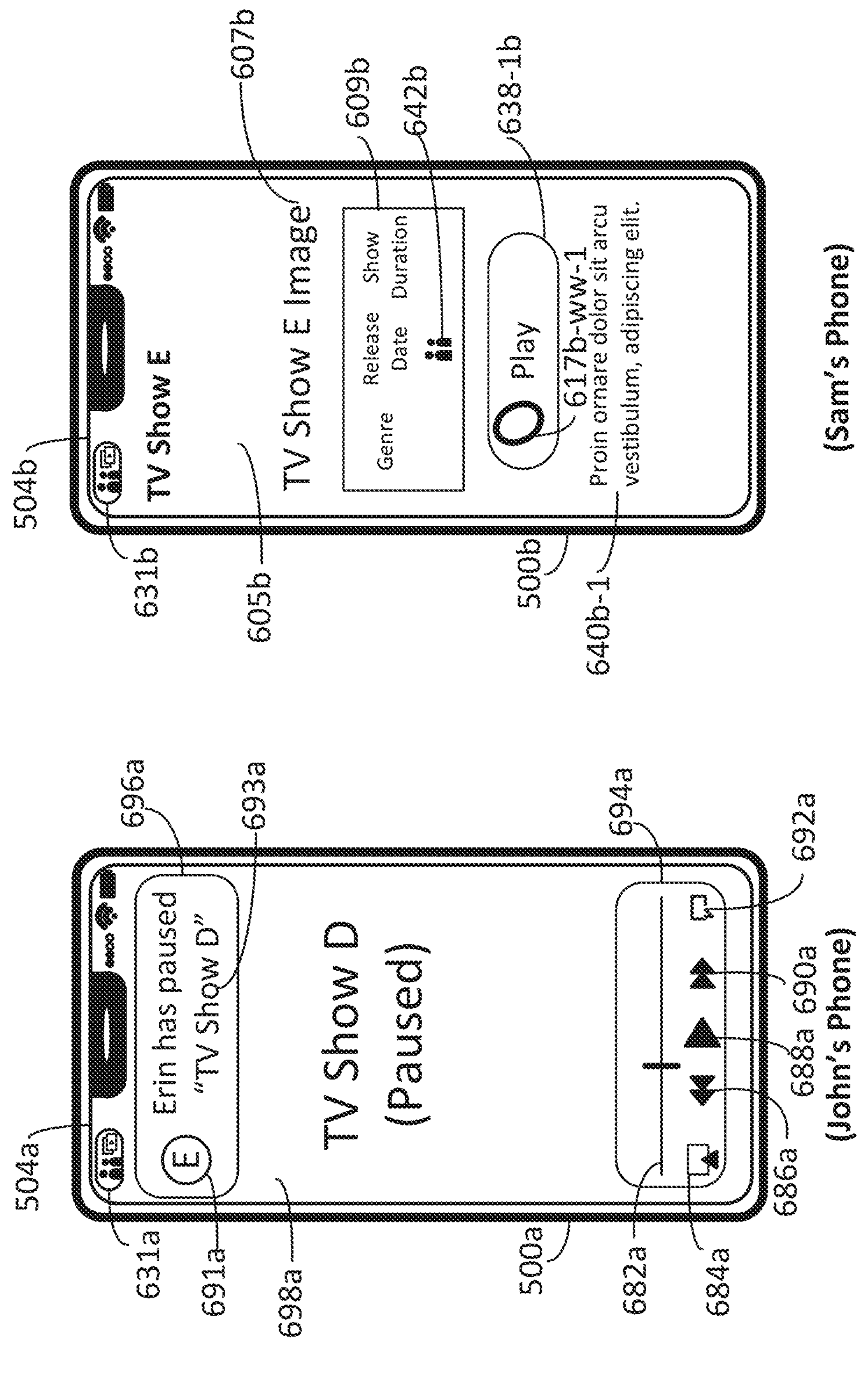
Figure 6X:
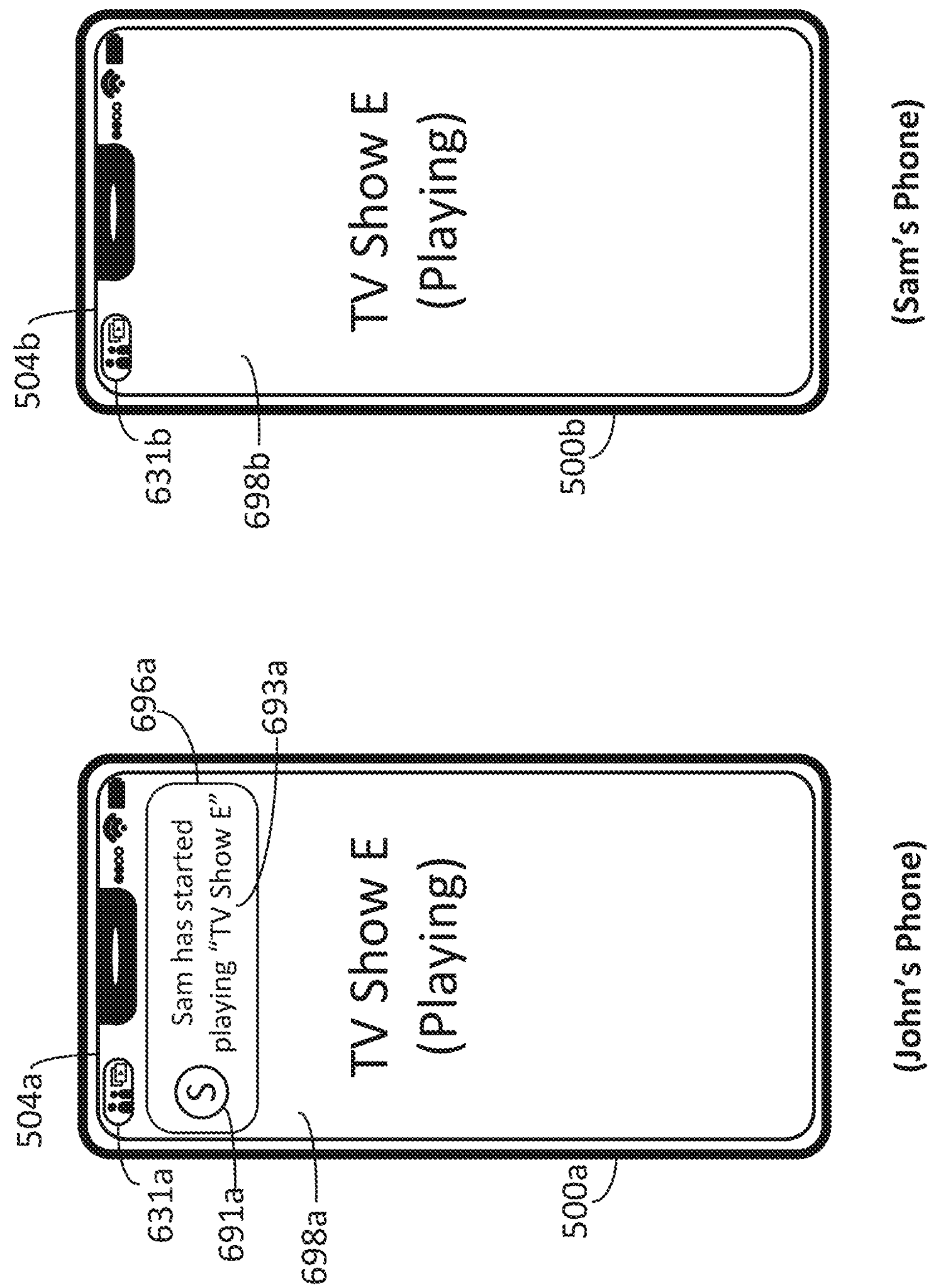
Figure 6Z:
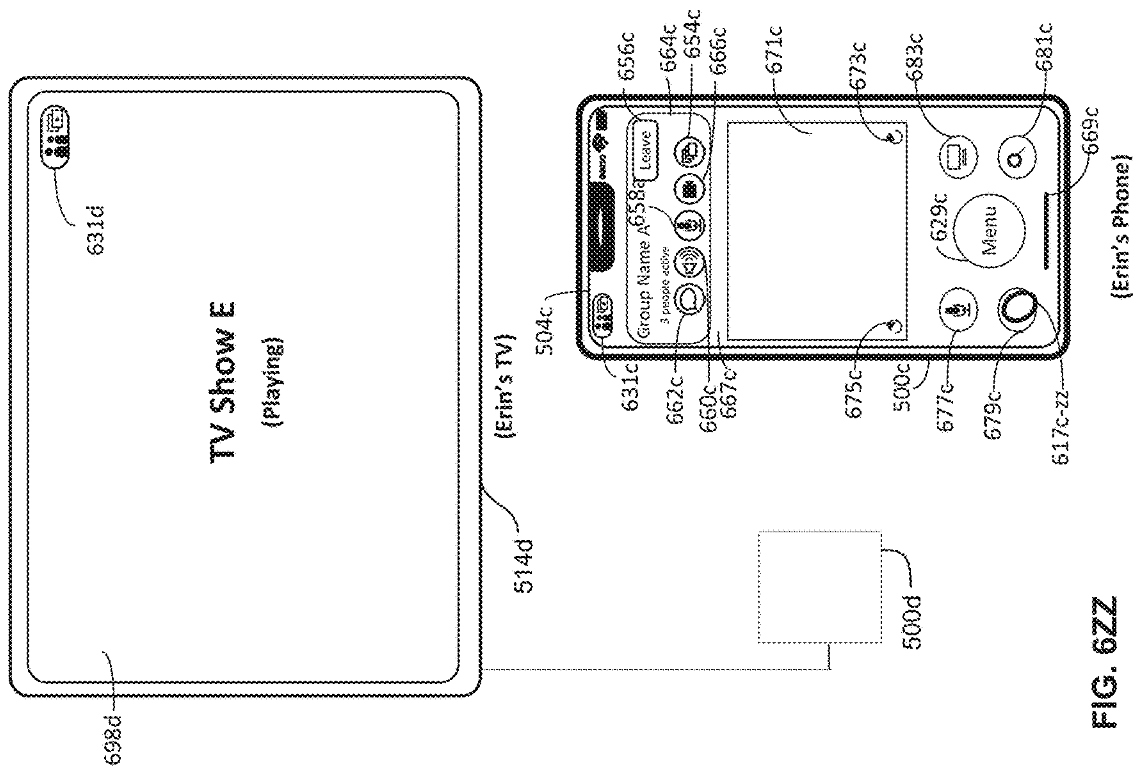
Figure 6Y:
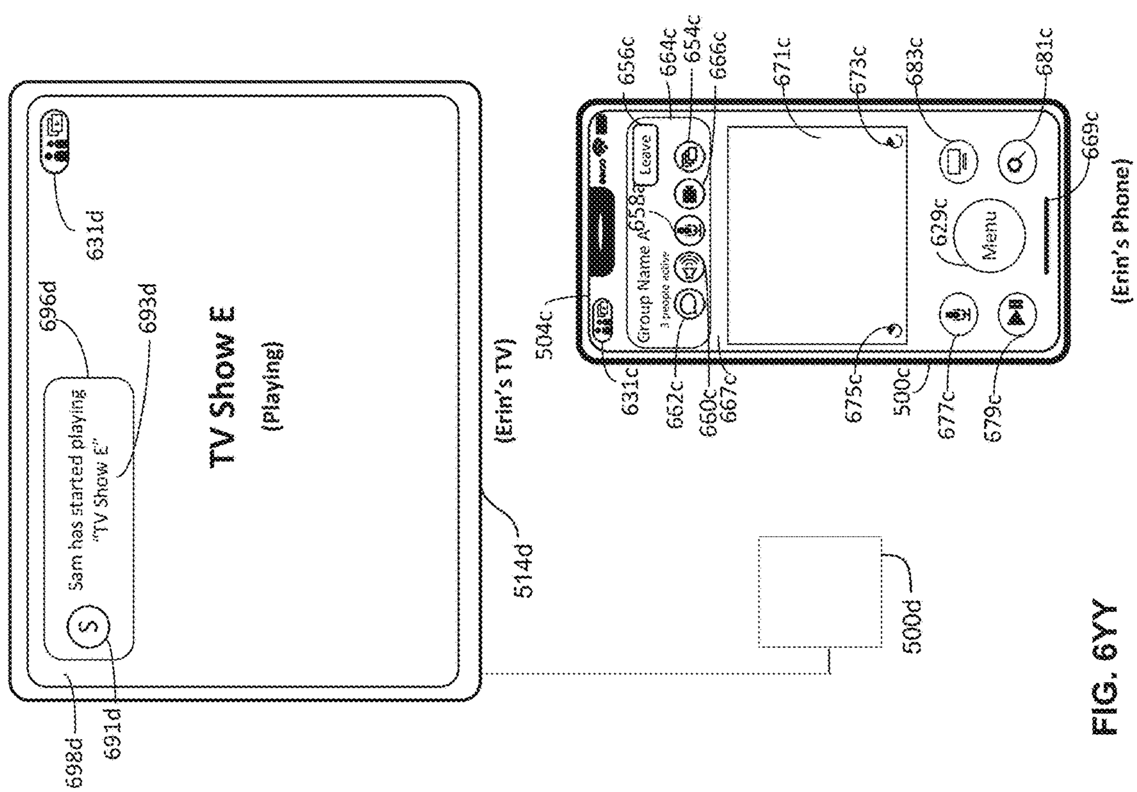
Figure 6Z:
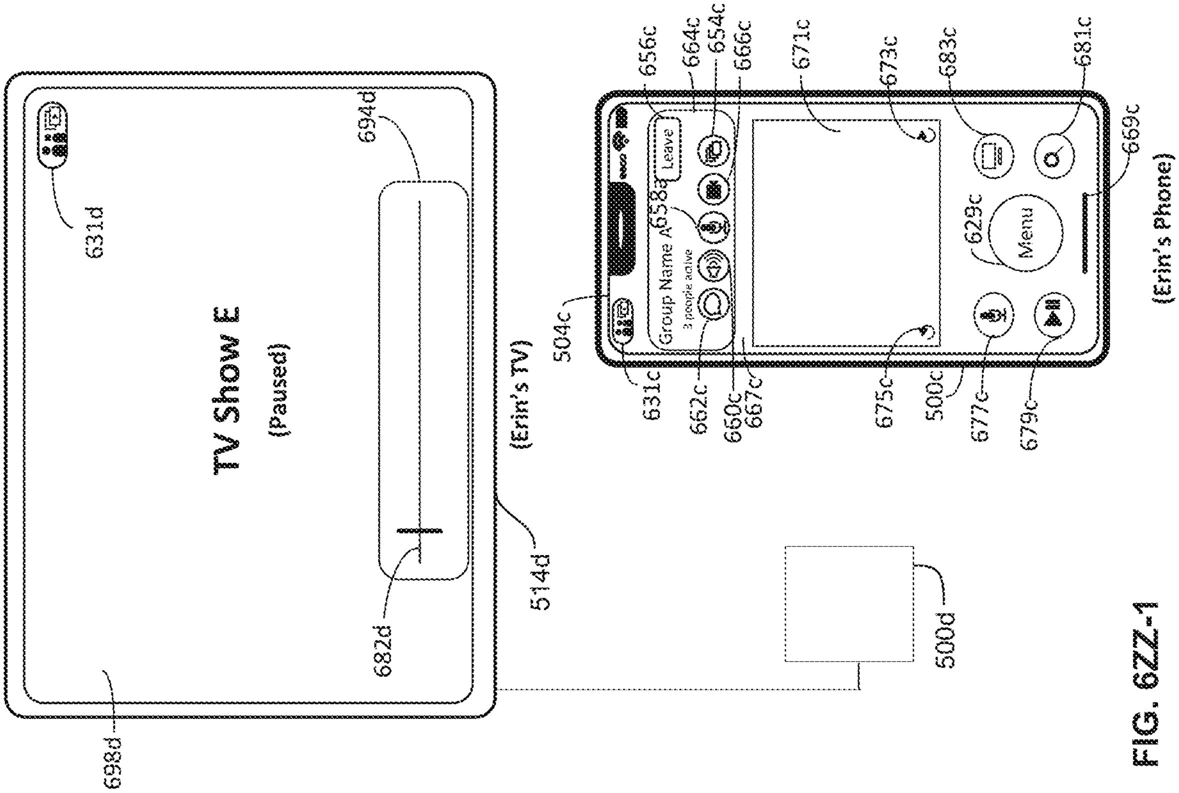
Figure 60O:
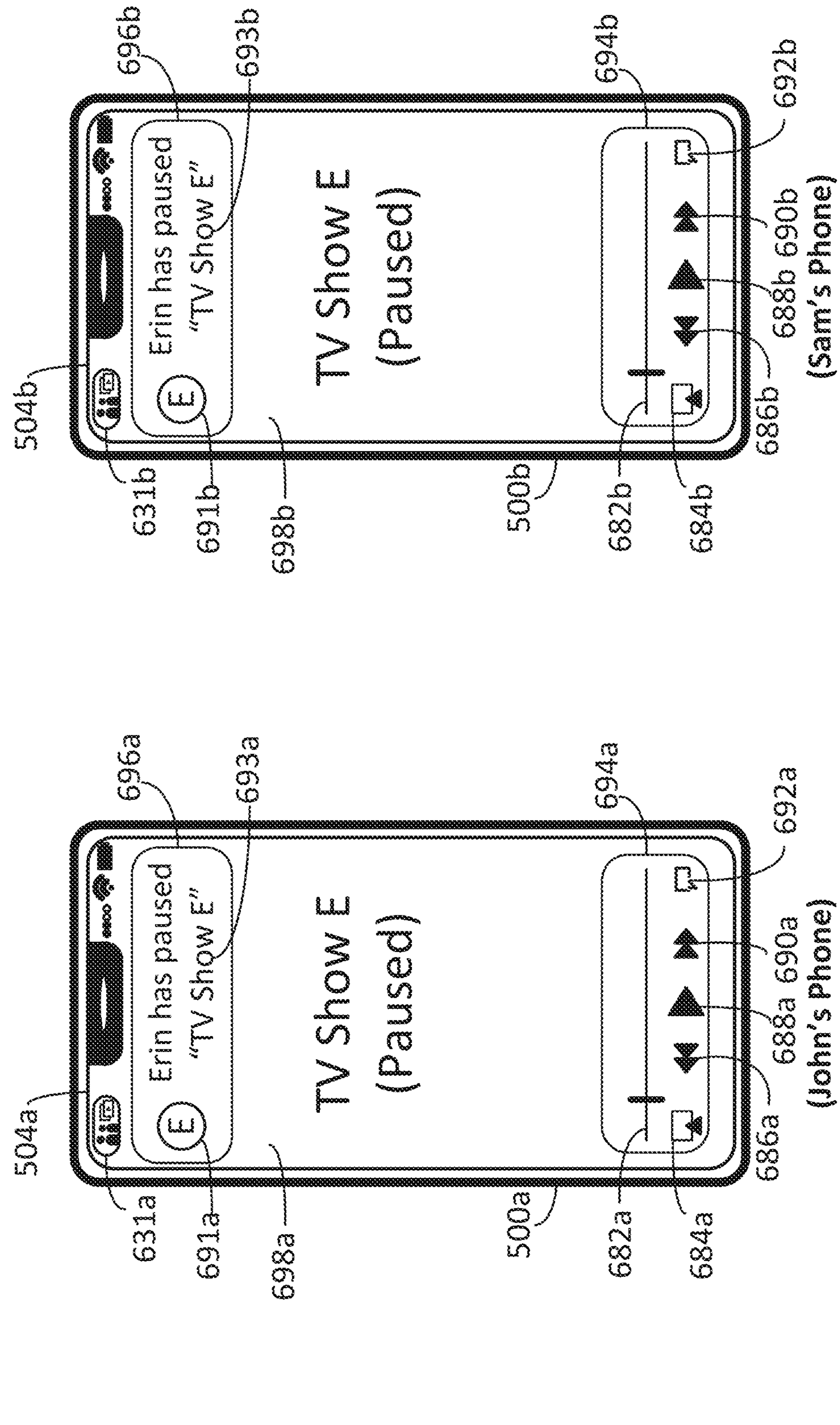

In some embodiments, if the playback of a media content playing in the synchronized media and communication session is modified, the playback of that media content is modified at all the electronic devices synchronously playing the media item. For example, in FIG. 6ZZ, while electronic device 500*d* is synchronously playing TV Show E with the other electronic devices in the synchronized media and communication session, the third electronic device 500*c* receives a request to pause TV Show E (indicated by indicated by touch contact 617*c-zz* selecting selectable option 679*c*). In response, electronic device 500*c* transmits a command to device 500*d* for pausing the playback of TV Show E. In FIG. 6ZZ-1, the electronic device 500*d* receives the command, and subsequently, pauses TV Show E (represented by TV Show E (Paused)). The remaining figures will describe a scenario in which TV Show E is paused, but it is understood that the features described below would apply analogously to a scenario in which TV Show E is playing. Additionally, in response to receiving the command to pause the playback of TV Show E, the electronic device 500*d* displays overlay 694*d* that includes a scrubber bar 692*d*, which indicates a currently playback position of TV Show E (indicated by the solid vertical line).

In FIG. 6AAA, in response to the electronic device 500*d* pausing TV Show E in the synchronized media and communication session, the electronic devices 500*a* and 500*b* receive an indication that TV Show E has been paused at the electronic device 500*d* (e.g., via a server in communication the devices 500*a*, 500*b*, 500*c*, and/or 500*d*). In response to devices 500*a* and 500*b* receiving the indication that TV Show E has been paused, electronic devices 500*a* and 500*b* display indications 696*a* and 696*b* (e.g., overlaid on user interface 698*a* and 698*b*) indicating that a user of device 500*d* (indicated by representation 691*a* of Erin) has paused the content (TV Show E) currently playing in the synchronized media and communication session (represented by the indication message 693*a* and 693*b* including the message: "Erin has paused TV Show E"). Additionally, in response to receiving the indication that TV Show E has been paused at device 500*c*, the first and second electronic devices 500*a* and 500*b* pause the playback of TV Show E. It is understood that because the playback of TV Show E is synchronized across the electronic devices part of the synchronized media and communication session, the current playback position of TV Show E, when paused, is the same across all the electronic devices in the synchronized media and communication session.

In some embodiments, when the synchronized media and communication session includes at least two electronic devices that are associated with the same user, the media and communication portions of the synchronized media and communication session are optionally displayed at different electronic devices associated with the user (e.g., in contrast to displaying both the media portion and communication portion of the synchronized media and communication session when the synchronized media and communication session only includes one electronic device associated with a user, as described and illustrated with reference to FIGS. 6R-6AA).

For example, in FIG. 6BBB, device 500*d* (Erin's TV) and 500*c* (Erin's Phone) are both part of the synchronized media and communication session—indicated by indications 631*d* and 631*c*—and are both associated with Erin. In some embodiments, devices 500*d* and 500*c* are associated with Erin because devices 500*d* and 500*c* are configured with a same user account: Erin's user account. As shown in FIG. 6BBB, device 500*d* is currently playing TV Show E in media user interface 698*d* while device 500*c* is currently displaying remote control user interface 667*c*. While electronic device 500*c* is displaying remote-control user interface 667*c*, the electronic device 500*c* receives a request to display a messaging conversation associated with the synchronized media and communication session (indicated by touch contact 617*c-bbb* selecting selectable option 662*c*). In response, in FIG. 6CCC, the electronic device 500*c* displays messaging user interface 699*c*, which includes a messaging conversation with the users in the synchronized media and communication session, as described previously, while device 500*d* continues displaying TV Show E (e.g., the media content currently playing in the synchronized media and communication session).

In some embodiments, TV Show E (e.g., the media content currently playing in the synchronized media and communication session) continues playing while device 500*c* is facilitating a video/voice call with other users in the synchronized media and communication session. For example, in FIG. 6DDD, device 500*c* receives a request to start and/or join an audio call with the other users in the synchronized media and communication session (indicated by touch contact 617*c-ddd* selecting selectable option 666*c*). In response, in FIG. 6EEE, the electronic device 500*c* displays a video call user interface 623*c* while device 500*d* continues to display TV Show E in media user interface 698*d*. Video chat user interface 623*c* includes video streams of the users in the synchronized media and communication session, including a video stream 668*c* of Sam, a video stream 670*c* of John, and a video stream 680*c* of the user of device 500*c* (Erin).

In some embodiments, the electronic device 500*c* can leave (e.g., stop being part of) the video call/chat between the users in the synchronized media and communication session while remaining in the synchronized media and communication session. For example, in FIG. 6FFF, the electronic device 500*c* receives a request to exit the voice call/chat (indicated by touch contact 617*c-fff* selecting selectable option 676*c*). In response, in FIG. 6GGG, device 500*c* exits/leaves the video call while still remaining part of the synchronized media and communication session—indicated by indication 631*c*.

In some embodiments, an electronic device that is currently part of a synchronized media and communication session can initiate a process to leave the synchronized media and communication session. For example, in FIG. 6GGG, the electronic device 500*d* is playing, in media user interface 898*d*, TV Show E while electronic device 500*d* receives an input to display a control center user interface (indicated by touch contact 617*c-ggg* holding down selectable option 683*c*). In response, the electronic device 500*d* displays, in FIG. 6HHH, the control center user interface 645*d*. Control center user interface 645*d* includes a representation 659*d* of Erin's user account, a representation 657*d* of Alice's user account, and a representation 655*d* of Bob's user account. The representations 655*d*-659*d* of respective user accounts are displayed in the control center user interface 645*d* because user accounts for Erin, Alice, and Bob are configured on the electronic device. The control center user interface 645*d* also includes a selectable option 653*d* that, when selected, causes the electronic device 500*d* to enter a sleep state (e.g., the electronic device 500*d* remains powered on, but the display 514*d* associated with device 500*d* is off; or the electronic device 500*d* and display 514*d* are powered off). Additionally, because electronic device 500*d* is part of a synchronized media and communication session, the control center user interface 645*d* includes information about the synchronized media and communication session that is associated with device 500*d* (e.g., as described with reference to method 900). In some embodiments, if the electronic device 500*d* was not associated with a synchronized media and communication session and/or if device 500*c* was not part of a synchronized media and communication session, the control center user interface 645*d* would not include information about a synchronized media and communication session.

Specifically, the control center user interface 645*d* includes indication 651*d* indicating that the electronic device 500*d* is part of a synchronized media and communication session that is currently playing TV Show E, and that TV Show E is actively playing (Playing TV Show E). The control center user interface 645*d* also includes indication 647*d* indicating that device 500*c* (e.g., a device associated with device 500*d*) is also part of the same synchronized media and communication session. The control center user interface 645*d* also includes indication 649*d* indicating that device 500*d* is currently in a content sharing mode (e.g., a mode which allows the electronic device 500*d* to add media content to the synchronized media and communication session, which will be described in more detail later).

In FIG. 6III, the electronic device 500*d* detects a selection of indication 647*d* (indicated by touch contact 617*c-iii* tapping trackpad 666*c* while indication 647*d* has focus). In response, in FIG. 6M, the electronic device 500*d* displays a user interface 643*d* for confirming that electronic device 500*d* should leave the synchronized media and communication session. User interface 643*d*-1 includes a selectable option 639*d* that, when selected, causes electronic device 500*d* to leave the synchronized media and communication session (or initiate a process to leave the synchronized media and communication session). User interface 643*d* also includes a selectable option 637*d*, which when selected, causes the electronic device to forgo leaving the synchronized media and communication session.

In FIG. 6KKK, the electronic device 500*d* receives an input to cause electronic device 500*d* to leave the synchronized media and communication session (indicated by touch contact 617*c-kkk* tapping trackpad 671*c* while selectable option 639*d* has focus). In FIG. 6LLL, in response, electronic device 500*d* leaves the synchronized media and communication session, and device 500*c* starts synchronously playing TV Show E (e.g., continues playback of TV Show E) in the picture-in-picture user interface 650*c* with other electronic devices in the synchronized media and communication session.

In some embodiments, after an electronic device leaves a synchronized media and communication, media played by that electronic device does not modify/change the playback of media playing in the synchronized media and communication session. For example, in FIG. 6LLL, after device 500*d* left the synchronized media and communication session, the device 500*d* received a sequence of one or more inputs for navigating to the (e.g., dedicated) user interface 602*d*-5 for TV Show A. The user interface 602*d*-5 for TV Show A optionally has similar characteristics that were described and illustrated with respect to the user interface 697*a* for TV Show D. Specifically, indication 642*d*, in user interface 602*d*-5, is indicating that TV Show A is able to be added to a synchronized media and communication session. In some embodiments, user interface 602*d*-5 includes indication 642*d* if device 500*d* is currently participating in a synchronized media and communication session, and does not include indication 642*d* if device 500*d* is not currently participating in a synchronized media and communication session.

In FIG. 6MMM, device 500*d* receives a request to play TV Show A (indicated by touch contact 617*c-mmm* tapping track pad 671*c* while play affordance 602*d*-2 has focus). In response, in FIG. 6NNN device 500*d* starts playing TV Show A in media user interface 698*d* while device 500*c* is still displaying/playing TV Show E (e.g., the media item currently playing in the synchronized media and communication session) in the picture-in-picture user interface 650*c*. Similarly, in FIG. 6OOO, devices 500*a* and 500*b* continue displaying TV Show E (e.g., the media item currently playing in the synchronized media and communication session) because device 500*d* was not part of a synchronized media and communication session when device 500*d* received the request to play TV Show A. While FIG. 6000 illustrates that indications are still being displayed by devices 500*a* and 500*b*, it is understood that, in some embodiments, devices 500*a* and 500*b* stop displaying indications 696*a* and 696*b* after a respective amount of time has passed (e.g., 10, 20, 40, 80, 160 seconds).

In some embodiments, an electronic device that is currently part of a synchronized media and communication session leaves a synchronized media and communication when that electronic enters a low power (or off) mode. For example, in FIG. 6PPP, device 500*d* detects a request for the device 500*d* to enter a low power mode (indicated by touch contact 617*c-ppp* tapping trackpad 671*c* while selectable option 653 has focus). In response to device 500*d* entering the low power mode, in FIG. 6QQQ, electronic device 500*d* leaves the synchronized media and communication session, and device 500*c* starts synchronously playing TV Show E (e.g., continues playback of TV Show E) in the picture-in-picture user interface 650*c* with other electronic devices in the synchronized media and communication session.

In some embodiments, when one of the devices that is associated with a particular user leaves the synchronized media and communication session, all of the devices in the synchronized media and communication that are associated with that user also leave the synchronized media and communication session. For example, in FIG. 6RRR, while device 500*d* is playing TV Show E (e.g., the media item currently playing in the synchronized media and communication session), the device 500*c* receives a request to leave the synchronized media and communication session (indicated by touch contact 617*c-rrr* selecting selectable option 656*c*). In response, in FIG. 6SSS, device 500*c* and device 500*d* leave the synchronized media and communication session. Device 500*d* continues displaying TV Show E, but the playback of TV Show E is no longer synchronized with the playback of TV Show E in the synchronized media and communication session. Device 500*c* displays a messaging user interface 699*c* that includes a messaging conversation between the user of device 500*c* and the users that are still part of the synchronized media and communication session (e.g., the user interface displayed by device 500*c* when device 500*c* first joined the synchronized media and communication session). In some embodiments, device 500*c* can rejoin the synchronized media and communication session similarly to the manner in which device 500*c* joined the synchronized media and communication session in FIGS. 6H-6J.

Figure 7:
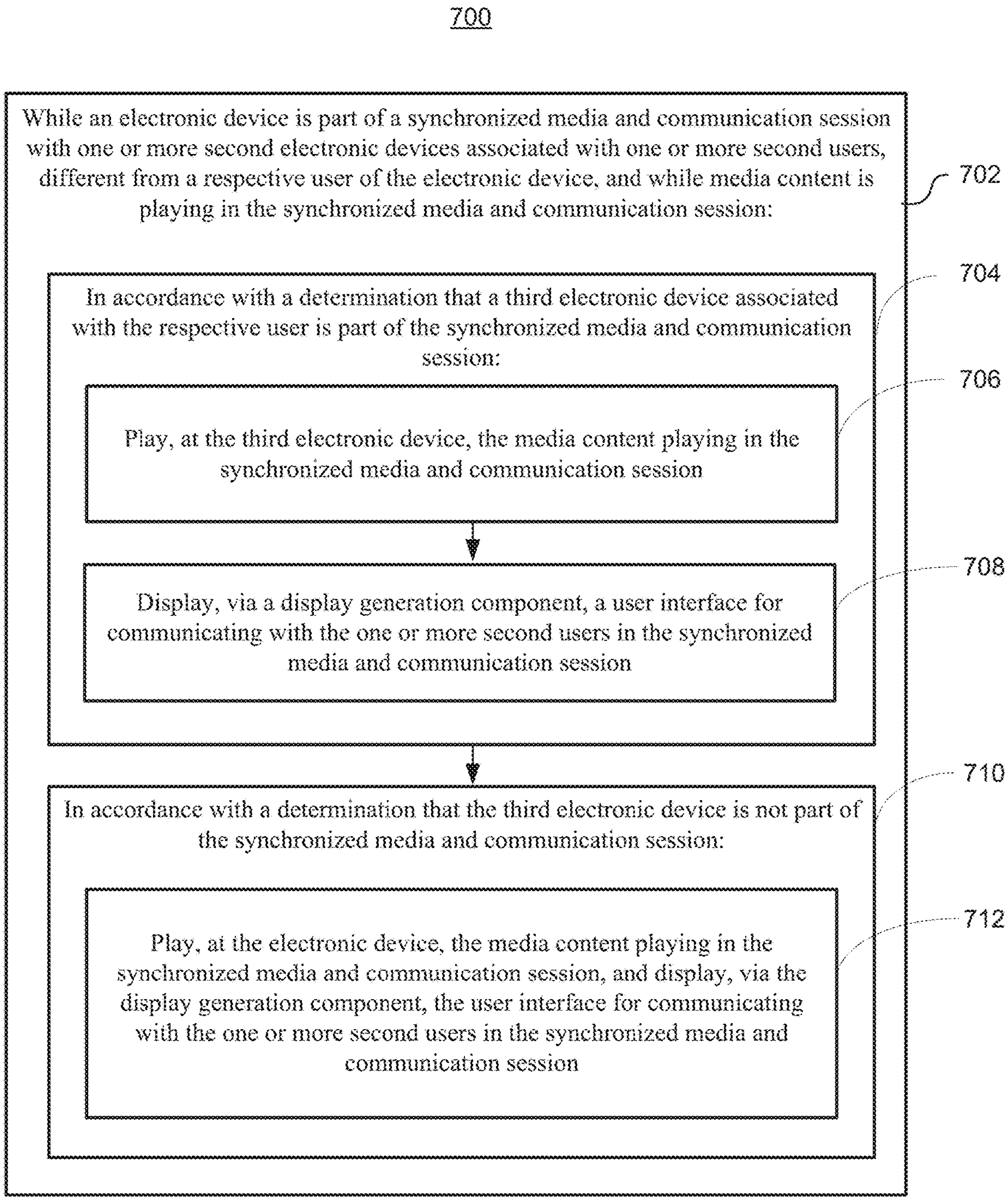
FIG. 7 is a flow diagram illustrating a method of displaying communication and/or media user interfaces associated with a synchronized media and communication session at one or more electronic devices in accordance with some embodiments of the disclosure.

FIG. 7 is a flow diagram illustrating a method of displaying communication and/or media user interfaces associated with a synchronized media and communication session at one or more electronic devices in accordance with some embodiments of the disclosure. The method 700 is optionally performed at electronic devices such as device 100, device 300, device 500, device 500*a*, device 500*b*, device 500*c* or device 500*d*, such as described above with reference to FIGS. 1A-1B, 2-3, 4A-4B and 5A-5C. Some operations in method 700 are, optionally combined and/or order of some operations is, optionally, changed.

As described below, the method 700 provides ways in which electronic devices display communication and/or media associated with a synchronized media and communication session at one or more electronic devices. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device in communication with a display generation component and one or more input devices (e.g., a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control)). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, while the electronic device is part of a synchronized media and communication session with one or more second electronic devices associated with one or more second users, different from a respective user of the electronic device (e.g., the electronic device is currently part of a session which optionally allows media content to be synchronously played (e.g., streamed) at the electronic device and the one or more second electronic devices. Additionally, the electronic device is optionally part of a session which allows users of the electronic device and the one or more second electronic devices to collaborate/communicate (e.g., talk, text, chat, message) with each other.), and while media content (e.g., audio and/or video, music, movie, episodic content, etc.) is playing in the synchronized media and communication session (702) ((e.g., media is being presented (e.g., displayed) in the session, such as if media is actively playing and/or paused in the synchronized media and communication session), in accordance with a determination that a third electronic device associated with the respective user is part of the synchronized media and communication session (704), such as electronic device 500*d* in FIG. 6CCC (e.g., if the synchronized media and communication session includes two electronic devices associated with the respective user—the electronic device and the third electronic device). In some embodiments, the synchronized media and communication session includes a plurality of devices that are associated with a same user. In some embodiments, the plurality of devices is associated with a same user if the plurality of devices are currently configured with a same user account. In some embodiments, the electronic device is a phone, and the third electronic device is a TV or set-top box connected to a TV. In some embodiments, the third electronic joins (e.g., becomes part of) the synchronized media and communication session when the electronic device sends (e.g., transfers, hands-off) the (e.g., synchronized) media content playing (e.g., streaming) at the electronic device to the third electronic device. In some embodiments, the third electronic device does not join the synchronized media and communication session at the same time the electronic device and the one or more second electronic devices join the session (e.g., the third electronic device joins at a time after the electronic device joined the session)), the electronic device plays (706) (e.g., displaying), at the third electronic device, the media content playing in the synchronized media and communication session, such as device 500*d* playing TV Show E in FIG. 6CCC.

In some embodiments, the synchronized media and communication session is started if the electronic device detects a selection of a selectable option associated with starting a synchronized media and communication session. In some embodiments, the selectable option is displayed in user interfaces that correspond to a group messaging conversation, a group video chat, a group conference call, or a group phone call, etc. For example, the selectable option for starting a synchronized media and communication session is optionally included in a group messaging conversation between the respective user and the one or more second users. If the electronic device detects the selection of that selectable option, the electronic device initiates (e.g., starts) the synchronized media and communication session, and subsequently causes the other users in the group messaging conversation to be invited to the synchronized media and communication session (e.g., sends requests to the one or more second electronic devices associated with the one or more second users to join the synchronized media and communication session).

Similarly, if a respective one of the one or more second electronic devices detects the selection of that selectable option, the respective one of the one or more second electronic device initiates (e.g., starts) the synchronized media and communication session, and subsequently causes the other users (including the respective user) to be invited to join the synchronized media and communication session. In some embodiments, when a user is invited to join the synchronized media and communication session, the associated electronic device is automatically added (e.g., becomes part of) the synchronized media and communication session. Alternatively, in some embodiments, when an electronic device receives a request to join the synchronized media and communication session, that electronic device must first accept the request to join or a user of that electronic device must first accept the request to join (e.g., via selection of an affordance included in the request to join).

In some embodiments, the media content starts playing in the synchronized media and communication session in response to detecting that one of the electronic devices that is part of the synchronized media and communication session has started playing (e.g., streaming) media content. In some embodiments, media content can only be played in (e.g., added to) the synchronized media and communication session by electronic devices that are part of the synchronized media and communication session. For example, the synchronized media content optionally does not include media content until the electronic device or the one or more second electronic devices start playing (e.g., streaming) media content. In some embodiments, the media content is optionally played (e.g., streamed) at one of the electronic devices when the media content is selected for playback from a (e.g., browsing, streaming, TV, and/or music) application. In some embodiments, when one of the electronic devices in the synchronized media and communication session (e.g., either the first electronic device or the one or more second electronic devices) start playing (e.g., streaming) the media content, other electronic devices in the synchronized media and communication session optionally begin to synchronously play (e.g., stream) the same media content. In some embodiments, all of the electronic devices in the synchronized media and communication session synchronously play (e.g., stream) the media content when the media content starts playing in the synchronized media and communication session. Alternatively, only some of the electronic devices in the synchronized media and communication session synchronously play (e.g., stream) the media content playing in the synchronized media and communication session. Thus, in some embodiments, at any respective time, the streaming of the media content at one electronic device in the synchronized media and communication session and the streaming of media content at a second electronic device (e.g., another device) in the synchronized media and communication session is optionally precisely (e.g., time) aligned.

For example, if the synchronized media and communication session includes two devices associated with the respective user—the electronic device and the third electronic device—media content playing in the synchronized media and communication session is played at the third electronic device. In some embodiments, when the media content is playing at the third electronic device, the media content is not being played (or stops/ceases playing) at the electronic device. In some embodiments, while the media content is being played at the third electronic device, the electronic optionally receives a request to play a new media content item. In response, the third electronic device optionally begins to play the new media content item, and the one or more second electronic devices optionally begin to play (e.g., stream) the new media content item synchronously with the playing (e.g., streaming) of the new media content item at the electronic device—but optionally does not play the new media content item at the electronic device. In some embodiments, neither the third electronic device nor the electronic displays the media content playing in the synchronized media and communication session.

In some embodiments, in accordance with a determination that a third electronic device associated with the respective user is part of the synchronized media and communication session (704), the electronic device displays (708), via the display generation component, a user interface for communicating with the one or more second users in the synchronized media and communication session, such as device 500*c* displaying messaging user interface 699*c* while device 500*d* is part of the synchronized media and communication session in FIG. 6CCC.

For example, if the synchronized media and communication session includes two devices associated with the respective user—the electronic device and the third electronic device—communication associated with the synchronized media and communication session is displayed at the electronic device. In some embodiments, while the third electronic device is playing the media content in the synchronized media and communication session, the user interface for communicating with the one or more second users is optionally not displayed at the electronic device (e.g., a user of the electronic device is browsing/navigating a different user interface and/or did not join the communication portion of the session). In some embodiments, if playback of the media content is modified (e.g., paused, rewound, fast-forwarded) or if the playback of the media content is replaced with the playing (e.g., streaming) of new media content, the electronic device displays information about the changes in media content currently playing at the third electronic device.

For example, if a user associated with the one or more second electronic devices starts playing a new media item (e.g., at a respective one of the one or more second electronic devices), the third electronic device optionally starts playing the new media item synchronously with the playing of the new media item at the respective one of the one or more second electronic devices, and a notification is optionally displayed, at the electronic device, about this change in media playing in the synchronized media and communication session. Similarly, while the electronic is playing the media item at the third electronic device, the electronic device optionally displays a messaging conversation, a group phone call, or a group video call that includes some of or all of the users associated with the one or more second electronic devices. In some embodiments, users can be part of messaging conversation, group phone call, group video call, etc. but the devices associated with the users are not playing the media content in the synchronized media and communication session. Similarly, in some embodiments, the electronic devices can be playing the media content in the synchronized media and communication session, but the user of the electronic device is not part of the communication related aspects of the synchronized media and communication session (e.g., did not join the group phone call/group video call).

In some embodiments, in accordance with a determination that the third electronic device is not part of the synchronized media and communication session (710) (e.g., if the synchronized media and communication session only includes one electronic device (e.g., a phone) associated with the respective user), the electronic device plays (712) (e.g., displaying), at the electronic device (e.g., a phone), the media content playing in the synchronized media and communication session, and the electronic device displays (712), via the display generation component, the user interface for communicating with the one or more second users in the synchronized media and communication session, such as, in FIG. 6R, device 500*c* displaying messaging user interface 699*c* while TV Show D is playing in the picture-in-picture user interface 650*c*. For example, if the synchronized media and communication session only includes one electronic device associated with the respective user (the electronic device), the electronic device plays the media content playing in the synchronized media and communication session and displays the user interface for communicating with the one or more second users in the session. In some embodiments, both the media content and the user interface for communicating with the one or more second users are concurrently displayed in the same user interface. Alternatively, in some embodiments, media content playing in the synchronized media and communication session is displayed in a picture-in-picture (PIP) window while the user interface for communicating with the one or more second users is displayed on the full display (e.g., full screen) of the electronic device. In some embodiments, the PIP window is displayed at the electronic device while the electronic device is not displaying the user interface for communicating with the one or more second users. In some embodiments, if the user interface for communicating with the one or more second users includes a group phone call, group video call, group conference call, or is associated with any other type of communication that requires use of the speakers of the electronic device, the electronic device mutes the audio associated with the media content and the audio associated with the communication amongst the one or more second users and the respective user is played by the electronic device. In some embodiments, if the user interface for communicating with the one or more second users is a group messaging conversation with the one or more second users (or any other type of communication that does not require use of the speakers of the electronic device), the electronic device plays the audio associated with the media content at the speakers of the electronic device. In some embodiments, neither the synchronized media content nor the communication user interface is displayed by the electronic device. In some embodiments, the electronic device displays the communication user interface without displaying the media content (e.g., does not display the PIP window).

The above-described manner of playing the synchronized media and displaying the communication user interface at the same electronic device when only the electronic device associated with the user is in the synchronized media and communication session, and displaying the communication user interface at a first electronic device and playing the synchronized media at a second electronic device when multiple electronic devices associated with the user are part of the synchronized media and communication session provides an efficient way of displaying the communication user interface and playing the media content at the same device or multiple devices based on whether a respective user is associated with a plurality of devices or one device in the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the user interface for communicating with the one or more second users in the synchronized media and communication session includes a messaging user interface including a conversation between the respective user and the one or more second users, such as the messaging user interface 699*c* in FIGS. 6R and 600. For example, while media is playing in the synchronized media session, users included in the synchronized media and communication session can communicate with each other via a messaging user interface. In some embodiments, the messaging user interface is displayed at an electronic device different than the electronic device playing the media content in the synchronized media and communication session. For example, if the synchronized media and communication session includes two devices associated with the respective user—the first electronic device and the third electronic device—the messaging user interface is optionally displayed at the first electronic device and the media playing in the synchronized media and communication session is optionally displayed at the third electronic device. In some embodiments, the same electronic device displays the messaging user interface and the media content playing in the synchronized media and communication session. For example, if the synchronized media and communication only includes one electronic device associated with the respective user (e.g., the electronic device), the electronic device optionally concurrently displays the messaging user interface and displays a picture-in-picture user interface that includes the media currently playing in the synchronized media and communication session.

The above-described manner of displaying a messaging user interface that includes users of the synchronized media and communication session provides an efficient way for a user of the electronic device to communicate with other users in the synchronized media and communication while media content is playing in the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the media content is playing in the synchronized media and communication session, the electronic device receives, via the one or more input devices, an indication that a respective one of the one or more second users has modified playback of the media content (e.g., a respective second user of the one or more second users has paused, started playing, rewound, fast-forwarded, or otherwise modified the playback of the media content playing in the synchronized media and communication session. In some embodiments, when the respective second user modifies/adjusts the playback of the media content, the device associated with the respective second user transmits directly or indirectly (e.g., via one or more servers), an indication that the playback of the media content has been modified to all devices in the synchronized media and communication session). In some embodiments, in response to receiving the indication, in accordance with the determination that the third electronic device is part of the synchronized media and communication session (e.g., if the synchronized media and communication session includes two electronic devices associated with the respective user—the electronic device and the third electronic device), the electronic device modifies playback of the media content playing at the third electronic device in accordance with the received indication, such as device 500*d* ceasing playing TV Show D and starting to play TV Show E in FIG. 6YY. For example, if the electronic device receives the indication indicating that the media content has been modified while the third electronic device is synchronously playing the media content, the third electronic device adjusts (e.g., time-aligns) the playback of the media content with the other devices in the synchronized media and communication session (e.g., for synchronizing the playback of media content across all the devices). In some embodiments, in response to receiving the indication, the electronic device displays, via the display generation component, a visual indication indicating that the respective one of the one or more second users has modified playback of the media content, such as device 500*d* displaying indication 696*d* in FIG. 6YY (e.g., concurrently with the user interface for communicating with the one or more second users in the synchronized media and communication session). For example, the electronic device displays a visual indication that the playback of the media content currently playing in the synchronized media and communication session has been modified. In some embodiments, the visual indication includes an indication of the user associated with the electronic device that changed the playback of the media content. In some embodiments, the visual indication includes an indication/information about how the media content was modified. For example, if the electronic device associated with the respective one of the one or more second users paused the content playing in the synchronized media and communication session, the electronic device displays an indication indicating that the media content has been paused by the respective one of the one or more second users and includes an avatar associated with the respective one of the one or more second users.

In some embodiments, in accordance with the determination that the third electronic device is not part of the synchronized media and communication session (e.g., if the synchronized media and communication session only includes one electronic device (e.g., a phone) associated with the respective user), the electronic device modifies playback of the media content playing at the electronic device in accordance with the received indication, such as device 500*c* modifying the playback of TV Show D in FIG. 6HH in response to the input at device 500*b* in FIG. 6GG. For example, if the indication indicating that the media content has been modified is received while the electronic device is playing media content part of the synchronized media and communication session, the electronic device adjusts (e.g., time-aligns) the playback of the media content with the other devices in the synchronized media and communication session (e.g., for synchronizing the playback of media content). In some embodiments, the electronic device displays, via the display generation component, the visual indication indicating that the respective one of the one or more second users has modified playback of the media content, such as indication 696*c* in FIG. 6HH (e.g., concurrently with the user interface for communicating with the one or more second users in the synchronized media and communication session). For example, the electronic device displays an indication that the media content playing in the synchronized media and communication session has been modified. In some embodiments, the visual indication includes an indication of the user associated with the electronic device that modified the playback of the media content. In some embodiments, the visual indication includes an indication/information about how the media content was modified. For example, if the electronic device associated with the respective one of the one or more second users, paused the content playing in the synchronized media and communication session, the electronic device displays an indication indicating that the media content has been paused by the respective one of the one or more second users and includes an avatar associated with the respective one of the one or more second users. Additionally, or alternatively, in some embodiments, the third electronic device displays a visual indication indicating that the media content playing in the synchronized media and communication has been modified.

The above-described manner of modifying the playback of media content when an indication indicating a change in playback for respective media content is received, and displaying a visual indication when the indication is received provides an efficient way of synchronizing the playback of the media content playing at all of the electronic devices included in the synchronized media and communication, and provides an efficient way for indicating to a user of a respective electronic device how/why the playback of the media content has changed, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that the electronic device is part of a voice call with at least one of the one or more second electronic devices while the media content is playing in the synchronized media and communication session, the user interface for communicating with the one or more second users includes a voice call user interface, such as voice user interface 603*c* in FIG. 6V. For example, if the electronic device is part of a voice call/chat with other devices in the synchronized media and communication session, the users associated with those devices can communicate with each other in a voice call user interface while media is playing in the synchronized media and communication session. In some embodiments, the voice call user interface is displayed at an electronic device different than the electronic device that plays the media content in the synchronized media and communication session. For example, if the synchronized media and communication session includes two devices associated with the respective user—the first electronic device and the third electronic device—the voice call interface is optionally displayed at the first electronic device and the media playing in the synchronized media and communication session is optionally displayed at the third electronic device. In some embodiments, the same electronic device displays the voice call user interface and the media content playing in the synchronized media and communication session. For example, if the synchronized media and communication only includes one electronic device associated with the respective user (e.g., the electronic device), the electronic device optionally concurrently displays the voice call user interface and displays a picture-in-picture user interface that includes the media currently playing in the synchronized media and communication session.

The above-described manner of displaying a voice call user interface that includes users of the synchronized media and communication session provides an efficient way for communicating with the users in the synchronized media and communication session while media content is playing in the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that the electronic device is part of a video call with at least one of the one or more second electronic devices while the media content is playing in the synchronized media and communication session, the user interface for communicating with the one or more second users includes a video call user interface, such as video user interface 623*c* in FIGS. 6Z and 6EEE. For example, if the electronic device is part of a video call/chat with other devices in the synchronized media and communication session, the users associated with those devices can communicate with each other in a video call user interface while media is playing in the synchronized media and communication session. In some embodiments, the voice call user interface is displayed at an electronic device different than the electronic device that plays the media content in the synchronized media and communication session. For example, if the synchronized media and communication session includes two devices associated with the respective user—the first electronic device and the third electronic device—the video call interface is optionally displayed at the first electronic device and the media playing in the synchronized media and communication session is optionally displayed at the third electronic device. In some embodiments, the same electronic device displays the video call user interface and the media content playing in the synchronized media and communication session. For example, if the synchronized media and communication only includes one electronic device associated with the respective user (e.g., the electronic device), the electronic device optionally concurrently displays the voice call user interface and displays a picture-in-picture user interface that includes the media currently playing in the synchronized media and communication session.

The above-described manner of displaying a video call user interface that includes users of the synchronized media and communication session provides an efficient way for communicating with the users in the synchronized media and communication while media content is playing in the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the electronic device is part of the synchronized media and communication session (e.g., the electronic device is currently part of a session which optionally allows media content to be synchronously played (e.g., streamed) at the electronic device and at the one or more second electronic devices. Additionally, the electronic device is optionally part of a session which allows users of the electronic device and the one or more second electronic devices to collaborate/communicate (e.g., talk, text, chat, message) with each other. In some embodiments, the electronic device and the third electronic device are part of the synchronized media and communication session), the electronic device displays, via the display generation component, a set of controls associated with the synchronized media and communication session, including a first set of controls that are selectable to control the media content playing at a respective device, and a second set of controls, different from the first set of controls, that are selectable to perform one or more commands associated with communicating with the one or more second users, such as the selectable options 654*c*, 658*c*, 660*c*, 662*c* 666*c* displayed in overlay 664*c* in FIG. 6SS. For example, while the electronic device is in a synchronized media and communication session, the electronic device includes one or more selectable controls that are selectable to perform commands/operations associated with the synchronized media and communication session. In some embodiments, the first set of controls include controls for modifying the audio output of the synchronized media and communication session, for modifying the playback of the media content playing in the synchronized media and communication session (e.g., play/pause controls), for rewinding and/or fast-forwarding the media content playing in the synchronized media and communication session, etc. In some embodiments, the second set of controls include controls for displaying a messaging conversation associated with the synchronized media and communication session, for muting/unmuting the audio and/ or content in the synchronized media and communication session, for displaying a video call/chat associated with the synchronized media and communication session, etc. In some embodiments, the set of controls are displayed in overlay. In some embodiments, in accordance with the determination that the third electronic device is part of the synchronized media and communication session, the respective device is third electronic device. For example, because the third electronic device is playing the media content that is currently playing in the synchronized media and communication session, the first set of controls the media content playing at the third electronic device. In some embodiments, in accordance with the determination that the third electronic device is not part of the synchronized media and communication session, the respective device is the electronic device. For example, because the electronic device is playing the media content that is currently playing in the synchronized media and communication session, the first set of controls the media content playing at the electronic device. The above-described manner of displaying a set of controls when the electronic device is in a synchronized media and communication session provides an efficient way for performing one or more commands associated with the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device and the third electronic are associated with the respective user when one or more criteria are satisfied, including a criterion that is satisfied when the electronic device and the third electronic device are configured with a same user account, and is not satisfied when the electronic device and the third electronic device are not configured with the same user account. For example, device 500c and device 500d, in FIG. 600, are associated with the user Erin if device 500c and device 500d are associated with a user account that corresponds to Erin. For example, devices in the synchronized media and communication are associated with each other when those devices are configured with the same user account. In some embodiments, devices that are part of the synchronized media and communication session are not associated with each other when those devices are configured with different user accounts.

The above-described manner of associating devices that are configured with the same user and not associating devices that are not configured with the same user account provides an efficient way for determining which devices in the synchronized media and communication session are associated with each other, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the third electronic device is not part of the synchronized media and communication session (e.g., the synchronized media and communication only includes one electronic device associated with the user—the electronic device) and while the media content is playing at the electronic device (e.g., the media content playing in the synchronized media and communication session is synchronously playing at the electronic device), the electronic device displays, via the display generation component, a first selectable option (such as selectable option 613c in FIG. 6LL or selectable option 684c in FIG. 6KK) that is selectable to initiate a process to: cause the third electronic device to be added to the synchronized media and communication session; and play the media item at the third electronic device, such as device 500d being added to the synchronized media and communication session in response to the input in FIG. 6MM. For example, while the electronic device is the only device in the synchronized media and communication session that is associated with the respective user, a first selectable option is displayed that, when selected, initiates the process to add the third electronic device, associated with the respective user, to the synchronized media and communication session. Additionally, in some embodiments, when the first selectable option is selected the media content playing in the synchronized media and communication session begins to synchronously play at the third electronic device (e.g., and no longer play at the electronic device).

The above-described manner of initiating a process to add the third electronic device to the synchronized media and communication from an electronic device already part of the synchronized media communication session provides an efficient way for adding a new electronic device to the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the first selectable option, receiving, via the one or more input devices, a second input selecting the first selectable option (e.g., receiving an input correcting to a request to add the third electronic device to the synchronized communication, and to play the media content currently playing in the synchronized media and communication session at the third electronic device), such as touch input 617c-*mm* in FIG. 6MM. In some embodiments, in response to receiving the second input, (e.g., synchronously) the electronic device plays, at the third electronic device, the media content playing in the synchronized media and communication session, and ceases playing, at the electronic device, the media content playing in the synchronized media and communication session, such as, in FIG. 600, device 500d starting to play TV Show D in response to the input in FIG. 6MM, and device 500c no longer playing TV Show D in FIG. 600 in response to the input in FIG. 6MM. For example, after adding the third electronic device to the synchronized media and communication session, initiating a process to synchronously play, at the third electronic device, the media content playing in the synchronized media and communication session. In some embodiments, after the media content begins playing at the third electronic device, the media content is no longer synchronously played/displayed at the electronic device.

The above-described manner of playing the media content in the synchronized media and communication session at the third electronic device and ceasing playing the media content at the electronic device when the third electronic device becomes part of the synchronized media and communication session provides an efficient way of playing the media content at the electronic device recently added to the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to receiving the second input, the electronic device displays, via the display generation component, a second visual indication indicating that the media content has started playing at the third electronic device, such as indication 689*c* in FIG. 600. For example, when the media content playing in the synchronized media and communication session starts playing at the third electronic device, the electronic device (e.g., the device that the media content was previously playing at) displays a visual indication (e.g., notification) that the media content is now playing at the third electronic device. The above-described manner of indicating the media content that is now playing at the third electronic provides an efficient way of indicating that the new device (e.g., the third electronic device) is now playing the media content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device displays, via the display generation component, a second selectable option (e.g., within the visual indication indicating that that the media content has started playing at the third electronic device) that is selectable to display a remote-control user interface for the third electronic device (e.g., a user interface that includes one or more selectable options for controlling/navigating user interface(s) displayed by the third electronic device. In some embodiments, the remote-control user interface provides similar features/functions that a dedicated remote control for the third electronic device provides (e.g., such as remote control 510 described with reference to FIG. 5B). In some embodiments, the remote-control user interface can be separately accessed from a particular application running on the electronic device or user interface displayed by the electronic device), such as selectable option 687*c* in FIG. 600. In some embodiments, while displaying the second selectable option, the electronic device receives, via the one or more input devices, a second input selecting the second selectable option (such as touch contact 617*c-pp* selecting selectable option 687*c* in FIG. 6PP). In some embodiments, in response to receiving the second input, the electronic device displays, via the display generation component, one or more selectable options for controlling one or more functions of the third electronic device, such as device 500*c* displaying remote control user interface 667*c* in FIG. 6QQ in response the input in FIG. 6PP. For example, in response to selecting the second selectable option, the electronic device displays selectable options that, when selected, transmit corresponding commands to the third electronic device. In some embodiments, the third electronic device receives the transmitted command and responds in accordance with the command issued/transmitted by the electronic device. In some embodiments, the remote-control user interface includes a trackpad area that can be used for scrubbing and/or navigating user interfaces of the third electronic device. In some embodiments, commands that can be transmitted to the third electronic device include play/pause commands, scrubbing commands, fast-forward/rewind commands, selection commands, etc.

The above-described manner of displaying a selectable option for accessing a remote control user interface of the third electronic device provides an efficient way of accessing user interfaces associated with the third electronic device when the media content starts playing at the third electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the third electronic device is playing the media content playing in the synchronized media and communication session (e.g., and while the electronic device is part of the synchronized media and communication session), the third electronic device is not displaying the user interface for communicating with the one or more second users in the synchronized media and communication session, such as device 500*d* playing TV Show D in FIG. 6QQ without displaying a user interface for communication with the users in the synchronized media and communication session. For example, while the third electronic device is synchronously playing the media content playing in the synchronized media and communication session, the user interfaces associated with communicating with the users in the synchronized media and communication session are only displayed at the electronic device.

The above-described manner of displaying communication user interfaces at electronic devices when the third electronic device is part of the synchronized media and communication session provides an efficient way for displaying media content playing in the synchronized media and communication session and displaying communication associated with the synchronized media and communication sessions at dedicated electronic devices, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the electronic device and the third electronic device are part of the synchronized media and communication session, the electronic device detects that the electronic device is no longer part of the synchronized media and communication session (e.g., in some embodiments, the electronic device leaves the synchronized media and communication session if the electronic device detects a selection of a selectable option associated with leaving the synchronized media and communication session). In some embodiments, in response to detecting that the electronic device is no longer part of the synchronized media and communication session, the electronic initiates a process to cause the third electronic to leave the synchronized media and communication session, such as in FIG. 6SSS, device 500*d* leaving the synchronized media and communication session because device 500*c* left the synchronized media and communication session. For example, if the electronic device caused the third electronic device to become part of the synchronized media and communication session (e.g., because the electronic device "pushed" the media playing in the synchronized media and communication session to the third electronic device), the third electronic device leaves the synchronized media and communication session when the electronic device leaves the synchronized media and communication session. In some embodiments, in response to the third electronic device leaving the synchronized media and communication session, the third electronic device ceases playing the media content. In some embodiments, the media content continues to play at the third electronic device after leaving the synchronized media and communication session, but is no longer played synchronously with the other electronic devices in the synchronized media and communication session.

The above-described manner of initiating a process to cause a device to leave the synchronized media and communication when a second device associated with the device leaves the synchronized media and communication session provides an efficient way for associated devices to leave the synchronized media and communication session together, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the electronic device and the third electronic device are part of the synchronized media and communication session, the third electronic device leaves the synchronized media and communication session in response to an input for transitioning the third electronic device into a low power state, such as device 500*d* leaving the synchronized media and communication session as described with reference to FIG. 6QQQ. For example, while the electronic device and the third electronic device are part of the synchronized media and communication session, the third electronic device enters a low power mode (e.g., sleep mode), which causes the third electronic device to leave the synchronized media and communication session. In some embodiments, the third electronic device enters sleep mode when the third electronic device does not receive input for a predefined period of time (e.g., 5 mins, 10 mins, 30 mins, 60 mins, etc.) and/or when the third electronic device receives a command to cause the third electronic to enter a low power state (e.g., from a dedicated remote control and/or multi-function device in communication with the third electronic device). In some embodiments, the electronic device remains in the synchronized media and communication session after the third electronic device leaves. In some embodiments, if the third electronic device was playing the media content that is currently playing in the synchronized media and communication when the third electronic device entered the low power state, the electronic device begins playing the media content (e.g., in a picture-in-picture user interface and/or in a full screen user interface) and continues playing the media content from the playback position defined in the synchronized media and communication session.

The above-described manner of leaving the synchronized media and communication session when the an electronic device enters a low power state provides an efficient way for automatically leaving the synchronized media and communication session when that electronic device is no longer actively being used, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the electronic device and the third electronic device are part of the synchronized media and communication session, the third electronic device leaves the synchronized media and communication session in response to the third electronic device detecting a selection of a selectable option (e.g., displayed in a control center user interface by the third electronic device) associated with leaving the synchronized media and communication, such as device 500*d* leaving the synchronized media and communication when the input in FIG. 6111 is detected. For example, the third electronic device leaves the synchronized media and communication session when a selectable option, displayed at the third electronic device and associated with leaving the synchronized media and communication session, is selected. In some embodiments, the selectable option is displayed in a control user interface that includes a plurality of second selectable options for controlling operation of the third electronic device such as for switching the third electronic device to function/operate with a different user account (e.g., changing from the currently active user account), for navigating to a home screen user interface, for searching content in the third electronic device, etc. In some embodiments, in response to selecting the selectable option, the third electronic device initiates a process to move the media content playing at the third electronic device to the electronic device. In some embodiments, after the third electronic device leaves the synchronized media and communication session, the third electronic device remains in a normal operating mode (e.g., the third electronic device is not in a low power state (e.g., the display associated with the third electronic device remains on)). In some embodiments, when the third electronic device is not part of the synchronized media and communication session, media content cannot be added to the synchronized media and communication session from the third electronic device. In some embodiments, the electronic device remains in the synchronized media and communication session after the third electronic device leaves. In some embodiments, if the third electronic device was playing the media content that is currently playing in the synchronized media and communication when the third electronic device detected the selection of the selectable option, the electronic device begins playing the media content (e.g., in a picture-in-picture user interface and/or in a full screen user interface) and continues playing the media content from the playback position defined in the synchronized media and communication session.

The above-described manner of leaving the synchronized media and communication session when a third electronic device detects a selection of a selectable option associated with leaving the synchronized media and communication session provides an efficient way for leaving the synchronized media and communication without requiring the electronic device to transition to a different state (e.g., a low power state), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the third electronic device is playing a respective media item, receiving, via the one or more input devices, an input corresponding to a request to modify playback of the respective media item, such as the input detected in FIG. 6RR (e.g., the electronic device transmits a command to modify the playback of the media content at the third electronic device. In some embodiments, the command is transmitted when the electronic device detects a selection of a selectable option in a remote-control user interface displayed by the electronic device. For example, the remote-control user interface includes a selectable option for playing/pausing the media playing at the third electronic, which when selected, causes the media content to be played/paused. In some embodiments, the third electronic device receives an input to modify the playback of the media when a button on a dedicated remote control for the third electronic device is selected. For example, the dedicated remote control includes a fast-forward button, which when selected, causes the media content to be fast-forwarded by a predetermined amount). In some embodiments, in response to receiving the input, in accordance with a determination that the third electronic device is part of the synchronized media and communication session (e.g., if third electronic device is playing the media content currently playing in the synchronized media and communication session), the electronic device modifies playback of the media content at the third electronic device and the one or more second electronic devices in accordance with the input, such as pausing TV Show D in FIG. 6SS in response to the input in FIG. 6RR. For example, if the media content playing at the third electronic device is the media content playing in the synchronized media and communication session, the input causes the playback of the media content to be modified in accordance with the input. Additionally, because the input was directed to modifying the playback of the media content that is playing in the synchronized media and communication session, the playback of the media content at the other electronic devices is also modified in accordance with the input. For example, if the third electronic device rewinds the playback of the media content currently playing in the synchronized media and communication by a respective amount of time (e.g., 1, 5, 10, 15, 30 minutes), the other electronic devices also synchronously playing the media content rewind the playback of the media by the same respective amount of time (e.g., 1, 5, 10, 15, 30 minutes). Similarly, if one of the electronic devices started playing new content, fast-forward, pause, or scrub a media item that is currently playing in the synchronized media and communication session, the other electronic devices also similar perform the same action/operation.

In some embodiments, in accordance with a determination that the third electronic device is not part of the synchronized media and communication session (e.g., if third electronic device is not playing media content that is part of the synchronized media and communication session), the first electronic device modifies playback of the media content playing at the third electronic device in accordance with the input without modifying playback of media content at the one or more second electronic devices (e.g., if the input in FIG. 6TT was detected while the electronic device 500*d* was not in a synchronized media and communication, TV Show D playing at devices 500*a* and 500*b* (and optionally other devices in the synchronized media and communication session) would not be paused). For example, if the media content playing at the third electronic device is not the media content playing in the synchronized media and communication session, the input causes the playback of the media content to be modified in accordance with input received without modifying the playback of media content playing at the other electronic devices. For example, if the third electronic device rewinds the playback of the media content by a respective amount of time (e.g., 1, 5, 10, 15, 30 minutes), the media content currently playing in the synchronized media communication is not modified (e.g., because the third electronic device is not part of the synchronized communication when the input is received). Thus, input detected from a device that is not part of the synchronized media and communication session does not cause the playback of the media content playing in the synchronized media and communication to be modified/adjusted.

The above-described manner of modifying playback of media content at multiple devices or at a single device in response to the same input provides an efficient way for modifying the playback for all devices when the electronic device in a synchronized media and communication session and not modifying the playback for all devices when the electronic device is not in the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIG. 7. For example, the user interfaces associated with the synchronized media and communication described above with reference to method 700 optionally have one or more of the characteristics of user interfaces or playing media content in a synchronized media and communication session, described herein with reference to other methods described herein (e.g., method 900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIG. 7 are, optionally, implemented by components depicted in FIGS. 1A-1B. For example, playing operations 706 and 712 and displaying operation 708 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Joining a Synchronized Media and Communication Session

User interact with electronic devices in many different manners. In some embodiments, an electronic device is able to join a synchronized media and communication that is associated with a second electronic device. The embodiments described below provide ways in which an electronic device joins a synchronized media and communication session that a second electronic is currently part of, thus enhancing the user's interactions with the electronic device.

Enhancing interactions with a device reduces the amount of time needed by a user to join a synchronized media and communication session, and thus reduces the power usage of the device and increases battery life for battery-powered devices. It is understood that people use devices. When a person uses a device, that person is optionally referred to as a user of the device.

Figure 8A:
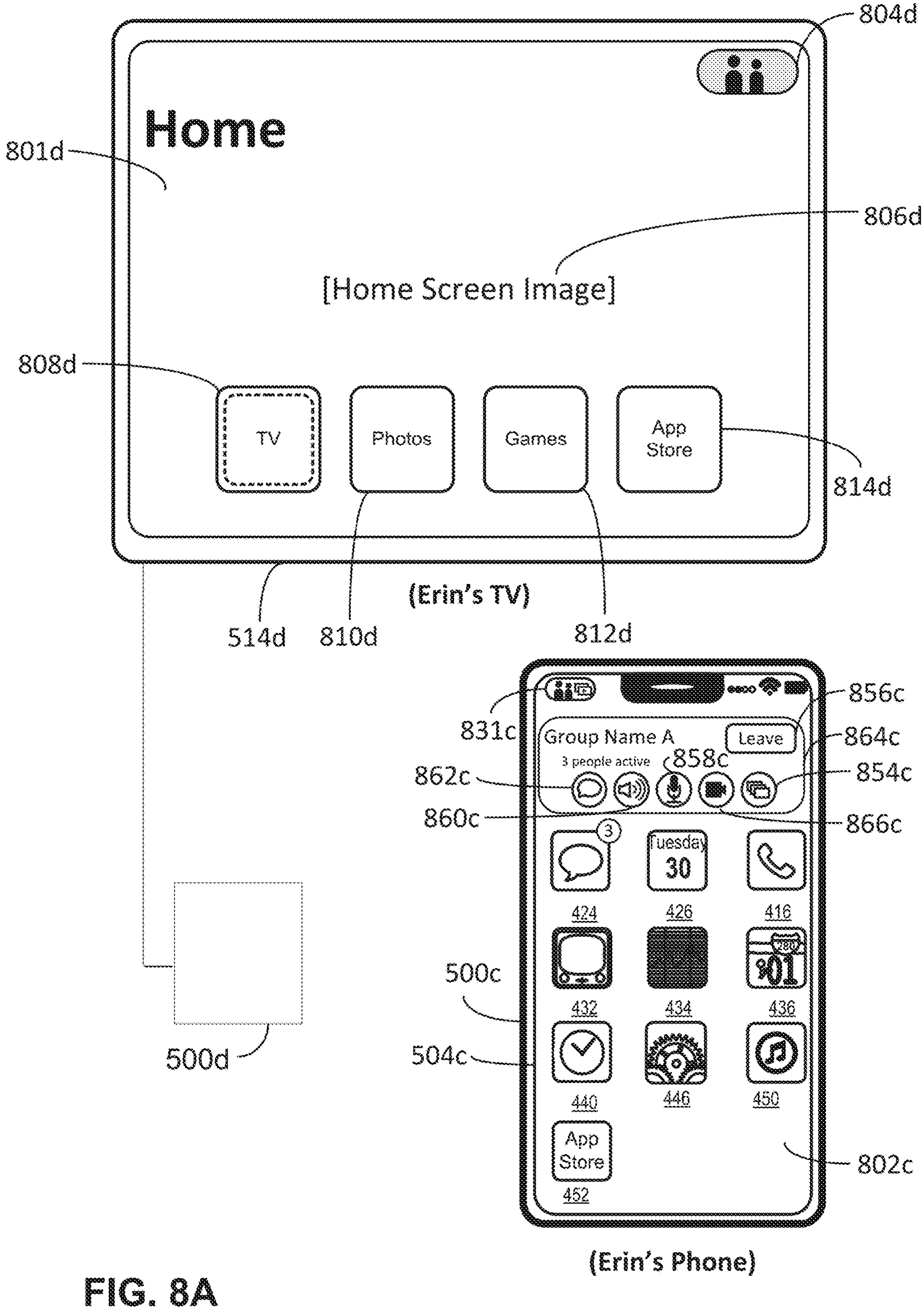
FIGS. 8A-8RR illustrate exemplary ways in which a first electronic device can join and/or add media content to a synchronized media and communication session when an associated second electronic device is part of the synchronized media and communication session in accordance with some embodiments of the disclosure.
Figure 8B:
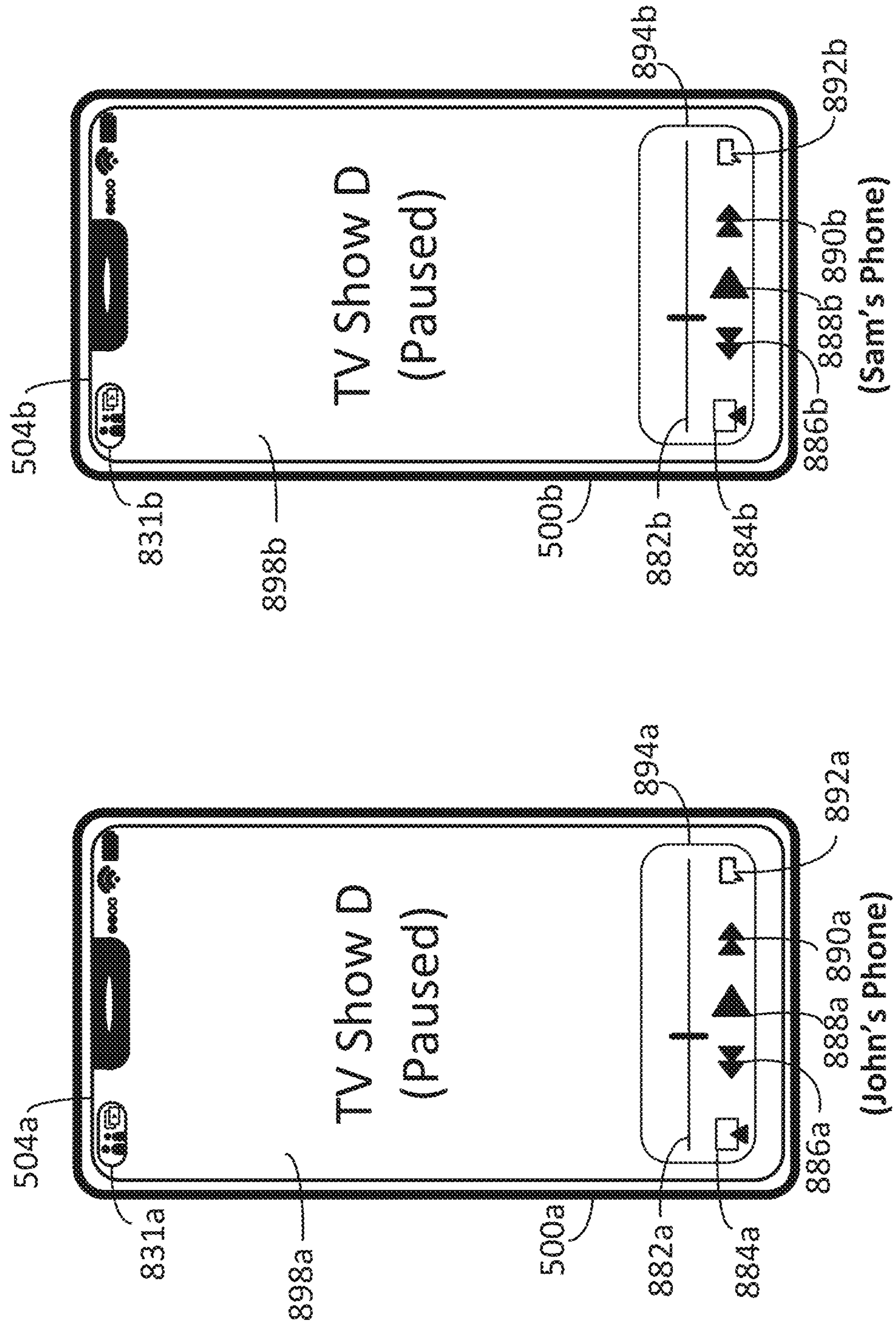
Figure 8D:
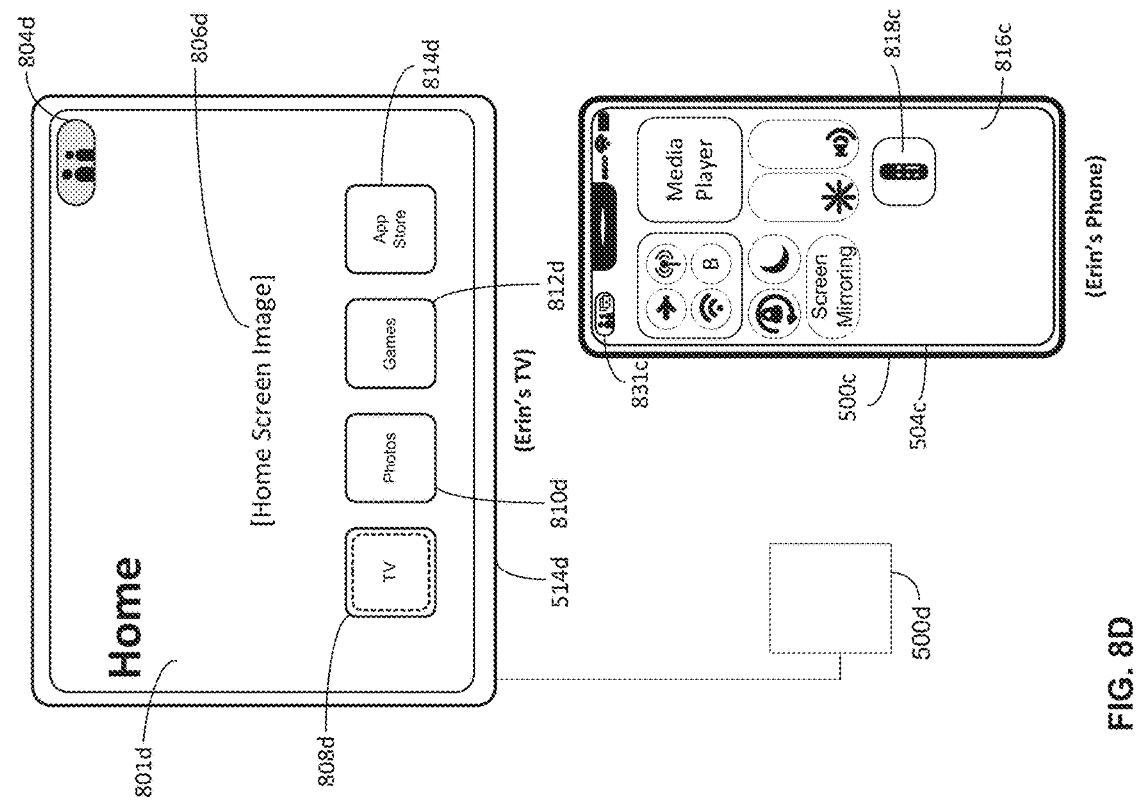
Figure 8C:
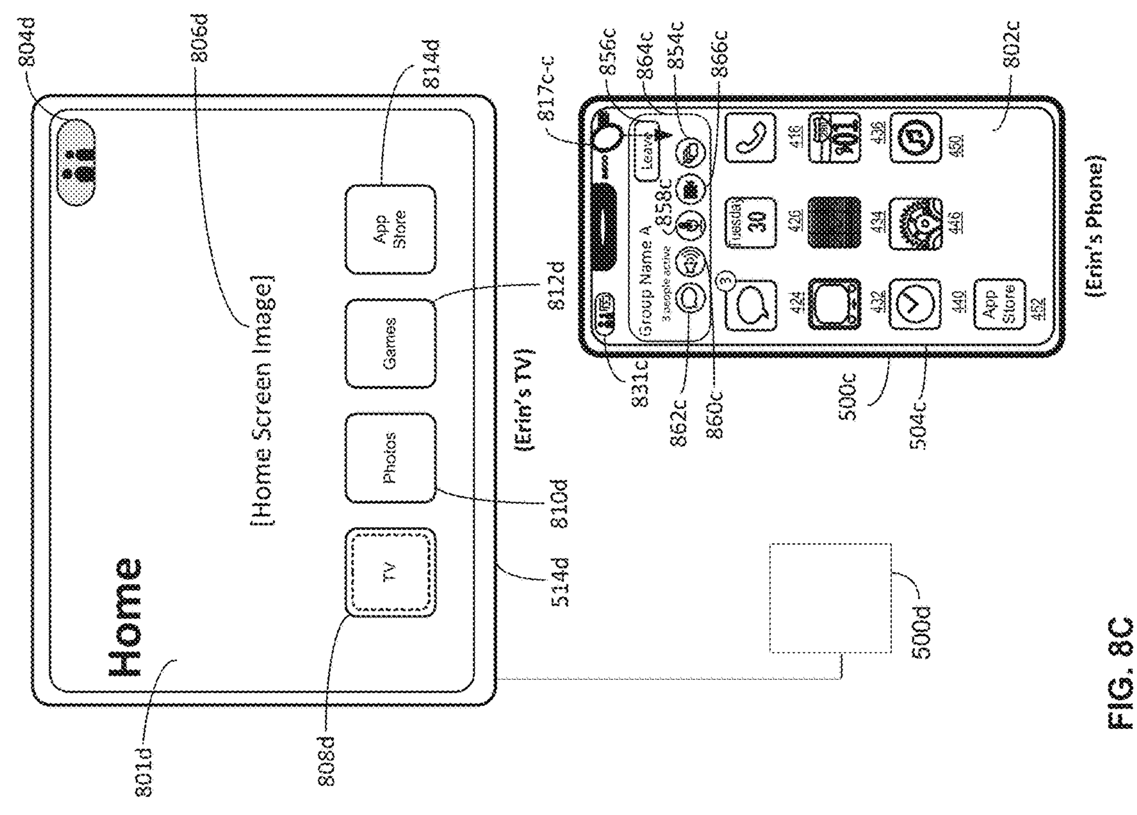
Figure 8F:
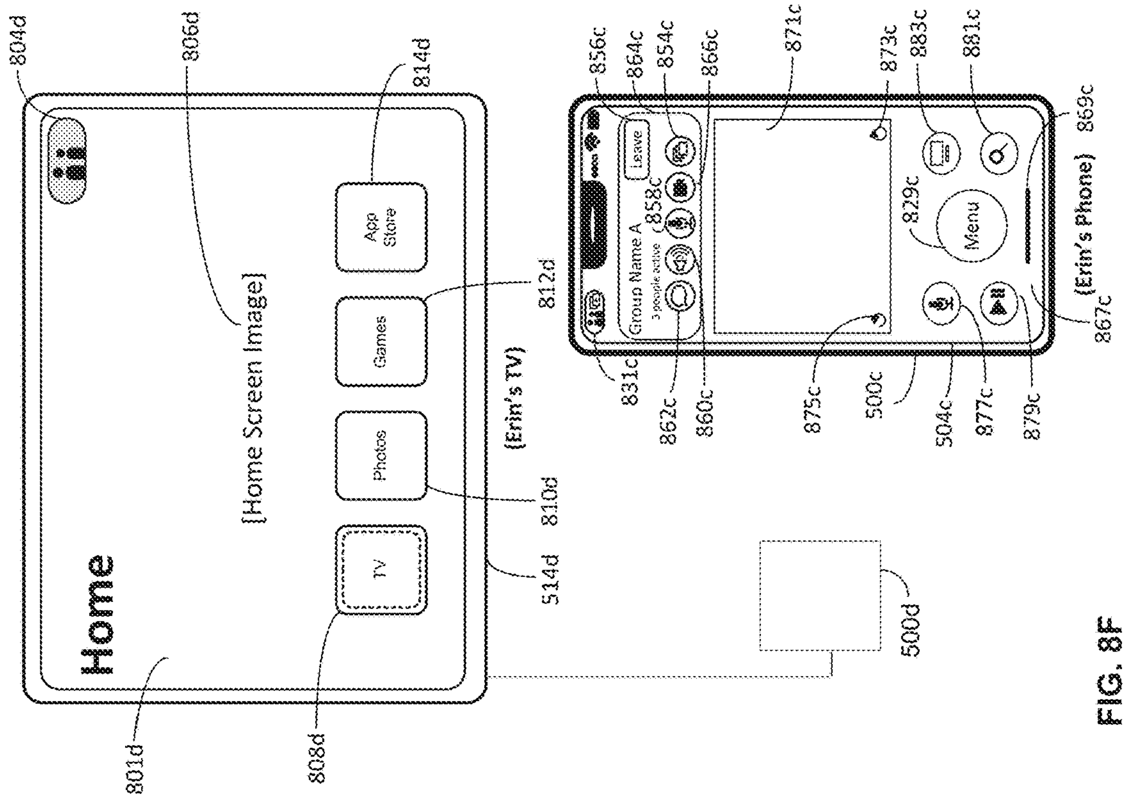
Figure 8E:
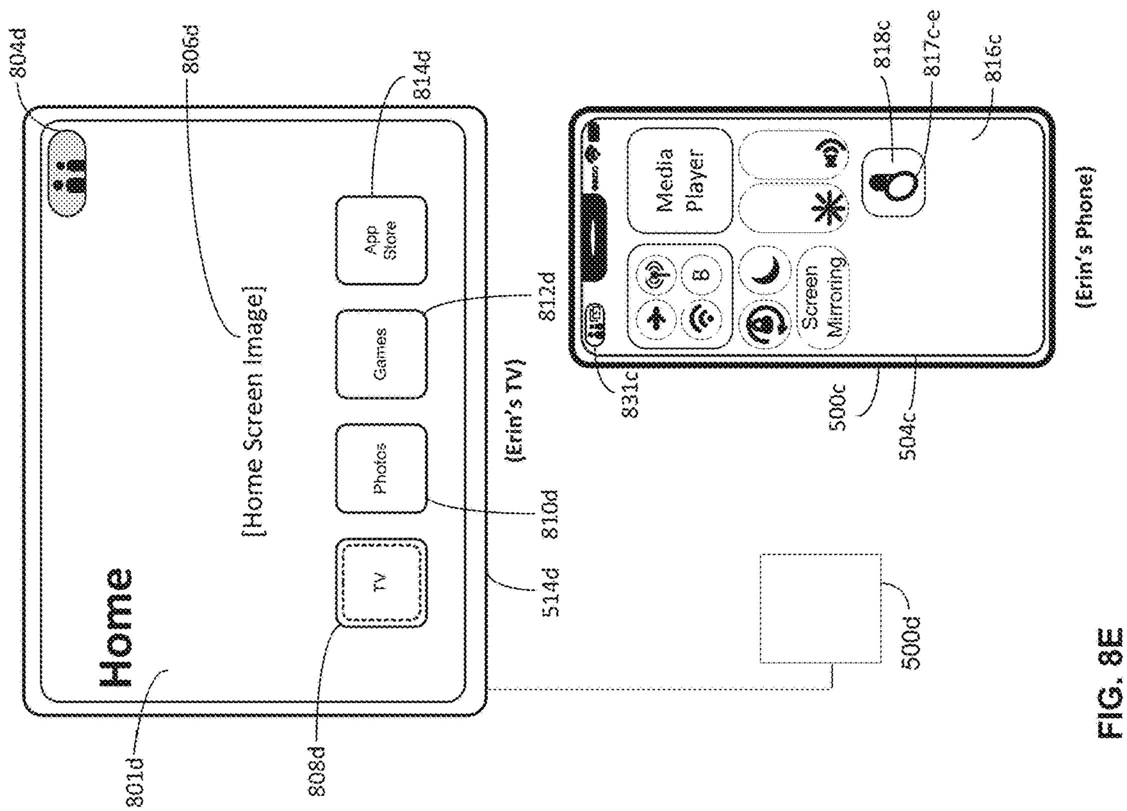
Figure 8H:
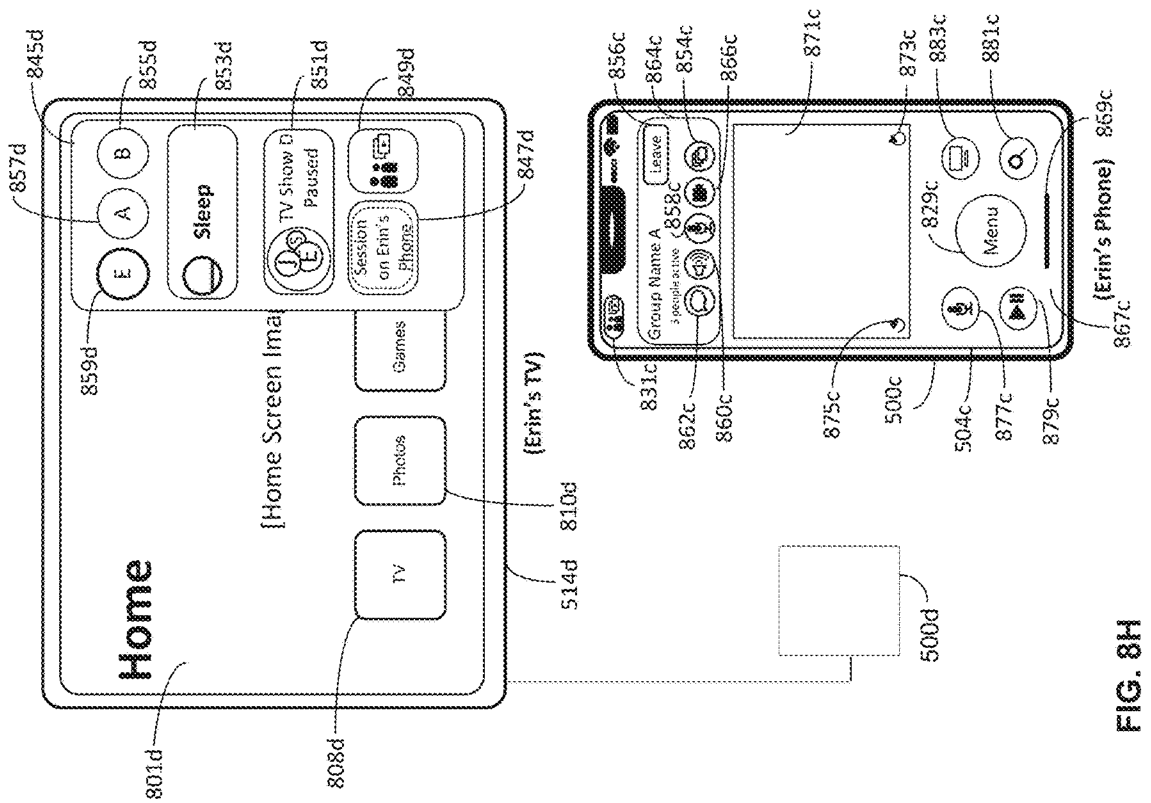
Figure 8G:
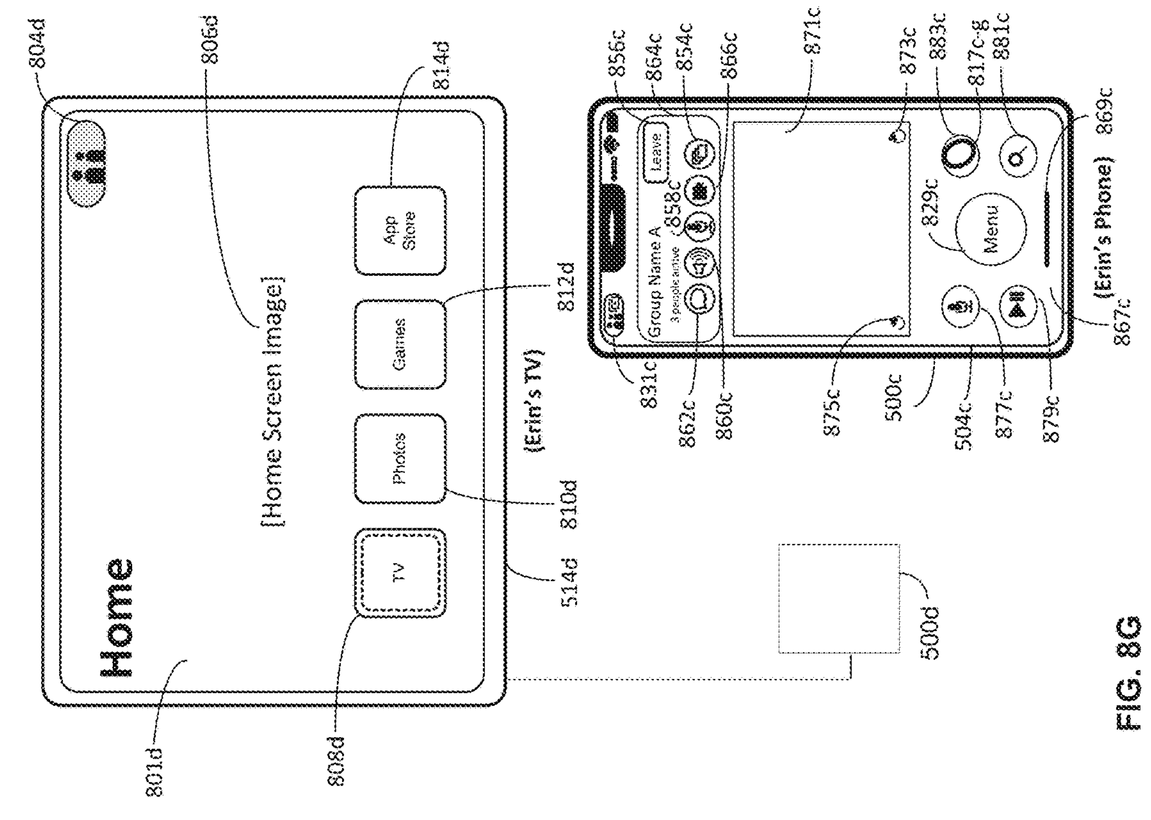
Figure 8J:
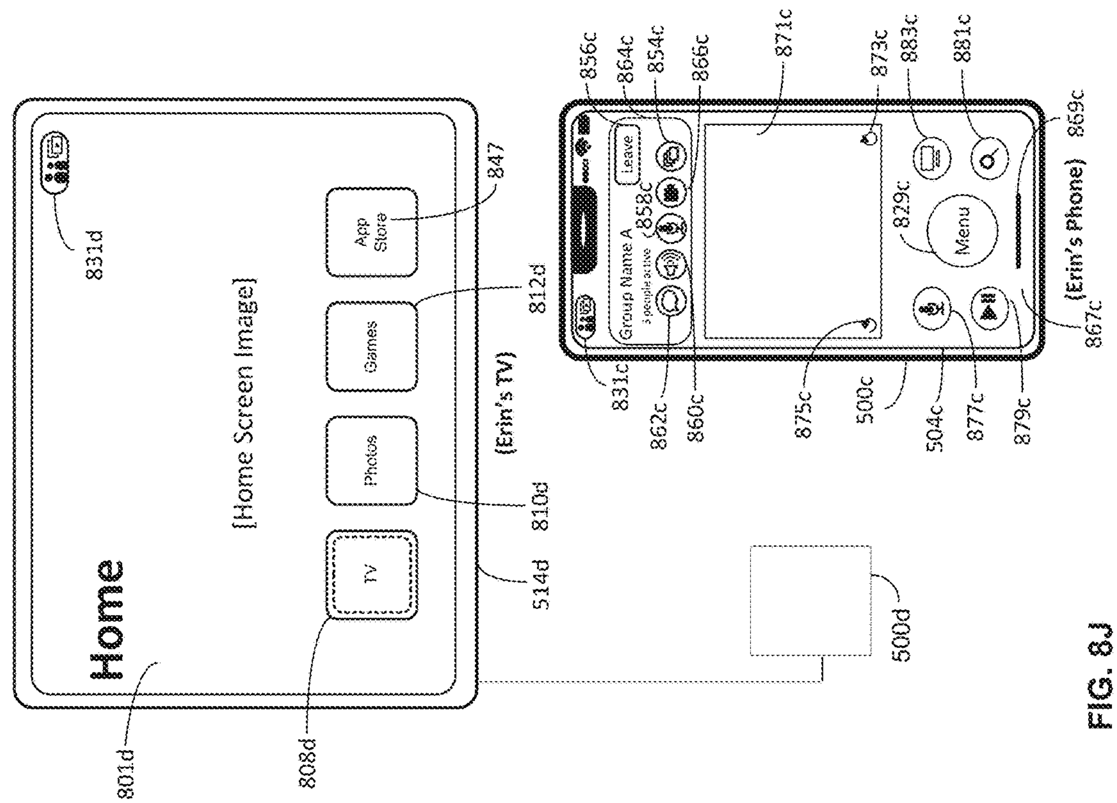
Figure 8I:
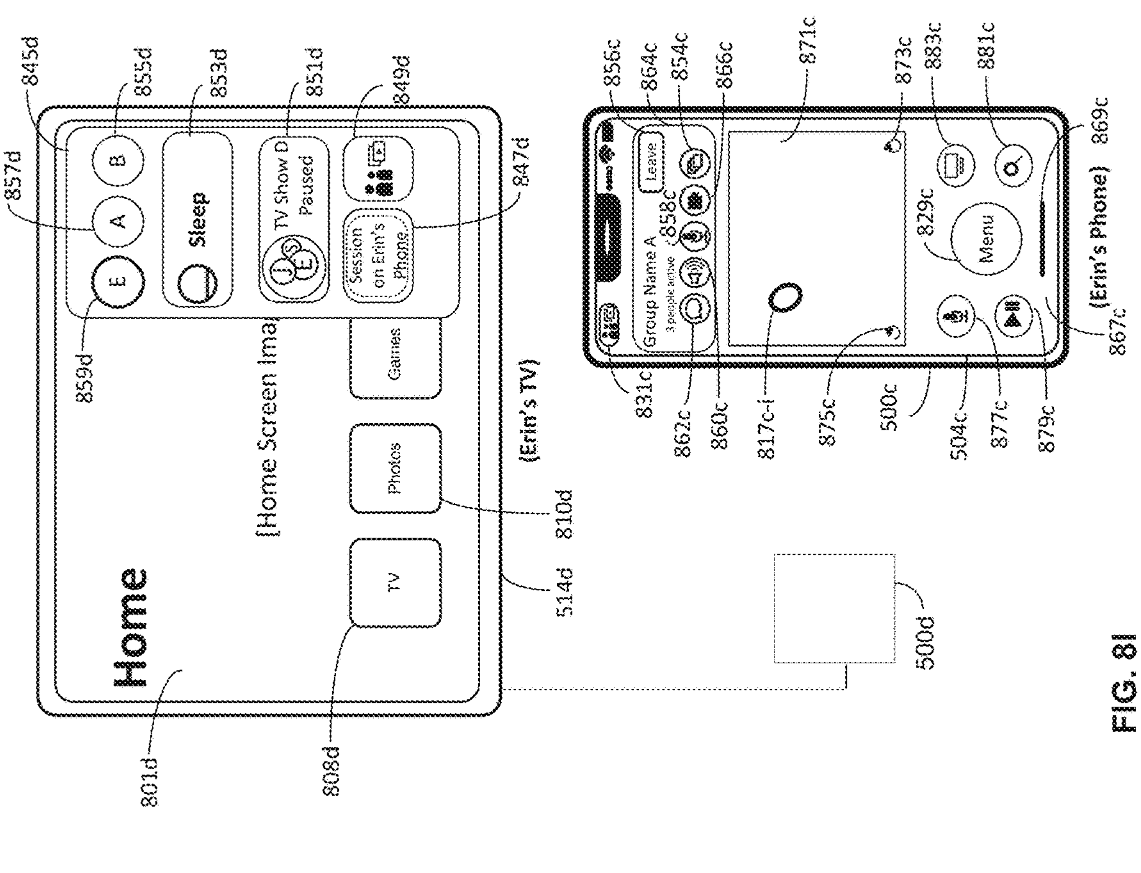
Figure 8L:
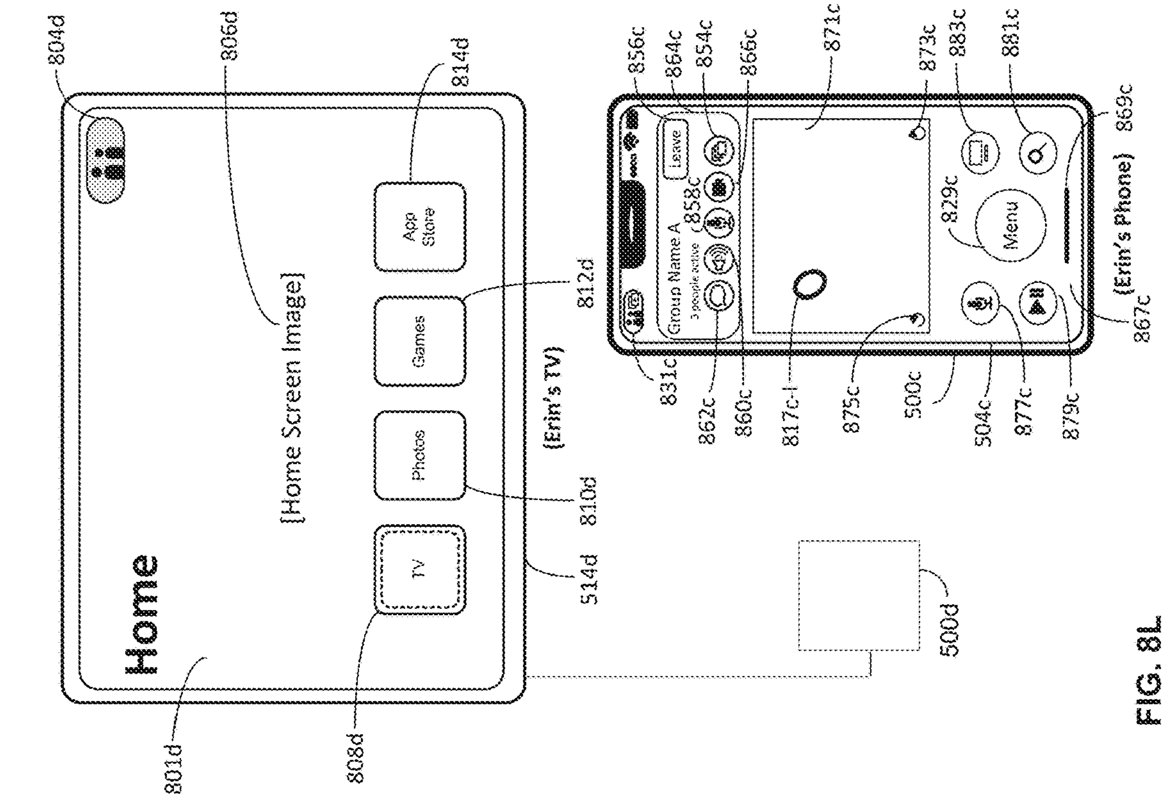
Figure 8K:
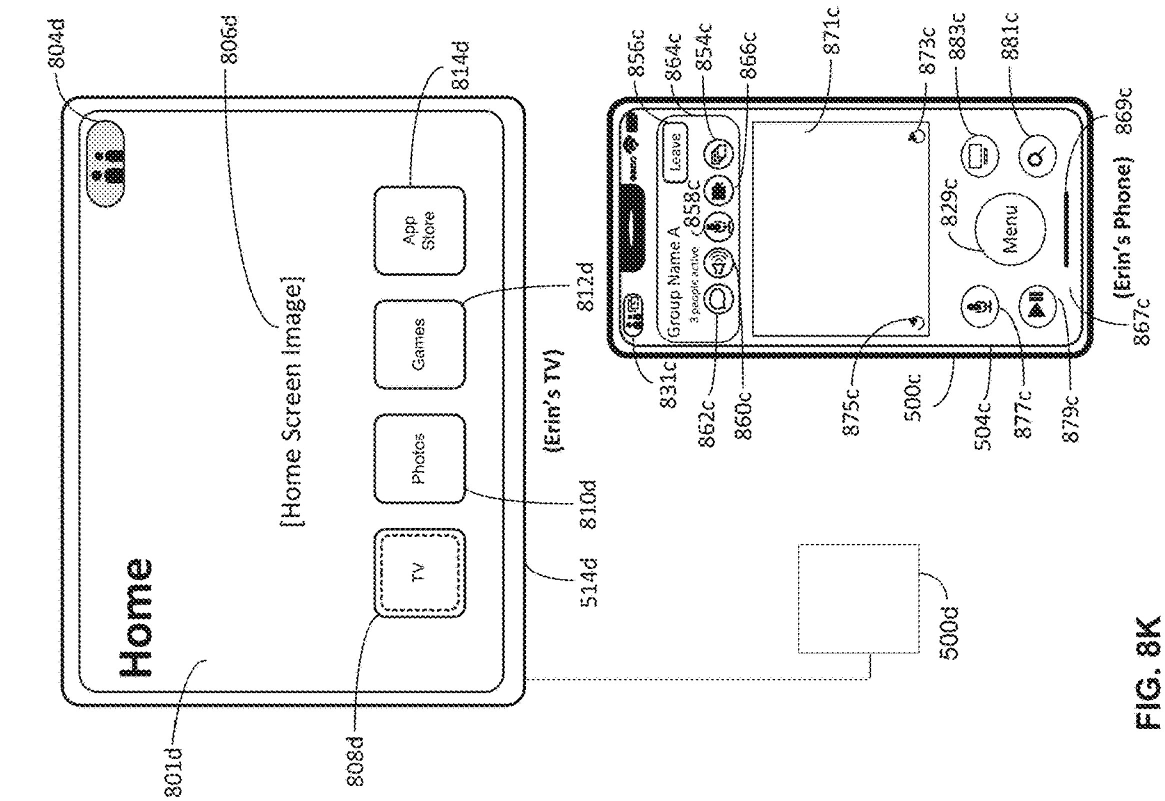
Figure 8N:
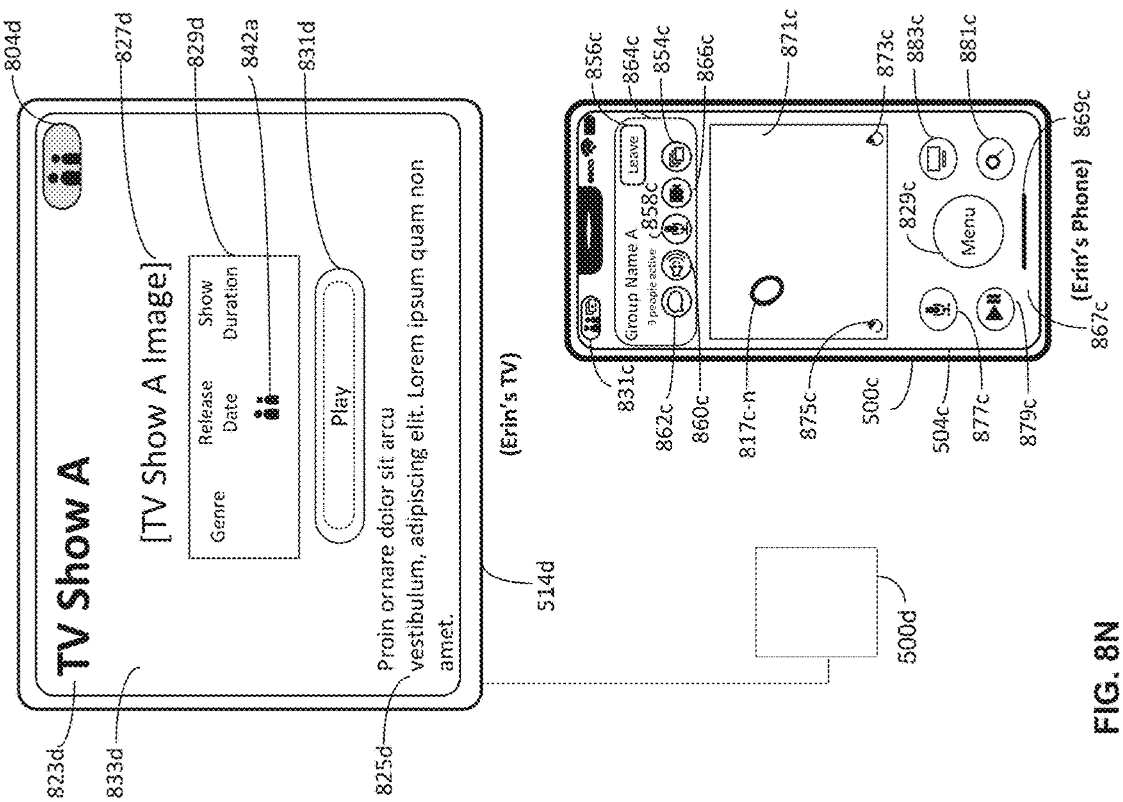
Figure 8M:
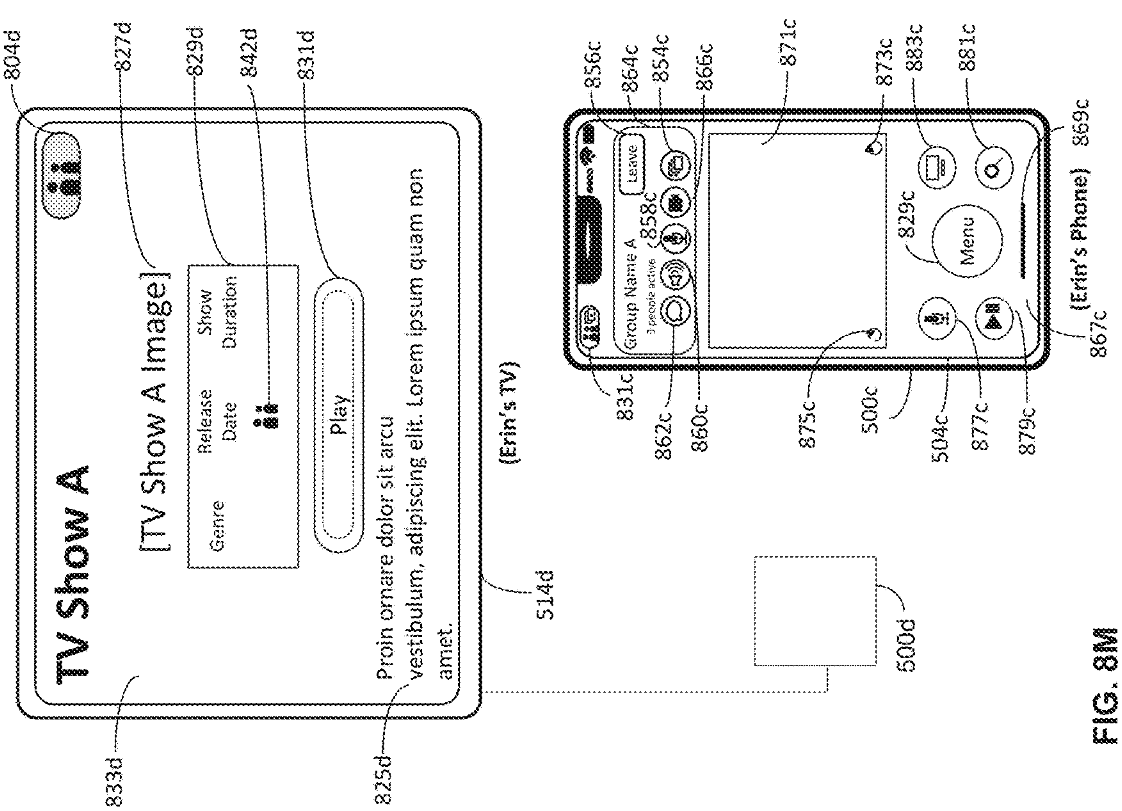
Figure 8P:
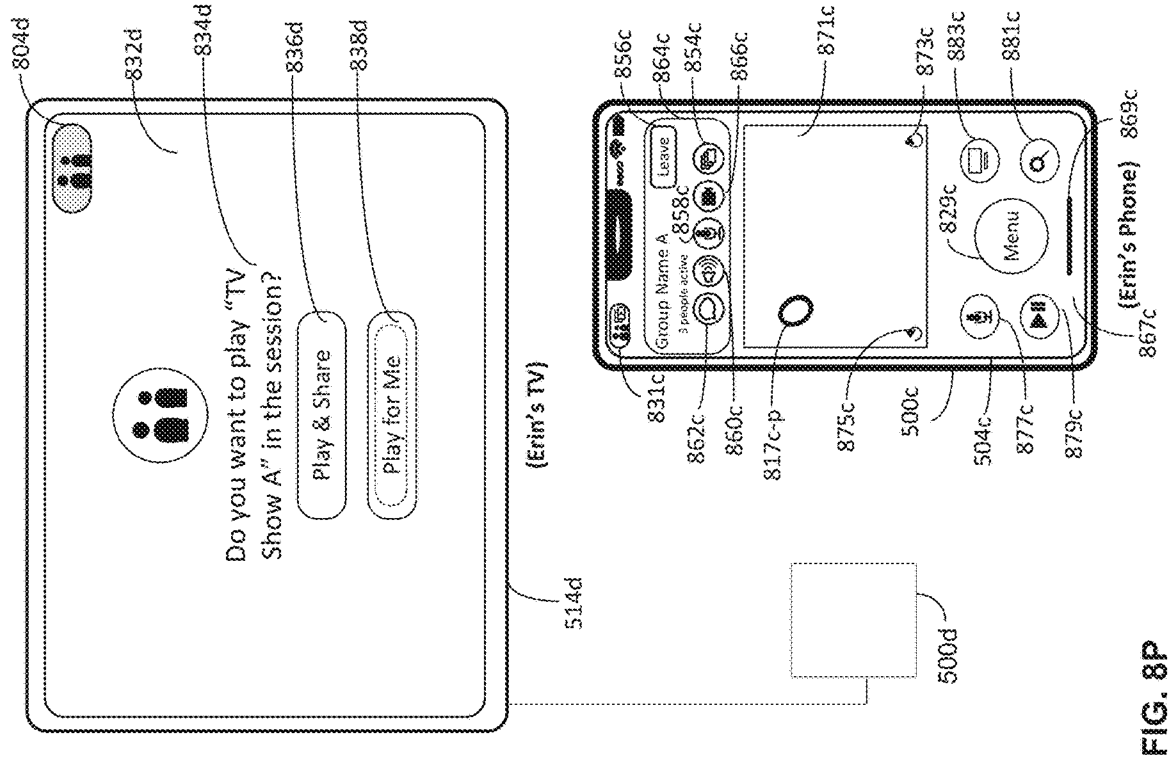
Figure 8O:
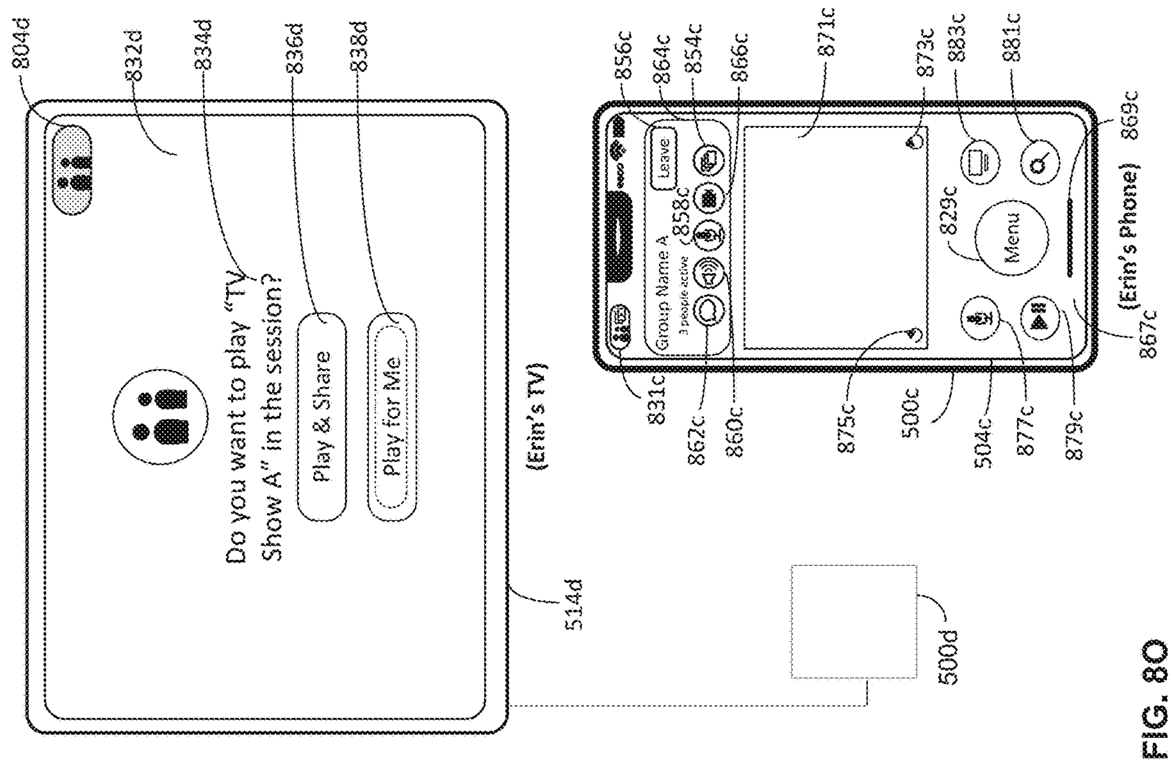
Figures 1, 8P:
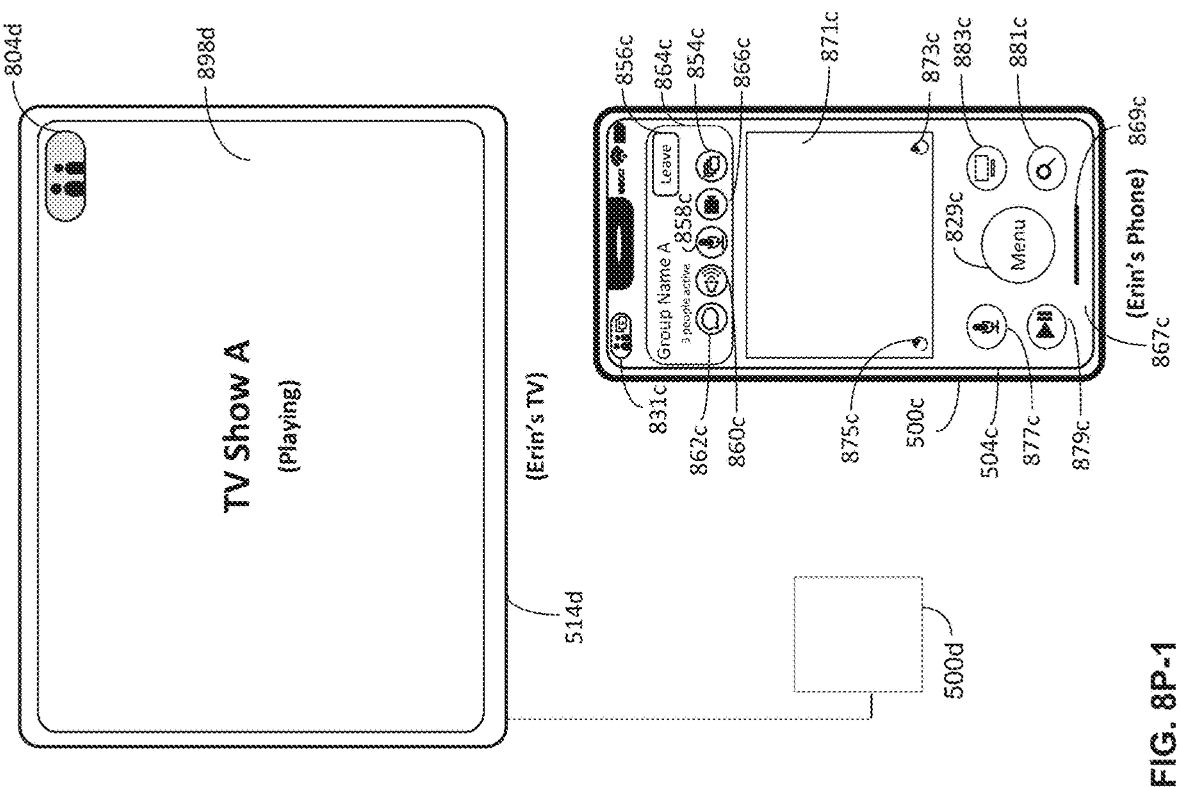
Figure 8Q:
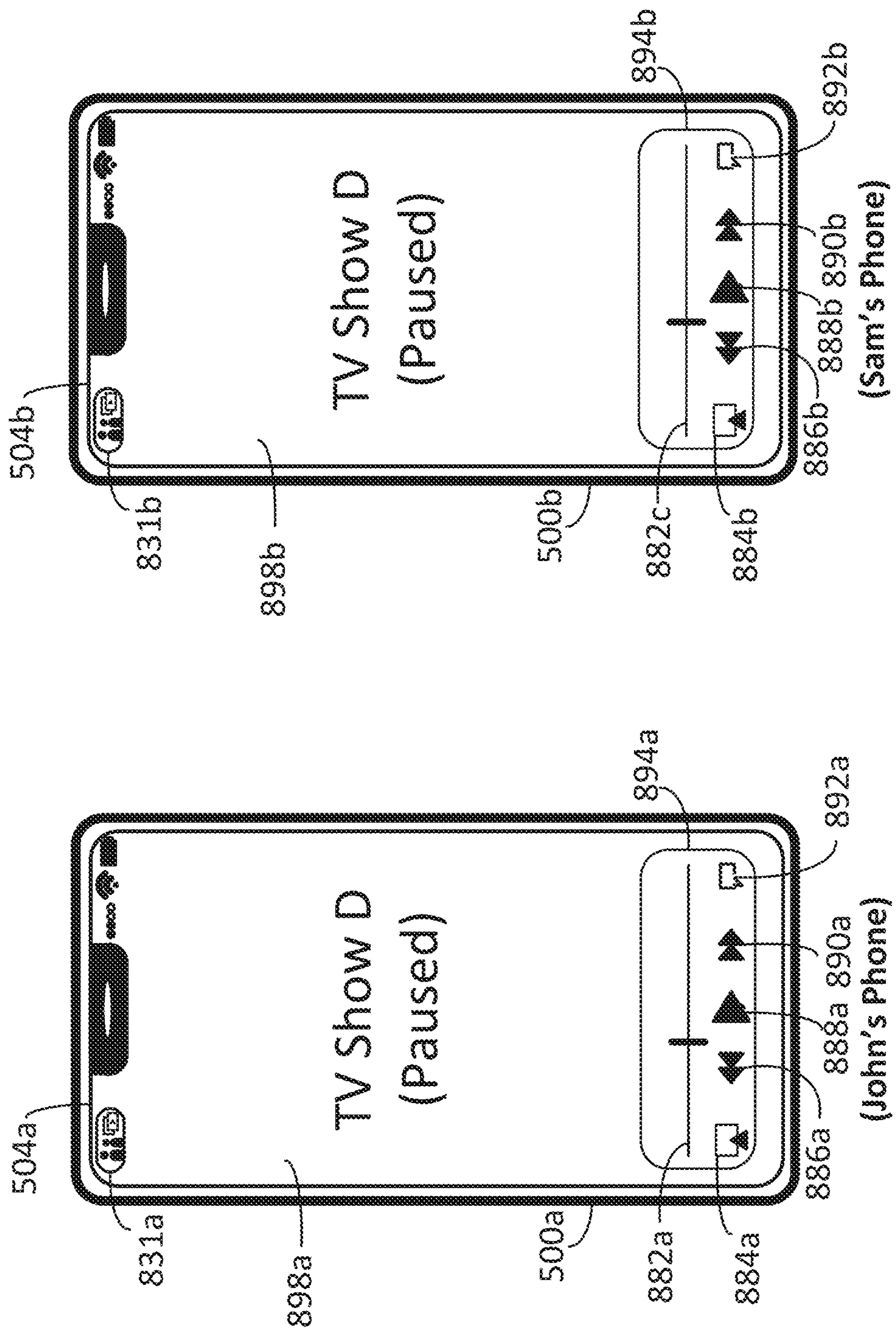
Figure 8S:
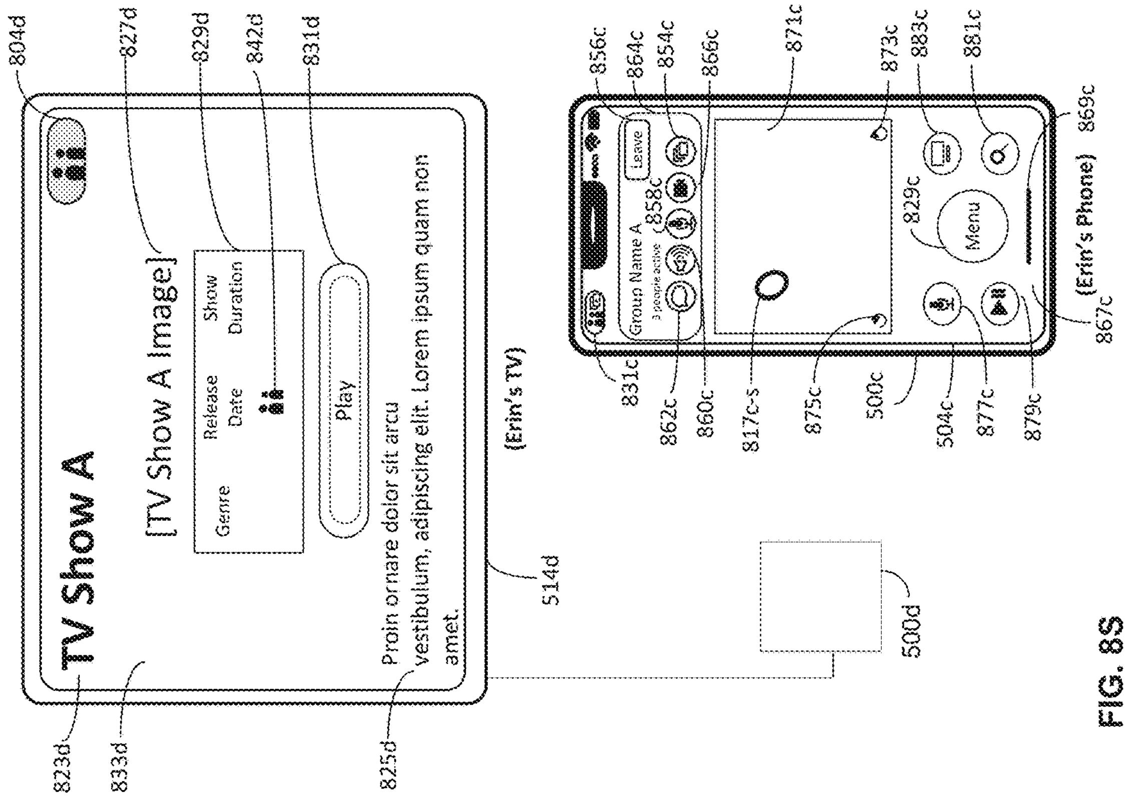
Figure 8R:
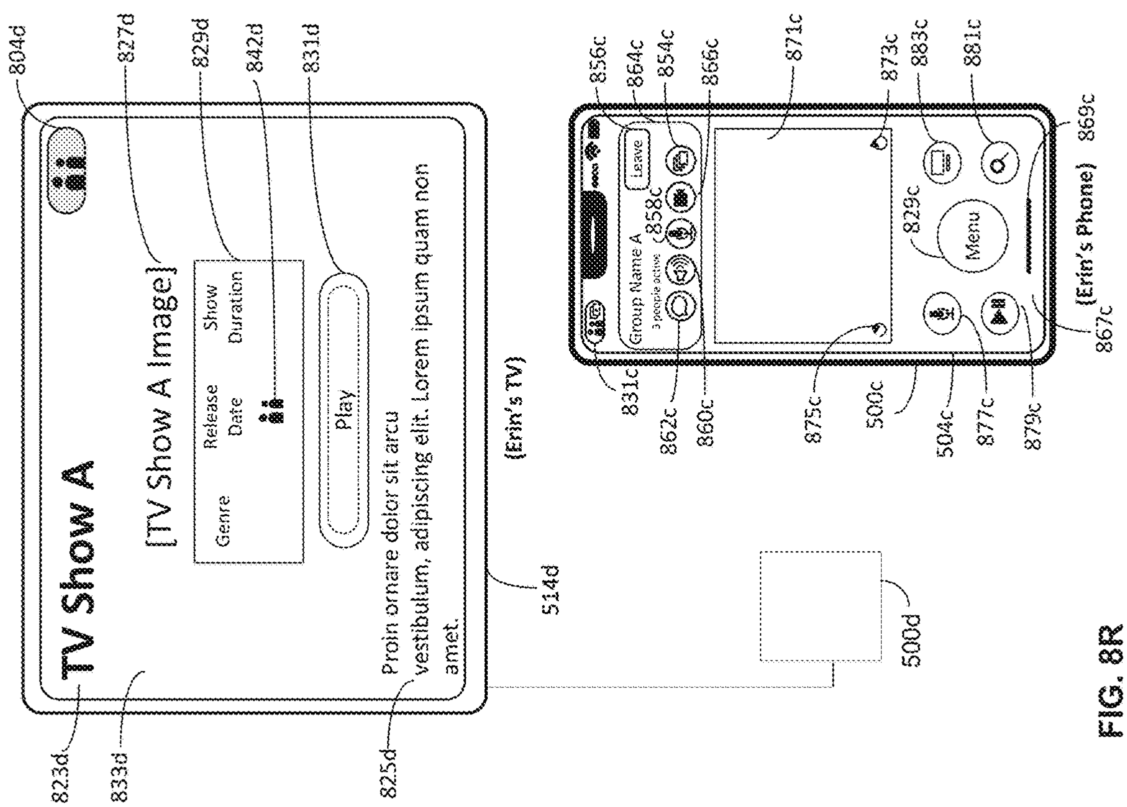

FIGS. 8A-8RR illustrate exemplary ways in which a first electronic device can join and/or add media content to a synchronized media and communication session when an associated second electronic device is part of the synchronized media and communication session in accordance with some embodiments of the disclosure. The embodiments in these figures are used to illustrate the processes described below, including the processes described with reference to FIG. 9. Although FIGS. 8A-8RR illustrate various examples of ways an electronic device is able to perform the processes described below with reference to FIG. 9, it should be understood that these examples are not meant to be limiting, and the electronic device is able to perform one or more processes described below with reference to FIG. 9 in ways not expressly described with reference to FIGS. 8A-8RR.

FIG. 8A illustrates an electronic device 500*c* (Erin's Phone) that is currently part of a synchronized media and communication session and illustrates an electronic device 500*d* (Erin's TV), such as a set-top box 500*d* connected to a television 514*d*, that is not currently part of a synchronized media and communication session. In some embodiments, when a respective electronic device is part of a synchronized media and communication session, the electronic device displays a visual indication indicating that the electronic device is currently part of a synchronized media and communication session and/or controls for interacting with the synchronized media and communication session. For example, in FIG. 8A, because electronic device 500*c* is currently part of a synchronized media and communication session, the electronic device 500*c* displays indication 831*c* indicating that electronic device 500*c* is currently part of a synchronized media and communication session. In some embodiments, indication 831*c* is displayed with different visual appearances based on whether the synchronized media and communication session is playing media or is not currently playing media. In the example shown in FIG. 8A, the indication 831*c* is currently displayed with a visual appearance indicating that the synchronized media and communication session is currently playing a media item (TV Show D).

Additionally, because electronic device 500*c* is currently part of a synchronized media and communication session, the electronic device 500*c* displays an overlay 864*c* (e.g., overlaid on home screen user interface 802*c*) that includes an indication of the group of users that are included in the synchronized media and communication session (e.g., users associated with the Group Name A) and an indication indicating the number of users currently in the synchronized media and communication session (3 people active). Overlay 864*c* also includes a selectable option 854*c* for controlling whether device 500*c* is in a private viewing mode (e.g., a mode which allows device 500*c* to play media content without that media content being added to the synchronized media and communication session), a selectable option 856*c*, which when selected, causes the electronic device 500*c* to leave the synchronized media and communication session, a selectable option 858*c* which mutes/unmutes the microphone of electronic device 500*c* from the synchronized media and communication session, a selectable option 860*c* which is selectable to modify the audio output of the synchronized media and communication session, a selectable option 862*c* which is selectable to cause electronic device 500*c* to display a messaging conversation associated with the users in the synchronized media and communication session (e.g., the users associated with the Group Name A), and a selectable option 866*c* which is selectable to cause the electronic device to display a video chat/call with the users in synchronized media and communication session. Overlay 864*c* and/or the options within overlay 864*c* optionally have one or more of the characteristics of the corresponding overlays described with reference to method 700.

In some embodiments, one or more devices in the synchronized media and communication are not actively displaying the media content currently playing in the synchronized media and communication session. For example, electronic device 500*c* is displaying a home screen user interface 802*c* that includes a plurality of selectable options 424-452 (e.g., such as the home screen user interface described with reference to FIG. 4A) without displaying the media content currently playing in the synchronized media and communication session. In some embodiments, the plurality of selectable options are representations of applications, which when selected, cause the electronic device 500*c* to present user interfaces of an application associated with the selected representation.

In some embodiments, other electronic devices that are associated with an electronic device that is currently part of a synchronized media and communication session (e.g., device 500*c*) display one or more indications that the associated (and/or nearby electronic device) is currently part of a synchronized media and communication session. For example, electronic device 500*d* (Erin's TV) displays indicator 804*d* indicating that electronic device 500*c* is currently part of a synchronized media and communication session. In some embodiments, indication 804*d* is only displayed when electronic devices 500*c* and 500*d* are configured with a same user account (e.g., a user account corresponding to Erin). In some embodiments, indication 804*d* is only displayed when electronic devices 500*c* and 500*d* are within a threshold distance of each other (e.g., 25, 100, 200, 300, 500 feet). While electronic device 500*d* is presenting indication 804*d*, the electronic device 500*d* is also presenting a home screen user interface 801*d* that includes a home screen background 806*d* (represented by [Home Screen Image]) and representations of applications 808*d*-814*d* that, when selected, cause electronic device 500*d* to display user interfaces corresponding to the selected application. In the example of FIG. 8A, representation 808*d* currently has a focus (indicated by the dashed-line box).

FIG. 8B illustrates two of the electronic devices 500*a* and 500*b* that are currently part of the same synchronized media and communication session as electronic device 500*c*. In FIG. 8B, electronic device 500*a* (John's Phone) and electronic device 500*b* (Sam's Phone) are synchronously playing TV Show D (e.g., the media content currently playing in the synchronized media and communication session). Specifically, the electronic device 500*a* is playing TV Show D in media user interface 898*a*, and the electronic device 500*b* is playing TV Show D in media user interface 898*b*. TV Show D is currently paused in the synchronized media and communication session (represented by TV Show D (Paused) in media user interfaces 898*a* and 898*b*), and as a result, electronic devices 500*a* and 500*b* are also displaying overlays 894*a* and 894*b*. Overlay 894*a* includes a scrubber bar 882*a* for scrubbing TV Show D, which also indicates a current playback position in TV Show D (indicated by the solid vertical line). Overlay 894*a* also includes a selectable option 884*a*, which when selected, causes the electronic device 500*a* to initiate a process to stream/play TV Show D at a different electronic device, a selectable option 886*a*, which when selected, causes the electronic device 500*a* to rewind TV Show D by a predetermined amount (e.g., 15, 30, 60, 90 seconds), a selectable option 888*a*, which when selected, causes the electronic device 500*a* to play/pause TV Show D, a selectable option 890*a*, which when selected, causes the electronic device 500*a* to fast-forward TV Show D by a predetermined amount (e.g., 15, 30, 60, 90 seconds), and a selectable option 892*a*, which when selected, causes the electronic device 500*a* to turn on/off subtitles for TV Show D. The overlay 894*b* (and the user interface elements included in overlay 894*b*) is similar to the overlay 894*a* and the selectable options 882*a*-892*a* described above. Further, the synchronized media and communication session and/or the behaviors of device 500*a*, 500*b*, 500*c* and/or 500*d* while part of the synchronized media and communication session are optionally as described with reference to method 700.

In some embodiments, device 500*c* is a multi-function device that is able to transmit control commands to device 500*d*. For example, in FIG. 8C, the electronic device 500*c* detects a downward swipe starting at a location near the top right portion of the touchscreen 504*c* (indicated by touch contact 817*c*-*c* moving in a direction towards the bottom portion of the touch screen 504*c*). In FIG. 8D, in response to device 500*c* detecting the downward swipe, the electronic device 500*c* displays a control center user interface 816*c*. The control center user interface 816*c* includes one or more selectable options for controlling one or more functions/settings of the electronic device 500*c*, such as selectable options for switching Airplane mode on or off, switching Wi-Fi on or off, adjusting the display brightness, and/or controlling other functions/settings of the electronic device 500*c*. Control center user interface 816*c* also includes a selectable option 818*c* that is selectable to display a remote-control user interface for controlling electronic device 500*d*. In FIG. 8E, the electronic device 500*c* detects a selection of selectable option 818*c* (indicated by touch contact 817*c*-*e* selecting selectable object 818*c*). In response, in FIG. 8F, the electronic device 500*c* displays a remote-control user interface 867*c* for controlling electronic device 500*d*. Specifically, remote-control user interface 867*c* includes selectable options 829*c*, 883*c*, 879*c*, 877*c* that correspond to buttons described with reference to remote 510 in FIG. 5B, and when selected, transmit corresponding control commands to the electronic device 500*d*. For example, if the electronic device 500*c* detects a tap on selectable option 873*c*, the electronic device 500*c* optionally transmits a control command to device 500*d* for fast-forwarding a media item that is currently playing at device 500*d* by a predetermined amount (e.g., 15, 30, 60, 90 seconds). The remote-control user interface 867*c* also includes a trackpad area 871*c*, which optionally operates in a similar manner as the touch-sensitive surface 451 on remote 510 described in FIG. 5B. Additionally, in FIG. 8F, because electronic device 500*c* is currently part of a synchronized media and communication (indicated by indication 831*c*, described previously), the electronic device 500*c* displays overlay 864*c*, which was described previously.

In some embodiments, an electronic device can transmit one or more commands for displaying a user interface at a second electronic device. For example, in FIG. 8G, the electronic device 500*c* detects a long tap (indicated by touch contact 817*c*-*g*) at a location corresponding to the selectable option 883*c* (e.g., a touch contact remaining on the touch-sensitive surface 504*c* for more than a threshold amount of time (e.g., 1, 3, 5, 7, 10 seconds)). In response to detecting the long tap at a location corresponding to selectable option 883*c*, electronic device 500*c* transmits a command to device 500*d* for displaying a control center user interface. In response, in FIG. 8H, the electronic device 500*d* displays a control center user interface 845*d*. In some embodiments, the control center user interface 845*d* includes representations of user accounts configured on device 500*d*. For example, in FIG. 8H, electronic device 500*d* is currently configured with user accounts corresponding to users Erin, Alice, and Bob, and as a result, the control center user interface 845 includes a representation 859*d* corresponding to Erin's user account, a representation 857*d* corresponding to Alice's user account, and a representation 855*d* corresponding to Bob's user account. The control center user interface 845*d* also includes a selectable option 853*d* that, when selected, causes the electronic device 500*d* to enter a low power state (e.g., the electronic device remains on, but the display 514*d* associated with device 500*d* is off) or an off state.

In some embodiments, the control center user interface includes information about a synchronized media and communication that a device associated with device 500*d* is part of. In some embodiments, a device is associated with device 500*d* if that device is within a threshold distance of device 500*d* (e.g., 50, 100, 150, 200, 500 feet). For example, control center user interface 845*d* includes indication 851*d*, 847*d*, and 849*d* which indicate information about the synchronized media and communication session that device 500*c* is part of. Indication 851*d* is indicating that electronic device 500*c* is part of a synchronized media and communication session that is playing TV Show D, and that TV Show D is currently paused. Additionally, indication 851*d* also includes a representation of the users that are included in the synchronized media and communication session in which device 500*c* is participating (indicated by the profiles avatars of John's, Erin's, and Sam's user accounts being included in indication 851*d*). Indication 847*d* is indicating that device 500*c* (e.g., a device associated with device 500*d*) is in a synchronized media and communication session ("Session on Erin's Phone"). Indication 849*d* is indicating electronic device 500*c* is currently in a content sharing mode (e.g., a mode which allows the electronic device 500*c* to add media content to the synchronized media and communication session), which will be described in more detail later. In some embodiments, indication 849*d* provides an indication of a respective mode/characteristics of device 500*d* with respect to sharing content in a synchronized media and communication session.

In some embodiments, indication 847*d* is selectable to initiate a process to add electronic device 500*d* to the synchronized media and communication session. For example, in FIG. 8I, the electronic device 500*c* detects a tap on trackpad 871*c* (indicated by touch contact 817*c*-*i*) while indication 847*d* currently has focus. In response, the device 500*c* transmits a click command to device 500*d*. In FIG. 8J, in response to device 500*d* receiving the click command while the indication 847*d* had the focus, the device 500*d* initiates a process to join (e.g., become part of) the same synchronized media and communication that is currently associated with device 500*c*. Additionally, because electronic device 500*d* joined the synchronized media and communication session, electronic device 500*d* displays indication 831*d* indicating that device 500*d* is now part of a synchronized media and communication session (e.g., in addition to device 500*c* being part of the synchronized media and communication session).

Additionally, or alternatively, electronic device 500*d* can also join (e.g., become part of) the synchronized media and communication associated with device 500*c* when the electronic device 500*d* receives a request to play a respective media item. For example, in FIG. 8K, electronic device 500*d* is not currently part of a synchronized media and communication session (indicated by the indication 804*d* displayed by device 500*d*, described previously), though device 500*c* is. In FIG. 8L, while the electronic device 500*d* is not currently part of a synchronized media and communication session and while the representation 808*d* currently has focus, device 500*c* transmits a click command to device 500*d* (e.g., in response to contact 817*c*-1 on trackpad 871*c*). After the electronic device 500*d* receives the click command in FIG. 8L, the electronic device 500*d* displays a media browsing application (e.g., the application corresponding to representation 808*d*) and receives a sequence of one or more inputs for navigating to a user interface 833*d* for TV Show A, as illustrated in FIG. 8M.

In FIG. 8M, the user interface 833*d* for TV Show A includes a background image for TV Show A 827*d* (represented by [TV Show A Image]), information 829*d* about TV Show A, an indication 842*d* indicating that TV Show A can be played in a synchronized media and communication session, an affordance 831*d* which is selectable to cause the electronic device 500*d* to start playing TV Show A, and a description 825*d* of TV Show A. In some embodiments, user interface 833*d* includes indication 842*d* if device 500*d* is currently participating in a synchronized media and communication session, and does not include indication 842*d* if device 500*d* is not currently participating in a synchronized media and communication session. As shown in FIG. 8M, information 829*d* includes information about the genre of TV Show A, the release date of TV Show A, and the duration/length of TV Show A. In FIG. 8N, the electronic device 500*c* receives a tap on trackpad 871*c* (indicated by touch contact 817*c*-*n*) while affordance 831*d* currently has focus (indicated by the dash-lined ellipse in affordance 831*d*). In response the device 500*c* transmits a click command to device 500*d.*

In FIG. 8O, in response to the electronic device 500*d* receiving the click command while the affordance 831*d* had focus, the electronic device 500*d* initiates a process play TV Show A. Specifically, in response to receiving the input selecting affordance 831*d* in FIG. 8N, the electronic device displays user interface 832*d*. User interface 832*d* includes text 834*d* prompting a user of device 500*d* to indicate how TV Show A should be played ("Do you want to play "TV Show A" in the session?"), and selectable options 836*d* and 838*d*. Selectable option 836*d* is selectable to cause the electronic device 500*d* to play TV Show A and to cause TV Show A to start playing in the synchronized media and communication session associated with device 500*c*. Selectable option 838*d* is selectable to cause the electronic device 500*d* to play TV Show A without causing TV Show A to be played in the synchronized media and communication session associated with device 500*c*.

In FIG. 8P, the electronic device 500*d* receives a selection of selectable option 838*d* (indicated by touch contact 817*c*-*p* tapping tracking 871*c* while selectable option 838*d* has the focus (represented by the dashed-line ellipse)). In response to detecting selection of selectable option 838*d* (Play for Me), the electronic device 500*d* starts playing TV Show A in media user interface 898*d*, as illustrated in FIG. 8P-1. Additionally, in the example of FIG. 8P-1, TV Show A is not added to the synchronized media and communication session associated with device 500*c* because the electronic device 500*d* detected selection of selectable option 838*d* (e.g., the option associated with playing content at device 500*d* without causing that content starting to play in a synchronized media and communication session).

In FIG. 8Q, because TV Show A was not added to the synchronized media and communication session, the media content currently playing in the synchronized media communication is not modified. Specifically, electronic devices 500*a* and 500*b* are still synchronously playing TV Show D (e.g., the media content currently playing in synchronized media and communication session before device 500*d* received the input to play TV Show A), as described with reference to FIG. 8B.

Figure 8T:
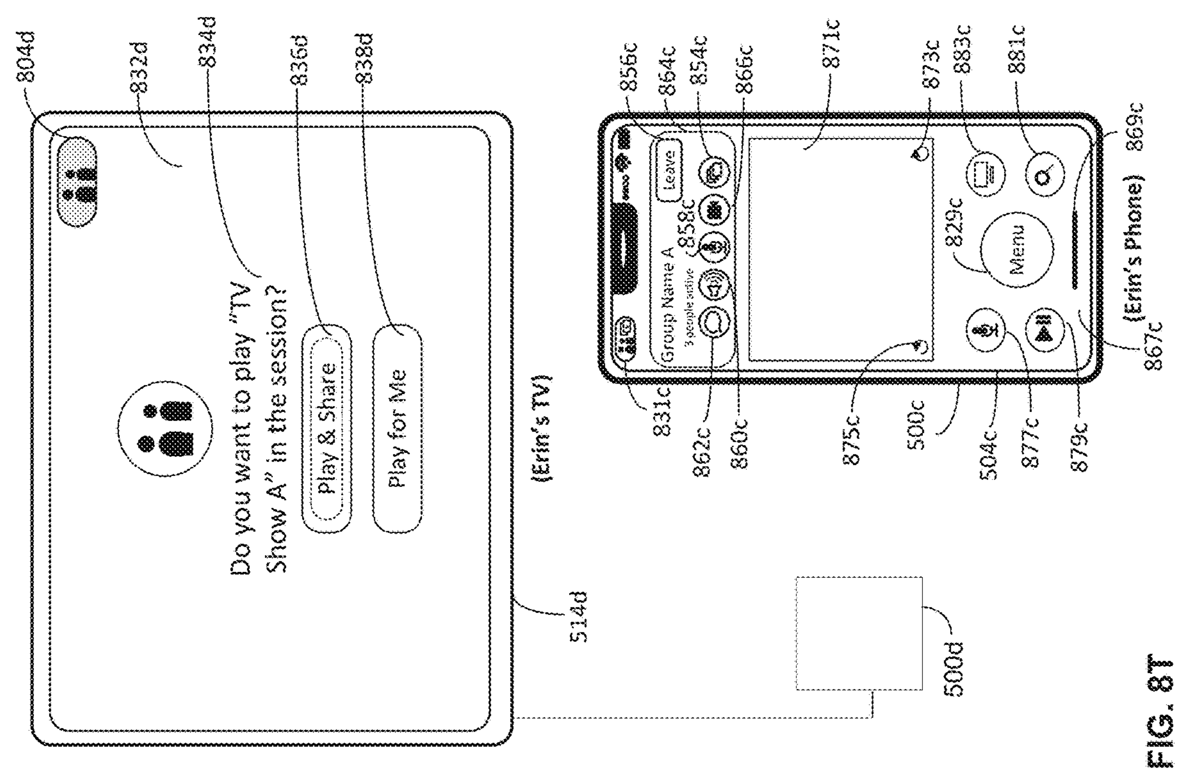

As described previously, in some embodiments, an electronic device that is not currently part of a synchronized media and communication session can cause media content to start playing in a synchronized media and communication associated with an associated second electronic device. For example, in FIG. 8R, device 500*d* is displaying a user interface 833*d* for TV Show A, which was described previously with reference to FIG. 8M. In FIG. 8S, while electronic device 500*d* is displaying the user interface 833*d*, the electronic device 500*d* detects a selection of affordance 831*d* for playing TV Show A (indicated by touch contact 817*c*-*s* tapping trackpad 871*c* while affordance 831*d* has focus). In response, the electronic device 500*d* initiates a process to play TV Show A, as shown in FIG. 8T.

Figure 8U:
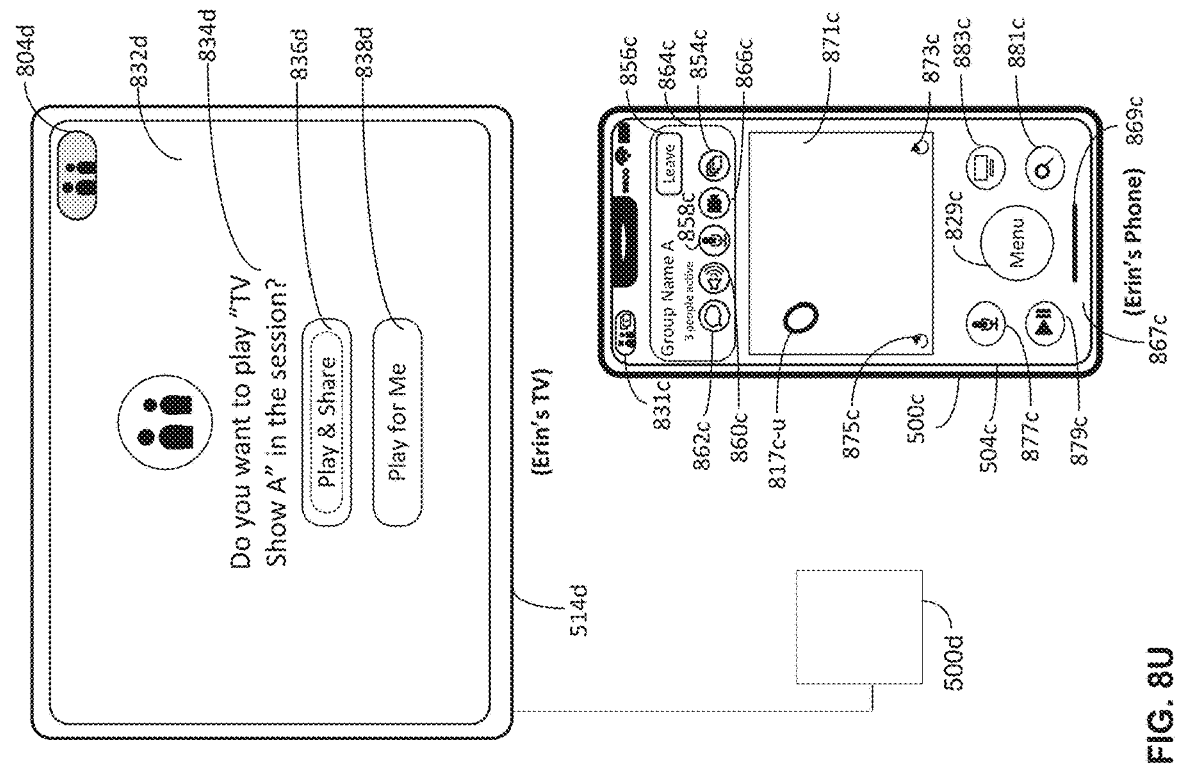

As described previously and as illustrated in FIG. 8T, in some embodiments, if an electronic device associated with device 500*d* (e.g., electronic device 500*c*) is part of a synchronized media and communication session when electronic device 500*d* receives a request to play a media item, the electronic device displays user interface 832*d*. User interface 832*d* includes a selectable option 836*d* for adding TV Show A to the synchronized media and communication session associated with device 500*c* and a selectable option 838*d* for playing TV Show A at the electronic device 500*d* without adding TV Show A to the synchronized media and communication session associated with electronic device 500*c*. In FIG. 8U, the electronic device 500*d* detects a selection of selectable option 836*d* (indicated by touch contact 817*c*-*u* tapping trackpad 871*c* while selectable option 836*d* is displayed with focus). In response to detecting the selection of selectable option 836*d*, the electronic device 500*d* initiates a process to add TV Show A to the synchronized media and communication associated with the device 500*c*.

In some embodiments, for TV Show A to be added to the synchronized media and communication associated with device 500*c*, the electronic device 500*c* (e.g., the device associated with the synchronized media and communication) needs to accept/confirm the request to add TV Show A to the synchronized media and communication session. For example, in FIG. 8V, after electronic device 500*d* received the request to play TV Show A in the synchronized media and communication session and before playing TV Show A in the synchronized media and communication session, the electronic device 500*d* displays user interface 840*d*. User interface 840*d* includes an indication 841*d* indicating that device 500*c* (Erin's Phone) needs to approve the request to add TV Show A to the synchronized media and communication session associated with device 500*c*. Additionally, in response to electronic device 500*d* receiving the request to play TV Show A in the synchronized media and communication session, the electronic device 500*c* displays an indication 842*c* that is selectable to add TV Show A to the synchronized media and communication session. Specifically, indication 842*c* indicates that selecting the indication will cause TV Show A to play in the synchronized media and communication session.

Figure 8W:
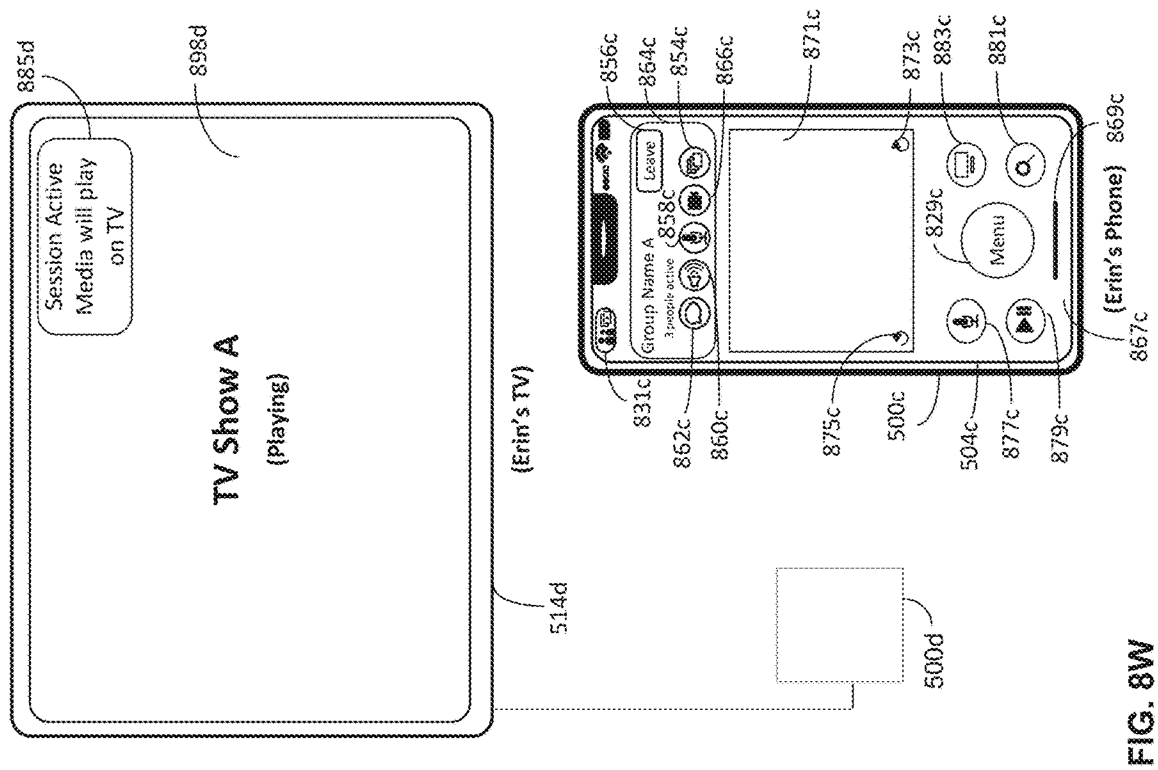
Figure 8V:
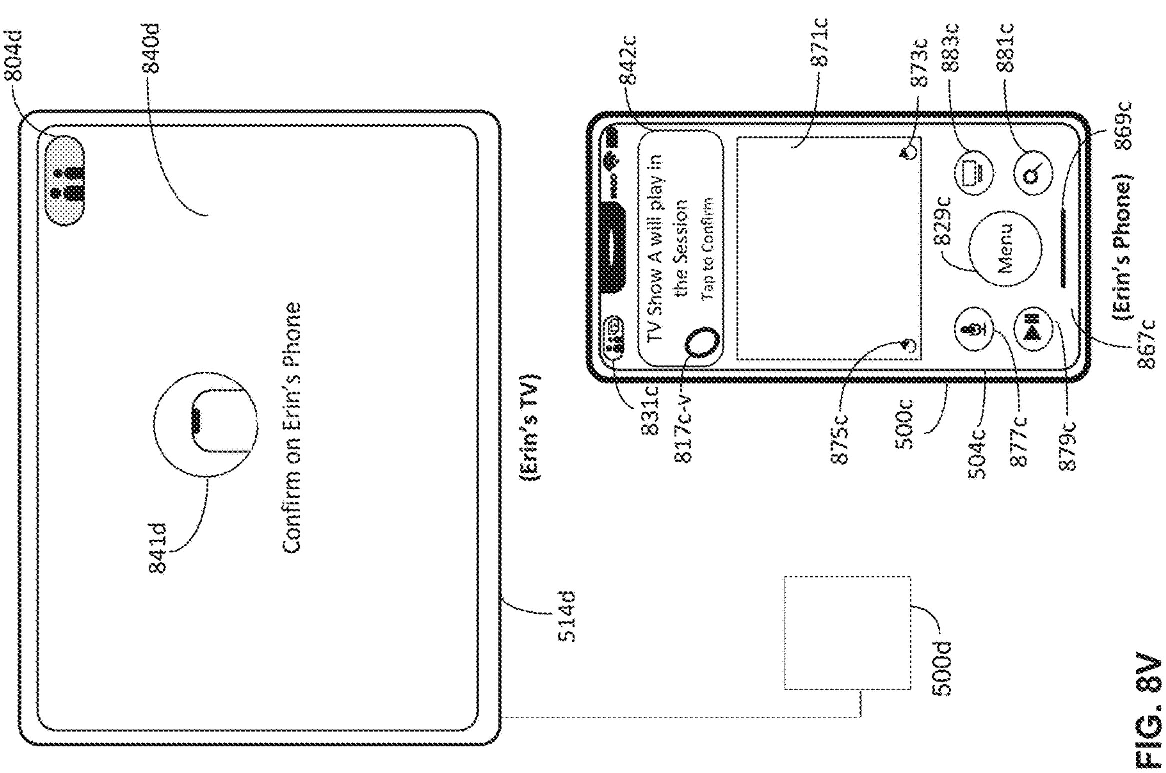

In FIG. 8V, while device 500*c* is displaying indication 842*c*, the electronic device 500*c* detects a selection of indication 842*c* (indicated by touch contact 817*c-v* selecting indication 842*c*). In FIG. 8W, in response to electronic device 500*c* detecting the selection of indication 842*c* in FIG. 8V, TV Show A starts playing in the synchronized media and communication session and starts playing in media user interface 898*d*. Additionally, in response to electronic device 500*c* detecting the selection of indication 842*c* in FIG. 8V, the electronic device 500*d* becomes part of the synchronized media and communication session (e.g., the same synchronized media and communication that electronic device 500*c* is part of). The electronic device 500*d* also displays an indication 885*d* indicating that electronic device 500*d* is now part of the synchronized media and communication session associated with device 500*c*, and that the media playing in the synchronized media and communication session—TV Show A—is now playing on the device 500*d*.

Figure 8X:
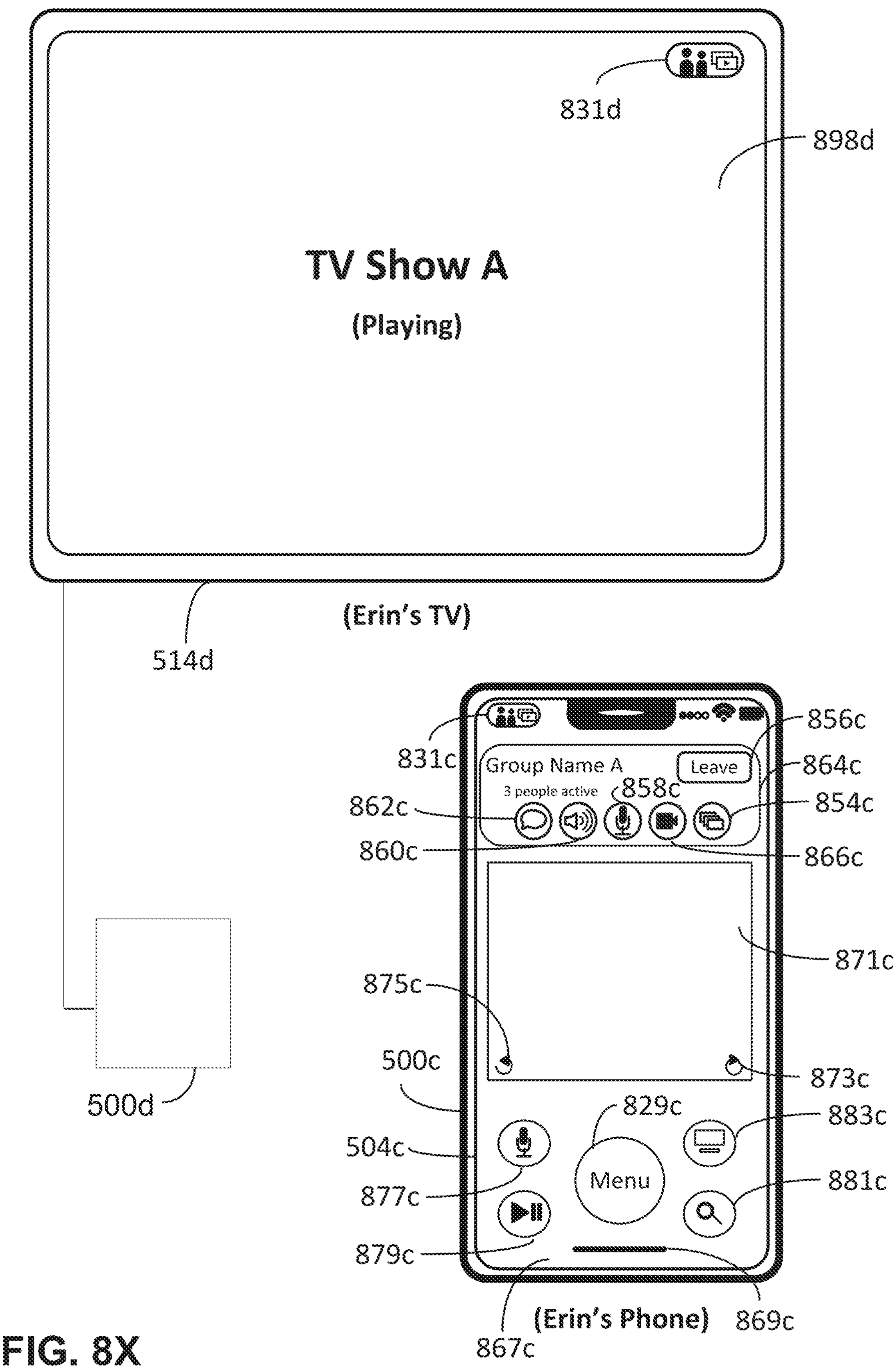
Figure 8Y:
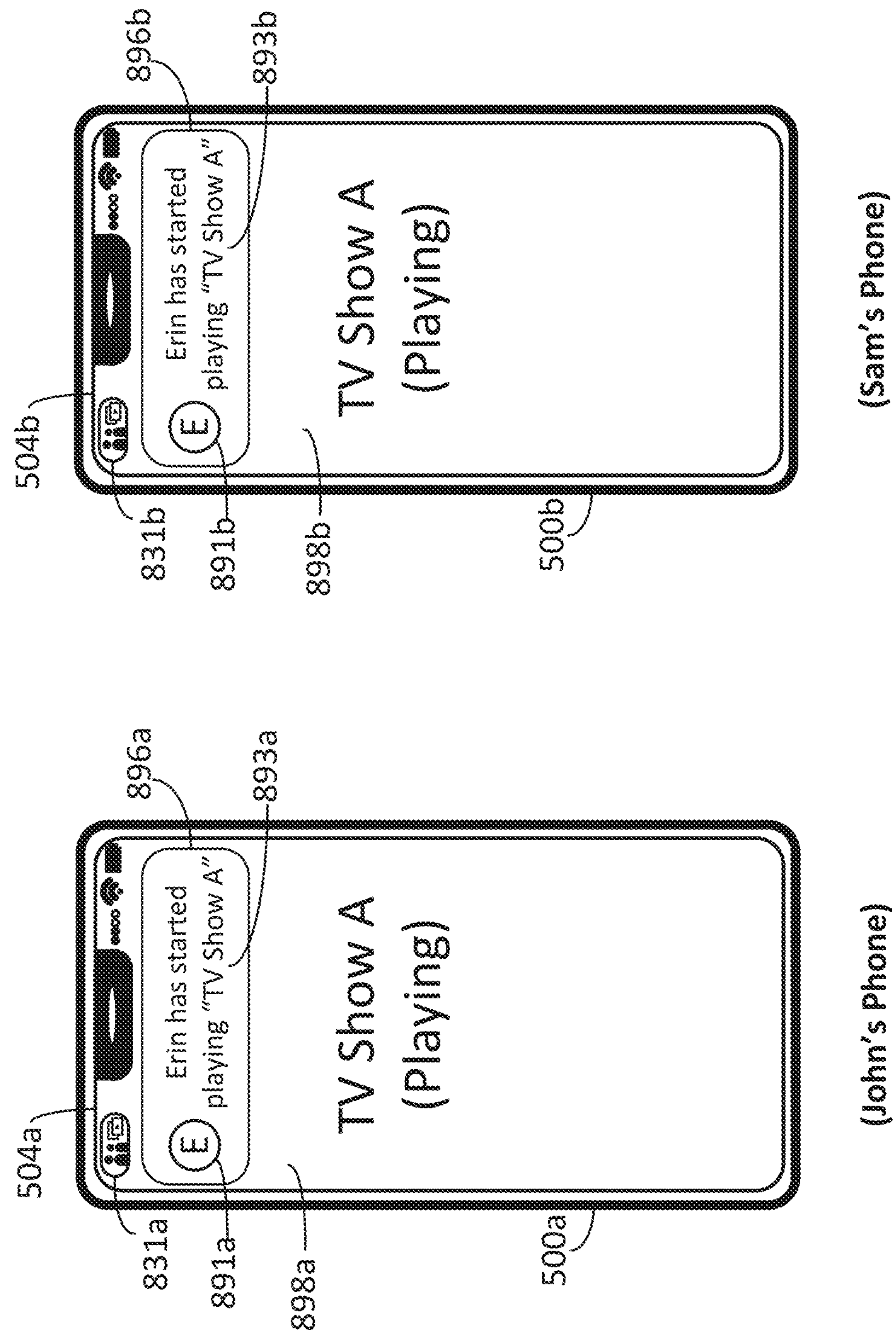
Figure 8A:
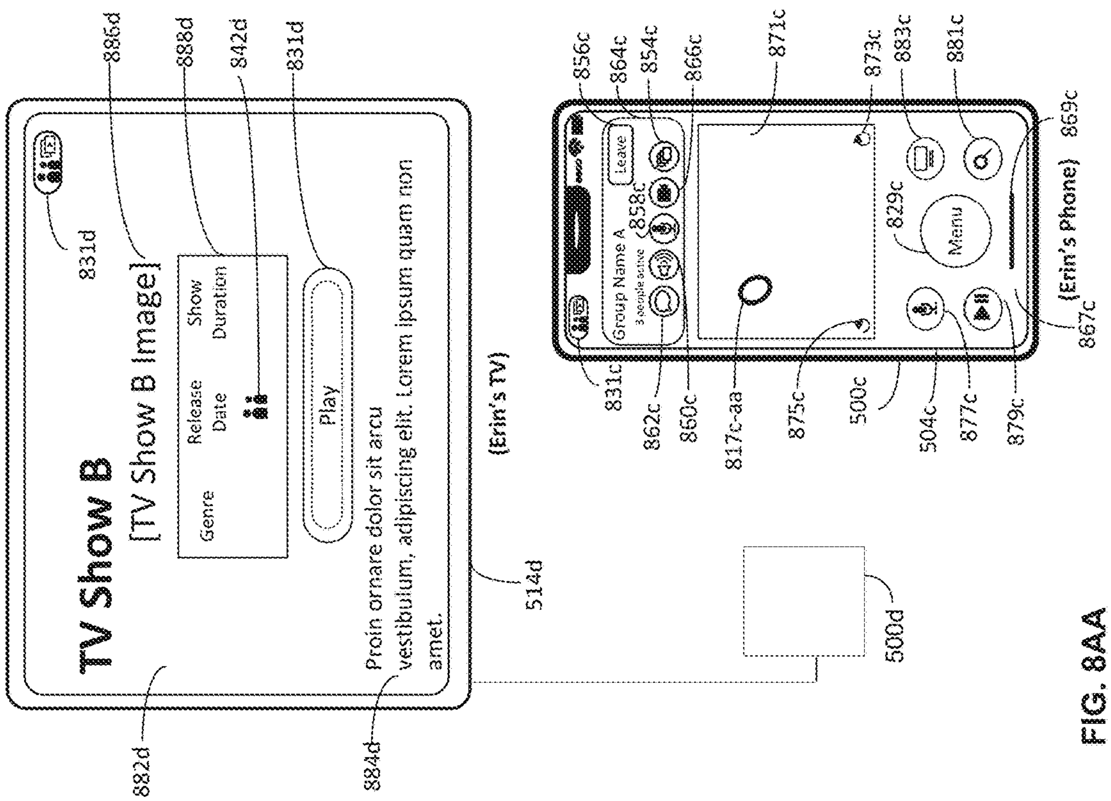

In some embodiments, after electronic device 500*d* displays indication 885*d* for a respective amount of time (e.g., 10, 20, 30, 60 seconds), the electronic device ceases displaying indication 885*d* and starts displaying indication 831*d*, as shown in FIG. 8X. Indication 831*d* is similar to the previously described indication 831*c* and is indicating that electronic device 500*d* is currently part of a synchronized media and communication session. Additionally, the visual appearance of indication 831*d* is indicating that media content (e.g., TV Show A) is currently playing in the synchronized media and communication session.

In some embodiments, when an electronic device that is part of a synchronized media and communication session modifies playback of media content currently playing in the session, that electronic device transmits, directly or indirectly (e.g., via one or more servers), an indication that the media content playing in the session has been modified. For example, in FIG. 8Y, devices 500*a* and 500*b*, which are part of the same synchronized media and communication session as device 500*d*, receive an indication that the media content currently playing in the synchronized media and communication session has changed from TV Show D to TV Show A. In response to receiving the indication, device 500*a* ceases playing TV Show D (e.g., the media item previously playing in the synchronized media and communication session) and starts playing TV Show A (e.g., the media item recently added to the synchronized media and communication session by device 500*d*). Additionally, in response to receiving the indication, device 500*a* also displays indication 896*a*. Indication 896*a* includes text 893*a* indicating why the synchronized media and communication session started playing TV Show A (Erin has started playing "TV Show A") and indicates the user associated with the device that modified the playback in the synchronized media and communication session (representation 891*a* of Erin). Device 500*b* (Sam's Phone) plays TV Show A and displays indication 896*b* in a similar manner described above with reference to device 500*a*.

In some embodiments, if a request to play a respective media is received while an electronic device is already part of a synchronized media and communication session, the electronic device starts playing the new media item in the synchronized media and communication session without displaying the selectable options 836*d* and 838*d* illustrated in FIG. 8T (e.g., the selectable options for designating if the TV Show A should be added to synchronized media and communication session or if the TV Show A should be played without adding the show to the synchronized media and communication session).

Figure 8Z:
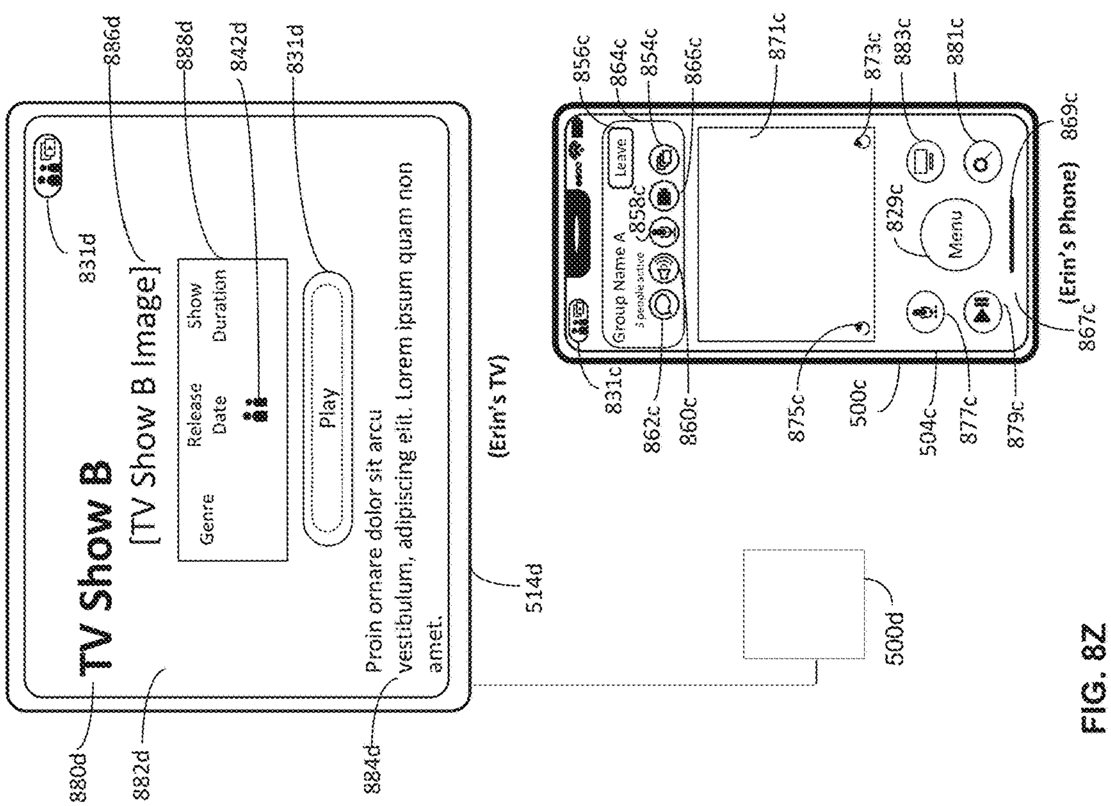
Figure 8B:
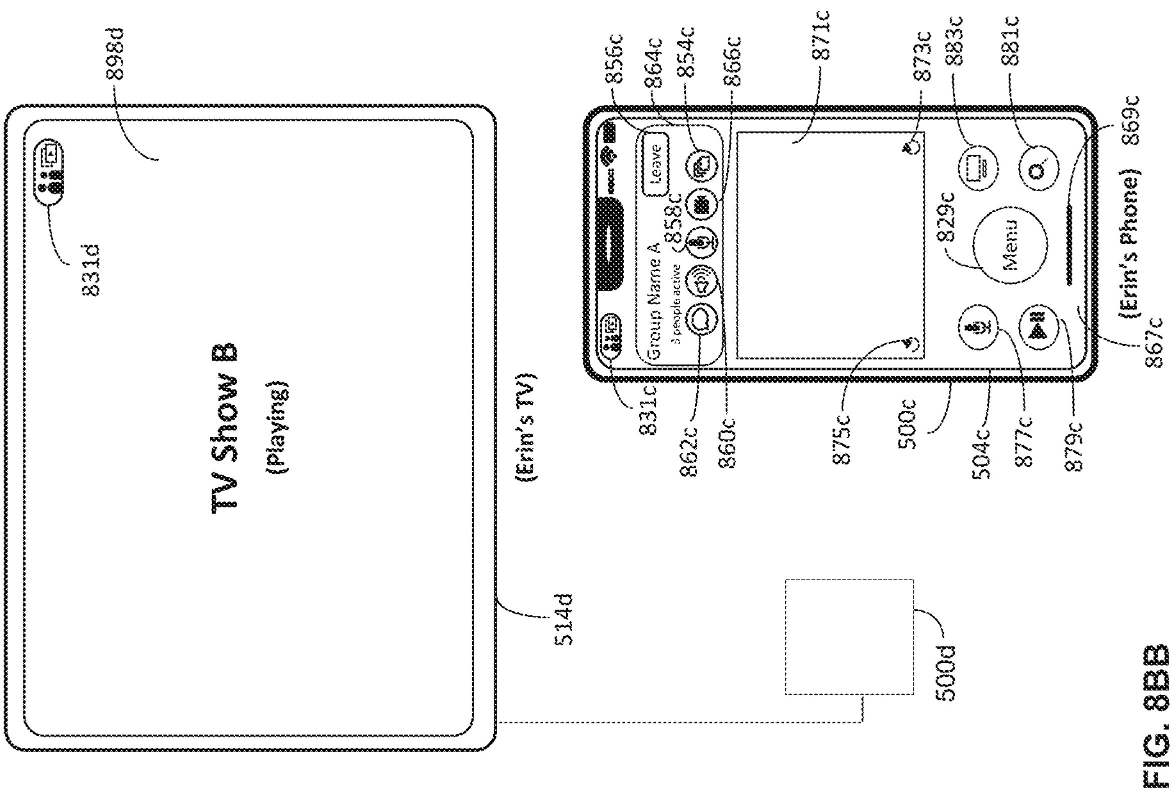
Figure 8C:
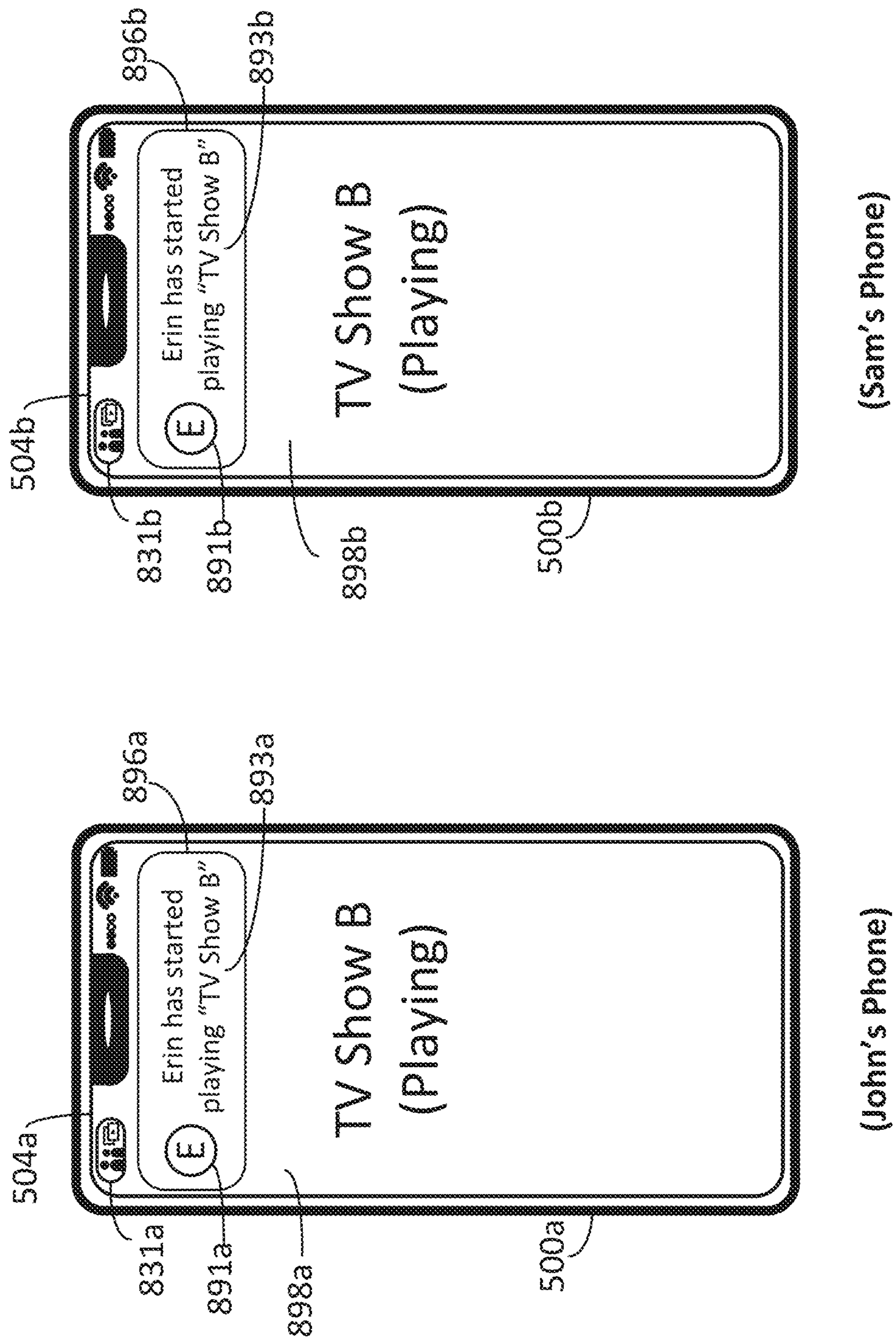
Figure 8E:
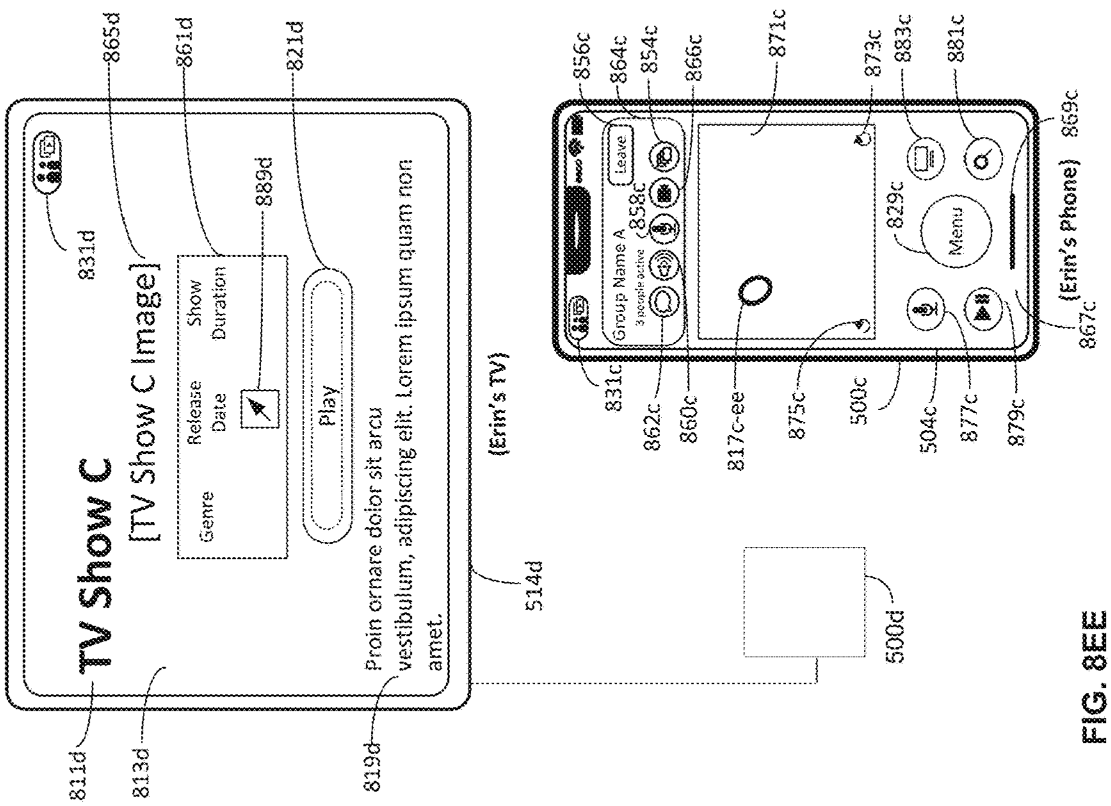
Figure 8D:
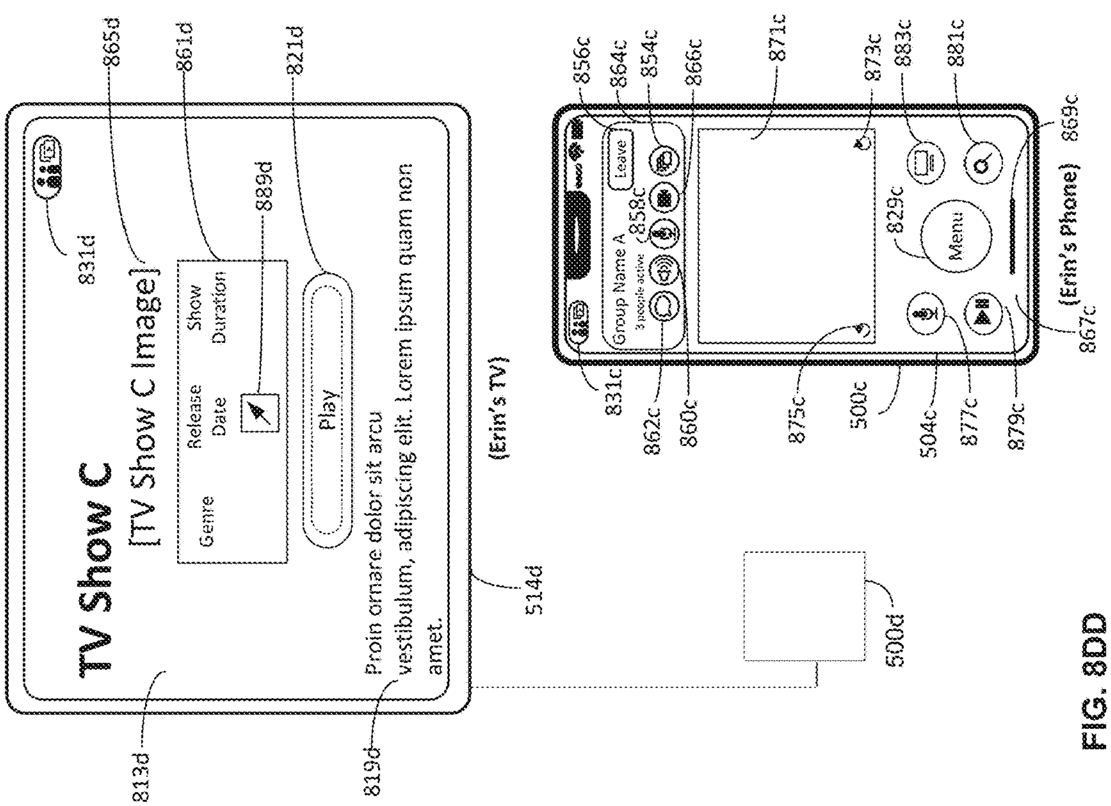
Figure 8F:
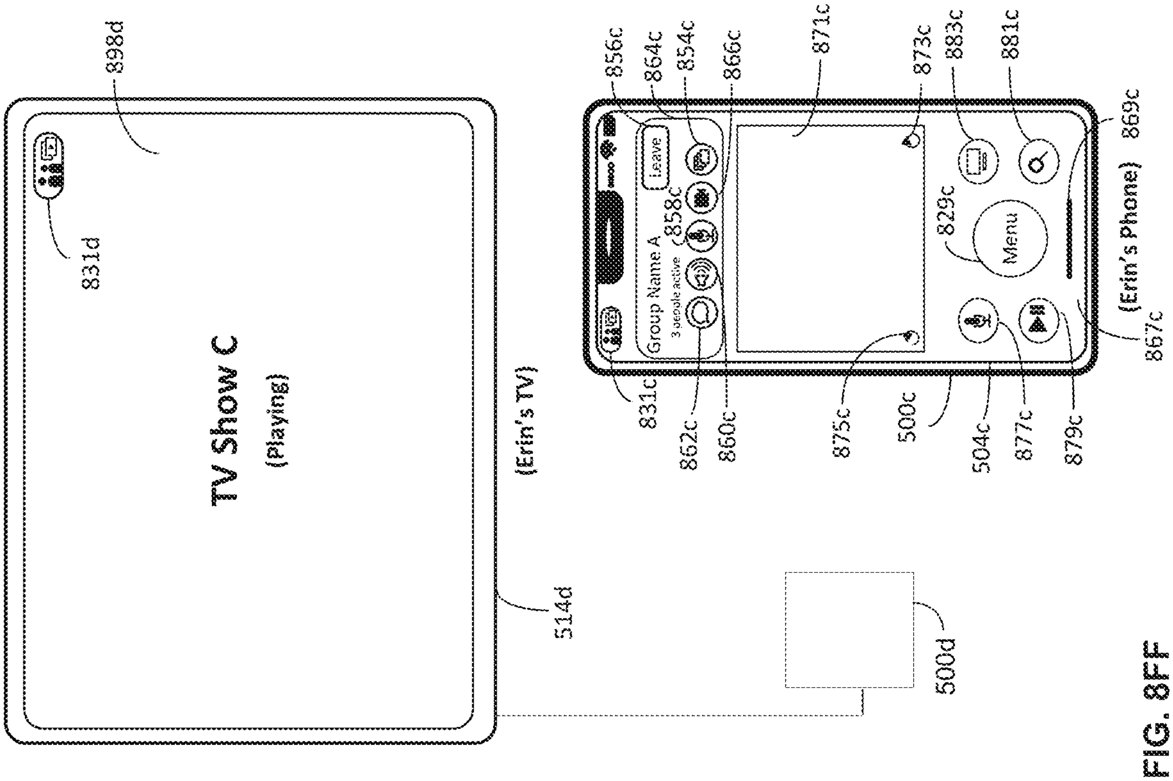
Figure 8G:
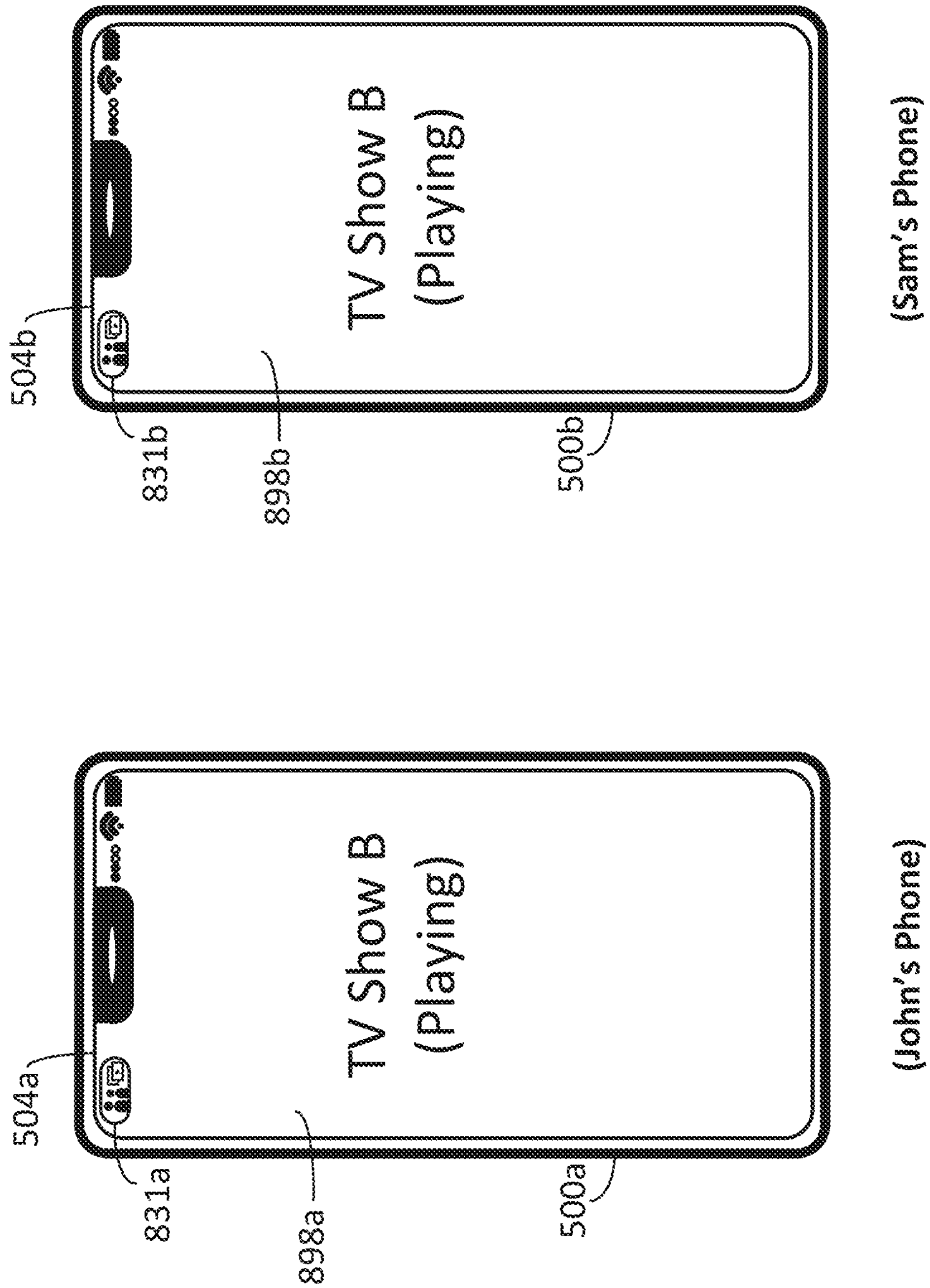
Figure 8I:
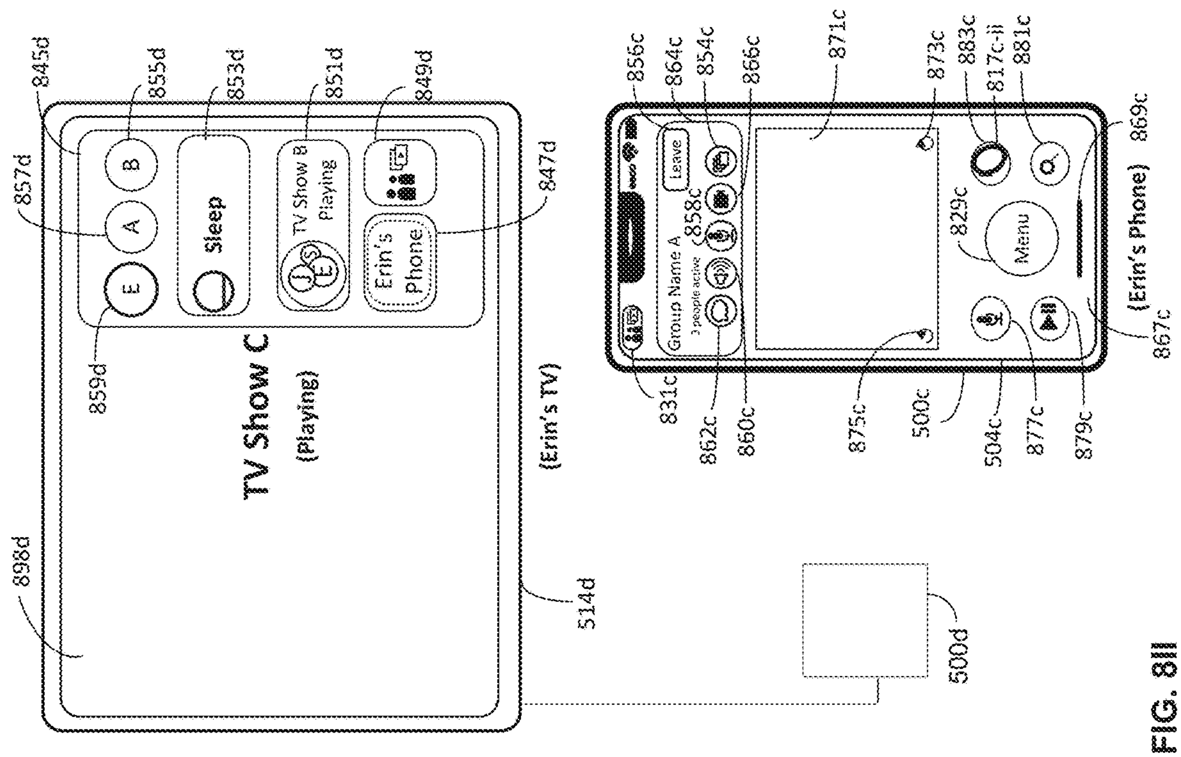
Figure 8H:
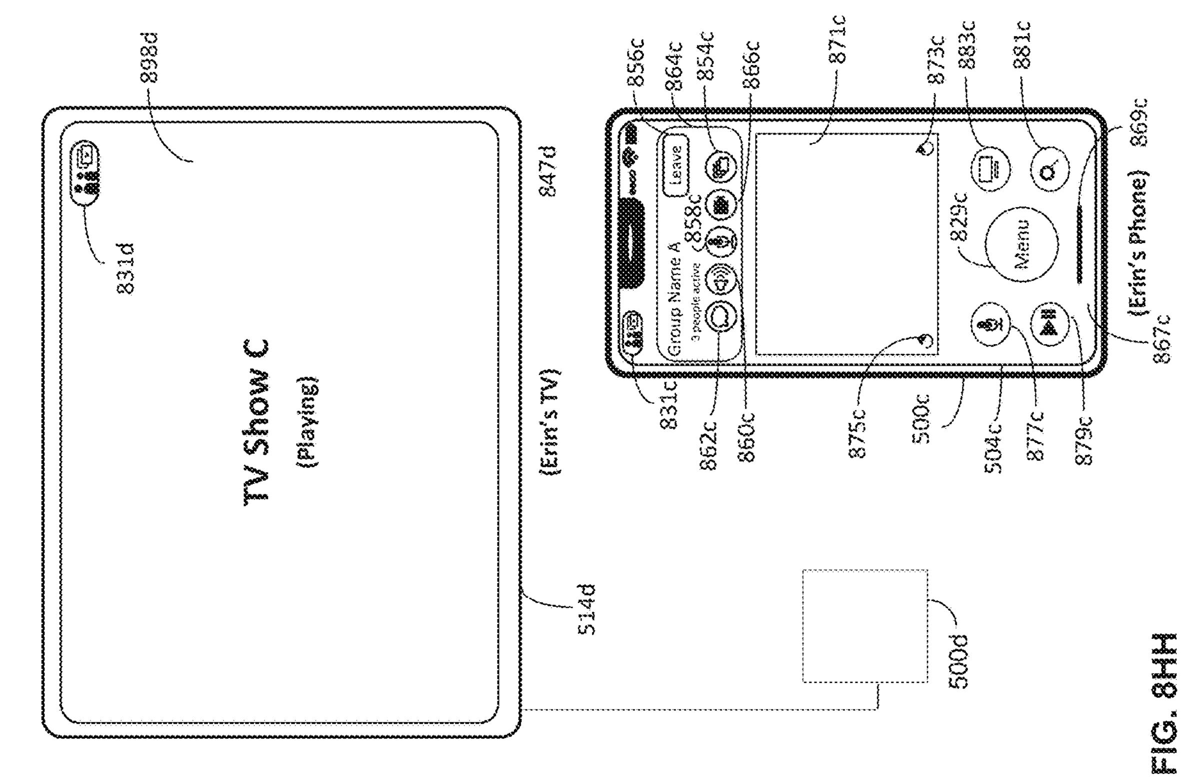
Figure 8J:
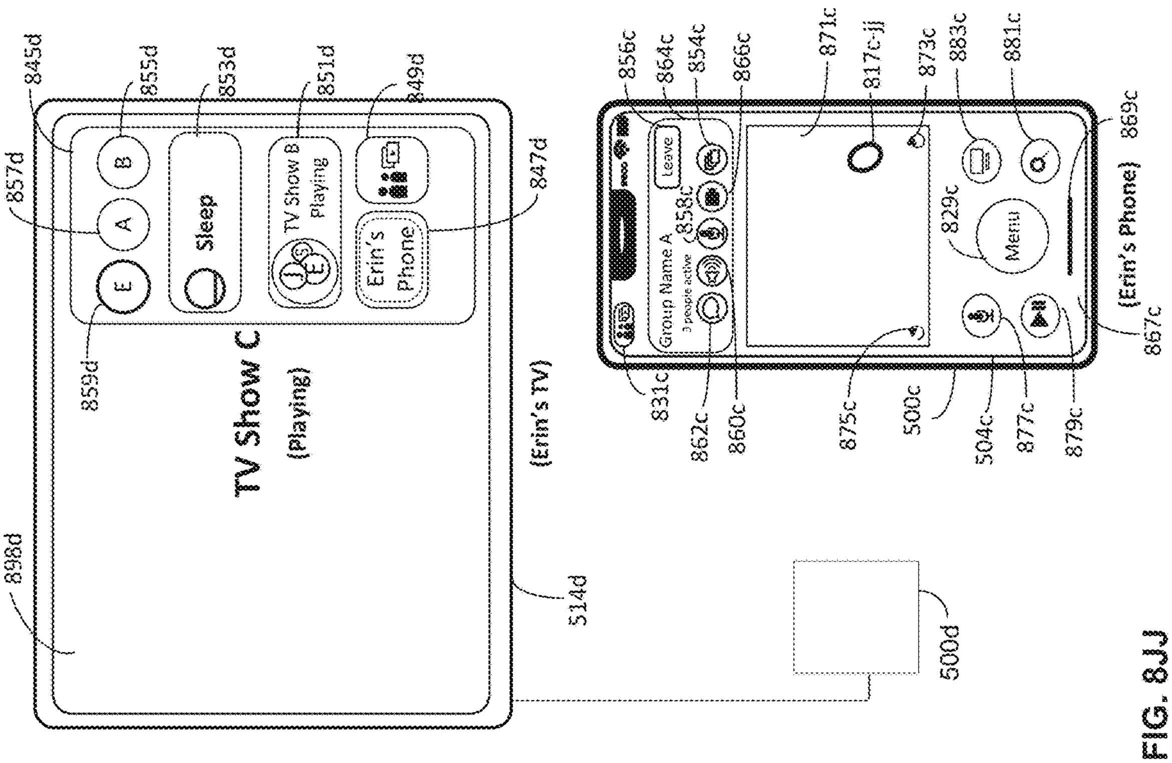
Figure 8K:
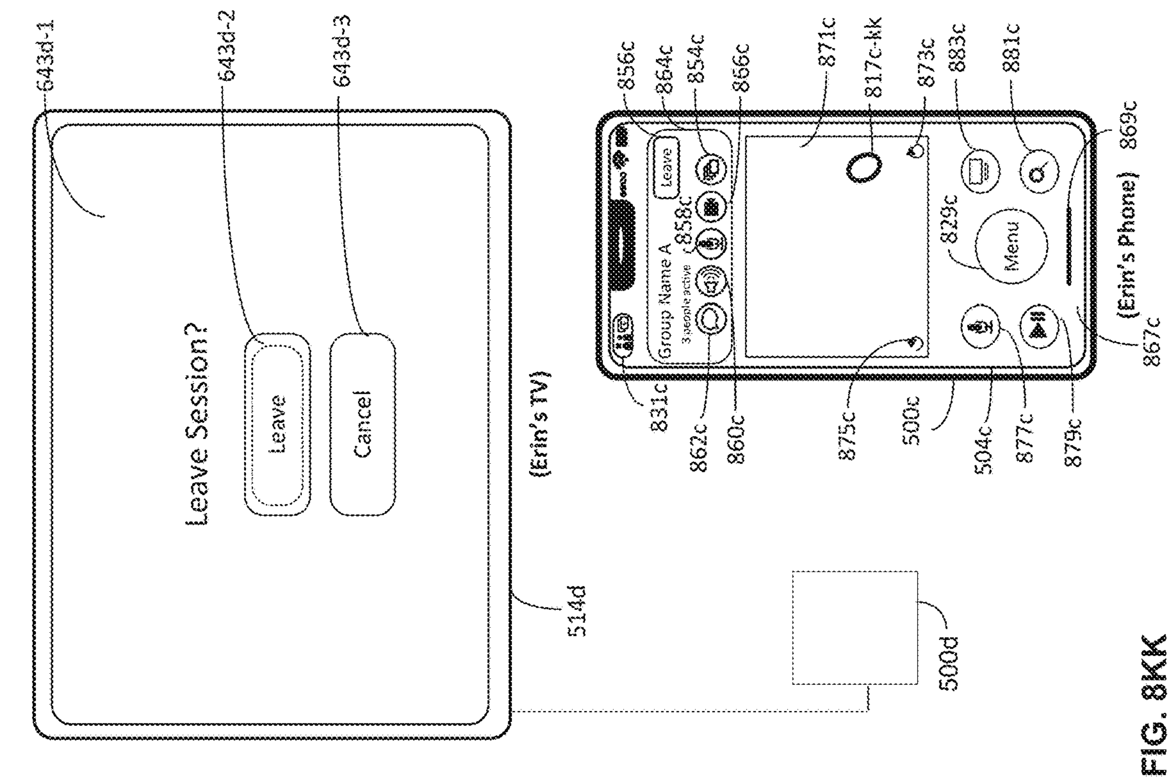
Figure 8M:
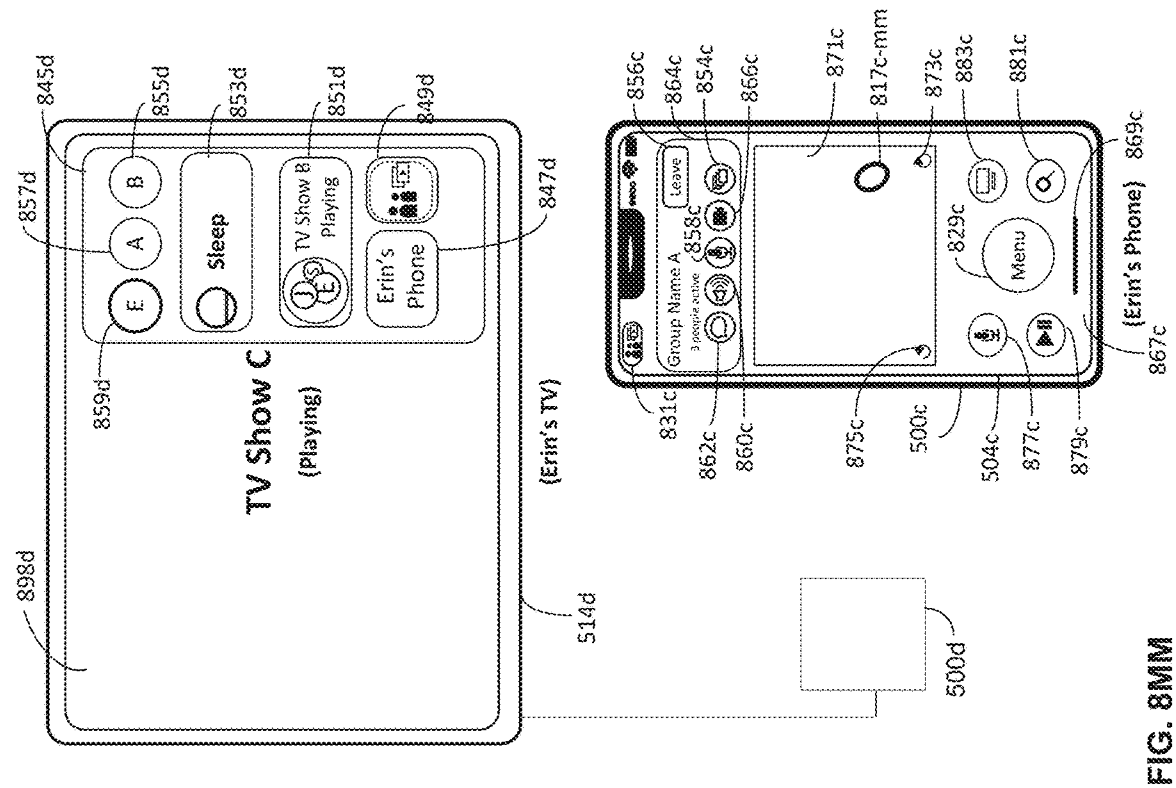
Figure 8L:
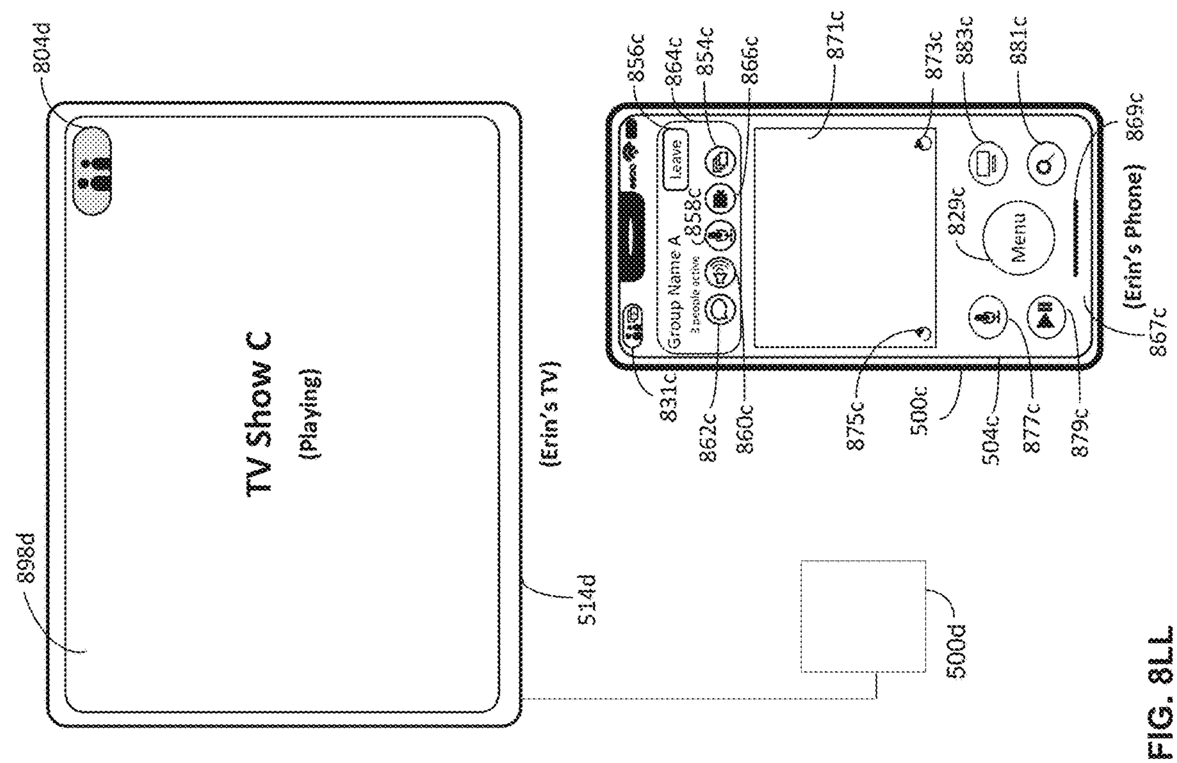
Figure 8N:
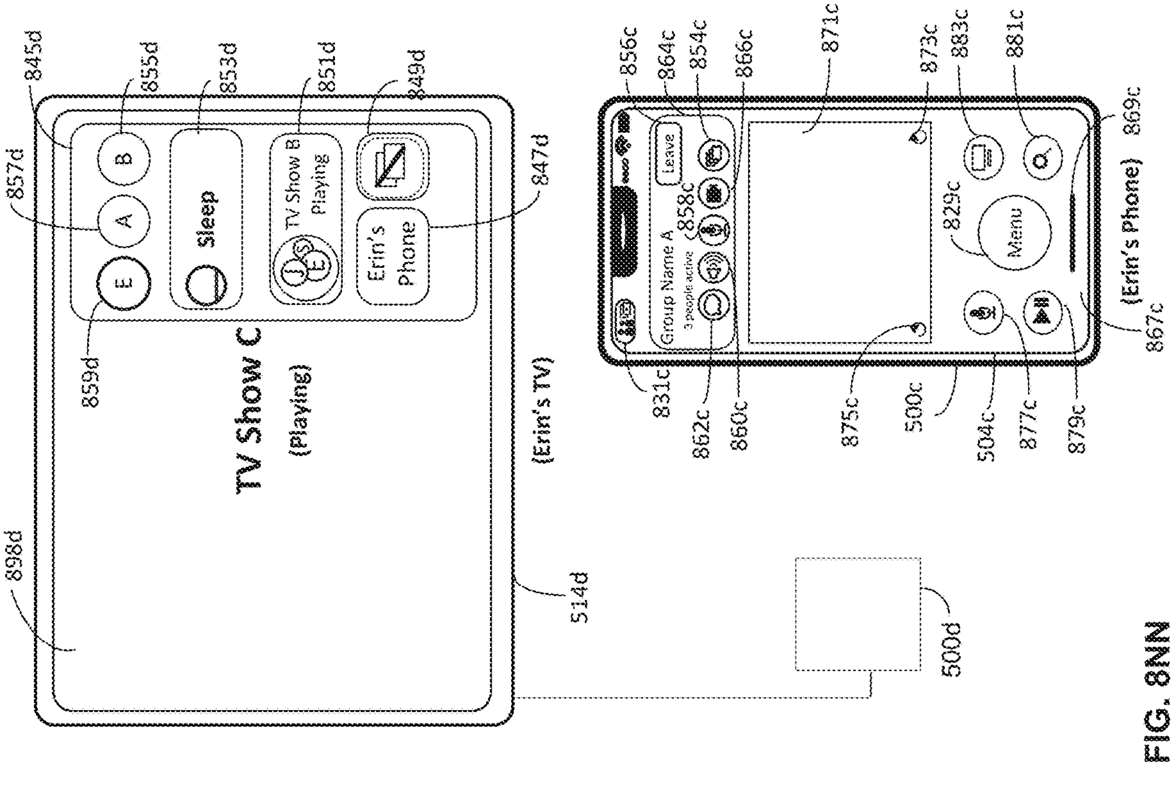
Figure 8O:
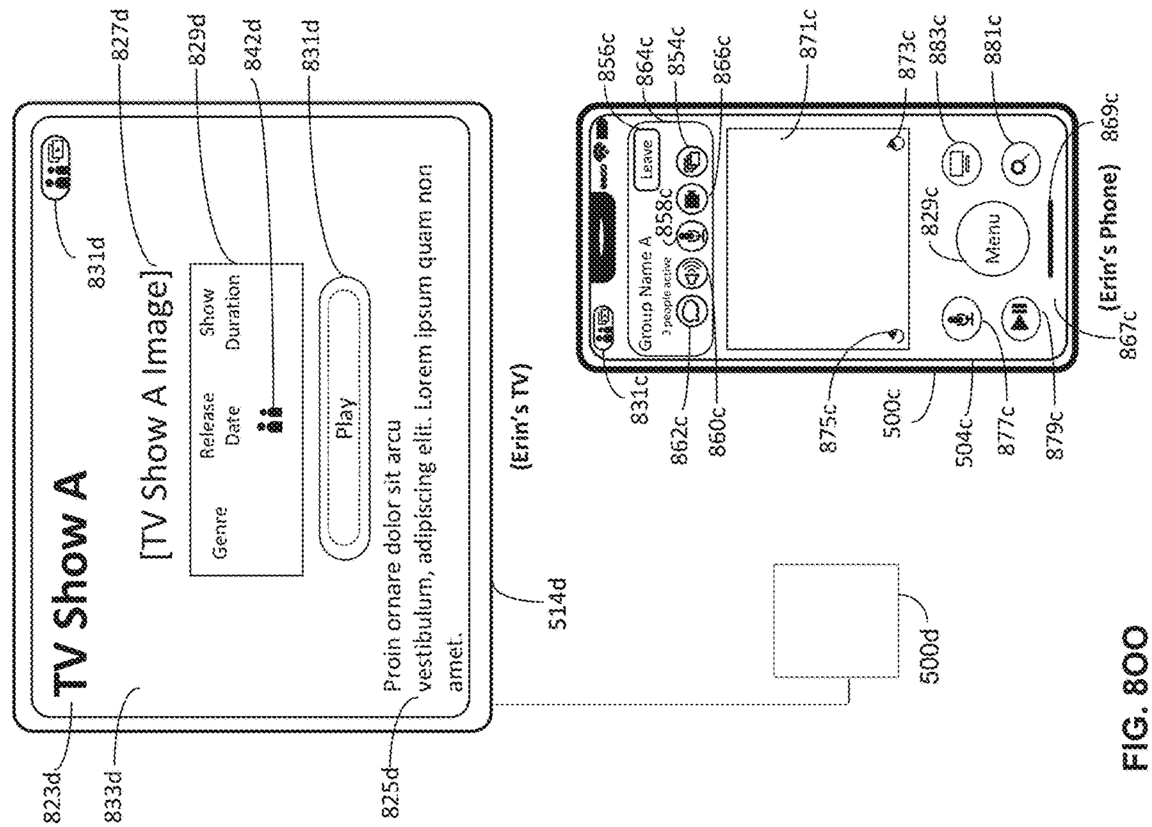
Figure 8P:
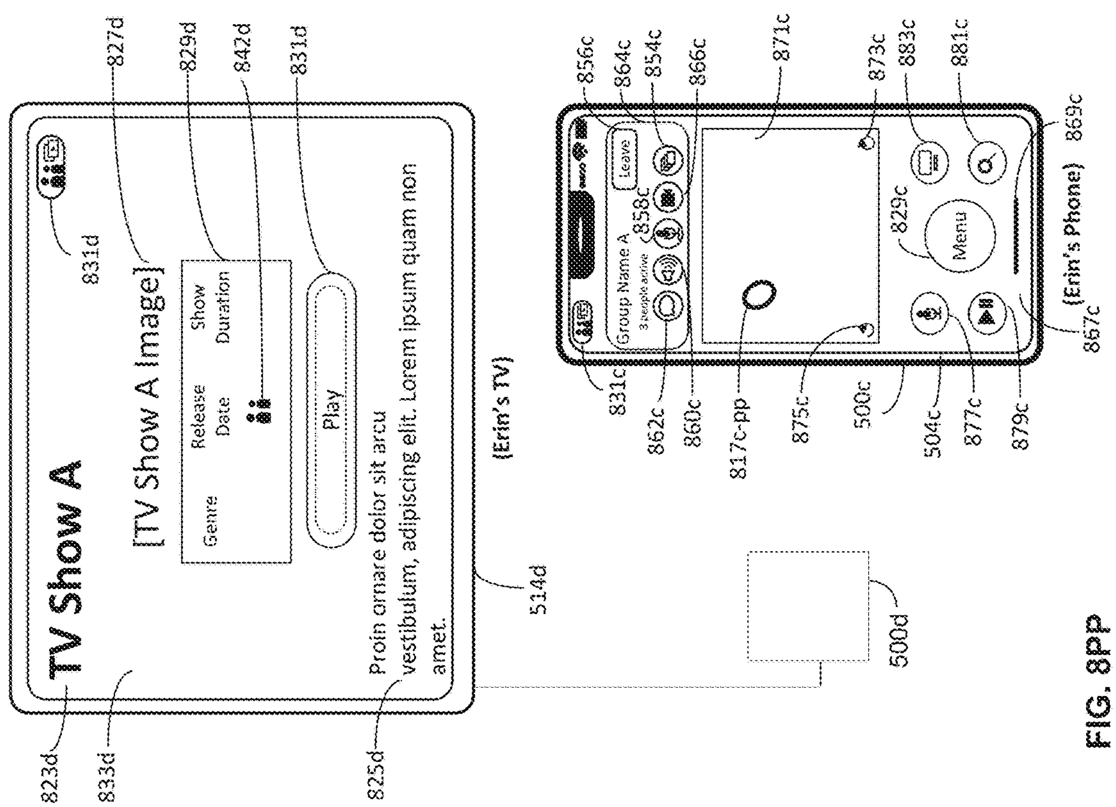
Figure 8Q:
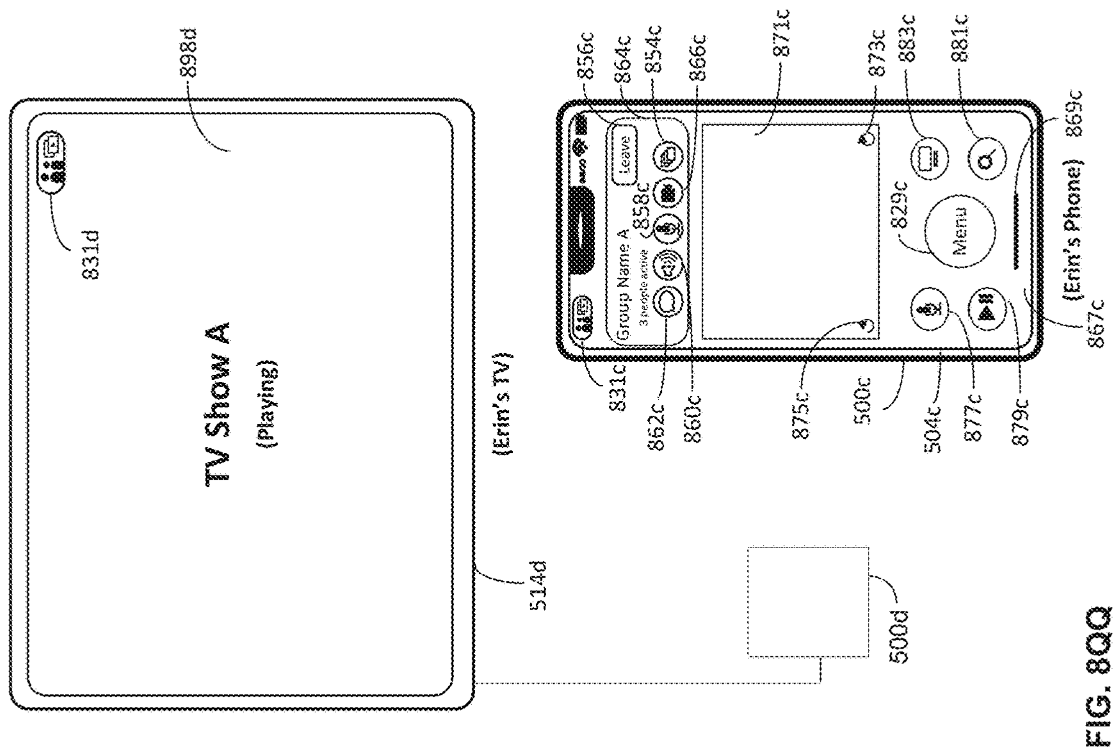
Figure 8R:
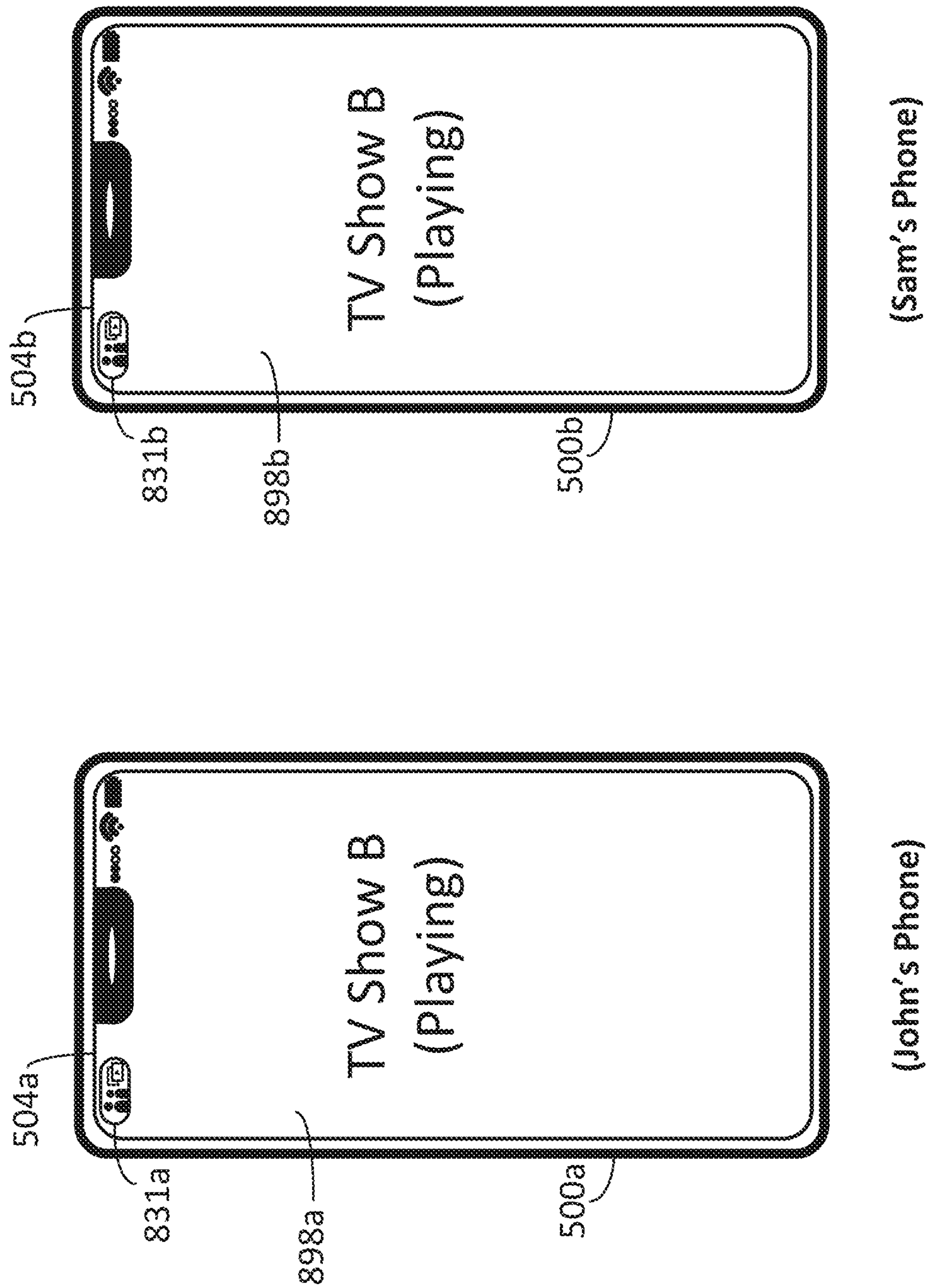

For example, in FIG. 8Z, while electronic device 500*d* is in the synchronized media and communication session (indicated by indication 831*d*), the electronic device receives a sequence of one or more navigations inputs (e.g., from device 500*c* or from a dedicated remote control for device 500*d*) for displaying a user interface 882*d* for TV Show B. The user interface 882*d* is similar to the user interface 833*d* described and illustrated in FIG. 8M. Specifically, as illustrated in FIG. 8Z, TV Show B is able to be added to the synchronized media and communication session (indicated by indication 842*d*).

In some embodiments, the electronic device 500*d* includes or is associated with a setting that, when activated (e.g., toggled on), causes the electronic device 500*d* to automatically play content items in the synchronized media and communication session (e.g., play the content items at device 500*d* and at the other devices included in the communication session, without displaying a menu for indicating whether the content item should be played just at device 500*d* or at device 500*d* and at the other devices included in the communication session) in response to receiving an input corresponding to a request to play a content item while the electronic device 500*d* is in a synchronized media and communication session that includes content sharing. In some embodiments, if the setting to automatically play the content item in the synchronized media and communication session is not active (e.g., toggled off), device 500*d* displays a menu for indicating whether the content item should be played just at device 500*d* or at device 500*d* and at the other devices included in the communication session (e.g., such as in FIGS. 80 and 8T). In some embodiments, the state of this setting is ported to device 500*d* from device 500*c* (e.g., the device associated with the same user account as device 500*d*) when device 500*d* joins the synchronized media and communication session such that, at least at the start of the participation of device 500*d* in the synchronized media and communication session, the state of this setting is synchronized between (e.g., is the same for) devices 500*c* and 500*d*. In some embodiments, the state of this setting for device 500*d* can be changed on device 500*d* (e.g., via selection of a toggle included in control center user interface 845*d*). In some embodiments, the state of this setting for device 500*d* only persists as long as device 500*d* remains in the synchronized media and communication session, and is reset on and/or removed from device 500*d* once device 500*d* leaves the synchronized media and communication session (e.g., and is reinitialized from device 500*c* the next time device 500*d* joins a synchronized media and communication session).

In FIG. 8AA, while electronic device 500*d* is displaying the user interface 882*d* for TV Show A, the electronic device 500*d* detects a selection of affordance 831*d* for playing TV Show B (indicated by touch contact 817*c-aa* tapping trackpad 871*c* while affordance 831*d* is displayed with focus). In FIG. 8BB, in response to receiving the input for playing TV Show B (e.g., and in accordance with a determination that the setting for automatically playing content items in the synchronized media and communication session is toggled on), the electronic device 500*d* starts playing TV Show B in the media user interface 898*d* and in the synchronized media and communication session. The user interface 832*d*, selectable option 836*d*, and selectable option 838*d* that were illustrated in FIG. 8T are not displayed before TV Show A is added to the synchronized media and communication session in FIG. 8BB, because the electronic device 500*d* was already part of the synchronized media and communication session when the request to play the media was received. In FIG. 8CC, electronic devices 500*a* and 500*b* receive an indication that the media playing in the synchronized media and communication session has changed from TV Show A to TV Show B. In response to receiving the indication, device 500*a* ceases playing TV Show A (e.g., the media previously playing in the synchronized media and communication session) and starts playing TV Show B at the playback position defined by the synchronized media and communication session (e.g., the media item recently added to the synchronized media and communication session by device 500*d*). Additionally, in response to receiving the indication, device 500*a* also displays indication 896*a*. Indication 896*a* includes text 893*a* indicating why the synchronized media and communication session started playing TV Show B (Erin has started playing "TV Show B") and indicates the user associated with the device that modified the playback in the synchronized media and communication session (representation 891*a* of Erin).

Similarly, in response to receiving the indication, device 500*b* ceases playing TV Show A (e.g., the media item previously playing in the synchronized media and communication session) and starts playing TV Show B at the playback position defined by the synchronized media and communication session (e.g., the new media item added to the synchronized media and communication session). Additionally, in response to receiving the indication, device 500*b* also displays indication 896*b*. Indication 896*b* includes text 893*b* indicating why the synchronized media and communication session started playing TV Show A (Erin has started playing "TV Show B") and indicates the user associated with the device that modified the playback in the synchronized media and communication session (representation 891*b* of Erin).

In some embodiments, while an electronic device is part of a synchronized media and communication session, the electronic device can switch between synchronously playing media content that is playing in the synchronized media and communication session and playing media content that cannot be added to the synchronized media and communication session. For example, in FIG. 8DD, after the electronic device 500*d* started playing TV Show B (e.g., the media item currently playing in the synchronized media and communication session), as illustrated in FIG. 8BB, the electronic device 500*d* receives a sequence of one or more navigation inputs (e.g., from device 500*c* or from a dedicated remote control for device 500*d*) for displaying a user interface 813*d* for TV Show C. The user interface 813*d* illustrated in FIG. 8DD is similar to the user interface 883*d* described and illustrated in FIG. 8M. However, unlike TV Show A and B described previously, TV Show C cannot be added/played in the synchronized media and communication session (indicated by indication 889*d*). In some embodiments, indication 889*d* indicates that TV Show C cannot play within the media application of which user interface 813*d* is a user interface—rather, TV Show C must be played in a user interface of an application different from the application of which user interface 813*d* is a user interface. In contrast, indication 842*d* in FIG. 8Z for example indicates that TV Show B can be played within the media application of which user interface 882*d* is a user interface, and thus can be added to the synchronized media and communication session. In some embodiments, selection of option 821*d* causes device 500*d* to play TV Show C in that different application. In some embodiments, a media item, such as TV Show C, cannot be added to the synchronized media and communication due to restrictions from a content provider associated with TV Show C. In FIG. 8EE, while electronic device 500*d* is displaying the user interface 813*d* for TV Show C and while electronic device 500*d* is in a synchronized media and communication session (indicated by 831*d*), electronic device 500*d* detects a selection of affordance 821*d* for playing TV Show C (indicated by touch contact 817*c-ee* tapping trackpad 871*c* while affordance 812*d* has focus).

In response, in FIG. 8FF, the electronic device 500*d* starts playing TV Show C (e.g., in an application different from the application of which user interface 813*d* is a user interface) without adding TV Show C to the synchronized media and communication session. In FIG. 8GG, because TV Show C is a type of content that cannot be played in the synchronized media and communication session, electronic devices 500*a* and 500*b* continue playing TV Show B (e.g., the media item currently playing in the synchronized media and communication session). That is, electronic devices 500*a* and 500*b* continue synchronously playing TV Show B while electronic device 500*d* is playing TV Show C, as described and illustrated in FIG. 8FF. In some embodiments, after device 500*d* starts playing TV Show C, the device 500*d* leaves the synchronized media and communication session. Alternatively, in some embodiments, after device 500*d* starts playing TV Show C, the device 500*d* continues to be part of the synchronized media and communication session.

In some embodiments, an electronic device can initiate a process to leave a synchronized media and communication session. For example, in FIG. 8HH, the electronic device 500*d* is playing TV Show C while the synchronized media and communication session associated with device 500*d* is playing TV Show B. In FIG. 811, while device 500*d* is playing TV Show C, the electronic device 500*d* receives an input to display a control center user interface (indicated by touch contact 817*c-ii* holding down selectable option 883*c*). In response, the electronic device 500*d* displays, control center user interface 845*d*. Control center user interface 845*d* includes a representation 859*d* of Erin's user account, a representation 857*d* of Alice's user account, and a representation 855*d* of Bob's user account. The representations 855*d*-859*d* corresponding to respective user accounts are being displayed in the control center user interface 845*d* because a user account for Erin, Alice, and Bob are configured on electronic device 500*d*. The control center user interface 845*d* also includes a selectable option 853*d* that, when selected, causes the electronic device 500*d* to enter a sleep state (e.g., the electronic device 500*d* remains powered on, but the display 514*d* associated with device 500*d* is off) or an off state. Additionally, because electronic device 500*d* is part of a synchronized media and communication session, the control center user interface 845*d* includes information about the synchronized media and communication session that is associated with device 500*d*. In some embodiments, if the electronic device 500*d* was not associated with a synchronized media and communication session and/or if device 500*c* was not part of a synchronized media and communication session, the control center user interface 845*d* would not include information about any synchronized media and communication session.

Specifically, the control center user interface 845*d* includes indication 851*d* which is indicating that the electronic device 500*d* is part of a synchronized media and communication session that is currently playing media content (TV Show B), and that TV Show B is actively playing.

Additionally, indication 851*d* also includes a representation of the users that are included in the synchronized media and communication session in which device 500*d* is participating in—indicated by the profiles avatars included in indication 851*d*. The control center user interface 845*d* also includes indication 847*d* indicating that device 500*c* (e.g., a device associated with device 500*d*) is also part of the same synchronized media and communication session. The control center user interface 845*d* also includes indication 849*d* indicating that device 500*d* is currently in a content sharing mode (e.g., a mode which allows the electronic device 500*d* to add media content to the synchronized media and communication session).

In FIG. 8JJ, the electronic device 500*d* detects a selection of indication 847*d* (indicated by touch contact 817*c-jj* tapping trackpad 871*c* while indication 847*d* has focus). In response, in FIG. 8KK, the electronic device 500*d* displays a user interface 643*d*-1 for confirming that electronic device 500*d* should leave the synchronized media and communication session. User interface 643*d*-1 includes a selectable option 643*d*-2 that, when selected, causes electronic device 500*d* to leave the synchronized media and communication session (or initiate a process to leave the synchronized media and communication session). User interface 643*d*-1 also includes a selectable option 643*d*-3, which when selected, causes the electronic device 500*d* to forgo leaving the synchronized media and communication session.

In FIG. 8KK, the electronic device 500*d* receives an input to cause electronic device 500*d* to leave the synchronized media and communication session (indicated by touch contact 817*c-kk* tapping trackpad 871*c* while selectable option 643*d*-2 has focus). In FIG. 8LL, in response, electronic device 500*d* leaves the synchronized media and communication session. After leaving the synchronized media and communication session, device 500*d* starts displaying indication 804*d* which is indicating that device 500*c* (e.g., a device associated with device 500*d*) is currently part of a synchronized media and communication session, and that device 500*d* is not part of a synchronized media and communication session. In some embodiments, after a device leaves a synchronized media and communication session, the device is no longer able to synchronously play media content with the other devices in the synchronized media and communication session. In some embodiments, after an electronic device leaves a synchronized media and communication session, media played by that electronic device does not modify/change the playback of media playing in the synchronized media and communication session. In some embodiments, after device 500*d* leaves the synchronized media and communication session, device 500*d* and/or device 500*c* operate in a similar manner to when the electronic device(s) in FIGS. 6HHH-6SSS leave a synchronized media and communication session.

In some embodiments, an electronic device is able to switch between private and shared playback modes while that electronic device is part of a synchronized media and communication session. For example, in FIG. 8MM, while device 500*d* is in a synchronized media and communication session, device 500*d* receives a request to switch to a private playback mode (e.g., a mode which allows device 500*c* to play media content without that media content being added to the synchronized media and communication session)—indicated by touch contact 817*c-mm* tapping trackpad 871*c* while indication 849*d* has focus. In FIG. 8NN, in response, device 500*d* switches to a private playback mode while still remaining in the synchronized media and communication session and displays indication 849*d* with a new visual appearance. Specifically, the visual appearance of indication 894*d* in FIG. 8NN is indicating that device 500*d* is currently in a private playback mode. In some embodiments, when an electronic device is in a private playback mode, the electronic device can play media content without causing other devices in the synchronized media and communication session to also initiate playback of that media content item. For example, in FIG. 800, after device 500*d* switched to the private playback mode but while device 500*d* remains part of the synchronized media and communication session, device 500*d* received a sequence of one or more navigation inputs (e.g., from device 500*c* or from a dedicated remote control for device 500*d*) for displaying a user interface 833*d* for TV Show A, which was described previously. Specifically, as illustrated in FIG. 8OO, TV Show A is a type of media content that can be played in the synchronized media and communication session (indicated by indication 842*d*). In FIG. 8PP, while displaying the user interface 833*d* for TV Show A, device 500*d* receives a request to play TV Show A (indicated by touch contact 817*c-pp* tapping trackpad 871*c* while affordance 831*d* has focus). In response, in FIG. 8QQ, device 500*d* starts playing TV Show A without causing TV Show A to play in the synchronized media and communication session. TV Show A is not added to the synchronized media and communication session because device 500*d* received the request to play TV Show A while device 500*d* was in a private playback mode (e.g., a mode which allows device 500*d* to play media content without that media content being added to the synchronized media and communication session). In FIG. 8RR, because device 500*d* initiated playback of TV Show A while in a private playback mode, the other devices in the synchronized media and communication do not receive an indication that device 500*d* started playing TV Show A. Specifically, in FIG. 8RR, electronic devices 500*a* and 500*b* continue playing TV Show B (e.g., the media item playing in the synchronized media and communication session before the input in FIG. 8PP was received).

Figure 9:
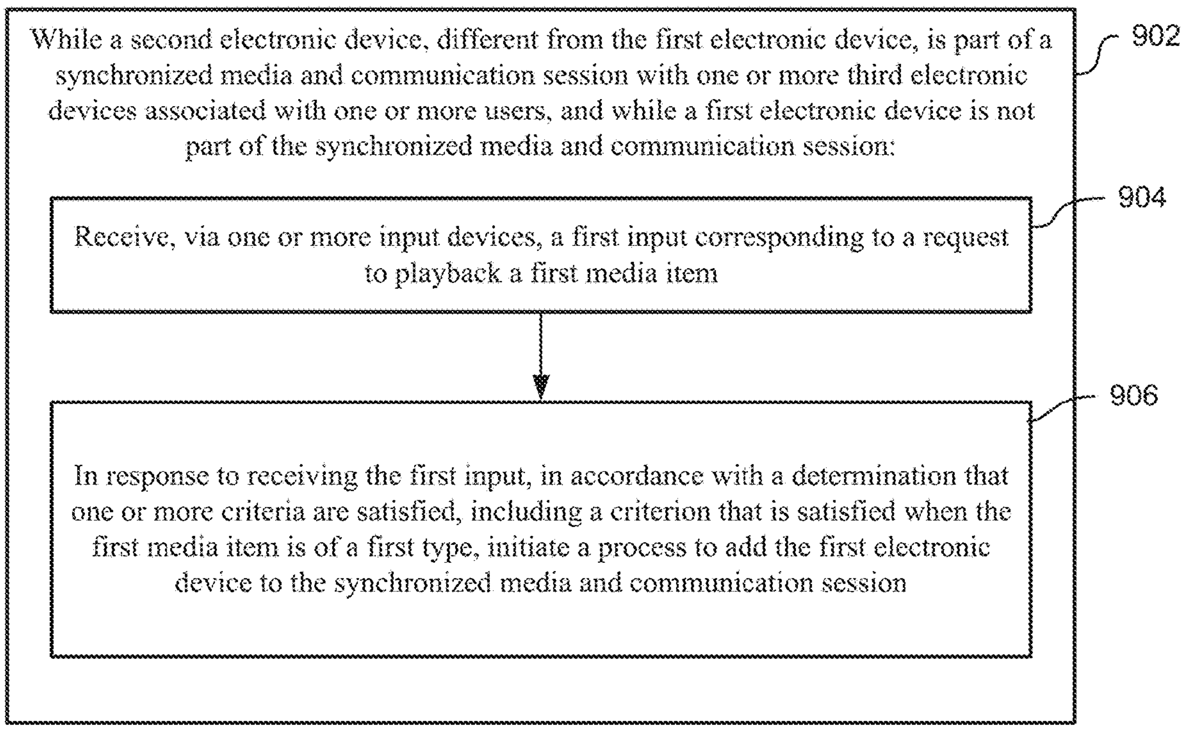
FIG. 9 is a flow diagram illustrating a method of joining and/or adding media content to a synchronized media and communication session when an associated second electronic device is part of the synchronized media and communication session in accordance with some embodiments of the disclosure.

FIG. 9 is a flow diagram illustrating a method of joining and/or adding media content to a synchronized media and communication session when an associated second electronic device is part of the synchronized media and communication session in accordance with some embodiments of the disclosure. The method 900 is optionally performed at first/electronic devices such as device 100, device 300, device 500, device 500*a*, device 500*b*, device 500*c* or device 500*d*, such as described above with reference to FIGS. 1A-1B, 2-3, 4A-4B and 5A-5C. Some operations in method 900 are, optionally combined and/or order of some operations is, optionally, changed.

As described below, the method 900 provides ways in which electronic devices join a synchronized media and communication session associated with a second electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at a first electronic device in communication with a display generation component and one or more input devices (e.g., a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control)). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, while a second electronic device, different from the first electronic device, is part of a synchronized media and communication session (e.g., having one or more of the characteristics of the synchronized media and communication session described with reference to method 700) with one or more third electronic devices associated with one or more users, and while the first electronic device is not part of the synchronized media and communication session (902) (e.g., while a device other than the first electronic device is part of a synchronized media and communication session. In some embodiments, while the second electronic device is in the synchronized media and communication session, the first electronic device is not yet in (e.g., part of) the synchronized media and communication session. In some embodiments, the first electronic device detects that the second electronic device is in the synchronized media and communication session. For example, the first electronic optionally detects that the second electronic device is in a synchronized media and communication session when the second electronic device moves or is within a threshold distance (e.g., 5, 10, 20, 40, 60, 100, 200 feet) from the first electronic device. In some embodiments, the first electronic device only detects that the second electronic device is in the synchronized media and communication session if the first electronic device and the second electronic device are configured with the same user account. In some embodiments, the first electronic device is a TV or set-top box associated with a respective user, and the second electronic device is a phone associated with the same respective user. In some embodiments, when the second electronic device is in the synchronized media and communication session, media content can be played at (e.g., streamed to) the second electronic device synchronously with the playing (e.g., streaming) of the media content at the one or more third electronic devices. Additionally, while the second electronic device is part of the synchronized media and communication session, the second electronic device is optionally part of a session which allows the user of the second electronic device and the one or more users of the one or more third electronic devices to collaborate/communicate (e.g., talk, text, chat, message) with each other. In some embodiments, the second or third electronic devices start and/or join the synchronized media and communication session in a manner similar to what was described with reference to method 700), the first electronic device receives (904), via the one or more input devices, a first input corresponding to a request to playback a first media item (e.g., audio and/or video, music, movie, episodic content, etc.), such as the request to playback TV Show A in FIG. 8S. For example, while the second electronic is in a synchronized media and communication session, the first electronic device receives a request to start or resume playback of the first media item. In some embodiments, the first input is received when the first electronic device detects a selection of a respective one of a plurality of representations of media items being displaying in a media (e.g., TV, music, movies, podcasts, video, audio) browsing application. In some embodiments, the representations of the media items include a visual indication about whether the first media can be added to the synchronized media and communication. In some embodiments, the first media item is selected for playback when an affordance for playing the first content is selected on a page dedicated to the first media item (e.g., a product page in a media browsing application). In some embodiments, the page dedicated to the first media item includes a (e.g., visual) indication about whether the first media item can be played in the synchronized media and communication session.

In some embodiments, in response to receiving the first input, in accordance with a determination that one or more criteria are satisfied, including a criterion that is satisfied when the first media item is of a first type (e.g., if the first media item can be played in the synchronized media and communication session. In some embodiments, the first media item is of the first type if the first media item can be played in a particular content application. In some embodiments, the first media item is not of the first type if the media item is protected (e.g., federated) content (e.g., if the first media item cannot be played in a particular content application). In some embodiments, the first media item is not of the first type if the first media item cannot be played in a synchronized media and communication session. In some embodiments, the first media item is of the first type if the first media can be played/added to a synchronized media and communication session), the first electronic device initiates (906) a process to add the first electronic device to the synchronized media and communication session, such as device 500*d* being added to a synchronized media and communication session in FIGS. 8T-8W (e.g., the first electronic device becomes part of the same synchronized media and communication session that the second electronic device is part of). For example, in response to receiving the first input, the first electronic device becomes part of the same synchronized media and communication session associated with the second electronic device. In some embodiments, after the third electronic device joins the synchronized media and communication session, the third electronic device synchronously plays the media content playing in the synchronized media and communication session. In some embodiments, adding the first electronic device to synchronized media and communication session requires (e.g., confirmation) input from the second electronic device (e.g., from the device associated with the synchronized media and communication session that the first electronic device is attempting to join). In some embodiments, the first media item is of the first type if the first media item can be played in a particular content application and/or the first media item is not federated (e.g., protected) content (e.g., if a content provider of the first media item allows the first media item to be added to the synchronized media and communication session). If some embodiments, if the first media is not of the first type (e.g., a type of media content that cannot be added to the synchronized media and communication session), the first electronic device forgoes initiating the process to add the first electronic device to the synchronized media and communication session. In some embodiments, when the first electronic device is added to the synchronized media and communication session, the one or more third electronic devices and/or the second electronic device receive an indication (e.g., notification) that a user of the first electronic device has joined the synchronized media and communication session. In some such embodiments, the indication (e.g., notification) is selectable (or includes a selectable option), which when selected, causes the respective second and/or third electronic device(s) to start synchronously playing (e.g., streaming) the media item currently playing in the synchronized media and communication session.

The above-described manner of initiating a process to add the first electronic device to a synchronized media and communication session when an input to play a respective media is received by the first electronic device provides an efficient way of adding the first electronic device to the synchronized media and communication when a second device (e.g., associated with the first electronic device) is part of the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to receiving the first input, in accordance with a determination that one or more criteria are satisfied (e.g., if the first media item is able to be added to the synchronized media and communication session), the first electronic device initiates a second process to play the first media item in the synchronized media and communication session, such as TV Show A being added to the synchronized media and communication session in response to the input detected in FIG. 8S. For example, if the first media is able to be played in the synchronized media and communication session, then a process to play the first media item in the synchronized media and communication is initiated (e.g., the first media item starts playing in the synchronized media and communication session). In some embodiments, the second process is initiated automatically (e.g., without user input) after/concurrently with the process to add the first electronic device to the synchronized media and communication. In some embodiments, when the first media item is added to the synchronized media and communication session, the first media item begins synchronously playing at the first electronic device and the one or more second electronic devices. In some embodiments, if the first electronic is already part of the synchronized media and communication session when the first input is received, the first input causes the first electronic device to start playing the first media item in the synchronized media and communication session. In some embodiments, if the first electronic device is not already part of the synchronized media and communication session when the first input is received, the first electronic device is required to join the synchronized media and communication session before the first electronic device can cause the first media item to be played in the synchronized media and communication session.

In some embodiments, in accordance with a determination that the one or more criteria are not satisfied (e.g., if the first media item is not able to be added/played in the synchronized media and communication session), the first electronic device forgoes initiating the process to add the first electronic device to the synchronized media and communication session. For example, in FIG. 8N, if TV Show A was not able to be added to the synchronized media and communication session, device 500*d* would not initiate a process to join the synchronized media and communication session. For example, if the first electronic device receives a request to playback a media item that is not able to be played in the synchronized media and communication session, a process to add device 500*d* to a synchronized media and communication session is not initiated in response to the input detected in FIG. 8S (e.g., the first electronic device does not join synchronized media and communication session). In some embodiments, the first electronic device does not join the synchronized media and communication session until the first electronic device receives a request to playback a media item that can be added to the synchronized media and communication session. In some embodiments, in accordance with a determination that the one or more criteria are not satisfied (e.g., if the first media item is not able to be added/played in the synchronized media and communication session), the first electronic device forgoes initiating the second process to play the first media item in the synchronized media and communication session. For example, in FIG. 8S, if TV Show A was not able to be added to the synchronized media and communication session, TV Show A would not be added to the synchronized media and communication session in response to the input detected in FIG. 8S. For example, the first media item is not played in the synchronized media and communication session because the first media item is not able to be added to the session. In some embodiments, even though the first media item is not added to the synchronized media and communication session, the first electronic device starts playing the first media item in response to receiving the first input, but the one or more second electronic devices do not start playing the first media item synchronously with the first electronic device (e.g., because the first electronic device is not part of the synchronized media and communication session).

The above-described manner of initiating a process to play the first media item in the synchronized media communication session while a (e.g., associated) second electronic device is in the synchronized media and communication session provides an efficient way for playing (e.g., adding) content in the synchronized media and communication session if another (e.g., associated or nearby) device is in the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more criteria include a second criterion that is satisfied when the first electronic device and the second electronic device are configured with a same user account, and is not satisfied when the first electronic device and the second electronic device are not configured with the same user account. For example, if device 500*d* and 500*c* in FIG. 8S are configured with a same user account, the process to add device 500*d* to the synchronized media and communication is initiated in response to the input detected in FIG. 8S. Similarly, if device 500*d* and 500*c* in FIG. 8S are not configured with a same user account, a process to add device 500*d* to the synchronized media and communication session is not initiated in response to the input detected in FIG. 8S. For example, if the first electronic device and the second electronic device are configured with the same user account when the first electronic device receives the request to playback a respective media item of a first type, the process(es) to add the first electronic device to the synchronized media and communication is initiated and/or the process to play the first media item in the synchronized media and communication session is initiated. In some embodiments, if the first electronic device and the second electronic device are not configured with the same user account when the first electronic device receives the request to playback the respective media item of the first type, the first electronic device does not initiate the process(es) to add the first electronic device to the synchronized media and communication session and/or play the first media item in the synchronized media and communication session.

The above-described criteria that is satisfied when the first electronic device and the second electronic device are configured with a same user account provides an efficient way of only adding the first electronic device to the synchronized media and communication associated when the first electronic device and the second electronic device are configured with a same user account, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the second electronic device is part of the synchronized media and communication session (e.g., and while the first electronic device is not part of the synchronized media and communication session), the first electronic device displays, via the display generation component, a visual indication that indicates that the second electronic device is part of the synchronized media and communication session, such as the indication 804*d* in FIG. 8A. For example, the first electronic device visually indicates that a (e.g., nearby, associated) second electronic is in a synchronized media and communication session. In some embodiments, the visual indication indicates that the first electronic device can join the synchronized media and communication session if the second electronic device is already part of a synchronized media and communication session (e.g., indicating that the first electronic device can join the same synchronized media and communication session that the second electronic device is part of). In some embodiments, the indication is an overlay on a user interface (e.g., home screen user interface) that the first electronic device is currently displaying. In some embodiments, the indication is overlaid media content that the first electronic device is currently playing (e.g., media content that is not part of the synchronized media and communication session).

The above-described of displaying an indication that a (e.g., associated, nearby) second electronic device is in a synchronized media and communication session provides an efficient way for indicating to a user of the first electronic device that the first electronic can join the synchronized media and communication active at a (e.g., associated) second electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, initiating the process to add the first electronic device to the synchronized media and communication session includes displaying, via the display generation component, an indication that input at the second electronic device is required for the first electronic device to be added to the synchronized media and communication session, such as the indication 841*d* displayed in user interface 840*d* in FIG. 8V. For example, when the first electronic device initiates a process to join the synchronized media and communication session that is associated with the second electronic device, (e.g., confirmation) input is required at the second electronic device before the first electronic device is added the synchronized media and communication session. In some embodiments, the indication indicates the name assigned to the second electronic (e.g., Erin's Phone). In some embodiments, initiating the process to add the first electronic device to the synchronized media and communication includes displaying a confirmation overlay at the second electronic which, when selected, causes the first electronic device to become part of the synchronized media and communication session. In some embodiments, if confirmation is not received at the second electronic device, the first electronic device does not become part of the synchronized media and communication session.

The above-described manner of displaying an indication that an (e.g., confirmation) input is needed from a (e.g., associated, nearby) second electronic in order to add the first electronic device to the synchronized media and communication session provides an efficient way of indicating to a user of the first electronic device the remaining action(s) that are required for the first electronic device to be successfully added to the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first electronic device is not part of the synchronized media and communication session while the indication is being displayed (e.g., the synchronized media and communication associated with the second electronic device does not include the first electronic device). In some embodiments, while displaying the indication (e.g., while visually indicating input is needed from the second electronic device for completing the process to add the first electronic device to the synchronized media and communication session), in accordance with a determination that an input confirming addition of the first electronic device to the synchronized media and communication session was received at the second electronic device, the first electronic device adds the first electronic device to the synchronized media and communication session, such as device 500*d* being added to the synchronized media and communication session in FIG. 8W in response to the input detected in FIG. 8V. For example, if the second electronic device selects a confirmation overlay, popover, or other type of confirmation user interface element (e.g., associated with adding the first electronic device to the synchronized media and communication session), the first electronic device is added to/joins the synchronized media and communication session. In some embodiments, the confirmation overlay, popover, etc. displayed at the second electronic device indicates the electronic device that will be added to the synchronized media and communication and/or that the first media will start playing in the synchronized media and communication session if confirmed/selected. In some embodiments, in accordance with a determination that the input confirming addition of the first electronic device to the synchronized media and communication session was not received at the second electronic device, the first electronic device forgoes adding the first electronic device to the synchronized media and communication session. For example, if the input in FIG. 8V is not detected, the first electronic device is not added to the synchronized media and communication session. For example, if the second electronic device detects a selection input that corresponds to the first electronic device not being authorized to join the synchronized media and communication session or does not detect any selection input directed towards the confirmation overlay, popover, the first electronic is not added to the synchronized media and communication session associated with the second electronic device.

The above-described of adding or not adding the first electronic to the synchronized media and communication based on confirmation input received at a first electronic device provides an efficient way of controlling the devices that are added to the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more criteria are not satisfied when the first media item is of a second type, different from the first type (e.g., the one or more criteria are not satisfied when the first media cannot be added to the synchronized media and communication session). In some embodiments, in accordance with the determination that the one or more criteria are satisfied (e.g., if the first media item is able to be added to the synchronized media and communication session), the first electronic device initiates a second process to play the first media item in the synchronized media and communication session, such as the user interfaces displayed in FIGS. 8T-8W in response to the input detected in FIG. 8S. For example, if the first media is able to be played in the synchronized media and communication session, then a process to play the first media item in the synchronized media and communication is initiated (e.g., the first media item starts playing in the synchronized media and communication session). In some embodiments, the second process is initiated automatically (e.g., without user input) after/concurrently with the process to add the first electronic device to the synchronized media and communication session. In some embodiments, when the first media item is added to the synchronized media and communication session, the first media item begins synchronously playing at the first electronic device and the one or more second electronic devices. In some embodiments, if the first electronic is already part of the synchronized media and communication session when the first input is received, the first input causes the first electronic device to start playing the first media item in the synchronized media and communication session. In some embodiments, if the first electronic device is not already part of the synchronized media and communication session when the first input is received, the first electronic device is required to join the synchronized media and communication session before the first electronic device can cause the first media item to be played in the synchronized media and communication session.

In some embodiments, in accordance with a determination that the one or more criteria are not satisfied (e.g., if first media item is not able to be added/played in the synchronized media and communication session), (e.g., forgoing initiating the process to add the first electronic device to the synchronized media and communication session, and) the first electronic device forgoes initiating the second process to play the first media item in the synchronized media and communication session. For example, because TV Show C in FIG. 8DD cannot be added to the synchronized media and communication session, TV Show C is not added to the synchronized media and communication session in FIG. 8FF. For example, the first media item is not played in the synchronized media and communication session because the first media item is not able to be added to the synchronized media and communication session. In some embodiments, even though the first media is not added to the synchronized media and communication session, the first electronic device begins playing the first media item in response to receiving the first input, but the one or more second electronic devices do not start playing the first media item because the first media was not added to the synchronized media and communication session.

The above-described manner of adding or not adding the first media item to the synchronized media and communication session based on whether the first media is of a respective type (e.g., a type of content that can be added to the session) provides an efficient way of only adding media content to the synchronized media and communication that is of a particular type, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, initiating the second process to play the first media item in the synchronized media and communication session includes playing the first media item at the first electronic device and the one or more third electronic devices, such as TV Show A playing at devices 500*a*, 500*b*, and 500*d* in response to the input detected in FIG. 8S. For example, when media content that can be added to the synchronized media and communication is selected, the selected media content starts (e.g., synchronously, immediately) playing at (e.g., all) the electronic devices that are part of the synchronized media and communication session.

The above-described manner of playing the first media item in the synchronized media and communication session when the first media item is able to be added to a (e.g., nearby) synchronized media and communication session provides an efficient way of playing a media item from an electronic device that is not currently part of a synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, initiating the second process to play the first media item in the synchronized media and communication session includes displaying, via the display generation component, a first selectable option that, when selected, causes the first media item to play in the synchronized media and communication session, such as selectable option 836*d* in FIG. 8T. For example, when media content that can be added to the synchronized media and communication is selected, the first electronic device displays a selectable option that, when selected, adds the first media item to the synchronized media and communication session. For example, in response to receiving the first input (e.g., the input to play the first media item), the electronic device displays a selectable option that, when selected, adds the first media item to the synchronized media and communication session (e.g., the first media item starts synchronously playing at the electronic devices that are part of the synchronized media and communication session). The first media is optionally not added to the synchronized media and communication until the electronic device detects a selection of the first selectable option.

The above-described manner of requiring confirmation to add the first media item to the synchronized media and communication session provides an efficient way of only adding the first media item to the synchronized media and communication session after the first selectable option has been selected, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, initiating the second process to play the first media item in the synchronized media and communication session includes displaying, via the display generation component, a second selectable option that, when selected, causes the first media item to be played at the third electronic device without playing the first media item in the synchronized media and communication session, such as selectable option 838*d* in FIG. 8T. For example, when media content that can be added to the synchronized media and communication is selected, the first electronic device displays a menu that includes an affordance that is selectable to add the first media item to the synchronized media and communication session, and a second affordance that is selectable to play the first media item only at the first electronic device (e.g., does not play in the synchronized media and communication session).

The above-described manner of displaying a first selectable option that, when selected, causes the first media played in the synchronized media and communication session and a second selectable option that, when selected, causes the first media to be played only at the first electronic device (e.g., not added to the synchronized media and communication session) provides an efficient way of controlling how the first media is played, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first electronic device receives, via the one or more input devices, a second input corresponding to a request to play a second media item, such as the request in FIG. 8S to play TV show A (e.g., audio and/or video, music, movie, episodic content, etc.). For example, while the second electronic is in a synchronized media and communication session, the first electronic device receives a request to start or resume playback of the second media item. In some embodiments, the second input is received when the first electronic device detects a selection of a respective one of a plurality of representations of media items being displaying in a media (e.g., TV, music, movies, podcasts, video, audio) browsing application. In some embodiments, the representations of the media items include a visual indication about whether the first media can be added to the synchronized media and communication. In some embodiments, the second media item is selected for playback when an affordance for playing the second media item is selected on a page dedicated to the second media item (e.g., a product page in a media browsing application). In some embodiments, the page dedicated to the second media item includes a (e.g., visual) indication about whether the second media item can be played in the synchronized media and communication session. In some embodiments, in response to receiving the second input, in accordance with a determination that one or more second criteria are satisfied (e.g., if the second media can be added to the synchronized media and communication session), in accordance with a determination that the first electronic device is part of the synchronized media and communication session (e.g., if the second input is received while the first electronic device is currently part of the synchronized media and communication session), the first electronic device plays the second media item in the synchronized media and communication session. For example, if device 500*d* was in a synchronized media and communication session when the input in FIG. 8S was detected, TV Show A would start playing in the synchronized media and communication session in response to the input in FIG. 8S. For example, if the first electronic device receives a request to playback a new media item (e.g., the second media item) while the first electronic device in a synchronized media and communication session, the new media item (e.g., the second media item) starts playing in the synchronized media and communication (e.g., without the first electronic device displaying a menu for designating how to play the first media item).

In some embodiments, in accordance with a determination that the first electronic device is not part of the synchronized media and communication session, the first electronic device displays, via the display generation component, a first selectable option (such as selectable option 836*d*) that, when selected, causes the second media item to be played in the synchronized media and communication session. For example, if the first electronic device receives a request to playback a new media item (e.g., a second media item) while the first electronic device is not currently part of a synchronized media and communication session, the electronic device displays a selectable option that needs to be selected in order for the second media item to play in the synchronized media and communication session. In some embodiments, a second selectable option is also displayed in response to receiving the second input, which is selectable to play the second media at the first electronic without the second media item being added to the synchronized media and communication session. In some embodiments, until the electronic device detects a selection of one of the selectable options describe above, the second media item is not played privately and is not added to the synchronized media and communication session.

The above-described manner of requiring or not requiring additional input before playing the first media item in the synchronized media and communication session provides an efficient way of requiring additional input to play the first media item in the synchronized media and communication session if the first electronic device is not already part of the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the first media item is playing in the synchronized media and communication session, and while the third electronic is part of synchronized media and communication session, the first electronic device receives, via the one or more input devices, a second input corresponding to a request to modify playback of the first media item, such as the request to start playing TV Show B in the synchronized media and communication session in FIG. 8AA (e.g., the first electronic device receives an input directed to pausing, fast-forwarding, rewinding, playing, or otherwise changing the playback of the first media item. In some embodiments, the second input is received from a remote control in communication with the first electronic device or is received from a multi-function device that is in communication with the first electronic device (e.g., received from the second electronic device)). In some embodiments, in response to receiving the second input, the first electronic devices modifies the playback of the first media item in the synchronized media and communication session in accordance with the second input, such as device 500*d* causing TV Show A to no longer play in the synchronized media and communication session and causing TV Show B to play in the synchronized media and communication session in FIGS. 8BB and 8CC. For example, if the first media item (e.g., the media item currently playing in the synchronized media and communication session) is paused in response to receiving the second input, the playback of the first media item is updated (e.g., paused) at the first electronic device and at the other electronic device in the synchronized media and communication session.

The above-described manner of modifying the playback of the first media item in synchronized media and communication session in response receiving an input to modify the playback of the media item at one of the electronic devices that are part of the synchronized media and communication session provides an efficient way for any device in the synchronized media and communication session to modify the playback of a media item currently playing in the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, a respective media item, different from the first media item, is playing in the synchronized media and communication session when the first input is received, and in response to receiving the first input, in accordance with a determination that one or more criteria are satisfied, the respective content item ceases playing in the synchronized media and communication session, and the first media item starts playing in the synchronized media and communication session, such as device 500*d* ceasing playing TV Show A in the synchronized media and communication session and playing TV Show B in the synchronized media and communication session in FIG. 8BB. For example, the respective media item (e.g., the media item currently playing in the synchronized media and communication session) stops playing in the synchronized media and communication session when a new media item (e.g., the first media item) is added to/starts playing in the synchronized media and communication session. In some embodiments, before the first media item was added to the synchronized media and communication session, the electronic devices in the synchronized media and communication session were synchronously playing the respective media item. In some embodiments, in response to the first media item being added to the synchronized media and communication session, the electronic devices in the synchronized media and communication session stop synchronously playing the respective media item and start synchronously playing the first media item.

The above-described manner of ceasing playing content that was previously playing in the synchronized media and communication session when a new media is added/starts playing in the synchronized media and communication session provides an efficient way of playing a new media item in the synchronized media and communication without having to first stop playing the media item currently playing in the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the first media item is playing in the synchronized media and communication session (e.g., the electronic devices part of the synchronized media and communication session are synchronously playing the first media item), the first electronic device receives, via the one or more input devices, a second input corresponding to a request to play a respective media item of a second type, different from the first type, such as the request to play TV Show C in FIG. 8EE (e.g., receiving a request to playback a new media item that that is not able to be added to the synchronized media and communication session). In some embodiments, in response to receiving the second input, the first electronic device initiates a process to playback, at the first electronic device, the respective media item without playing the respective media item in the synchronized media and communication session, such as TV Show C playing at device 500*d* without device 500*d* adding TV Show C to the synchronized media and communication session in FIG. 8FF. For example, while the first electronic device is in a synchronized media and communication session, the electronic device can play content that cannot not be added to the synchronized media and communication session. In some embodiments, when the first electronic device starts playing the respective media, the first electronic device stops playing the first media item (e.g., the media item currently playing in the synchronized media and communication session). In some embodiments, the first electronic device can start synchronously playing the first media item again in response to detecting a sequence of one or more inputs (e.g., selecting an affordance in a control center user interface, in a dedicated user interface for the first media item, etc.).

The above-described manner of playing media content that cannot be played in the synchronized media and communication session provides an efficient way for playing media that can and cannot be played in the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to receiving the second input, the first media item continues to play in the synchronized media and communication session, such as TV Show C playing at device 500*d* in FIG. 8FF but not playing at devices 500*a* and 500*b* in FIG. 8GG. For example, the media content currently playing in the synchronized media and communication session remains unchanged (e.g., unmodified) in response to the first electronic starting to play content that cannot be added to the synchronized media and communication session. That is, if the electronic devices in the synchronized media and communication session were synchronously playing the first media item before the first electronic device started playing the respective media item (e.g., that cannot be added to the synchronized media and communication session), the electronic devices continue to synchronously play the first media item after the first electronic device switches to playing the respective media item.

The above-described manner of continuing to play the media content previously playing in the synchronized media and communication session after an electronic device that is part of the synchronized media and communication session plays media content that cannot be played in the synchronized media and communication session provides an efficient way of playing media content that cannot be added to the synchronized media and communication session without modifying/changing the media content playing in the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while the first electronic device is part of the synchronized media and communication session, the first electronic device displays, via the display generation component, a visual indication indicating that the first electronic device is part of the synchronized media and communication session, such as indication 831*d* in FIG. 8X. For example, a visual indication is displayed, at the first electronic device, while the first electronic device is part of a synchronized media and communication session. In some embodiments, the visual indication is displayed with different visual appearances. For example, if the synchronized media and communication is not currently playing media content (e.g., the session is not synchronizing playback of any media content), the visual indication has a first visual appearance indicating that that media is not currently playing in the synchronized media and communication session. In some embodiments, if the synchronized media and communication is currently playing media content, the visual indication has a second visual appearance indicating that the media content is currently playing in the synchronized media and communication session. In some embodiments, the visual indication is displayed overlaid various user interfaces being presented by the electronic device, such as a home screen user interface, a media browsing user interface, etc. In some embodiments, the indication is overlaid media content that is playing at the first electronic device (e.g., that is part of the synchronized media and communication session).

The above-described manner of displaying an indication that the first electronic device is part of a synchronized media and communication session provides an efficient way of an indicating to a user of first electronic device that the first electronic is currently part of a synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first electronic device receives, via one or more input devices, a second input corresponding to a request to display a control center user interface; (e.g., a user interface for accessing settings of the first electronic device), such as control center user interface 845*d* in FIG. 811. In some embodiments, in response to receiving the second input, the first electronic device displays, via the display generation component, a control center user interface that includes a first set of selectable options for controlling one or more functionalities of the first electronic device, such as selectable options 853*d*-859*d* in FIG. 811 (e.g., selectable options for switching between user profiles configured on the first electronic device, selectable options for transitioning the first electronic to a low power mode (e.g., the first electronic device remains on, but the display associated with the first electronic device is off), for navigating to different applications on the first electronic device, for searching content on the first electronic device, for controlling audio playback on the first electronic device, etc.). In some embodiments, in accordance with a determination that one or more second criteria are satisfied, including a criterion that is satisfied when the second electronic device is part of the synchronized media and communication session, the first electronic device displays, in the control center user interface, information associated with the synchronized media and communication session, such as device 500*d* displaying selectable options 847*d*-851*d* because device 500*d* is part of a synchronized media and communication session. For example, the control center user interface includes information associated with the synchronized media and communication session when the first electronic device is part of a synchronized media and communication session (e.g., in addition to the first set of selectable options). In some embodiments, the information includes visual indications about the playback of a media currently playing in the synchronized media and communication session. In some embodiments, the information includes selectable options that, when selected, perform one or more operations associated with the synchronized media and communication session.

The above-described manner of displaying information associated with the synchronized media and communication session in a control center user interface provides an efficient way of including information about a synchronized media and communication when the first electronic device is part of a synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that a respective media item is playing in the synchronized media and communication session, the information associated with the synchronized media and communication session includes a visual indication indicating a playback status of the respective media item, such as indication 851*d* in FIG. 811. For example, if the first electronic device is part of a synchronized media and communication that is currently playing a respective media item, the control center user interface includes an indication about the playback status of that respective media item. For example, if media item A is currently playing in the synchronized media and communication session, the visual indication indicates the media item playing in the synchronized media and communication session ("media item A") and/or an indication about its playback status (e.g., "currently playing"). Similarly, if media item A is currently paused in the synchronized media and communication session, the visual indication would optionally indicate the media item playing in the synchronized media and communication session ("media item A") and/or its playback state/status (e.g., "currently paused"). In some embodiments, in accordance with a determination that the respective media item is not playing in the synchronized media and communication session, the information associated with the synchronized media and communication session does not include the visual indication indicating the playback status of the respective media item. For example, indication 851*d* is not displayed by device 500*d* if media is not currently playing in the synchronized media and communication session. For example, if the first electronic device is part of a synchronized media and communication that is not currently playing a respective media item, the control center user interface does include an indication about a playback status of a respective media item. The above-described manner of indicating a playback status of a respective media item when a respective media item is playing in synchronized media and communication provides an efficient way indicating the media that is playing in the synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that the first electronic device is part of the synchronized media and communication session, the information associated with the synchronized media and communication session includes a first selectable option that, when selected, causes the first electronic device to leave the synchronized media and communication session, such as indication 847*d* in FIG. 811. For example, if the first electronic device is currently part of a synchronized media and communication session, the control center user interface includes a selectable option which, when selected, causes the first electronic device to leave the synchronized media and communication session. In some embodiments, if the first electronic device detects a selection of the first selectable option while the first electronic device is playing the media content that is currently playing in the synchronized media and communication session, the first electronic device optionally begins playing, privately (e.g., not as part of the synchronized media and communication session), the media content at a playback position defined by the synchronized media and communication session. Alternatively, in some embodiments, the media content continues to play at the first electronic device, but the media content is no longer synchronously playing with respect to the synchronized media and communication session (e.g., no longer plays synchronously with the other electronic devices in the synchronized media and communication session also playing the media content).

The above-described manner of displaying a selectable option for leaving the synchronized media and communication session in a control center user interface provides an efficient way for an electronic device to leave a synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the information associated with the synchronized media and communication session includes an indication of the second electronic device, such as indication 847*d* in FIG. 811. For example, the control center user interface includes an indication about the (e.g., associated) second electronic device that is also part of the same synchronized media and communication session. In some embodiments, the indication includes an indication about a user associated with the second electronic device (e.g., indicates "Erin's Phone"). In some embodiments, if the first electronic device detects a selection of the indication, the first electronic device initiates a process to leave the synchronized media and communication session, which optionally causes the first electronic device to cease playing the media item currently playing in the synchronized media and communication session. In some embodiments, when the first electronic leaves the synchronized media and communication session, the second electronic device starts playing the media content that is currently playing in the synchronized media and communication session at a playback position defined by the synchronized media and communication session.

The above-described manner of displaying an indication about another (e.g., associated) electronic device that is in the same synchronized media and communication provides an efficient way of indicating devices that are also part of the same synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that the first electronic device is not part of the synchronized media and communication session, the information associated with the synchronized media and communication session includes a visual indication indicating that the second electronic device is part of the synchronized media and communication session, such as indication 847*d* in FIG. 8H. For example, the control center user interface includes an indication about the (e.g., associated) second electronic device that is currently part of a synchronized media and communication session. In some embodiments, the visual indication indicates the second electronic device is part of a synchronized media and communication because the first electronic device and the second electronic device are configured with a same user account. In some embodiments, the visual indication indicates the second electronic device is part of a synchronized media and communication because the first electronic device is within a threshold distance (e.g., 1, 5, 15, 30, 100, 200, 400 feet) of the second electronic device (e.g., within a threshold distance of an electronic that is in a synchronized media and communication session). In some embodiments, if the first and second electronic devices are not configured with a same user account and/or are not within the threshold distance of each other, the visual indication is not displayed.

The above-described manner of displaying an indication about another (e.g., associated) electronic device that is in a synchronized media and communication provides an efficient way of indicating associated devices that part of a same synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the visual indication indicating that the second electronic device is part of the synchronized media and communication session, the first electronic device receives, via the one or more input devices, a second input selecting the visual indication, such as the touch input detected in FIG. 8I. In some embodiments, in response to receiving the second input, the first electronic device initiates the process to add the first electronic device to the synchronized media and communication session, such device 500*d* being added to the synchronized media and communication session in FIG. 8J. For example, when the visual indication is selected, the first electronic device joins the synchronized media and communication session associated with the second electronic device. In some embodiments, the process to add the first electronic device to the synchronized media and communication session requires an input from the second electronic device to confirm adding the first electronic device to the synchronized media and communication session. In some embodiments, if the second input was received while the first electronic device was playing media content (e.g., media content not part of the synchronized media and communication session), the first electronic device ceases playing the media content that is currently playing at the first electronic device and starts playing the media content that is playing in the synchronized media and communication session. In some embodiments, if the second input is received while the first electronic device was not playing any media content, the first electronic device starts playing the media content that is currently playing in the synchronized media and communication session. In some embodiments, if the second input is received while the first electronic device is not playing any media content and the synchronized media and communication session is also not playing any media content, the first electronic device joins the synchronized media and communication session without changing what was being displayed at the first electronic (e.g., continues displaying the same user interface that was being presented before the first electronic device joined the synchronized media and communication session)

The above-described manner of displaying a indication about another (e.g., associated) electronic device that is in a synchronized media and communication provides an efficient way of indicating a synchronized media and communication that the first electronic device can join, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to receiving the second input, in accordance with a determination that the one or more second criteria are not satisfied, forgoing displaying, in the control center user interface, the information associated with the synchronized media and communication session, such as control center user interface 845*d* not including selectable options 847*d*-851*d* when device 500*d* is not part of a synchronized media and communication session. For example, the control center user interface does not include information about a synchronized media and communication session if the first electronic device is not in a synchronized media and communication and/or if the devices associated with the first electronic device (e.g., the second electronic device) are also not in a synchronized media and communication session. In some embodiments, if the first electronic device leaves the synchronized media and communication session after displaying the information associated with the synchronized media and communication session, the first electronic device ceases displaying the information associated with the synchronized media and communication session. In some embodiments, if the second electronic device is more than a threshold distance from the first electronic device (e.g., 10, 40, 100, 200, 500 feet) while the second electronic device is part of a synchronized media and communication session, the information associated with the synchronized media and communication session (e.g., that the second electronic device is part of) is not displayed. In some embodiments, if the second electronic device is within the above-mentioned threshold distance but the second electronic device is not part of a synchronized media and communication session, the control center user interface does not include any information associated with a synchronized media and communication session. In some embodiments, if the second electronic device is with a threshold distance from the first electronic device (e.g., 10, 40, 100, 200, 500 feet) while the second electronic device is part of a synchronized media and communication session, the information associated with the synchronized media and communication session (e.g., that the second electronic device is part of) is displayed in the control center user interface.

The above-described manner of not displaying information associated with a synchronized media and communication when the second electronic device is not in a synchronized media and communication session provides an efficient way of only including information about a synchronized media and communication when the first and/or second electronic device is part of a synchronized media and communication session, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, the synchronized media and communication session that an electronic joins described above with reference to method 900 optionally has one or more of the characteristics of the synchronized media and communication session or user interfaces associated with a synchronized media and communication session, described herein with reference to other methods described herein (e.g., methods 700). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIG. 9 are, optionally, implemented by components depicted in FIGS. 1A-1B. For example, receiving operation 904 and initiating operation 906 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology includes facilitating a synchronized media and communication session with one or more other users. The present disclosure contemplates that in some instances, the data utilized may include personal information data that uniquely identifies or can be used to contact or locate a specific person. Such personal information data can include demographic data, content consumption activity, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, content consumption activity can be used to suggest content to a user. Accordingly, use of such personal information data enables users to use electronic devices in coordinated manners. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of network services, the present technology can be configured to allow users to select to "opt in" or "opt out" of participation in the collection of personal information data during registration for services or anytime thereafter. In another example, users can select not to enable content consumption activity tracking. In addition to providing "opt in" and "opt out" options, the present disclosure contemplates providing notifications relating to the access or use of personal information. For instance, a user may be notified upon initiating content playback that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, synchronized media and communication session interactions can proceed in accordance with the embodiments of the disclosure without tracking the content consumption activity of the user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at a first electronic device in communication with a display generation component and one or more input devices:

while the first electronic device is not part of a synchronized media and communication session with one or more third electronic devices associated with one or more users:

receiving, via the one or more input devices, a first input corresponding to a request to playback a first media item; and in response to receiving the first input:

in accordance with a determination that a second electronic device is part of the synchronized media and communication session and in accordance with a determination that one or more criteria are satisfied, including a criterion that is satisfied when the first media item is of a first type, initiating a process to add the first electronic device to the synchronized media and communication session; and in accordance with a determination that the second electronic device is not part of the synchronized media and communication session, forgoing initiating the process to add the first electronic device to the synchronized media and communication session.

2. The method of claim 1, further comprising:

in response to receiving the first input:

in accordance with a determination that the one or more criteria are satisfied:

initiating a second process to play the first media item in the synchronized media and communication session; and in accordance with a determination that the one or more criteria are not satisfied:

forgoing initiating the process to add the first electronic device to the synchronized media and communication session; and forgoing initiating the second process to play the first media item in the synchronized media and communication session.

3. The method of claim 1, wherein the one or more criteria include a second criterion that is satisfied when the first electronic device and the second electronic device are configured with a same user account, and is not satisfied when the first electronic device and the second electronic device are not configured with the same user account.

4. The method of claim 1, further comprising:

while the second electronic device is part of the synchronized media and communication session, displaying, via the display generation component, a visual indication that indicates that the second electronic device is part of the synchronized media and communication session.

5. The method of claim 1, wherein initiating the process to add the first electronic device to the synchronized media and communication session includes displaying, via the display generation component, an indication that input at the second electronic device is required for the first electronic device to be added to the synchronized media and communication session.

6. The method of claim 5, wherein the first electronic device is not part of the synchronized media and communication session while the indication is being displayed, the method further comprising:

while displaying the indication:

in accordance with a determination that an input confirming addition of the first electronic device to the synchronized media and communication session was received at the second electronic device, adding the first electronic device to the synchronized media and communication session; and in accordance with a determination that the input confirming addition of the first electronic device to the synchronized media and communication session was not received at the second electronic device, forgoing adding the first electronic device to the synchronized media and communication session.

7. The method of claim 1, wherein the one or more criteria are not satisfied when the first media item is of a second type, different from the first type, the method further comprising:

in response to receiving the first input:

in accordance with the determination that the one or more criteria are satisfied:

initiating a second process to play the first media item in the synchronized media and communication session; and in accordance with a determination that the one or more criteria are not satisfied, forgoing initiating the second process to play the first media item in the synchronized media and communication session.

8. The method of claim 7, wherein initiating the second process to play the first media item in the synchronized media and communication session includes playing the first media item at the first electronic device and the one or more third electronic devices.

9. The method of claim 7, wherein initiating the second process to play the first media item in the synchronized media and communication session includes displaying, via the display generation component, a first selectable option that, when selected, causes the first media item to play in the synchronized media and communication session.

10. The method of claim 9, wherein initiating the second process to play the first media item in the synchronized media and communication session includes displaying, via the display generation component, a second selectable option that, when selected, causes the first media item to be played at the one or more third electronic devices without playing the first media item in the synchronized media and communication session.

11. The method of claim 1, further comprising:

receiving, via the one or more input devices, a second input corresponding to a request to play a second media item; and in response to receiving the second input:

in accordance with a determination that one or more second criteria are satisfied:

in accordance with a determination that the first electronic device is part of the synchronized media and communication session, playing the second media item in the synchronized media and communication session; and in accordance with a determination that the first electronic device is not part of the synchronized media and communication session, displaying, via the display generation component, a first selectable option that, when selected, causes the second media item to be played in the synchronized media and communication session.

12. The method of claim 1, further comprising:

while the first media item is playing in the synchronized media and communication session, and while the one or more third electronic devices is part of synchronized media and communication session:

receiving, via the one or more input devices, a second input corresponding to a request to modify playback of the first media item; and in response to receiving the second input, modifying the playback of the first media item in the synchronized media and communication session in accordance with the second input.

13. The method of claim 1, wherein a respective media item, different from the first media item, is playing in the synchronized media and communication session when the first input is received, and in response to receiving the first input, in accordance with a determination that the one or more criteria are satisfied, the respective media item ceases playing in the synchronized media and communication, and the first media item starts playing in the synchronized media and communication session.

14. The method of claim 1, further comprising:

while the first media item is playing in the synchronized media and communication session, receiving, via the one or more input devices, a second input corresponding to a request to play a respective media item of a second type, different from the first type; and in response to receiving the second input:

initiating a process to playback, at the first electronic device, the respective media item without playing the respective media item in the synchronized media and communication session.

15. The method of claim 14, wherein in response to receiving the second input, the first media item continues to play in the synchronized media and communication session.

16. The method of claim 2, further comprising:

while the first electronic device is part of the synchronized media and communication session, displaying, via the display generation component, a visual indication indicating that the first electronic device is part of the synchronized media and communication session.

17. The method of claim 1, further comprising:

receiving, via one or more input devices, a second input corresponding to a request to display a control center user interface; and in response to receiving the second input:

displaying, via the display generation component, a control center user interface that includes a first set of selectable options for controlling one or more functionalities of the first electronic device; and in accordance with a determination that one or more second criteria are satisfied, including a criterion that is satisfied when the second electronic device is part of the synchronized media and communication session, displaying, in the control center user interface, information associated with the synchronized media and communication session.

18. The method of claim 17, wherein:

in accordance with a determination that a respective media item is playing in the synchronized media and communication session, the information associated with the synchronized media and communication session includes a visual indication indicating a playback status of the respective media item; and in accordance with a determination that the respective media item is not playing in the synchronized media and communication session, the information associated with the synchronized media and communication session does not include the visual indication indicating the playback status of the respective media item.

19. The method of claim 17, wherein:

in accordance with a determination that the first electronic device is part of the synchronized media and communication session, the information associated with the synchronized media and communication session includes a first selectable option that, when selected, causes the first electronic device to leave the synchronized media and communication session.

20. The method of claim 17, wherein:

the information associated with the synchronized media and communication session includes an indication of the second electronic device.

21. The method of claim 17, wherein:

in accordance with a determination that the first electronic device is not part of the synchronized media and communication session, the information associated with the synchronized media and communication session includes a visual indication indicating that the second electronic device is part of the synchronized media and communication session.

22. The method of claim 21, further comprising:

while displaying the visual indication indicating that the second electronic device is part of the synchronized media and communication session, receiving, via the one or more input devices, a second input selecting the visual indication; and in response to receiving the second input, initiating the process to add the first electronic device to the synchronized media and communication session.

23. The method of claim 17, further comprising:

in response to receiving the second input:

in accordance with a determination that the one or more second criteria are not satisfied, forgoing displaying, in the control center user interface, the information associated with the synchronized media and communication session.

24. A first electronic device, comprising:

one or more processors;

memory; and one or more programs, wherein the one or more programs are stored in the memory and configured to be executed by the one or more processors, the one or more programs including instructions for:

while the first electronic device is not part of a synchronized media and communication session with one or more third electronic devices associated with one or more users:

receiving, via one or more input devices, a first input corresponding to a request to playback a first media item; and in response to receiving the first input:

in accordance with a determination that a second electronic device is part of the synchronized media and communication session and in accordance with a determination that one or more criteria are satisfied, including a criterion that is satisfied when the first media item is of a first type, initiating a process to add the first electronic device to the synchronized media and communication session; and in accordance with a determination that the second electronic device is not part of the synchronized media and communication session, forgoing initiating the process to add the first electronic device to the synchronized media and communication session.

25. The first electronic device of claim 24, the one or more programs further including instructions for:

in response to receiving the first input:

in accordance with a determination that the one or more criteria are satisfied:

initiating a second process to play the first media item in the synchronized media and communication session; and in accordance with a determination that the one or more criteria are not satisfied:

forgoing initiating the process to add the first electronic device to the synchronized media and communication session; and forgoing initiating the second process to play the first media item in the synchronized media and communication session.

26. The first electronic device of claim 25, the one or more programs further including instructions for:

while the first electronic device is part of the synchronized media and communication session, displaying, via a display generation component, a visual indication indicating that the first electronic device is part of the synchronized media and communication session.

27. The first electronic device of claim 24, wherein the one or more criteria include a second criterion that is satisfied when the first electronic device and the second electronic device are configured with a same user account, and is not satisfied when the first electronic device and the second electronic device are not configured with the same user account.

28. The first electronic device of claim 24, the one or more programs further including instructions for:

while the second electronic device is part of the synchronized media and communication session, displaying, via a display generation component, a visual indication that indicates that the second electronic device is part of the synchronized media and communication session.

29. The first electronic device of claim 24, wherein initiating the process to add the first electronic device to the synchronized media and communication session includes displaying, via a display generation component, an indication that input at the second electronic device is required for the first electronic device to be added to the synchronized media and communication session.

30. The first electronic device of claim 29, wherein the first electronic device is not part of the synchronized media and communication session while an indication is being displayed, the one or more programs further including instructions for:

while displaying the indication:

in accordance with a determination that an input confirming addition of the first electronic device to the synchronized media and communication session was received at the second electronic device, adding the first electronic device to the synchronized media and communication session; and in accordance with a determination that the input confirming addition of the first electronic device to the synchronized media and communication session was not received at the second electronic device, forgoing adding the first electronic device to the synchronized media and communication session.

31. The first electronic device of claim 24, wherein the one or more criteria are not satisfied when the first media item is of a second type, different from the first type, the one or more programs further including instructions for:

in response to receiving the first input:

in accordance with the determination that the one or more criteria are satisfied:

initiating a second process to play the first media item in the synchronized media and communication session; and in accordance with a determination that the one or more criteria are not satisfied, forgoing initiating the second process to play the first media item in the synchronized media and communication session.

32. The first electronic device of claim 31, wherein initiating the second process to play the first media item in the synchronized media and communication session includes playing the first media item at the first electronic device and the one or more third electronic devices.

33. The first electronic device of claim 31, wherein initiating the second process to play the first media item in the synchronized media and communication session includes displaying, via a display generation component, a first selectable option that, when selected, causes the first media item to play in the synchronized media and communication session.

34. The first electronic device of claim 33, wherein initiating the second process to play the first media item in the synchronized media and communication session includes displaying, via the display generation component, a second selectable option that, when selected, causes the first media item to be played at the one or more third electronic devices without playing the first media item in the synchronized media and communication session.

35. The first electronic device of claim 24, the one or more programs further including instructions for:

receiving, via the one or more input devices, a second input corresponding to a request to play a second media item; and in response to receiving the second input:

in accordance with a determination that one or more second criteria are satisfied:

in accordance with a determination that the first electronic device is part of the synchronized media and communication session, playing the second media item in the synchronized media and communication session; and in accordance with a determination that the first electronic device is not part of the synchronized media and communication session, displaying, via a display generation component, a first selectable option that, when selected, causes the second media item to be played in the synchronized media and communication session.

36. The first electronic device of claim 24, the one or more programs further including instructions for:

while the first media item is playing in the synchronized media and communication session, and while the one or more third electronic devices is part of synchronized media and communication session:

receiving, via the one or more input devices, a second input corresponding to a request to modify playback of the first media item; and in response to receiving the second input, modifying the playback of the first media item in the synchronized media and communication session in accordance with the second input.

37. The first electronic device of claim 24, wherein a respective media item, different from the first media item, is playing in the synchronized media and communication session when the first input is received, and in response to receiving the first input, in accordance with a determination that the one or more criteria are satisfied, the respective media item ceases playing in the synchronized media and communication, and the first media item starts playing in the synchronized media and communication session.

38. The first electronic device of claim 24, the one or more programs further including instructions for:

while the first media item is playing in the synchronized media and communication session, receiving, via the one or more input devices, a second input corresponding to a request to play a respective media item of a second type, different from the first type; and in response to receiving the second input:

initiating a process to playback, at the first electronic device, the respective media item without playing the respective media item in the synchronized media and communication session.

39. The first electronic device of claim 38, wherein in response to receiving the second input, the first media item continues to play in the synchronized media and communication session.

40. The first electronic device of claim 24, the one or more programs further including instructions for:

receiving, via one or more input devices, a second input corresponding to a request to display a control center user interface; and in response to receiving the second input:

displaying, via a display generation component, a control center user interface that includes a first set of selectable options for controlling one or more functionalities of the first electronic device; and in accordance with a determination that one or more second criteria are satisfied, including a criterion that is satisfied when the second electronic device is part of the synchronized media and communication session, displaying, in the control center user interface, information associated with the synchronized media and communication session.

41. The first electronic device of claim 40, wherein:

in accordance with a determination that a respective media item is playing in the synchronized media and communication session, the information associated with the synchronized media and communication session includes a visual indication indicating a playback status of the respective media item; and in accordance with a determination that the respective media item is not playing in the synchronized media and communication session, the information associated with the synchronized media and communication session does not include the visual indication indicating the playback status of the respective media item.

42. The first electronic device of claim 40, wherein:

in accordance with a determination that the first electronic device is part of the synchronized media and communication session, the information associated with the synchronized media and communication session includes a first selectable option that, when selected, causes the first electronic device to leave the synchronized media and communication session.

43. The first electronic device of claim 40, wherein:

the information associated with the synchronized media and communication session includes an indication of the second electronic device.

44. The first electronic device of claim 40, wherein:

in accordance with a determination that the first electronic device is not part of the synchronized media and communication session, the information associated with the synchronized media and communication session includes a visual indication indicating that the second electronic device is part of the synchronized media and communication session.

45. The electronic device of claim 44, the one or more programs further including instructions for:

while displaying the visual indication indicating that the second electronic device is part of the synchronized media and communication session, receiving, via the one or more input devices, a second input selecting the visual indication; and in response to receiving the second input, initiating the process to add the first electronic device to the synchronized media and communication session.

46. The first electronic device of claim 40, the one or more programs further including instructions for:

in response to receiving the second input:

in accordance with a determination that the one or more second criteria are not satisfied, forgoing displaying, in the control center user interface, the information associated with the synchronized media and communication session.

47. A non-transitory computer readable storage medium storing one or more programs, the one or more programs comprising instructions, which when executed by one or more processors of a first electronic device, cause the first electronic device to perform a method comprising:

while the first electronic device is not part of a synchronized media and communication session with one or more third electronic devices associated with one or more users:

receiving, via one or more input devices, a first input corresponding to a request to playback a first media item; and in response to receiving the first input:

in accordance with a determination that a second electronic device is part of the synchronized media and communication session and in accordance with a determination that one or more criteria are satisfied, including a criterion that is satisfied when the first media item is of a first type, initiating a process to add the first electronic device to the synchronized media and communication session; and in accordance with a determination that the second electronic device is not part of the synchronized media and communication session, forgoing initiating the process to add the first electronic device to the synchronized media and communication session.

48. The non-transitory computer readable storage medium of claim 47, the method further comprising:

in response to receiving the first input:

in accordance with a determination that the one or more criteria are satisfied:

initiating a second process to play the first media item in the synchronized media and communication session; and in accordance with a determination that the one or more criteria are not satisfied:

forgoing initiating the process to add the first electronic device to the synchronized media and communication session; and forgoing initiating the second process to play the first media item in the synchronized media and communication session.

49. The non-transitory computer readable storage medium of claim 48, the method further comprising:

while the first electronic device is part of the synchronized media and communication session, displaying, via a display generation component, a visual indication indicating that the first electronic device is part of the synchronized media and communication session.

50. The non-transitory computer readable storage medium of claim 47, wherein the one or more criteria include a second criterion that is satisfied when the first electronic device and the second electronic device are configured with a same user account, and is not satisfied when the first electronic device and the second electronic device are not configured with the same user account.

51. The non-transitory computer readable storage medium of claim 47, the method further comprising:

while the second electronic device is part of the synchronized media and communication session, displaying, via a display generation component, a visual indication that indicates that the second electronic device is part of the synchronized media and communication session.

52. The non-transitory computer readable storage medium of claim 47, wherein initiating the process to add the first electronic device to the synchronized media and communication session includes displaying, via a display generation component, an indication that input at the second electronic device is required for the first electronic device to be added to the synchronized media and communication session.

53. The non-transitory computer readable storage medium of claim 52, wherein the first electronic device is not part of the synchronized media and communication session while an indication is being displayed, the method further comprising:

while displaying the indication:

in accordance with a determination that an input confirming addition of the first electronic device to the synchronized media and communication session was received at the second electronic device, adding the first electronic device to the synchronized media and communication session; and in accordance with a determination that the input confirming addition of the first electronic device to the synchronized media and communication session was not received at the second electronic device, forgoing adding the first electronic device to the synchronized media and communication session.

54. The non-transitory computer readable storage medium of claim 47, wherein the one or more criteria are not satisfied when the first media item is of a second type, different from the first type, the method further comprising:

in response to receiving the first input:

in accordance with the determination that the one or more criteria are satisfied:

initiating a second process to play the first media item in the synchronized media and communication session; and in accordance with a determination that the one or more criteria are not satisfied, forgoing initiating the second process to play the first media item in the synchronized media and communication session.

55. The non-transitory computer readable storage medium of claim 54, wherein initiating the second process to play the first media item in the synchronized media and communication session includes playing the first media item at the first electronic device and the one or more third electronic devices.

56. The non-transitory computer readable storage medium of claim 54, wherein initiating the second process to play the first media item in the synchronized media and communication session includes displaying, via a display generation component, a first selectable option that, when selected, causes the first media item to play in the synchronized media and communication session.

57. The non-transitory computer readable storage medium of claim 56, wherein initiating the second process to play the first media item in the synchronized media and communication session includes displaying, via the display generation component, a second selectable option that, when selected, causes the first media item to be played at the one or more third electronic devices without playing the first media item in the synchronized media and communication session.

58. The non-transitory computer readable storage medium of claim 47, the method further comprising:

receiving, via the one or more input devices, a second input corresponding to a request to play a second media item; and in response to receiving the second input:

in accordance with a determination that one or more second criteria are satisfied:

in accordance with a determination that the first electronic device is part of the synchronized media and communication session, playing the second media item in the synchronized media and communication session; and in accordance with a determination that the first electronic device is not part of the synchronized media and communication session, displaying, via a display generation component, a first selectable option that, when selected, causes the second media item to be played in the synchronized media and communication session.

59. The non-transitory computer readable storage medium of claim 47, the method further comprising:

while the first media item is playing in the synchronized media and communication session, and while the one or more third electronic devices is part of synchronized media and communication session:

receiving, via the one or more input devices, a second input corresponding to a request to modify playback of the first media item; and in response to receiving the second input, modifying the playback of the first media item in the synchronized media and communication session in accordance with the second input.

60. The non-transitory computer readable storage medium of claim 47, wherein a respective media item, different from the first media item, is playing in the synchronized media and communication session when the first input is received, and in response to receiving the first input, in accordance with a determination that the one or more criteria are satisfied, the respective media item ceases playing in the synchronized media and communication, and the first media item starts playing in the synchronized media and communication session.

61. The non-transitory computer readable storage medium of claim 47, the method further comprising:

while the first media item is playing in the synchronized media and communication session, receiving, via the one or more input devices, a second input corresponding to a request to play a respective media item of a second type, different from the first type; and in response to receiving the second input:

initiating a process to playback, at the first electronic device, the respective media item without playing the respective media item in the synchronized media and communication session.

62. The non-transitory computer readable storage medium of claim 61, wherein in response to receiving the second input, the first media item continues to play in the synchronized media and communication session.

63. The non-transitory computer readable storage medium of claim 47, the method further comprising:

receiving, via one or more input devices, a second input corresponding to a request to display a control center user interface; and in response to receiving the second input:

displaying, via a display generation component, a control center user interface that includes a first set of selectable options for controlling one or more functionalities of the first electronic device; and in accordance with a determination that one or more second criteria are satisfied, including a criterion that is satisfied when the second electronic device is part of the synchronized media and communication session, displaying, in the control center user interface, information associated with the synchronized media and communication session.

64. The non-transitory computer readable storage medium of claim 63, wherein:

in accordance with a determination that a respective media item is playing in the synchronized media and communication session, the information associated with the synchronized media and communication session includes a visual indication indicating a playback status of the respective media item; and in accordance with a determination that the respective media item is not playing in the synchronized media and communication session, the information associated with the synchronized media and communication session does not include the visual indication indicating the playback status of the respective media item.

65. The non-transitory computer readable storage medium of claim 63, wherein:

in accordance with a determination that the first electronic device is part of the synchronized media and communication session, the information associated with the synchronized media and communication session includes a first selectable option that, when selected, causes the first electronic device to leave the synchronized media and communication session.

66. The non-transitory computer readable storage medium of claim 63, wherein:

the information associated with the synchronized media and communication session includes an indication of the second electronic device.

67. The non-transitory computer readable storage medium of claim 63, wherein:

in accordance with a determination that the first electronic device is not part of the synchronized media and communication session, the information associated with the synchronized media and communication session includes a visual indication indicating that the second electronic device is part of the synchronized media and communication session.

68. The non-transitory computer readable storage medium of claim 67, the method further comprising:

while displaying the visual indication indicating that the second electronic device is part of the synchronized media and communication session, receiving, via the one or more input devices, a second input selecting the visual indication; and in response to receiving the second input, initiating the process to add the first electronic device to the synchronized media and communication session.

69. The non-transitory computer readable storage medium of claim 63, the method further comprising:

in response to receiving the second input:

in accordance with a determination that the one or more second criteria are not satisfied, forgoing displaying, in the control center user interface, the information associated with the synchronized media and communication session.

* * * * *